US012440481B2

(12) United States Patent
Thomson et al.

(10) Patent No.: US 12,440,481 B2
(45) Date of Patent: Oct. 14, 2025

(54) ESTERS AND CARBAMATES AS MODULATORS OF SODIUM CHANNELS

(71) Applicant: VERTEX PHARMACEUTICALS INCORPORATED, Boston, MA (US)

(72) Inventors: Stephen Andrew Thomson, Del Mar, CA (US); Nadia Ahmad, Didcot (GB); Corey Anderson, Brighton, MA (US); Vijayalaksmi Arumugam, San Marcos, CA (US); Iuliana Luci Asgian, San Diego, CA (US); Joanne Louise Camp, Didcot (GB); Lev Tyler Dewey Fanning, San Marcos, CA (US); Sara Sabina Hadida Ruah, La Jolia, CA (US); Dennis Hurley, San Marcos, CA (US); Yvonne Schmidt, San Diego, CA (US); David Shaw, Oxford (GB); Urvi Patel, San Diego, CA (US); Lidio Marx Carvalho Meireles, San Marcos, CA (US)

(73) Assignee: VERTEX PHARMACEUTICALS INCORPORATED, Boston, MA (US)

( * ) Notice: Subject to any disclaimer, the term of this patent is extended or adjusted under 35 U.S.C. 154(b) by 960 days.

(21) Appl. No.: 17/421,945

(22) PCT Filed: Jan. 9, 2020

(86) PCT No.: PCT/US2020/012905
§ 371 (c)(1),
(2) Date: Jul. 9, 2021

(87) PCT Pub. No.: WO2020/146612
PCT Pub. Date: Jul. 16, 2020

(65) Prior Publication Data
US 2022/0110923 A1    Apr. 14, 2022

Related U.S. Application Data

(60) Provisional application No. 62/790,886, filed on Jan. 10, 2019.

(51) Int. Cl.
*A61K 31/44* (2006.01)
*A61K 31/192* (2006.01)
*C07C 65/24* (2006.01)
*C07D 213/79* (2006.01)

(52) U.S. Cl.
CPC ............ *A61K 31/44* (2013.01); *A61K 31/192* (2013.01); *C07C 65/24* (2013.01); *C07D 213/79* (2013.01); *C07B 2200/05* (2013.01)

(58) Field of Classification Search
CPC ....... A61K 31/192; A61K 31/44; A61P 29/00; C07B 2200/05; C07C 65/24; C07D 213/56; C07D 213/79
See application file for complete search history.

(56) References Cited

U.S. PATENT DOCUMENTS

| | | |
|---|---|---|
| 2,511,231 A | 6/1950 | Weissberger et al. |
| 2,657,134 A | 10/1953 | Graham et al. |
| 2,688,617 A | 9/1954 | Hein et al. |
| 2,694,718 A | 11/1954 | Salminen et al. |
| 2,710,802 A | 6/1955 | Parmerter et al. |
| 2,710,803 A | 6/1955 | Salminen et al. |
| 2,721,798 A | 10/1955 | Loria et al. |
| 2,725,292 A | 11/1955 | Graham et al. |
| 2,772,163 A | 11/1956 | Tong |
| 4,146,637 A | 3/1979 | Metz et al. |
| 4,218,765 A | 8/1980 | Kinkade |
| 4,639,273 A | 1/1987 | Gilmore et al. |
| 5,258,407 A | 11/1993 | Washburn et al. |
| 5,304,121 A | 4/1994 | Sahatjian |
| 5,310,760 A | 5/1994 | Washburn et al. |
| 5,312,960 A | 5/1994 | Kramer et al. |
| 5,532,235 A | 7/1996 | Albright et al. |
| 5,536,718 A | 7/1996 | Albright et al. |
| 5,886,026 A | 3/1999 | Hunter et al. |
| 6,099,562 A | 8/2000 | Ding et al. |
| 6,211,242 B1 | 4/2001 | Setoi et al. |
| 6,235,680 B1 | 5/2001 | Ziemer et al. |
| 6,531,291 B1 | 3/2003 | Kabbash et al. |
| 6,699,994 B1 | 3/2004 | Babu et al. |
| 6,936,719 B2 | 8/2005 | Babu et al. |
| 7,056,910 B2 | 6/2006 | Koshio et al. |

(Continued)

FOREIGN PATENT DOCUMENTS

| | | |
|---|---|---|
| BE | 854683 | 11/1977 |
| CA | 1091247 | 12/1980 |

(Continued)

OTHER PUBLICATIONS

Akopian, A.N., L. Sivilotti, and J.N. Wood, A tetrodotoxin-resistant voltage-gated sodium channel expressed by sensory neurons. *Nature*, 1996. 379(6562): p. 257-62.
Balasegaram, T. et al., "Structure-Activity Relations. Part 9. The Biological Activity and Mode of Action of Substituted 2-Phenoxy-N'phenyl-pyridine-3-carboxamides," J. Chem. Research (S), (1991), p. 234.
Berge, S.M., et al. describe pharmaceutically acceptable salts in detail in *J. Pharmaceutical Sciences*, 1977, 66, 1-19.
Black, J.A., et al., Multiple sodium channel isoforms and mitogen-activated protein kinases are present in painful human neuromas. *Ann. Neurol.*, 2008. 64(6): p. 644-53.
Blair, N.T. and B.P. Bean, Roles of tetrodotoxin (TTX)-sensitive Na+ current, TTX-resistant Na$^+$current, and Ca$^{2+}$current in the action potentials of nociceptive sensory neurons. *J. Neurosci.*, 2002. 22(23): p. 10277-90.

(Continued)

Primary Examiner — Umamaheswari Ramachandran
(74) *Attorney, Agent, or Firm* — Barnes & Thornburg LLP

(57) ABSTRACT

Compounds, and pharmaceutically acceptable salts thereof, useful as inhibitors of sodium channels are provided. Also provided are pharmaceutical compositions comprising the compounds or pharmaceutically acceptable salts and methods of using the compounds, pharmaceutically acceptable salts, and pharmaceutical compositions in the treatment of various disorders, including pain.

23 Claims, No Drawings

(56) References Cited

U.S. PATENT DOCUMENTS

| | | |
|---|---|---|
| 7,374,749 B2 | 5/2008 | Haase et al. |
| 7,863,280 B2 | 1/2011 | Paukert et al. |
| 8,389,734 B2 | 3/2013 | Chen et al. |
| 8,466,188 B2 | 6/2013 | Chafeev et al. |
| 8,481,479 B1 | 7/2013 | Mousa |
| 8,519,137 B2 | 8/2013 | Joshi et al. |
| 8,779,197 B2 | 7/2014 | Chen et al. |
| 8,841,483 B2 | 9/2014 | Joshi et al. |
| 8,865,771 B2 | 10/2014 | Chen et al. |
| 8,883,840 B2 | 11/2014 | Chafeev et al. |
| 9,051,270 B2 | 6/2015 | Hadida-Ruah et al. |
| 9,108,903 B2 | 8/2015 | Hadida-Ruah et al. |
| 9,139,529 B2 | 9/2015 | Hadida-Ruah et al. |
| 9,163,042 B2 | 10/2015 | Anderson et al. |
| 9,169,246 B2 | 10/2015 | Benazet et al. |
| 9,393,235 B2 | 7/2016 | Hadida-Ruah et al. |
| 9,421,196 B2 | 8/2016 | Hadida-Ruah et al. |
| 9,464,102 B2 | 10/2016 | Anderson et al. |
| 9,758,483 B2 | 9/2017 | Hadida-Ruah et al. |
| 9,783,501 B2 | 10/2017 | Hadida-Ruah et al. |
| 9,828,397 B2 | 11/2017 | Anderson et al. |
| 9,951,065 B2 | 4/2018 | Bartlett et al. |
| 10,087,143 B2 | 10/2018 | Hadida-Ruah et al. |
| 10,253,054 B2 | 4/2019 | Anderson et al. |
| 10,647,661 B2 | 5/2020 | Ahmad et al. |
| 10,738,009 B2 | 8/2020 | Hadida Ruah et al. |
| 10,787,472 B2 | 9/2020 | Anderson et al. |
| 11,203,571 B2 | 12/2021 | Hadida-Ruah et al. |
| 2002/0002183 A1 | 1/2002 | Zhu et al. |
| 2002/0032238 A1 | 3/2002 | Priepke et al. |
| 2002/0173656 A1 | 11/2002 | Peyman et al. |
| 2003/0225158 A1 | 12/2003 | Auerbach et al. |
| 2004/0058903 A1 | 3/2004 | Takasugi et al. |
| 2004/0132745 A1 | 7/2004 | Bertinato et al. |
| 2004/0186148 A1 | 9/2004 | Shankar et al. |
| 2005/0038035 A1 | 2/2005 | Takasugi et al. |
| 2005/0207972 A1 | 9/2005 | Friebe et al. |
| 2007/0237840 A1 | 10/2007 | Chern et al. |
| 2007/0238733 A1 | 10/2007 | Joshi et al. |
| 2008/0192127 A1 | 8/2008 | Sakai et al. |
| 2008/0312235 A1 | 12/2008 | Lane et al. |
| 2009/0012091 A1 | 1/2009 | Yu |
| 2009/0029994 A1 | 1/2009 | Nakamura et al. |
| 2009/0048306 A1 | 2/2009 | Bagal et al. |
| 2009/0074884 A1 | 3/2009 | Chesney et al. |
| 2009/0099233 A1 | 4/2009 | Joshi et al. |
| 2009/0118333 A1 | 5/2009 | Chen et al. |
| 2009/0118338 A1 | 5/2009 | Chen et al. |
| 2009/0163545 A1 | 6/2009 | Goldfarb |
| 2009/0326020 A1 | 12/2009 | Miller et al. |
| 2010/0009970 A1 | 1/2010 | Johansen et al. |
| 2010/0075948 A1 | 3/2010 | Ding et al. |
| 2010/0152190 A1 | 6/2010 | Bartkovitz et al. |
| 2011/0046370 A1 | 2/2011 | Sim et al. |
| 2011/0178089 A1 | 7/2011 | Bissantz et al. |
| 2011/0257196 A1 | 10/2011 | Lu et al. |
| 2011/0306607 A1 | 12/2011 | Hadida-Ruah et al. |
| 2012/0196869 A1 | 8/2012 | Hadida Ruah et al. |
| 2012/0220605 A1 | 8/2012 | Pajouhesh et al. |
| 2012/0245136 A1 | 9/2012 | Hadida-Ruah et al. |
| 2012/0264749 A1 | 10/2012 | Hadida-Ruah et al. |
| 2013/0150339 A1 | 6/2013 | Boezio et al. |
| 2013/0231370 A1 | 9/2013 | Chen et al. |
| 2013/0274243 A1 | 10/2013 | Bagal et al. |
| 2013/0295187 A1 | 11/2013 | Mousa |
| 2013/0303535 A1 | 11/2013 | Tsuboi et al. |
| 2014/0094457 A1 | 4/2014 | Gardner et al. |
| 2014/0187533 A1 | 7/2014 | Pajouhesh et al. |
| 2014/0200215 A1 | 7/2014 | Buckman et al. |
| 2014/0213616 A1 | 7/2014 | Hadida-Ruah et al. |
| 2014/0221435 A1* | 8/2014 | Hadida-Ruah ......... A61K 31/44 562/455 |
| 2014/0228371 A1 | 8/2014 | Hadida-Ruah et al. |
| 2014/0296313 A1 | 10/2014 | Bagal et al. |
| 2015/0005304 A1 | 1/2015 | Hadida-Ruah et al. |
| 2015/0166589 A1 | 6/2015 | Anderson et al. |
| 2015/0246028 A1 | 9/2015 | Hadida-Ruah et al. |
| 2015/0328196 A1 | 11/2015 | Hadida-Ruah et al. |
| 2015/0336945 A1 | 11/2015 | Hadida-Ruah et al. |
| 2016/0009743 A1 | 1/2016 | Anderson et al. |
| 2016/0152561 A1 | 6/2016 | Hadida-Ruah et al. |
| 2016/0376295 A1 | 12/2016 | Anderson et al. |
| 2017/0037009 A1 | 2/2017 | Hadida-Ruah et al. |
| 2018/0016235 A1 | 1/2018 | Hadida-Ruah et al. |
| 2018/0044361 A1 | 2/2018 | Anderson et al. |
| 2019/0005521 A1 | 1/2019 | Nobe |
| 2019/0016671 A1* | 1/2019 | Ahmad ................ C07D 213/81 |
| 2019/0248745 A1 | 8/2019 | Hadida Ruah et al. |
| 2019/0276483 A1 | 9/2019 | Anderson et al. |
| 2019/0343817 A1 | 11/2019 | Agarwal et al. |
| 2021/0047271 A1 | 2/2021 | Hadida Ruah et al. |
| 2021/0052610 A1 | 2/2021 | Agarwal et al. |
| 2021/0094906 A1 | 4/2021 | Ahmad et al. |
| 2021/0155643 A1 | 5/2021 | Jiang et al. |
| 2021/0198241 A1 | 7/2021 | Durrant |
| 2022/0110923 A1 | 4/2022 | Thomson |

FOREIGN PATENT DOCUMENTS

| | | |
|---|---|---|
| CA | 2109195 | 2/1993 |
| CA | 2512582 | 7/2004 |
| CA | 2851462 | 7/2004 |
| CN | 101838264 | 9/2010 |
| CN | 103012397 | 4/2013 |
| CN | 103961348 | 8/2014 |
| CN | 106317027 | 1/2017 |
| DE | 2623228 | 12/1977 |
| DE | 4023008 | 1/1991 |
| DE | 4019307 | 12/1991 |
| DE | 19523640 | 1/1997 |
| DE | 102004009238 | 9/2005 |
| DE | 102004050196 | 4/2006 |
| EP | 407217 | 1/1991 |
| EP | 569912 | 11/1993 |
| EP | 1217000 | 6/2002 |
| EP | 2573073 | 3/2013 |
| EP | 2606726 | 6/2013 |
| EP | 2997966 | 3/2016 |
| FR | 2628864 | 9/1989 |
| GB | 1555723 | 11/1979 |
| IT | T 1349739 | 12/2008 |
| JP | 63-182182 | 7/1988 |
| JP | 05313169 | 11/1993 |
| JP | 10-191842 | 7/1998 |
| JP | 10-213820 | 8/1998 |
| JP | 2003342175 | 12/2003 |
| JP | 2004043456 | 2/2004 |
| JP | 2004175739 | 6/2004 |
| JP | 2004315395 | 11/2004 |
| JP | 2008106017 | 5/2008 |
| JP | 2009108152 | 5/2009 |
| JP | 2009149754 | 7/2009 |
| JP | 2009209090 | 9/2009 |
| JP | 2009242540 | 10/2009 |
| JP | 2010001284 | 1/2010 |
| JP | 2010059131 | 3/2010 |
| JP | 2010066630 | 3/2010 |
| JP | 2010126651 | 6/2010 |
| JP | 2011006360 | 1/2011 |
| JP | 2011162678 | 8/2011 |
| JP | 2011207765 | 10/2011 |
| JP | 2014232188 | 12/2014 |
| WO | WO 1993016684 | 9/1993 |
| WO | WO 1995029152 | 11/1995 |
| WO | WO 1995032943 | 12/1995 |
| WO | WO 1996022282 | 7/1996 |
| WO | WO 1997001542 | 1/1997 |
| WO | WO 1997045016 | 12/1997 |
| WO | WO 1997049707 | 12/1997 |
| WO | WO 1998047879 | 10/1998 |
| WO | WO 1999047529 | 9/1999 |
| WO | WO 1999055663 | 11/1999 |
| WO | WO 1999065874 | 12/1999 |
| WO | WO 2000024707 | 5/2000 |

(56) References Cited

FOREIGN PATENT DOCUMENTS

| | | |
|---|---|---|
| WO | WO 2000064876 | 11/2000 |
| WO | WO 2001007028 | 2/2001 |
| WO | WO 2001019788 | 3/2001 |
| WO | WO 2001043732 | 6/2001 |
| WO | WO 2001056989 | 8/2001 |
| WO | WO 2001064642 | 9/2001 |
| WO | WO 2001064643 | 9/2001 |
| WO | WO 2001066098 | 9/2001 |
| WO | WO 2001070671 | 9/2001 |
| WO | WO 2001080894 | 11/2001 |
| WO | WO 2002004403 | 1/2002 |
| WO | WO 2002028835 | 4/2002 |
| WO | WO 2002034711 | 5/2002 |
| WO | WO 2002042273 | 5/2002 |
| WO | WO 2002046159 | 6/2002 |
| WO | WO 2002051397 | 7/2002 |
| WO | WO 2002054077 | 7/2002 |
| WO | WO 2002070483 | 9/2002 |
| WO | WO 2002090347 | 11/2002 |
| WO | WO 2002098839 | 12/2002 |
| WO | WO 2002101007 | 12/2002 |
| WO | WO 2003003008 | 1/2003 |
| WO | WO 2003003009 | 1/2003 |
| WO | WO 2003004020 | 1/2003 |
| WO | WO 2003007955 | 1/2003 |
| WO | WO 2003013516 | 2/2003 |
| WO | WO 2003018536 | 3/2003 |
| WO | WO 2003045921 | 6/2003 |
| WO | WO 2003055477 | 7/2003 |
| WO | WO 2003057205 | 7/2003 |
| WO | WO 2003062221 | 7/2003 |
| WO | WO 2003072532 | 9/2003 |
| WO | WO 2003075907 | 9/2003 |
| WO | WO 2004000820 | 12/2003 |
| WO | WO 2004014844 | 2/2004 |
| WO | WO 2004018428 | 3/2004 |
| WO | WO 2004052837 | 6/2004 |
| WO | WO 2004056777 | 7/2004 |
| WO | WO 2004062601 | 7/2004 |
| WO | WO 2005000309 | 1/2005 |
| WO | WO 2005023761 | 3/2005 |
| WO | WO 2005033079 | 4/2005 |
| WO | WO 2005040135 | 5/2005 |
| WO | WO 2005073165 | 8/2005 |
| WO | WO 2005085202 | 9/2005 |
| WO | WO 2006007864 | 1/2006 |
| WO | WO 2006011050 | 2/2006 |
| WO | WO 2006058905 | 6/2006 |
| WO | WO 2006067445 | 6/2006 |
| WO | WO 2006068199 | 6/2006 |
| WO | WO 2006137376 | 12/2006 |
| WO | WO 2007008627 | 1/2007 |
| WO | WO 2007013332 | 2/2007 |
| WO | WO 2007030567 | 3/2007 |
| WO | WO 2007052843 | 5/2007 |
| WO | WO 2007056143 | 5/2007 |
| WO | WO 2007071632 | 6/2007 |
| WO | WO 2007088996 | 8/2007 |
| WO | WO 2008044767 | 4/2008 |
| WO | WO 2008073670 | 6/2008 |
| WO | WO 2008074997 | 6/2008 |
| WO | WO 2008104994 | 9/2008 |
| WO | WO 2008135826 | 11/2008 |
| WO | WO 2008140810 | 11/2008 |
| WO | WO 2009000413 | 12/2008 |
| WO | WO 2009047105 | 4/2009 |
| WO | WO 2009047151 | 4/2009 |
| WO | WO 2009049180 | 4/2009 |
| WO | WO 2009049181 | 4/2009 |
| WO | WO 2009049183 | 4/2009 |
| WO | WO 2009070533 | 6/2009 |
| WO | WO 2010027746 | 3/2010 |
| WO | WO 2010031713 | 3/2010 |
| WO | WO 2010048149 | 4/2010 |
| WO | WO 2010133312 | 11/2010 |
| WO | WO 2010133748 | 11/2010 |
| WO | WO 2010138901 | 12/2010 |
| WO | WO 2011026240 | 3/2011 |
| WO | WO 2011032169 | 3/2011 |
| WO | WO 2011109059 | 9/2011 |
| WO | WO 2011133729 | 10/2011 |
| WO | WO 2011139765 | 11/2011 |
| WO | WO 2011140425 | 11/2011 |
| WO | WO 2012016133 | 2/2012 |
| WO | WO 2012026931 | 3/2012 |
| WO | WO 2012027392 | 3/2012 |
| WO | WO 2012106499 | 3/2012 |
| WO | WO 2012080729 | 6/2012 |
| WO | WO 2012112743 | 8/2012 |
| WO | WO 2012116440 | 9/2012 |
| WO | WO 2012125613 | 9/2012 |
| WO | WO 2012129562 | 9/2012 |
| WO | WO 2012166951 | 12/2012 |
| WO | WO 2012177668 | 12/2012 |
| WO | WO 2013003112 | 1/2013 |
| WO | WO 2013045400 | 4/2013 |
| WO | WO 2013061205 | 5/2013 |
| WO | WO 2013072502 | 5/2013 |
| WO | WO 2013092350 | 6/2013 |
| WO | WO 2013096060 | 6/2013 |
| WO | WO 2013109521 | 7/2013 |
| WO | WO 2013114250 | 8/2013 |
| WO | WO 2013131018 | 9/2013 |
| WO | WO 2014041125 | 3/2014 |
| WO | WO 2014055634 | 4/2014 |
| WO | WO 2014120808 | 8/2014 |
| WO | WO 2014120815 | 8/2014 |
| WO | WO 2014120820 | 8/2014 |
| WO | WO 2014134127 | 9/2014 |
| WO | WO 2014149207 | 9/2014 |
| WO | WO 2014157267 | 10/2014 |
| WO | WO 2014192681 | 12/2014 |
| WO | WO 2014204831 | 12/2014 |
| WO | WO 2015003816 | 1/2015 |
| WO | WO 2015010065 | 1/2015 |
| WO | WO 2015011284 | 1/2015 |
| WO | WO 2015014900 | 2/2015 |
| WO | WO 2015030898 | 3/2015 |
| WO | WO 2015046827 | 4/2015 |
| WO | WO 2015085238 | 6/2015 |
| WO | WO 2015089361 | 6/2015 |
| WO | WO 2015196072 | 12/2015 |
| WO | WO 2016022626 | 1/2016 |
| WO | WO 2016040449 | 3/2016 |
| WO | WO 2017040982 | 3/2017 |
| WO | WO 2017062751 | 4/2017 |
| WO | WO 2017066705 | 4/2017 |
| WO | WO 2017161028 | 9/2017 |
| WO | WO 2018060110 | 4/2018 |
| WO | WO 2018064119 | 4/2018 |
| WO | WO 2018161033 | 9/2018 |
| WO | WO 2018195439 | 10/2018 |
| WO | WO 2018202681 | 11/2018 |
| WO | WO 2019014352 | 1/2019 |
| WO | WO 2019018119 | 1/2019 |
| WO | WO 2019036657 | 2/2019 |
| WO | WO 2019150220 | 8/2019 |
| WO | WO 2019206925 | 10/2019 |
| WO | WO 2019207081 | 10/2019 |
| WO | WO 2019241787 | 12/2019 |
| WO | WO 2020051207 | 3/2020 |
| WO | WO 2020081572 | 4/2020 |
| WO | WO 2020123675 | 6/2020 |
| WO | WO 2020139748 | 7/2020 |
| WO | WO 2020146612 | 7/2020 |
| WO | WO 2020146682 | 7/2020 |
| WO | WO 2020152079 | 7/2020 |
| WO | WO 2020159576 | 8/2020 |
| WO | WO 2020176763 | 9/2020 |
| WO | WO 2020190774 | 9/2020 |
| WO | WO 2020198712 | 10/2020 |
| WO | WO 2020219867 | 10/2020 |

(56) References Cited

FOREIGN PATENT DOCUMENTS

| WO | WO 2020221677 | 11/2020 |
|---|---|---|
| WO | WO 2020251974 | 12/2020 |
| ZA | 9704663 | 12/1997 |

OTHER PUBLICATIONS

Bolton et al., "Discovery of nonbenzamidine factor VIIa inhibitors using a biaryl acid scaffold," Bioorganic & Medicinal Chemistry Letters, vol. 23, Iss. 18, (Sep. 15, 2013), pp. 5239-5243.
Catterall, W. A., Goldin, A. L., and Waxman, S. G., International Union of Pharmacology. XLVII. Nomenclature and structure-function relationships of voltage-gated sodium channels. *Pharmacol. Rev.* 57 (4), p. 397 (2005).
Chahine, M., Chatelier, A., Babich, O., and Krupp, J. J., Voltage-gated sodium channels in neurological disorders. *CNS Neurol. Disord. Drug Targets* 7 (2), p. 144-58 (2008).
Cheney et al., "Discovery of Novel P1 Groups for Coagulation Factor VIIa Inhibition Using Fragment-Based Screening," J. med. Chem., (2015), 58, 6, pp. 2799-2808.
Choi, J.S. and S.G. Waxman, Physiological interactions between $Na_v1.7$ and $Na_v1.8$ sodium channels: a computer simulation study. *J. Neurophysiol.* 106(6): p. 3173-84.
Coward, K., et al., Immunolocalization of SNS/PN3 and NaN/SNS2 sodium channels in human pain states. *Pain*, 2000. 85(1-2): p. 41-50.
Deak HL, et al., "N-(3-(Phenylcarbamoyl)arylpyrimidine)-5-carboxamides as potent and selective inhibitors of Lck: Structure, synthesis and SAR." Bioorg. Med. Chem. Lett., (Feb. 1, 2008); 18(3); pp. 1172-1176.
Dieleman, J.P., et al., Incidence rates and treatment of neuropathic pain conditions in the general population. *Pain*, 2008. 137(3): p. 681-8.
Dong, X.W., et al., Small interfering RNA-mediated selective knockdown of $Na_{(v)}1.8$ tetrodotoxin-resistant sodium channel reverses mechanical allodynia in neuropathic rats. *Neuroscience*, 2007. 146(2): p. 812-21.
England, S., Voltage-gated sodium channels: the search for subtype-selective analgesics. *Expert Opin. Investig. Drugs* 17 (12), p. 1849-64 (2008).
Harbeson, S.L., and Tung, *Deuterium In Drug Discovery and Development*, Ann. Rep. Med. Chem. 2011, 46, 403-417.
Huang, H.L., et al., Proteomic profiling of neuromas reveals alterations in protein composition and local protein synthesis in hyperexcitable nerves. *Mol. Pain*, 2008. 4: p. 33.
Jarvis, M.F., et al., A-803467, a potent and selective $Na_v1.8$ sodium channel blocker, attenuates neuropathic and inflammatory pain in the rat. *Proc. Natl. Acad. Sci. U S A*, 2007. 104(20): p. 8520-5.
Joshi, S.K., et al., Involvement of the TTX-resistant sodium channel Nav1.8 in inflammatory and neuropathic, but not post-operative, pain states. *Pain*, 2006. 123(1-2): pp. 75-82.
Kassah, E.A. et al., "Synthesis and behavior of a static benzoxazinone derivative towards nitrogen and sulphur nucleophieles," Egyptian Journal of Chemistry, 44, (2001); pp. 169-180.
Krafte, D. S. and Bannon, A. W., Sodium channels and nociception: recent concepts and therapeutic opportunities. *Curr. Opin. Pharmacol.* 8 (1), p. 50-56 (2008).
Lai, J., et al., Inhibition of neuropathic pain by decreased expression of the tetrodotoxin-resistant sodium channel, $Na_v1.8$. *Pain*, 2002. 95(1-2): p. 143-52.
Lambeng et al., "Arylsulfonamides as a new class of cannabinoid $CB_1$ receptor ligands: Identification of a lead and initial SAR studies," Bioorganic & Medicinal Chemistry Letters, vol. 17, Iss. 1, (Jan. 1, 2007), pp. 272-277.
Li, J., et al., "Discovery of potent and orally active MTP inhibitors as potential anti-obesity agents," Bioorganic & Medicinal Chemistry Letters, vol. 16, Iss. 11, 16 (Jun. 2006), pp. 3039-3042.
Liew et al., "SVM Model for Virtual Screening of Lck Inhibitors," J. Chem. Inf. Model. (2009), 44, 4, pp. 877-885.
List of Registry Compounds from CAS STN® Registry Database, with dates of entry in database.
Mehta et al., "Synthesis, characterization and antimicrobial activity of 1, 3, 4,-oxadiazoles derivatives of benzimidazoles," Chem. Sci. Rev. & Lett., 2014, 3(11), pp. 522-528.
Mehta et al., "Synthesis, characterization and antimicrobial evaluation of some novel benzenesulfonylhydrazone derivatives of benzimidazole," Der ChemicaSinica, 2015, 6(2): pp. 29-34.
Micronized amino-substituted hydroxyphenylbenzophenone derivatives IP.com Journal (Feb. 24, 2006) IP134143D.
Miura et al., "Design, synthesis and biological activity of selective and orally available TF/FVIIa complex inhibitors containing non-amidine P1 ligands," Bioorg. Med. Chem. (Jan. 1, 2007); 15(1): pp. 160-173.
Miura et la., "Potent and selective TF/FVIIa inhibitors containing a neutral P1 ligand," Bioorg. Med. Chem. (Dec. 1, 2006); 14(23): pp. 7688-7705.
Naruto et al., "Synthesis of yokonoside and its related compounds," Yakugaku Zassh (Aug. 1976); 96(8): pp. 945-951.
Nielsen et la., "2-(4-Methoxyphenoxy)-5-nitro-N-(4-sulfamoylphenyl)benzamide activates Kir6.2/SUR1 KATP channels," Bioorg. Med. Chem. Lett. (Dec. 6, 2004); 14(23): pp. 5727-5730.
Preparation of amino substituted hydroxyl phenyl benzophenone derivatives and their uses as UV filters in sunscreen formulations, IP.com Journal (Aug. 4, 2003) IP 18721D.
Qiu, F., et al., Increased expression of tetrodotoxin-resistant sodium channels $Na_v1.8$ and $Na_v1.9$ within dorsal root ganglia in a rat model of bone cancer pain. *Neurosci. Lett.*, 512(2): p. 61-6).
Renganathan, M., T.R. Cummins, and S.G. Waxman, Contribution of $Na_{(v)}1.8$ sodium channels to action potential electrogenesis in DRG neurons. *J. Neurophysiol.*, 2001. 86(2): p. 629-40.
Roza, C., et al., The tetrodotoxin-resistant $Na^+$channel $Na_v1.8$ is essential for the expression of spontaneous activity in damaged sensory axons of mice. *J. Physiol.*, 2003. 550(Pt 3): p. 921-6.
Ruangsri, S., et al., Relationship of axonal voltage-gated sodium channel 1.8 ($Na_v1.8$) mRNA accumulation to sciatic nerve injury-induced painful neuropathy in rats. *J. Biol. Chem.* 286(46): p. 39836-47).
Rush, A.M. and T.R. Cummins, *Painful Research: Identification of a Small-Molecule Inhibitor that Selectively Targets $Na_v1.8$ Sodium Channels*, Mol. Interv., 2007. 7(4): p. 192-5).
Rush, A.M., et al., A single sodium channel mutation produces hyper- or hypoexcitability in different types of neurons. *Proc. Natl. Acad. Sci. USA*, 2006. 103(21): p. 8245-50).
Shirley, V.S., & Lederer, C.M., Isotopes Project, Nuclear Science Division, Lawrence Berkeley Laboratory, Table of Nuclides (Jan. 1980).
Soderpalm, B., Anticonvulsants: aspects of their mechanisms of action. *Eur. J. Pain* 6 Suppl. A, p. 3-9 (2002).
Strickland, I.T., et al., Changes in the expression of NaV1.7, $Na_v1.8$ and $Na_v1.9$ in a distinct population of dorsal root ganglia innervating the rat knee joint in a model of chronic inflammatory joint pain. *Eur. J. Pain*, 2008. 12(5): p. 564-72.
Sun, W., et al., Reduced conduction failure of the main axon of polymodal nociceptive C-fibers contributes to painful diabetic neuropathy in rats. *Brain*, 135(Pt 2): p. 359-75.
Use of amino hydroxy benzophenone derivatives for protecting human hair and skin, IP.com Journal (Aug. 10, 2006) IP 138915D.
Use of aminohydroxybenzophenone derivatives in sunscreen preparations, IP.com Journal (Aug. 24, 2006) IP139425D.
Vertex Announces Treatment with the NaV1.8 Inhibitor VX-150 Showed Significant Relief of Acute Pain in Phase 2 Study (Feb. 14, 2018).
Wang et al., "Kinetics of extractable residue, bound residue and mineralization of a novel herbicide, ZJ0273, in aerobic soils," Chemosphere, vol. 76, Iss. 8, (Aug. 2009), pp. 1036-1040.
Wang et al., "Studies on the anoxic dissipation and metabolism of pyribambenz propyl (ZJ0273) in soils using position-specific radiolabeling," Science of the Total Environment 472, (2014), pp. 582-589.
Wang et al., "Transformation of 14C-pyrimidynyloxybenzoic herbicide ZJ0273 in aerobic soils," Science of The Total Environment, vol. 408, Iss. 10, (Apr. 15, 2010); pp. 2239-2244.

(56) References Cited

OTHER PUBLICATIONS

Wang, G. K., Mitchell, J., and Wang, S. Y., Block persistent late Na$^+$currents by antidepressant sertraline and paroxetine. *J. Membr. Biol.* 222 (2), p. 79-90 (2008).

Written Opinion of the International Searching Authority and International Search Report for PCT/US2018/041649 dated Oct. 17, 2018.

Yiangou, Y., et al., SNS/PN3 and SNS2/NaN sodium channel-like immunoreactivity in human adult and neonate injured sensory nerves. *FEBS Lett.*, 2000. 467(2-3): p. 249-52.

Yue et al., "The metabolism of a novel herbicide ZJ0273 in oilseed rape and crickweed," Pesticide Biochemistry and Physiology, vol. 104, Iss.3, (Sep. 2012), pp. 44-49.

Fornwald, J.A. et al., Gene Expression in Mammalian Cells Using BacMam, a Modified Baculovirus System, *1350 Methods in Molecular Biology*, 2016, pp. 95-116.

Gonzalez, J.E., and Tsien, R.Y., Improved indicators of cell membrane potential that use fluorescence resonance energy transfer, *Chem. Biol*, 1997, 4, pp. 269-277.

Gonzalez, J.E., and Tsien, R.Y., Voltage Sensing by Fluorescence Resonance Energy Transfer in Single Cells, *Biophys. J.*, 69, 1995, pp. 1272-1280.

Huang, J., et al., Characterization of voltage-gated sodium channel blockers by electrical stimulation and fluorescence detection of membrane potential, 24 *Nature Biotech*, 2006, pp. 439-446.

International Search Report and Written Opinion of the International Searching Authority for International Application No. PCT/US2020/012905 (Apr. 1, 2020).

\* cited by examiner

ESTERS AND CARBAMATES AS MODULATORS OF SODIUM CHANNELS

CROSS-REFERENCE TO RELATED APPLICATIONS

This application is a National Stage application of International Application No. PCT/US2020/012905, filed on Jan. 9, 2020, which claims benefit of priority of U.S. Provisional Application Ser. No. 62/790,886, filed on Jan. 10, 2019, which is incorporated by reference herein in its entirety.

BACKGROUND

Pain is a protective mechanism that allows healthy animals to avoid tissue damage and to prevent further damage to injured tissue. Nonetheless there are many conditions where pain persists beyond its usefulness, or where patients would benefit from inhibition of pain. Neuropathic pain is a form of chronic pain caused by an injury to the sensory nerves (Dieleman, J. P., et al., Incidence rates and treatment of neuropathic pain conditions in the general population. *Pain,* 2008. 137(3): p. 681-8). Neuropathic pain can be divided into two categories, pain caused by generalized metabolic damage to the nerve and pain caused by a discrete nerve injury. The metabolic neuropathies include post-herpetic neuropathy, diabetic neuropathy, and drug-induced neuropathy. Discrete nerve injury indications include post amputation pain, post-surgical nerve injury pain, and nerve entrapment injuries like neuropathic back pain.

Voltage-gated sodium channels ($Na_Vs$) are involved in pain signaling. $Na_Vs$ are biological mediators of electrical signaling as they mediate the rapid upstroke of the action potential of many excitable cell types (e.g. neurons, skeletal myocytes, cardiac myocytes). The evidence for the role of these channels in normal physiology, the pathological states arising from mutations in sodium channel genes, preclinical work in animal models, and the clinical pharmacology of known sodium channel modulating agents all point to the central role of $Na_Vs$ in pain sensation (Rush, A. M. and T. R. Cummins, *Painful Research: Identification of a Small-Molecule Inhibitor that Selectively Targets $Na_V1.8$ Sodium Channels.* Mol. Interv., 2007. 7(4): p. 192-5); England, S., Voltage-gated sodium channels: the search for subtype-selective analgesics. *Expert Opin. Investig. Drugs* 17 (12), p. 1849-64 (2008); Krafte, D. S. and Bannon, A. W., Sodium channels and nociception: recent concepts and therapeutic opportunities. *Curr. Opin. Pharmacol.* 8 (1), p. 50-56 (2008)). $Na_Vs$ mediate the rapid upstroke of the action potential of many excitable cell types (e.g. neurons, skeletal myocytes, cardiac myocytes), and thus are involved in the initiation of signaling in those cells (Hille, Bertil, *Ion Channels of Excitable Membranes,* Third ed. (Sinauer Associates, Inc., Sunderland, MA, 2001)). Because of the role $Na_Vs$ play in the initiation and propagation of neuronal signals, antagonists that reduce $Na_V$ currents can prevent or reduce neural signaling and $Na_V$ channels have been considered likely targets to reduce pain in conditions where hyper-excitability is observed (Chahine, M., Chatelier, A., Babich, O., and Krupp, J. J., Voltage-gated sodium channels in neurological disorders. *CNS Neurol. Disord. Drug Targets* 7 (2), p. 144-58 (2008)). Several clinically useful analgesics have been identified as inhibitors of $Na_V$ channels. The local anesthetic drugs such as lidocaine block pain by inhibiting $Na_V$ channels, and other compounds, such as carbamazepine, lamotrigine, and tricyclic antidepressants that have proven effective at reducing pain have also been suggested to act by sodium channel inhibition (Soderpalm, B., Anticonvulsants: aspects of their mechanisms of action. *Eur. J. Pain* 6 Suppl. A, p. 3-9 (2002); Wang, G. K., Mitchell, J., and Wang, S. Y., Block of persistent late $Na^+$ currents by antidepressant sertraline and paroxetine. *J. Membr. Biol.* 222 (2), p. 79-90 (2008)).

The $Na_Vs$ form a subfamily of the voltage-gated ion channel super-family and comprises 9 isoforms, designated $Na_V1.1$-$Na_V1.9$. The tissue localizations of the nine isoforms vary. $Na_V1.4$ is the primary sodium channel of skeletal muscle, and $Na_V1.5$ is primary sodium channel of cardiac myocytes. $Na_Vs$ 1.7, 1.8 and 1.9 are primarily localized to the peripheral nervous system, while $Na_Vs$ 1.1, 1.2, 1.3, and 1.6 are neuronal channels found in both the central and peripheral nervous systems. The functional behaviors of the nine isoforms are similar but distinct in the specifics of their voltage-dependent and kinetic behavior (Catterall, W. A., Goldin, A. L., and Waxman, S. G., International Union of Pharmacology. XLVII. Nomenclature and structure-function relationships of voltage-gated sodium channels. *Pharmacol. Rev.* 57 (4), p. 397 (2005)).

Upon their discovery, $Na_V1.8$ channels were identified as likely targets for analgesia (Akopian, A. N., L. Sivilotti, and J. N. Wood, A tetrodotoxin-resistant voltage-gated sodium channel expressed by sensory neurons. *Nature,* 1996. 379 (6562): p. 257-62). Since then, $Na_V1.8$ has been shown to be a carrier of the sodium current that maintains action potential firing in small dorsal root ganglia (DRG) neurons (Blair, N. T. and B. P. Bean, Roles of tetrodotoxin (TTX)-sensitive $Na+$ current, TTX-resistant $Na^+$ current, and $Ca^{2+}$ current in the action potentials of nociceptive sensory neurons. *J. Neurosci.,* 2002. 22(23): p. 10277-90). $Na_V1.8$ is involved in spontaneous firing in damaged neurons, like those that drive neuropathic pain (Roza, C., et al., The tetrodotoxin-resistant $Na^+$ channel $Na_V1.8$ is essential for the expression of spontaneous activity in damaged sensory axons of mice. *J. Physiol.,* 2003. 550(Pt 3): p. 921-6; Jarvis, M. F., et al., A-803467, a potent and selective $Na_V1.8$ sodium channel blocker, attenuates neuropathic and inflammatory pain in the rat. *Proc. Natl. Acad. Sci. USA,* 2007. 104(20): p. 8520-5; Joshi, S. K., et al., Involvement of the TTX-resistant sodium channel $Na_V1.8$ in inflammatory and neuropathic, but not post-operative, pain states. *Pain,* 2006. 123(1-2): pp. 75-82; Lai, J., et al., Inhibition of neuropathic pain by decreased expression of the tetrodotoxin-resistant sodium channel, $Na_V1.8$. *Pain,* 2002. 95(1-2): p. 143-52; Dong, X. W., et al., Small interfering RNA-mediated selective knockdown of $Na_V1.8$ tetrodotoxin-resistant sodium channel reverses mechanical allodynia in neuropathic rats. *Neuroscience,* 2007. 146(2): p. 812-21; Huang, H. L., et al., Proteomic profiling of neuromas reveals alterations in protein composition and local protein synthesis in hyper-excitable nerves. *Mol. Pain,* 2008. 4: p. 33; Black, J. A., et al., Multiple sodium channel isoforms and mitogen-activated protein kinases are present in painful human neuromas. *Ann. Neurol.,* 2008. 64(6): p. 644-53; Coward, K., et al., Immunolocalization of SNS/PN3 and NaN/SNS2 sodium channels in human pain states. *Pain,* 2000. 85(1-2): p. 41-50; Yiangou, Y., et al., SNS/PN3 and SNS2/NaN sodium channel-like immunoreactivity in human adult and neonate injured sensory nerves. *FEBS Lett.,* 2000. 467(2-3): p. 249-52; Ruangsri, S., et al., Relationship of axonal voltage-gated sodium channel 1.8 ($Na_V1.8$) mRNA accumulation to sciatic nerve injury-induced painful neuropathy in rats. *J. Biol. Chem.* 286(46): p. 39836-47). The small DRG neurons where $Na_V1.8$ is expressed include the nociceptors involved in pain signaling. $Na_V1.8$ mediates large amplitude action potentials in small neurons of the dorsal root ganglia (Blair, N. T. and B. P. Bean, Roles of tetrodotoxin (TTX)-sensitive $Na^+$ current, TTX-resistant $Na^+$ current, and $Ca^{2+}$ current in the action potentials of nociceptive sensory neurons. *J. Neurosci.*, 2002. 22(23): p. 10277-90). $Na_V 1.8$ is necessary for rapid repetitive action potentials in nociceptors, and for spontaneous activity of damaged neurons. (Choi, J. S. and S. G. Waxman, Physiological interactions between $Na_V 1.7$ and $Na_V 1.8$ sodium channels: a computer simulation study. *J. Neurophysiol.* 106(6): p. 3173-84; Renganathan, M., T. R. Cummins, and S. G. Waxman, Contribution of $Na_{(V)} 1.8$ sodium channels to action potential electrogenesis in DRG neurons. *J. Neurophysiol.*, 2001. 86(2): p. 629-40; Roza, C., et al., The tetrodotoxin-resistant $Na^+$ channel $Na_V 1.8$ is essential for the expression of spontaneous activity in damaged sensory axons of mice. *J. Physiol.*, 2003. 550(Pt 3): p. 921-6). In depolarized or damaged DRG neurons, $Na_V 1.8$ appears to be a driver of hyper-excitability (Rush, A. M., et al., A single sodium channel mutation produces hyper- or hypoexcitability in different types of neurons. *Proc. Natl. Acad. Sci. USA*, 2006. 103(21): p. 8245-50). In some animal pain models, $Na_V 1.8$ mRNA expression levels have been shown to increase in the DRG (Sun, W., et al., Reduced conduction failure of the main axon of polymodal nociceptive C-fibers contributes to painful diabetic neuropathy in rats. *Brain*, 135(Pt 2): p. 359-75; Strickland, I. T., et al., Changes in the expression of $Na_V 1.7$, $Na_V 1.8$ and $Na_V 1.9$ in a distinct population of dorsal root ganglia innervating the rat knee joint in a model of chronic inflammatory joint pain. *Eur. J Pain*, 2008. 12(5): p. 564-72; Qiu, F., et al., Increased expression of tetrodotoxin-resistant sodium channels $Na_V 1.8$ and $Na_V 1.9$ within dorsal root ganglia in a rat model of bone cancer pain. *Neurosci. Lett.*, 512(2): p. 61-6).

The primary drawback to some known $Na_V$ inhibitors is their poor therapeutic window, and this is likely a consequence of their lack of isoform selectivity. Since $Na_V 1.8$ is primarily restricted to the neurons that sense pain, selective $Na_V 1.8$ blockers are unlikely to induce the adverse events common to non-selective $Na_V$ blockers. Accordingly, there remains a need to develop additional $Na_V$ channel modulators, preferably those that are highly potent and selective for $Na_V 1.8$.

SUMMARY

In one aspect, the invention relates to a compound described herein, or a pharmaceutically acceptable salt thereof.

In another aspect, the invention relates to a pharmaceutical composition comprising the compound, or a pharmaceutically acceptable salt thereof, and one or more pharmaceutically acceptable carriers or vehicles.

In still another aspect, the invention relates to a method of inhibiting a voltage gated sodium channel in a subject by administering the compound, pharmaceutically acceptable salt, or pharmaceutical composition to the subject.

In yet another aspect, the invention relates to a method of treating or lessening the severity in a subject of a variety of diseases, disorders, or conditions, including, but not limited to, chronic pain, gut pain, neuropathic pain, musculoskeletal pain, acute pain, inflammatory pain, cancer pain, idiopathic pain, postsurgical pain (e.g., bunionectomy pain, herniorrhaphy pain or abdominoplasty pain), visceral pain, multiple sclerosis, Charcot-Marie-Tooth syndrome, incontinence, pathological cough, and cardiac arrhythmia, by administering the compound, pharmaceutically acceptable salt, or pharmaceutical composition to the subject.

DETAILED DESCRIPTION

In one aspect, the invention relates to a compound of formula (I), (II), or (III)

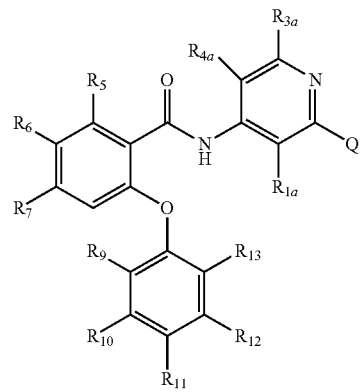

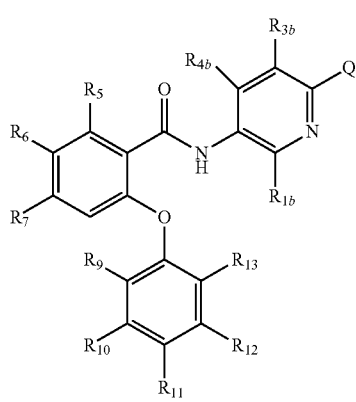

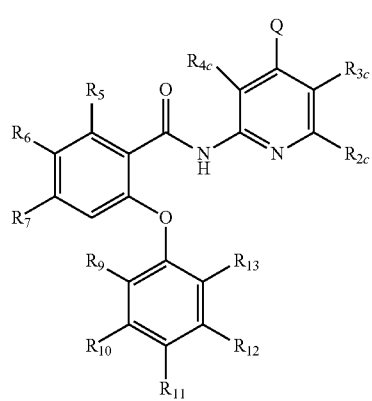

or a pharmaceutically acceptable salt thereof, wherein Q, $R_n$, $R_o$, $R_{1a}$, $R_{3a}$, $R_{4a}$, $R_{1b}$, $R_{3b}$, $R_{4b}$, $R_{2c}$, $R_{3c}$, $R_{4c}$, $R_5$, $R_6$, $R_7$, $R_9$, $R_{10}$, $R_{11}$, $R_{12}$, $R_{13}$, W, $R_w$, and n are defined as described herein.

For purposes of this invention, the chemical elements are identified in accordance with the Periodic Table of the Elements, CAS version, Handbook of Chemistry and Physics, 75$^{th}$ Ed. Additionally, general principles of organic chemistry are described in "Organic Chemistry," Thomas Sorrell, University Science Books, Sausalito: 1999, and "March's Advanced Organic Chemistry," 5$^{th}$ Ed., Ed.: Smith, M. B. and March, J., John Wiley & Sons, New York: 2001, the entire contents of which are hereby incorporated by reference.

As used herein, the term "compounds of the invention" refers to the compounds of formulas (I), (I-A), (I-B), (II), (II-A), (III), and (III-A), and all of the embodiments thereof, as described herein, and to the compounds identified in Tables 1, 1A, and 1B.

As described herein, the compounds of the invention comprise multiple variable groups (e.g., Q, $R_{3a}$, $R_5$, etc.). As one of ordinary skill in the art will recognize, combinations of groups envisioned by this invention are those combinations that result in the formation of stable or chemically feasible compounds. The term "stable," in this context, refers to compounds that are not substantially altered when subjected to conditions to allow for their production, detection, and preferably their recovery, purification, and use for one or more of the purposes disclosed herein. In some embodiments, a stable compound or chemically feasible compound is one that is not substantially altered when kept at a temperature of 40° C. or less, in the absence of moisture or other chemically reactive conditions, for at least a week.

As used herein, the term "substituted," refers to a group in which one or more hydrogen radicals has been replaced with a specified substituent. Unless otherwise indicated, a substituted group can have a substituent at any substitutable position of the group, and when more than one position in any given structure can be substituted with more than one substituent selected from a specified group, the substituent can be either the same or different at every position. As one of ordinary skill in the art will recognize, substituted groups envisioned by this invention are those that result in the formation of stable or chemically feasible compounds.

As used herein, the term "halo" means F, Cl, Br or I.

As used herein, the term "alkyl" refers to a straight or branched hydrocarbon chain radical group consisting solely of carbon and hydrogen atoms, containing no unsaturation, and having the specified number of carbon atoms, which is attached to the rest of the molecule by a single bond. For example, a "$C_1$-$C_6$ alkyl" group is an alkyl group having between one and six carbon atoms.

As used herein, the term "haloalkyl" refers to an alkyl group having the specified number of carbon atoms, wherein one or more of the hydrogen atoms of the alkyl group are replaced by halo groups. For example, a "$C_1$-$C_6$ haloalkyl" group is an alkyl group having between one and six carbon atoms, wherein one or more of the hydrogen atoms of the alkyl group are replaced by halo groups.

As used herein, the term "alkoxy" refers to a radical of the formula —$OR_a$ where $R_a$ is an alkyl group having the specified number of carbon atoms. For example, a "$C_1$-$C_6$ alkoxy" group is a radical of the formula —$OR_a$ where $R_a$ is an alkyl group having the between one and six carbon atoms.

As used herein, the term "haloalkoxy" refers to an alkoxy group having the specified number of carbon atoms, wherein one or more of the hydrogen atoms of the of the alkyl group are replaced by halo groups.

As used herein, the term "cycloalkyl" refers to a stable, non-aromatic, mono- or bicyclic (fused, bridged, or spiro) saturated hydrocarbon radical consisting solely of carbon and hydrogen atoms, having the specified number of carbon ring atoms, and which is attached to the rest of the molecule by a single bond.

As used herein, the term "heteroaryl" refers to a stable, aromatic, mono- or bicyclic ring radical having the specified number of ring atoms and comprising one or more heteroatoms individually selected from nitrogen, oxygen and sulfur.

Unless otherwise specified, the compounds of the invention, whether identified by chemical name or chemical structure, include all stereoisomers (e.g., enantiomers and diastereomers), double bond isomers (e.g., (Z) and (E)), conformational isomers, and tautomers, of the compounds identified by the chemical names and chemical structures provided herein. In addition, single stereoisomers, double bond isomers, conformation isomers, and tautomers as well as mixtures of stereoisomers, double bond isomers, conformation isomers, and tautomers are within the scope of the invention.

As used herein, the term "compound," when referring to the compounds of the invention, refers to a collection of molecules having identical chemical structures, except that there may be isotopic variation among the constituent atoms of the molecules. The term "compound" includes such a collection of molecules without regard to the purity of a given sample containing the collection of molecules. Thus, the term "compound" includes such a collection of molecules in pure form, in a mixture (e.g., solution, suspension, or colloid) with one or more other substances, or in the form of a hydrate, solvate, or co-crystal.

In the specification and claims, unless otherwise specified, any atom not specifically designated as a particular isotope in any compound of the invention is meant to represent any stable isotope of the specified element. In the Examples, where an atom is not specifically designated as a particular isotope in any compound of the invention, no effort was made to enrich that atom in a particular isotope, and therefore a person of ordinary skill in the art would understand that such atom likely was present at approximately the natural abundance isotopic composition of the specified element.

As used herein, the term "stable," when referring to an isotope, means that the isotope is not known to undergo spontaneous radioactive decay. Stable isotopes include, but are not limited to, the isotopes for which no decay mode is identified in V. S. Shirley & C. M. Lederer, Isotopes Project, Nuclear Science Division, Lawrence Berkeley Laboratory, Table of Nuclides (January 1980).

As used herein in the specification and claims, "H" refers to hydrogen and includes any stable isotope of hydrogen, namely $^1$H and D. In the Examples, where an atom is designated as "H," no effort was made to enrich that atom in a particular isotope of hydrogen, and therefore a person of ordinary skill in the art would understand that such hydrogen atom likely was present at approximately the natural abundance isotopic composition of hydrogen.

As used herein, "$^1$H" refers to protium. Where an atom in a compound of the invention, or a pharmaceutically acceptable salt thereof, is designated as protium, protium is present at the specified position at at least the natural abundance concentration of protium.

As used herein, "D," "d," and "$^2$H" refer to deuterium.

In some embodiments, the compounds of the invention, and pharmaceutically acceptable salts thereof, include each constituent atom at approximately the natural abundance isotopic composition of the specified element.

In some embodiments, the compounds of the invention, and pharmaceutically acceptable salts thereof, include one or more atoms having an atomic mass or mass number which differs from the atomic mass or mass number of the most abundant isotope of the specified element ("isotope-labeled" compounds and salts). Examples of stable isotopes which are commercially available and suitable for the invention include without limitation isotopes of hydrogen, carbon, nitrogen, oxygen, and phosphorus, for example $^2H$, $^{13}C$, $^{15}N$, $^{18}O$, $^{17}O$, and $^{31}P$, respectively.

The isotope-labeled compounds and salts can be used in a number of beneficial ways, including as medicaments. In some embodiments, the isotope-labeled compounds and salts are deuterium ($^2H$)-labeled. Deuterium ($^2H$)-labeled compounds and salts are therapeutically useful with potential therapeutic advantages over the non-$^2H$-labeled compounds. In general, deuterium ($^2H$)-labeled compounds and salts can have higher metabolic stability as compared to those that are not isotope-labeled owing to the kinetic isotope effect described below. Higher metabolic stability translates directly into an increased in vivo half-life or lower dosages, which under most circumstances would represent a preferred embodiment of the present invention. The isotope-labeled compounds and salts can usually be prepared by carrying out the procedures disclosed in the synthesis schemes, the examples and the related description, replacing a non-isotope-labeled reactant by a readily available isotope-labeled reactant.

The deuterium ($^2H$)-labeled compounds and salts can manipulate the rate of oxidative metabolism of the compound by way of the primary kinetic isotope effect. The primary kinetic isotope effect is a change of the rate for a chemical reaction that results from exchange of isotopic nuclei, which in turn is caused by the change in ground state energies of the covalent bonds involved in the reaction. Exchange of a heavier isotope usually results in a lowering of the ground state energy for a chemical bond and thus causes a reduction in the rate-limiting bond breakage. If the bond breakage occurs in or in the vicinity of a saddle-point region along the coordinate of a multi-product reaction, the product distribution ratios can be altered substantially. For explanation: if deuterium is bonded to a carbon atom at a non-exchangeable position, rate differences of $k_H/k_D$=2-7 are typical. For a further discussion, see S. L. Harbeson and R. D. Tung, *Deuterium In Drug Discovery and Development*, Ann. Rep. Med. Chem. 2011, 46, 403-417, incorporated in its entirety herein by reference.

The concentration of an isotope (e.g., deuterium) incorporated at a given position of an isotope-labeled compound of the invention, or a pharmaceutically acceptable salt thereof, may be defined by the isotopic enrichment factor. The term "isotopic enrichment factor," as used herein, means the ratio between the abundance of an isotope at a given position in an isotope-labeled compound (or salt) and the natural abundance of the isotope.

Where an atom in a compound of the invention, or a pharmaceutically acceptable salt thereof, is designated as deuterium, such compound (or salt) has an isotopic enrichment factor for such atom of at least 3000 (45% deuterium incorporation). In some embodiments, the isotopic enrichment factor is at least 3500 (52.5% deuterium incorporation), at least 4000 (60% deuterium incorporation), at least 4500 (67.5% deuterium incorporation), at least 5000 (75% deuterium incorporation), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation).

In one aspect, the invention relates to a compound of formula (I), (II), or (III)

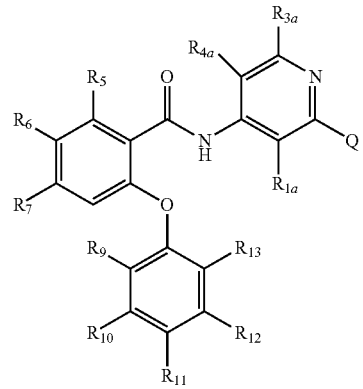

I

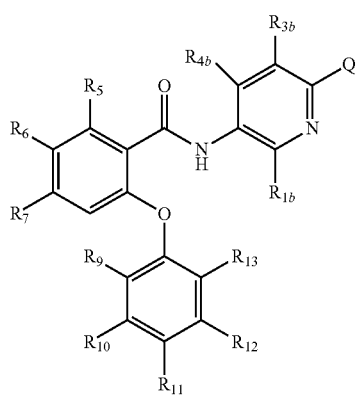

II

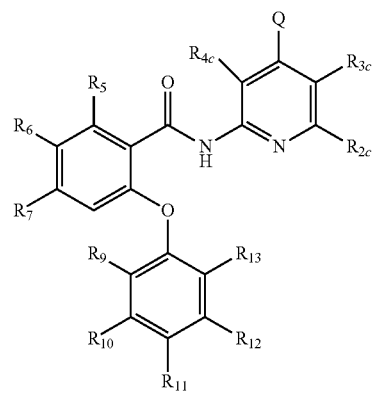

III or a pharmaceutically acceptable salt thereof, wherein:
Q is $C(O)OR_o$ or $NR_nC(O)OR_n$;
$R_n$ is H or $C_1$-$C_6$ alkyl;
each $R_o$ is independently $C_1$-$C_6$ alkyl;
$R_{1a}$ is H, halo, $C_1$-$C_6$ alkyl, $C_1$-$C_6$ haloalkyl, $C_1$-$C_6$ alkoxy, or $C_1$-$C_6$ haloalkoxy;
$R_{3a}$ is H, halo, $C_1$-$C_6$ alkyl, $C_1$-$C_6$ haloalkyl, $C_1$-$C_6$ alkoxy, $C_1$-$C_6$ haloalkoxy, or $C(O)OR_o$;
$R_{4a}$ is H, halo, $C_1$-$C_6$ alkyl, $C_1$-$C_6$ haloalkyl, $C_1$-$C_6$ alkoxy, $C_1$-$C_6$ haloalkoxy, or —W—$R_w$;
$R_{1b}$ is H, halo, $C_1$-$C_6$ alkyl, $C_1$-$C_6$ haloalkyl, $C_1$-$C_6$ alkoxy, or $C_1$-$C_6$ haloalkoxy;
$R_{3b}$ is H, halo, $C_1$-$C_6$ alkyl, $C_1$-$C_6$ haloalkyl, $C_1$-$C_6$ alkoxy, or $C_1$-$C_6$ haloalkoxy;
$R_{4b}$ is H, halo, $C_1$-$C_6$ alkyl, $C_1$-$C_6$ haloalkyl, $C_1$-$C_6$ alkoxy, or $C_1$-$C_6$ haloalkoxy;

$R_{2c}$ is H, halo, $C_1$-$C_6$ alkyl, $C_1$-$C_6$ haloalkyl, $C_1$-$C_6$ alkoxy, or $C_1$-$C_6$ haloalkoxy;

$R_{3c}$ is H, halo, $C_1$-$C_6$ alkyl, $C_1$-$C_6$ haloalkyl, $C_1$-$C_6$ alkoxy, or $C_1$-$C_6$ haloalkoxy;

$R_{4c}$ is H, halo, $C_1$-$C_6$ alkyl, $C_1$-$C_6$ haloalkyl, $C_1$-$C_6$ alkoxy, or $C_1$-$C_6$ haloalkoxy;

$R_5$ is H, halo, OH, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_6$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_7$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_9$ is H, halo, $C_1$-$C_6$ alkyl, $C_1$-$C_6$ haloalkyl, $C_1$-$C_6$ alkoxy, or $C_1$-$C_6$ haloalkoxy;

$R_{10}$ is H, halo, $C_1$-$C_6$ alkyl, $C_1$-$C_6$ haloalkyl, $C_1$-$C_6$ alkoxy, or $C_1$-$C_6$ haloalkoxy;

$R_{11}$ is H, halo, $C_1$-$C_6$ alkyl, $C_1$-$C_6$ haloalkyl, $C_1$-$C_6$ alkoxy, or $C_1$-$C_6$ haloalkoxy;

$R_{12}$ is H, halo, $C_1$-$C_6$ alkyl, $C_1$-$C_6$ haloalkyl, $C_1$-$C_6$ alkoxy, or $C_1$-$C_6$ haloalkoxy;

$R_{13}$ is H, halo, $C_1$-$C_6$ alkyl, $C_1$-$C_6$ haloalkyl, $C_1$-$C_6$ alkoxy, or $C_1$-$C_6$ haloalkoxy;

each W is independently O or a single bond;

each $R_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, $C_1$-$C_6$ alkyl, and $C_1$-$C_6$ haloalkyl; and n is 0 or 1;

wherein the compound of formula (I), (II), or (III) is not methyl 5-(2-(2,4-dimethoxyphenoxy)-5-(trifluoromethyl)benzamido)picolinate or methyl 5-(4,5-dichloro-2-(4-fluoro-2-methoxyphenoxy)benzamido)picolinate.

In some embodiments, the invention relates to a compound of formula (I) or (II), or a pharmaceutically acceptable salt thereof, wherein $R_{1a}$ is H; $R_{3a}$ is H, halo, $C_1$-$C_6$ alkyl, $C_1$-$C_6$ haloalkyl, $C_1$-$C_6$ alkoxy, or $C_1$-$C_6$ haloalkoxy; $R_{4a}$ is H, halo, $C_1$-$C_6$ alkyl, $C_1$-$C_6$ haloalkyl, $C_1$-$C_6$ alkoxy, or $C_1$-$C_6$ haloalkoxy; and $R_5$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$.

In some embodiments, the invention relates to a compound of formula (I), (II), or (III), or a pharmaceutically acceptable salt thereof, wherein Q is $C(O)OR_o$. In other embodiments, Q is $C(O)OCH_3$. In other embodiments, Q is $NR_nC(O)OR_o$. In other embodiments, Q is $NHC(O)OR_o$. In other embodiments, Q is NHC(O)O(tert-butyl).

In some embodiments, the invention relates to a compound of formula (I), or a pharmaceutically acceptable salt thereof, wherein $R_{1a}$ is H, halo, or $C_1$-$C_6$ alkyl. In other embodiments, $R_{1a}$ is H, F, or $CH_3$. In other embodiments, $R_{1a}$ is H. In other embodiments, $R_{1a}$ is F. In other embodiments, $R_{1a}$ is $CH_3$.

In some embodiments, the invention relates to a compound of formula (I), or a pharmaceutically acceptable salt thereof, wherein $R_{3a}$ is H. In other embodiments, $R_{3a}$ is $C(O)OR_o$.

In some embodiments, the invention relates to a compound of formula (I), or a pharmaceutically acceptable salt thereof, wherein $R_{4a}$ is H, halo, $C_1$-$C_6$ alkyl, $C_1$-$C_6$ haloalkyl, or —W—$R_w$. In other embodiments, $R_{4a}$ is H, halo, $C_1$-$C_6$ alkyl, or $C_1$-$C_6$ haloalkyl. In other embodiments, $R_{4a}$ is halo, $C_1$-$C_6$ alkyl, $C_1$-$C_6$ haloalkyl, or —W—$R_w$. In other embodiments, $R_{4a}$ is halo, $C_1$-$C_6$ alkyl, or $C_1$-$C_6$ haloalkyl. In other embodiments, $R_{4a}$ is H, $C_1$-$C_6$ alkyl, $C_1$-$C_6$ haloalkyl, or —W—$R_w$. In other embodiments, $R_{4a}$ is H, $C_1$-$C_6$ alkyl, or $C_1$-$C_6$ haloalkyl. In other embodiments, $R_{4a}$ is H, halo, $C_1$-$C_6$ haloalkyl, or —W—$R_w$. In other embodiments, $R_{4a}$ is H, halo, or $C_1$-$C_6$ haloalkyl. In other embodiments, $R_{4a}$ is H, halo, $C_1$-$C_6$ alkyl, or —W—$R_w$. In other embodiments, $R_{4a}$ is H, halo, or $C_1$-$C_6$ alkyl. In other embodiments, $R_{4a}$ is H, $C_1$-$C_6$ alkyl, or —W—$R_w$. In other embodiments, $R_{4a}$ is H or $C_1$-$C_6$ alkyl. In other embodiments, $R_{4a}$ is $C_1$-$C_6$ alkyl. In other embodiments, $R_{4a}$ is —W—$R_w$. In other embodiments, $R_{4a}$ is H, $CH_3$, or cyclopropyl. In other embodiments, $R_{4a}$ is H or $CH_3$. In other embodiments, $R_{4a}$ is H. In other embodiments, $R_{4a}$ is $CH_3$. In other embodiments, $R_{4a}$ is cyclopropyl.

In some embodiments, the invention relates to a compound of formula (II), or a pharmaceutically acceptable salt thereof, wherein $R_{1b}$ is H.

In some embodiments, the invention relates to a compound of formula (II), or a pharmaceutically acceptable salt thereof, wherein $R_{3b}$ is H.

In some embodiments, the invention relates to a compound of formula (II), or a pharmaceutically acceptable salt thereof, wherein $R_{4b}$ is H.

In some embodiments, the invention relates to a compound of formula (III), or a pharmaceutically acceptable salt thereof, wherein $R_{2c}$ is H.

In some embodiments, the invention relates to a compound of formula (III), or a pharmaceutically acceptable salt thereof, wherein $R_{3c}$ is H.

In some embodiments, the invention relates to a compound of formula (III), or a pharmaceutically acceptable salt thereof, wherein $R_{4c}$ is H.

In some embodiments, the invention relates to a compound of formula (I), (II), or (III), or a pharmaceutically acceptable salt thereof, wherein $R_5$ is halo, OH, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$. In other embodiments, $R_5$ is halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$. In other embodiments, $R_5$ is H, halo, OH, $C_1$-$C_6$ alkyl, or $C_1$-$C_6$ haloalkyl. In other embodiments, $R_5$ is H, halo, $C_1$-$C_6$ alkyl, or $C_1$-$C_6$ haloalkyl. In other embodiments, $R_5$ is halo, OH, $C_1$-$C_6$ alkyl, or $C_1$-$C_6$ haloalkyl. In other embodiments, $R_5$ is halo, $C_1$-$C_6$ alkyl, or $C_1$-$C_6$ haloalkyl. In other embodiments, $R_5$ is H, $C_1$-$C_6$ alkyl, or $C_1$-$C_6$ haloalkyl. In other embodiments, $R_5$ is H, halo, or $C_1$-$C_6$ haloalkyl. In other embodiments, $R_5$ is H, halo, OH, or $C_1$-$C_6$ alkyl. In other embodiments, $R_5$ is H, halo, or $C_1$-$C_6$ alkyl. In other embodiments, $R_5$ is halo. In other embodiments, $R_5$ is $C_1$-$C_6$ alkyl. In other embodiments, $R_5$ is H, F, OH, or $CH_3$. In other embodiments, $R_5$ is H, F, or $CH_3$. In other embodiments, $R_5$ is H. In other embodiments, $R_5$ is F. In other embodiments, $R_5$ is OH. In other embodiments, $R_5$ is $CH_3$.

In some embodiments, the invention relates to a compound of formula (I), (II), or (III), or a pharmaceutically acceptable salt thereof, wherein $R_6$ is H, $C_1$-$C_6$ alkyl, $C_1$-$C_6$ alkoxy, $C_1$-$C_6$ haloalkoxy, or —W—$(CH_2)_n$—$R_w$. In other embodiments, $R_6$ is H, halo, $C_1$-$C_6$ alkyl, $C_1$-$C_6$ haloalkyl, or $R_w$. In other embodiments, $R_6$ is halo, $C_1$-$C_6$ alkyl, $C_1$-$C_6$ haloalkyl, or $R_w$. In other embodiments, $R_6$ is H, $C_1$-$C_6$ alkyl, $C_1$-$C_6$ haloalkyl, or $R_w$. In other embodiments, $R_6$ is H, halo, $C_1$-$C_6$ haloalkyl, or $R_w$. In other embodiments, $R_6$ is H, halo, $C_1$-$C_6$ alkyl, or $R_w$. In other embodiments, $R_6$ is H, halo, $C_1$-$C_6$ alkyl, or $C_1$-$C_6$ haloalkyl. In other embodiments, $R_6$ is H, halo, $C_1$-$C_6$ alkyl, $C_1$-$C_6$ haloalkyl, or 3-6 membered cycloalkyl. In other embodiments, $R_6$ is halo, $C_1$-$C_6$ alkyl, $C_1$-$C_6$ haloalkyl, or 3-6 membered cycloalkyl. In other embodiments, $R_6$ is H, $C_1$-$C_6$ alkyl, $C_1$-$C_6$ haloalkyl, or 3-6 membered cycloalkyl. In other embodiments, $R_6$ is H, halo, $C_1$-$C_6$ haloalkyl, or 3-6 membered cycloalkyl. In other embodiments, $R_6$ is H, halo, $C_1$-$C_6$ alkyl, or 3-6 membered cycloalkyl. In other embodiments, $R_6$ is halo. In other embodiments, $R_6$ is $C_1$-$C_6$ haloalkyl. In other embodiments, $R_6$ is 3-6 membered cycloalkyl. In other embodiments, $R_6$ is F, $CF_3$, or cyclopropyl. In other embodiments, $R_6$ is F. In other embodiments, $R_6$ is $CF_3$. In other embodiments, $R_6$ is cyclopropyl.

In some embodiments, the invention relates to a compound of formula (I), (II), or (III), or a pharmaceutically acceptable salt thereof, wherein $R_7$ is $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$. In other embodiments, $R_7$ is H, halo, $C_1$-$C_6$ alkyl, or $C_1$-$C_6$ haloalkyl. In other embodiments, $R_7$ is halo, $C_1$-$C_6$ alkyl, or $C_1$-$C_6$ haloalkyl. In other embodiments, $R_7$ is H, $C_1$-$C_6$ alkyl, or $C_1$-$C_6$ haloalkyl. In other embodiments, $R_7$ is H, halo, or $C_1$-$C_6$ haloalkyl. In other embodiments, $R_7$ is H, halo, or $C_1$-$C_6$ alkyl. In other embodiments, $R_7$ is $C_1$-$C_6$ haloalkyl. In other embodiments, $R_7$ is H or $CF_3$. In other embodiments, $R_7$ is H. In other embodiments, $R_7$ is $CF_3$.

In some embodiments, the invention relates to a compound of formula (I), (II), or (III) or a pharmaceutically acceptable salt thereof, wherein $R_9$ is H, halo, $C_1$-$C_6$ alkyl, $C_1$-$C_6$ haloalkyl, or $C_1$-$C_6$ haloalkoxy. In other embodiments, $R_9$ is H, halo, $C_1$-$C_6$ alkyl, $C_1$-$C_6$ alkoxy, or $C_1$-$C_6$ haloalkoxy. In other embodiments, $R_9$ is H, halo, $C_1$-$C_6$ alkoxy, or $C_1$-$C_6$ haloalkoxy. In other embodiments, $R_9$ is halo, $C_1$-$C_6$ alkoxy, or $C_1$-$C_6$ haloalkoxy. In other embodiments, $R_9$ is H, $C_1$-$C_6$ alkoxy, or $C_1$-$C_6$ haloalkoxy. In other embodiments, $R_9$ is H, halo, or $C_1$-$C_6$ haloalkoxy. In other embodiments, $R_9$ is H, halo, $C_1$-$C_6$ alkyl, or $C_1$-$C_6$ alkoxy. In other embodiments, $R_9$ is H, halo, or $C_1$-$C_6$ alkoxy. In other embodiments, $R_9$ is $C_1$-$C_6$ alkoxy. In other embodiments, $R_9$ is H, Cl, $CH_3$, $OCH_3$, $OC(^1H)_3$, or $OCD_3$. In other embodiments, $R_9$ is H, $OCH_3$, $OC(^1H)_3$, or $OCD_3$. In other embodiments, $R_9$ is H. In other embodiments, $R_9$ is Cl. In other embodiments, $R_9$ is $CH_3$. In other embodiments, $R_9$ is $OCH_3$. In other embodiments, $R_9$ is $OC(^1H)_3$. In other embodiments, $R_9$ is $OCD_3$.

In some embodiments, the invention relates to a compound of formula (I), (II), or (III), or a pharmaceutically acceptable salt thereof, wherein $R_{10}$ is H. In other embodiments, $R_{10}$ is halo. In other embodiments, $R_{10}$ is F.

In some embodiments, the invention relates to a compound of formula (I), (II), or (III), or a pharmaceutically acceptable salt thereof, wherein $R_{11}$ is H, $C_1$-$C_6$ alkyl, $C_1$-$C_6$ haloalkyl, or $C_1$-$C_6$ haloalkoxy. In other embodiments, $R_{11}$ is H, halo, $C_1$-$C_6$ alkoxy, or $C_1$-$C_6$ haloalkoxy. In other embodiments, $R_{11}$ is halo, $C_1$-$C_6$ alkoxy, or $C_1$-$C_6$ haloalkoxy. In other embodiments, $R_{11}$ is H, $C_1$-$C_6$ alkoxy, or $C_1$-$C_6$ haloalkoxy. In other embodiments, $R_{11}$ is H, halo, or $C_1$-$C_6$ haloalkoxy. In other embodiments, $R_{11}$ is H, halo, or $C_1$-$C_6$ alkoxy. In other embodiments, $R_{11}$ is halo. In other embodiments, $R_{11}$ is $C_1$-$C_6$ haloalkoxy. In other embodiments, $R_{11}$ is F or $OCF_3$. In other embodiments, $R_{11}$ is F. In other embodiments, $R_{11}$ is $OCF_3$.

In some embodiments, the invention relates to a compound of formula (I), (II), or (III), or a pharmaceutically acceptable salt thereof, wherein $R_{12}$ is H.

In some embodiments, the invention relates to a compound of formula (I), (II), or (III) or a pharmaceutically acceptable salt thereof, wherein $R_{13}$ is H.

In some embodiments, the invention relates to a compound of formula (I), (II), or (III) i.e., the compound in non-salt form.

In another aspect, the invention relates to a compound of formula (I)

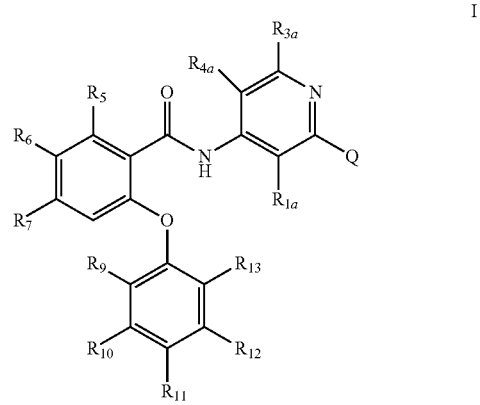

or a pharmaceutically acceptable salt thereof, wherein:
Q is $C(O)OR_o$ or $NR_nC(O)OR_n$;
$R_n$ is H or $C_1$-$C_6$ alkyl;
each $R_o$ is independently $C_1$-$C_6$ alkyl;
$R_{1a}$ is H, halo, $C_1$-$C_6$ alkyl, $C_1$-$C_6$ haloalkyl, $C_1$-$C_6$ alkoxy, or $C_1$-$C_6$ haloalkoxy;
$R_{3a}$ is H, halo, $C_1$-$C_6$ alkyl, $C_1$-$C_6$ haloalkyl, $C_1$-$C_6$ alkoxy, $C_1$-$C_6$ haloalkoxy, or $C(O)OR_o$;
$R_{4a}$ is H, halo, $C_1$-$C_6$ alkyl, $C_1$-$C_6$ haloalkyl, $C_1$-$C_6$ alkoxy, or $C_1$-$C_6$ haloalkoxy, or —W—$R_w$;
$R_5$ is H, halo, OH, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;
$R_6$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;
$R_7$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)$—$R_w$;
$R_9$ is H, halo, $C_1$-$C_6$ alkyl, $C_1$-$C_6$ haloalkyl, $C_1$-$C_6$ alkoxy, or $C_1$-$C_6$ haloalkoxy;
$R_{10}$ is H, halo, $C_1$-$C_6$ alkyl, $C_1$-$C_6$ haloalkyl, $C_1$-$C_6$ alkoxy, or $C_1$-$C_6$ haloalkoxy;
$R_{11}$ is H, halo, $C_1$-$C_6$ alkyl, $C_1$-$C_6$ haloalkyl, $C_1$-$C_6$ alkoxy, or $C_1$-$C_6$ haloalkoxy;
$R_{12}$ is H, halo, $C_1$-$C_6$ alkyl, $C_1$-$C_6$ haloalkyl, $C_1$-$C_6$ alkoxy, or $C_1$-$C_6$ haloalkoxy;
$R_{13}$ is H, halo, $C_1$-$C_6$ alkyl, $C_1$-$C_6$ haloalkyl, $C_1$-$C_6$ alkoxy, or $C_1$-$C_6$ haloalkoxy;
each W is independently O or a single bond;
each $R_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, $C_1$-$C_6$ alkyl, and $C_1$-$C_6$ haloalkyl; and
n is 0 or 1.

In some embodiments, the invention relates to a compound of formula (I), or a pharmaceutically acceptable salt thereof, wherein $R_{1a}$ is H; $R_{3a}$ is H, halo, $C_1$-$C_6$ alkyl, $C_1$-$C_6$ haloalkyl, $C_1$-$C_6$ alkoxy, or $C_1$-$C_6$ haloalkoxy; $R_{4a}$ is H, halo, $C_1$-$C_6$ alkyl, $C_1$-$C_6$ haloalkyl, $C_1$-$C_6$ alkoxy, or $C_1$-$C_6$ haloalkoxy; and $R_5$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$.

In some embodiments, the invention relates to a compound of formula (I), or a pharmaceutically acceptable salt thereof, wherein Q is $C(O)OR_o$. In other embodiments, Q is $C(O)OCH_3$. In other embodiments, Q is $NR_nC(O)OR_o$. In other embodiments, Q is NHC(O)OR$_o$. In other embodiments, Q is NHC(O)O(tert-butyl).

In some embodiments, the invention relates to a compound of formula (I), or a pharmaceutically acceptable salt thereof, wherein R$_{1a}$ is H, halo, or C$_1$-C$_6$ alkyl. In other embodiments, R$_{1a}$ is H, F, or CH$_3$. In other embodiments, R$_{1a}$ is H. In other embodiments, R$_{1a}$ is F. In other embodiments, R$_{1a}$ is CH$_3$.

In some embodiments, the invention relates to a compound of formula (I), or a pharmaceutically acceptable salt thereof, wherein R$_{3a}$ is H. In other embodiments, R$_{3a}$ is C(O)OR$_o$.

In some embodiments, the invention relates to a compound of formula (I), or a pharmaceutically acceptable salt thereof, wherein R$_{4a}$ is H, halo, C$_1$-C$_6$ alkyl, C$_1$-C$_6$ haloalkyl, or —W—R$_w$. In other embodiments, R$_{4a}$ is H, halo, C$_1$-C$_6$ alkyl, or C$_1$-C$_6$ haloalkyl. In other embodiments, R$_{4a}$ is halo, C$_1$-C$_6$ alkyl, C$_1$-C$_6$ haloalkyl, or —W—R$_w$. In other embodiments, R$_{4a}$ is halo, C$_1$-C$_6$ alkyl, or C$_1$-C$_6$ haloalkyl. In other embodiments, R$_{4a}$ is H, C$_1$-C$_6$ alkyl, C$_1$-C$_6$ haloalkyl, or —W—R$_w$. In other embodiments, R$_{4a}$ is H, C$_1$-C$_6$ alkyl, or C$_1$-C$_6$ haloalkyl. In other embodiments, R$_{4a}$ is H, halo, C$_1$-C$_6$ haloalkyl, or —W—R$_w$. In other embodiments, R$_{4a}$ is H, halo, or C$_1$-C$_6$ haloalkyl. In other embodiments, R$_{4a}$ is H, halo, C$_1$-C$_6$ alkyl, or —W—R$_w$. In other embodiments, R$_{4a}$ is H, halo, or C$_1$-C$_6$ alkyl. In other embodiments, R$_{4a}$ is H, C$_1$-C$_6$ alkyl, or —W—R$_w$. In other embodiments, R$_{4a}$ is H or C$_1$-C$_6$ alkyl. In other embodiments, R$_{4a}$ is C$_1$-C$_6$ alkyl. In other embodiments, R$_{4a}$ is —W—R$_w$. In other embodiments, R$_{4a}$ is H, CH$_3$, or cyclopropyl. In other embodiments, R$_{4a}$ is H or CH$_3$. In other embodiments, R$_{4a}$ is H. In other embodiments, R$_{4a}$ is CH$_3$. In other embodiments, R$_{4a}$ is cyclopropyl.

In some embodiments, the invention relates to a compound of formula (I), or a pharmaceutically acceptable salt thereof, wherein R$_5$ is halo, OH, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$. In other embodiments, R$_5$ is halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$. In other embodiments, R$_5$ is H, halo, OH, C$_1$-C$_6$ alkyl, or C$_1$-C$_6$ haloalkyl. In other embodiments, R$_5$ is H, halo, C$_1$-C$_6$ alkyl, or C$_1$-C$_6$ haloalkyl. In other embodiments, R$_5$ is halo, OH, C$_1$-C$_6$ alkyl, or C$_1$-C$_6$ haloalkyl. In other embodiments, R$_5$ is halo, C$_1$-C$_6$ alkyl, or C$_1$-C$_6$ haloalkyl. In other embodiments, R$_5$ is H, C$_1$-C$_6$ alkyl, or C$_1$-C$_6$ haloalkyl. In other embodiments, R$_5$ is H, halo, or C$_1$-C$_6$ haloalkyl. In other embodiments, R$_5$ is H, halo, OH, or C$_1$-C$_6$ alkyl. In other embodiments, R$_5$ is H, halo, or C$_1$-C$_6$ alkyl. In other embodiments, R$_5$ is halo. In other embodiments, R$_5$ is C$_1$-C$_6$ alkyl. In other embodiments, R$_5$ is H, F, OH, or CH$_3$. In other embodiments, R$_5$ is H, F, or CH$_3$. In other embodiments, R$_5$ is H. In other embodiments, R$_5$ is F. In other embodiments, R$_5$ is OH. In other embodiments, R$_5$ is CH$_3$.

In some embodiments, the invention relates to a compound of formula (I), or a pharmaceutically acceptable salt thereof, wherein R$_6$ is H, halo, C$_1$-C$_6$ alkyl, C$_1$-C$_6$ haloalkyl, or R$_w$. In other embodiments, R$_6$ is halo, C$_1$-C$_6$ alkyl, C$_1$-C$_6$ haloalkyl, or R$_w$. In other embodiments, R$_6$ is H, halo, C$_1$-C$_6$ haloalkyl, or R$_w$. In other embodiments, R$_6$ is halo, C$_1$-C$_6$ haloalkyl, or 3-6 membered cycloalkyl. In other embodiments, R$_6$ is H, halo, C$_1$-C$_6$ alkyl, or C$_1$-C$_6$ haloalkyl. In other embodiments, R$_6$ is halo, C$_1$-C$_6$ alkyl, or C$_1$-C$_6$ haloalkyl. In other embodiments, R$_6$ is H, halo, or C$_1$-C$_6$ haloalkyl. In other embodiments, R$_6$ is halo or C$_1$-C$_6$ haloalkyl. In other embodiments, R$_6$ is halo. In other embodiments, R$_6$ is C$_1$-C$_6$ haloalkyl. In other embodiments, R$_6$ is 3-6 membered cycloalkyl. In other embodiments, R$_6$ is F, CF$_3$, or cyclopropyl. In other embodiments, R$_6$ is F or CF$_3$. In other embodiments, R$_6$ is F. In other embodiments, R$_6$ is CF$_3$. In other embodiments, R$_6$ is cyclopropyl.

In some embodiments, the invention relates to a compound of formula (I), or a pharmaceutically acceptable salt thereof, wherein R$_7$ is H, halo, C$_1$-C$_6$ alkyl, or C$_1$-C$_6$ haloalkyl. In other embodiments, R$_7$ is H, C$_1$-C$_6$ alkyl, or C$_1$-C$_6$ haloalkyl. In other embodiments, R$_7$ is H, halo, or C$_1$-C$_6$ haloalkyl. In other embodiments, R$_7$ is H or C$_1$-C$_6$ haloalkyl. In other embodiments, R$_7$ is C$_1$-C$_6$ haloalkyl. In other embodiments, R$_7$ is H or CF$_3$. In other embodiments, R$_7$ is H. In other embodiments, R$_7$ is CF$_3$.

In some embodiments, the invention relates to a compound of formula (I), or a pharmaceutically acceptable salt thereof, wherein R$_9$ is H, halo, C$_1$-C$_6$ alkyl, C$_1$-C$_6$ alkoxy, or C$_1$-C$_6$ haloalkoxy. In other embodiments, R$_9$ is H, C$_1$-C$_6$ alkoxy, or C$_1$-C$_6$ haloalkoxy. In other embodiments, R$_9$ is H, halo, C$_1$-C$_6$ alkyl, or C$_1$-C$_6$ alkoxy. In other embodiments, R$_9$ is H or C$_1$-C$_6$ alkoxy. In other embodiments, R$_9$ is C$_1$-C$_6$ alkyl. In other embodiments, R$_9$ is C$_1$-C$_6$ alkoxy or C$_1$-C$_6$ haloalkoxy. In other embodiments, R$_9$ is C$_1$-C$_6$ alkoxy. In other embodiments, R$_9$ is H, Cl, CH$_3$, OCH$_3$, OC($^1$H)$_3$, or OCD$_3$. In other embodiments, R$_9$ is H, OCH$_3$, OC($^1$H)$_3$, or OCD$_3$. In other embodiments, R$_9$ is OCH$_3$, OC($^1$H)$_3$, or OCD$_3$. In other embodiments, R$_9$ is H. In other embodiments, R$_9$ is Cl. In other embodiments, R$_9$ is CH$_3$. In other embodiments, R$_9$ is OCH$_3$. In other embodiments, R$_9$ is OC($^1$H)$_3$. In other embodiments, R$_9$ is OCD$_3$.

In some embodiments, the invention relates to a compound of formula (I), or a pharmaceutically acceptable salt thereof, wherein R$_{10}$ is H. In other embodiments, R$_{10}$ is halo. In other embodiments, R$_{10}$ is F.

In some embodiments, the invention relates to a compound of formula (I), or a pharmaceutically acceptable salt thereof, wherein R$_{11}$ is H, halo, C$_1$-C$_6$ alkoxy, or C$_1$-C$_6$ haloalkoxy. In other embodiments, R$_{11}$ is halo, C$_1$-C$_6$ alkoxy, or C$_1$-C$_6$ haloalkoxy. In other embodiments, R$_{11}$ is H, halo, or C$_1$-C$_6$ haloalkoxy. In other embodiments, R$_{11}$ is halo or C$_1$-C$_6$ haloalkoxy. In other embodiments, R$_{11}$ is H, C$_1$-C$_6$ alkoxy, or C$_1$-C$_6$ haloalkoxy. In other embodiments, R$_{11}$ is C$_1$-C$_6$ alkoxy or C$_1$-C$_6$ haloalkoxy. In other embodiments, R$_{11}$ is H or C$_1$-C$_6$ haloalkoxy. In other embodiments, R$_{11}$ is halo. In other embodiments, R$_{11}$ is C$_1$-C$_6$ haloalkoxy. In other embodiments, R$_{11}$ is F or OCF$_3$. In other embodiments, R$_{11}$ is F. In other embodiments, R$_{11}$ is OCF$_3$.

In some embodiments, the invention relates to a compound of formula (I), or a pharmaceutically acceptable salt thereof, wherein R$_{12}$ is H.

In some embodiments, the invention relates to a compound of formula (I), or a pharmaceutically acceptable salt thereof, wherein R$_{13}$ is H.

In some embodiments, the invention relates to a compound of formula (I), i.e., the compound in non-salt form.

In another aspect, the invention relates to a compound of formula (II)

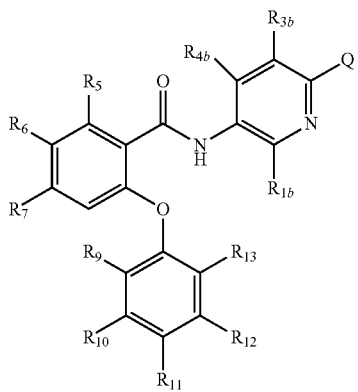

II or a pharmaceutically acceptable salt thereof, wherein:
Q is C(O)OR$_o$ or NR$_n$C(O)OR$_n$;
R$_n$ is H or C$_1$-C$_6$ alkyl;
R$_o$ is C$_1$-C$_6$ alkyl;
R$_{1b}$ is H, halo, C$_1$-C$_6$ alkyl, C$_1$-C$_6$ haloalkyl, C$_1$-C$_6$ alkoxy, or C$_1$-C$_6$ haloalkoxy;
R$_{3b}$ is H, halo, C$_1$-C$_6$ alkyl, C$_1$-C$_6$ haloalkyl, C$_1$-C$_6$ alkoxy, or C$_1$-C$_6$ haloalkoxy;
R$_{4b}$ is H, halo, C$_1$-C$_6$ alkyl, C$_1$-C$_6$ haloalkyl, C$_1$-C$_6$ alkoxy, or C$_1$-C$_6$ haloalkoxy;
R$_5$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_6$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_7$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_9$ is H, halo, C$_1$-C$_6$ alkyl, C$_1$-C$_6$ haloalkyl, C$_1$-C$_6$ alkoxy, or C$_1$-C$_6$ haloalkoxy;
R$_{10}$ is H, halo, C$_1$-C$_6$ alkyl, C$_1$-C$_6$ haloalkyl, C$_1$-C$_6$ alkoxy, or C$_1$-C$_6$ haloalkoxy;
R$_{11}$ is H, halo, C$_1$-C$_6$ alkyl, C$_1$-C$_6$ haloalkyl, C$_1$-C$_6$ alkoxy, or C$_1$-C$_6$ haloalkoxy;
R$_{12}$ is H, halo, C$_1$-C$_6$ alkyl, C$_1$-C$_6$ haloalkyl, C$_1$-C$_6$ alkoxy, or C$_1$-C$_6$ haloalkoxy;
R$_{13}$ is H, halo, C$_1$-C$_6$ alkyl, C$_1$-C$_6$ haloalkyl, C$_1$-C$_6$ alkoxy, or C$_1$-C$_6$ haloalkoxy;
each W is independently O or a single bond;
each R$_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, C$_1$-C$_6$ alkyl, and C$_1$-C$_6$ haloalkyl; and
n is 0 or 1;
wherein the compound of formula (II) is not methyl 5-(2-(2,4-dimethoxyphenoxy)-5-(trifluoromethyl)benzamido)picolinate or methyl 5-(4,5-dichloro-2-(4-fluoro-2-methoxyphenoxy)benzamido)picolinate.

In some embodiments, the invention relates to a compound of formula (II), or a pharmaceutically acceptable salt thereof, wherein Q is C(O)OR$_o$. In other embodiments, Q is C(O)OCH$_3$. In other embodiments, Q is NR$_n$C(O)OR$_o$. In other embodiments, Q is NHC(O)OR$_o$. In other embodiments, Q is NHC(O)O(tert-butyl).

In some embodiments, the invention relates to a compound of formula (II), or a pharmaceutically acceptable salt thereof, wherein R$_{1b}$ is H.

In some embodiments, the invention relates to a compound of formula (II), or a pharmaceutically acceptable salt thereof, wherein R$_{3b}$ is H.

In some embodiments, the invention relates to a compound of formula (II), or a pharmaceutically acceptable salt thereof, wherein R$_{4b}$ is H.

In some embodiments, the invention relates to a compound of formula (II), or a pharmaceutically acceptable salt thereof, wherein R$_5$ is halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$. In other embodiments, R$_5$ is H or halo. In other embodiments, R$_5$ is halo. In other embodiments, R$_5$ is H or F. In other embodiments, R$_5$ is H. In other embodiments, R$_5$ is F.

In some embodiments, the invention relates to a compound of formula (II), or a pharmaceutically acceptable salt thereof, wherein R$_6$ is H, halo, C$_1$-C$_6$ alkyl, or C$_1$-C$_6$ haloalkyl. In other embodiments, R$_6$ is halo, C$_1$-C$_6$ alkyl, or C$_1$-C$_6$ haloalkyl. In other embodiments, R$_6$ is H, halo, or C$_1$-C$_6$ haloalkyl. In other embodiments, R$_6$ is halo or C$_1$-C$_6$ haloalkyl. In other embodiments, R$_6$ is halo. In other embodiments, R$_6$ is C$_1$-C$_6$ haloalkyl. In other embodiments, R$_6$ is F or CF$_3$. In other embodiments, R$_6$ is F. In other embodiments, R$_6$ is CF$_3$.

In some embodiments, the invention relates to a compound of formula (II), or a pharmaceutically acceptable salt thereof, wherein R$_7$ is H, halo, C$_1$-C$_6$ alkyl, or C$_1$-C$_6$ haloalkyl. In other embodiments, R$_7$ is H, C$_1$-C$_6$ alkyl, or C$_1$-C$_6$ haloalkyl. In other embodiments, R$_7$ is H, halo, or C$_1$-C$_6$ haloalkyl. In other embodiments, R$_7$ is H or C$_1$-C$_6$ haloalkyl. In other embodiments, R$_7$ is C$_1$-C$_6$ haloalkyl. In other embodiments, R$_7$ is H or CF$_3$. In other embodiments, R$_7$ is H. In other embodiments, R$_7$ is CF$_3$.

In some embodiments, the invention relates to a compound of formula (II), or a pharmaceutically acceptable salt thereof, wherein R$_9$ is H, halo, C$_1$-C$_6$ alkyl, C$_1$-C$_6$ haloalkyl, or C$_1$-C$_6$ haloalkoxy. In other embodiments, R$_9$ is H, C$_1$-C$_6$ alkoxy, or C$_1$-C$_6$ haloalkoxy. In other embodiments, R$_9$ is H, halo, or C$_1$-C$_6$ alkoxy. In other embodiments, R$_9$ is H or C$_1$-C$_6$ alkoxy. In other embodiments, R$_9$ is C$_1$-C$_6$ alkoxy. In other embodiments, R$_9$ is H, OCH$_3$, OC($^1$H)$_3$, or OCD$_3$. In other embodiments, R$_9$ is H. In other embodiments, R$_9$ is OCH$_3$. In other embodiments, R$_9$ is OC($^1$H)$_3$. In other embodiments, R$_9$ is OCD$_3$.

In some embodiments, the invention relates to a compound of formula (II), or a pharmaceutically acceptable salt thereof, wherein R$_{10}$ is H. In other embodiments, R$_{10}$ is halo. In other embodiments, R$_{10}$ is F.

In some embodiments, the invention relates to a compound of formula (II), or a pharmaceutically acceptable salt thereof, wherein R$_{11}$ is H, halo, C$_1$-C$_6$ alkoxy, or C$_1$-C$_6$ haloalkoxy. In other embodiments, R$_{11}$ is halo, C$_1$-C$_6$ alkoxy, or C$_1$-C$_6$ haloalkoxy. In other embodiments, R$_{11}$ is H, halo, or C$_1$-C$_6$ haloalkoxy. In other embodiments, R$_{11}$ is halo or C$_1$-C$_6$ haloalkoxy. In other embodiments, R$_{11}$ is halo. In other embodiments, R$_{11}$ is C$_1$-C$_6$ haloalkoxy. In other embodiments, R$_{11}$ is F or OCF$_3$. In other embodiments, R$_{11}$ is F. In other embodiments, R$_{11}$ is OCF$_3$.

In some embodiments, the invention relates to a compound of formula (II), or a pharmaceutically acceptable salt thereof, wherein R$_{12}$ is H.

In some embodiments, the invention relates to a compound of formula (II), or a pharmaceutically acceptable salt thereof, wherein R$_{13}$ is H.

In some embodiments, the invention relates to a compound of formula (II), i.e., the compound in non-salt form.

In another aspect, the invention relates to a compound of formula (III)

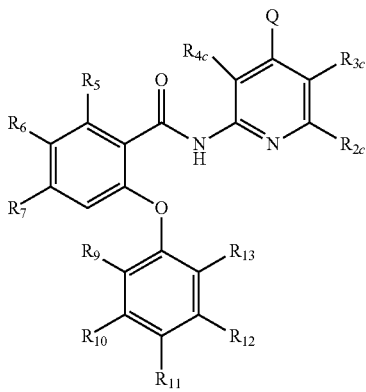

or a pharmaceutically acceptable salt thereof, wherein:
Q is $C(O)OR_o$ or $NR_nC(O)OR_o$;
$R_n$ is H or $C_1$-$C_6$ alkyl;
$R_o$ is $C_1$-$C_6$ alkyl;
$R_{2c}$ is H, halo, $C_1$-$C_6$ alkyl, $C_1$-$C_6$ haloalkyl, $C_1$-$C_6$ alkoxy, or $C_1$-$C_6$ haloalkoxy;
$R_{3c}$ is H, halo, $C_1$-$C_6$ alkyl, $C_1$-$C_6$ haloalkyl, $C_1$-$C_6$ alkoxy, or $C_1$-$C_6$ haloalkoxy;
$R_{4c}$ is H, halo, $C_1$-$C_6$ alkyl, $C_1$-$C_6$ haloalkyl, $C_1$-$C_6$ alkoxy, or $C_1$-$C_6$ haloalkoxy;
$R_5$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;
$R_6$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;
$R_7$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;
$R_9$ is H, halo, $C_1$-$C_6$ alkyl, $C_1$-$C_6$ haloalkyl, $C_1$-$C_6$ alkoxy, or $C_1$-$C_6$ haloalkoxy;
$R_{10}$ is H, halo, $C_1$-$C_6$ alkyl, $C_1$-$C_6$ haloalkyl, $C_1$-$C_6$ alkoxy, or $C_1$-$C_6$ haloalkoxy;
$R_{11}$ is H, halo, $C_1$-$C_6$ alkyl, $C_1$-$C_6$ haloalkyl, $C_1$-$C_6$ alkoxy, or $C_1$-$C_6$ haloalkoxy;
$R_{12}$ is H, halo, $C_1$-$C_6$ alkyl, $C_1$-$C_6$ haloalkyl, $C_1$-$C_6$ alkoxy, or $C_1$-$C_6$ haloalkoxy;
$R_{13}$ is H, halo, $C_1$-$C_6$ alkyl, $C_1$-$C_6$ haloalkyl, $C_1$-$C_6$ alkoxy, or $C_1$-$C_6$ haloalkoxy;
each W is independently O or a single bond;
each $R_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, $C_1$-$C_6$ alkyl, and $C_1$-$C_6$ haloalkyl; and
n is 0 or 1.

In some embodiments, the invention relates to a compound of formula (III), or a pharmaceutically acceptable salt thereof, wherein Q is $C(O)OR_o$. In other embodiments, Q is $C(O)OCH_3$. In other embodiments, Q is $NR_nC(O)OR_o$. In other embodiments, Q is $NHC(O)OR_o$. In other embodiments, Q is NHC(O)O(tert-butyl).

In some embodiments, the invention relates to a compound of formula (III), or a pharmaceutically acceptable salt thereof, wherein $R_5$ is halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$. In other embodiments, $R_5$ is H, halo, or $C_1$-$C_6$ alkyl. In other embodiments, $R_5$ is halo. In other embodiments, $R_5$ is $C_1$-$C_6$ alkyl. In other embodiments, $R_5$ is F or $CH_3$. In other embodiments, $R_5$ is F. In other embodiments, $R_5$ is $CH_3$.

In some embodiments, the invention relates to a compound of formula (III), or a pharmaceutically acceptable salt thereof, wherein $R_6$ is H, halo, $C_1$-$C_6$ alkyl, or $C_1$-$C_6$ haloalkyl. In other embodiments, $R_6$ is halo, $C_1$-$C_6$ alkyl, or $C_1$-$C_6$ haloalkyl. In other embodiments, $R_6$ is H, halo, or $C_1$-$C_6$ haloalkyl. In other embodiments, $R_6$ is halo or $C_1$-$C_6$ haloalkyl. In other embodiments, $R_6$ is $C_1$-$C_6$ haloalkyl. In other embodiments, $R_6$ is $CF_3$.

In some embodiments, the invention relates to a compound of formula (III), or a pharmaceutically acceptable salt thereof, wherein $R_7$ is H, halo, $C_1$-$C_6$ alkyl, or $C_1$-$C_6$ haloalkyl. In other embodiments, $R_7$ is H, $C_1$-$C_6$ alkyl, or $C_1$-$C_6$ haloalkyl. In other embodiments, $R_7$ is H, halo, or $C_1$-$C_6$ haloalkyl. In other embodiments, $R_7$ is H or $C_1$-$C_6$ haloalkyl. In other embodiments, $R_7$ is H.

In some embodiments, the invention relates to a compound of formula (III), or a pharmaceutically acceptable salt thereof, wherein $R_9$ is H, halo, $C_1$-$C_6$ alkyl, $C_1$-$C_6$ haloalkyl, or $C_1$-$C_6$ haloalkoxy. In other embodiments, $R_9$ is H, $C_1$-$C_6$ alkoxy, or $C_1$-$C_6$ haloalkoxy. In other embodiments, $R_9$ is H, halo, or $C_1$-$C_6$ alkoxy. In other embodiments, $R_9$ is H or $C_1$-$C_6$ alkoxy. In other embodiments, $R_9$ is $C_1$-$C_6$ alkoxy. In other embodiments, $R_9$ is $OCH_3$.

In some embodiments, the invention relates to a compound of formula (III), or a pharmaceutically acceptable salt thereof, wherein $R_{10}$ is halo. In other embodiments, $R_{10}$ is F.

In some embodiments, the invention relates to a compound of formula (III), or a pharmaceutically acceptable salt thereof, wherein $R_{11}$ is H, halo, $C_1$-$C_6$ alkoxy, or $C_1$-$C_6$ haloalkoxy. In other embodiments, $R_{11}$ is halo, $C_1$-$C_6$ alkoxy, or $C_1$-$C_6$ haloalkoxy. In other embodiments, $R_{11}$ is H, halo, or $C_1$-$C_6$ haloalkoxy. In other embodiments, $R_{11}$ is halo or $C_1$-$C_6$ haloalkoxy. In other embodiments, $R_{11}$ is $C_1$-$C_6$ haloalkoxy. In other embodiments, $R_{11}$ is $OCF_3$.

In some embodiments, the invention relates to a compound of formula (III), or a pharmaceutically acceptable salt thereof, wherein $R_{12}$ is H.

In some embodiments, the invention relates to a compound of formula (III), or a pharmaceutically acceptable salt thereof, wherein $R_{13}$ is H.

In some embodiments, the invention relates to a compound of formula (III), i.e., the compound in non-salt form.

In another aspect, the invention relates to a compound of formula (I-A), (II-A), or (III-A)

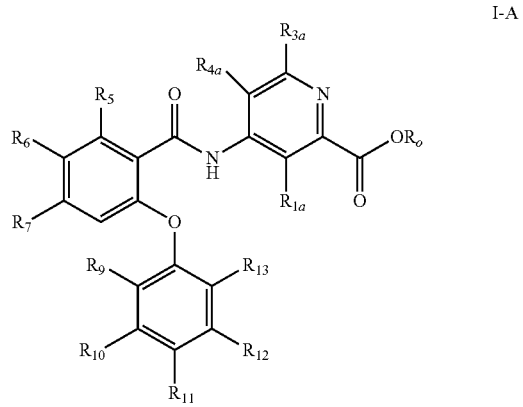

I-A

-continued

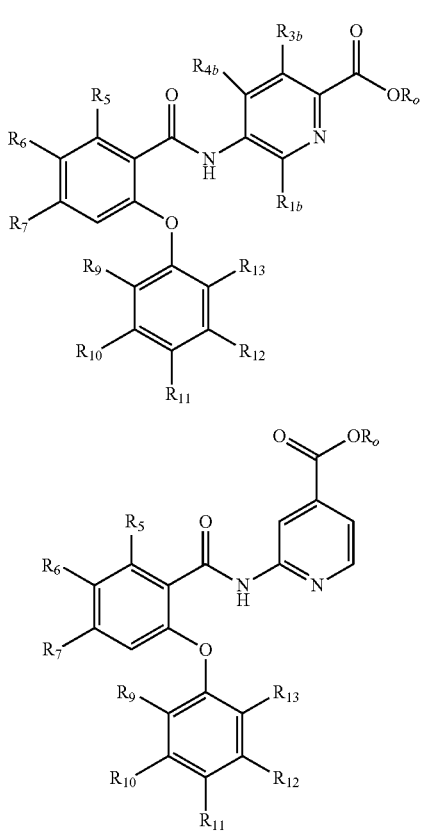

or a pharmaceutically acceptable salt thereof, wherein:
each $R_o$ is independently $C_1$-$C_6$ alkyl;
$R_{1a}$ is H, halo, $C_1$-$C_6$ alkyl, $C_1$-$C_6$ haloalkyl, $C_1$-$C_6$ alkoxy, or $C_1$-$C_6$ haloalkoxy;
$R_{3a}$ is H, halo, $C_1$-$C_6$ alkyl, $C_1$-$C_6$ haloalkyl, $C_1$-$C_6$ alkoxy, $C_1$-$C_6$ haloalkoxy, or $C(O)OR_o$;
$R_{4a}$ is H, halo, $C_1$-$C_6$ alkyl, $C_1$-$C_6$ haloalkyl, $C_1$-$C_6$ alkoxy, $C_1$-$C_6$ haloalkoxy, or —W—$R_w$;
$R_{1b}$ is H, halo, $C_1$-$C_6$ alkyl, $C_1$-$C_6$ haloalkyl, $C_1$-$C_6$ alkoxy, or $C_1$-$C_6$ haloalkoxy;
$R_{3b}$ is H, halo, $C_1$-$C_6$ alkyl, $C_1$-$C_6$ haloalkyl, $C_1$-$C_6$ alkoxy, or $C_1$-$C_6$ haloalkoxy;
$R_{4b}$ is H, halo, $C_1$-$C_6$ alkyl, $C_1$-$C_6$ haloalkyl, $C_1$-$C_6$ alkoxy, or $C_1$-$C_6$ haloalkoxy;
$R_5$ is H, halo, OH, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—$R_w$;
$R_6$ is H, halo, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—$R_w$;
$R_7$ is H, halo, $C_1$-$C_6$ alkyl, $C_1$-$C_6$ haloalkyl, $C_1$-$C_6$ alkoxy, $C_1$-$C_6$ haloalkoxy, or —W—(CH$_2$)—$R_w$;
$R_9$ is H, halo, $C_1$-$C_6$ alkyl, $C_1$-$C_6$ haloalkyl, $C_1$-$C_6$ alkoxy, or $C_1$-$C_6$ haloalkoxy;
$R_{10}$ is H, halo, $C_1$-$C_6$ alkyl, $C_1$-$C_6$ haloalkyl, $C_1$-$C_6$ alkoxy, or $C_1$-$C_6$ haloalkoxy;
$R_{11}$ is H, halo, $C_1$-$C_6$ alkyl, $C_1$-$C_6$ haloalkyl, $C_1$-$C_6$ alkoxy, or $C_1$-$C_6$ haloalkoxy;
$R_{12}$ is H, halo, $C_1$-$C_6$ alkyl, $C_1$-$C_6$ haloalkyl, $C_1$-$C_6$ alkoxy, or $C_1$-$C_6$ haloalkoxy;
$R_{13}$ is H, halo, $C_1$-$C_6$ alkyl, $C_1$-$C_6$ haloalkyl, $C_1$-$C_6$ alkoxy, or $C_1$-$C_6$ haloalkoxy;
each W is independently O or a single bond;
each $R_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, $C_1$-$C_6$ alkyl, and $C_1$-$C_6$ haloalkyl; and
n is 0 or 1;
wherein the compound of formula (I-A), (II-A), or (III-A) is not methyl 5-(2-(2,4-dimethoxyphenoxy)-5-(trifluoromethyl)benzamido)picolinate or methyl 5-(4,5-dichloro-2-(4-fluoro-2-methoxyphenoxy)benzamido)picolinate.

In some embodiments, the invention relates to a compound of formula (I-A) or (II-A), or a pharmaceutically acceptable salt thereof, wherein $R_{1a}$ is H; $R_{3a}$ is H, halo, $C_1$-$C_6$ alkyl, $C_1$-$C_6$ haloalkyl, $C_1$-$C_6$ alkoxy, or $C_1$-$C_6$ haloalkoxy; $R_{4a}$ is H, halo, $C_1$-$C_6$ alkyl, $C_1$-$C_6$ haloalkyl, $C_1$-$C_6$ alkoxy, or $C_1$-$C_6$ haloalkoxy; and $R_5$ is H, halo, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—$R_w$.

In some embodiments, the invention relates to a compound of formula (I-A), (II-A), or (III-A), or a pharmaceutically acceptable salt thereof, wherein $R_o$ is CH$_3$. In other embodiments, the invention relates to a compound of formula (I-A) or (II-A), or a pharmaceutically acceptable salt thereof, wherein $R_o$ is CH$_3$.

In some embodiments, the invention relates to a compound of formula (I-A), or a pharmaceutically acceptable salt thereof, wherein $R_{1a}$ is H, halo, or $C_1$-$C_6$ alkyl. In other embodiments, $R_{1a}$ is H, F, or CH$_3$. In other embodiments, $R_{1a}$ is H. In other embodiments, $R_{1a}$ is F. In other embodiments, $R_{1a}$ is CH$_3$.

In some embodiments, the invention relates to a compound of formula (I-A), or a pharmaceutically acceptable salt thereof, wherein $R_{3a}$ is H. In other embodiments, $R_{3a}$ is $C(O)OR_o$.

In some embodiments, the invention relates to a compound of formula (I-A), or a pharmaceutically acceptable salt thereof, wherein $R_{4a}$ is H, halo, $C_1$-$C_6$ alkyl, $C_1$-$C_6$ haloalkyl, or —W—$R_w$. In other embodiments, $R_{4a}$ is H, halo, $C_1$-$C_6$ alkyl, or $C_1$-$C_6$ haloalkyl. In other embodiments, $R_{4a}$ is H, $C_1$-$C_6$ alkyl, $C_1$-$C_6$ haloalkyl, or —W—$R_w$. In other embodiments, $R_{4a}$ is H, $C_1$-$C_6$ alkyl, or $C_1$-$C_6$ haloalkyl. In other embodiments, $R_{4a}$ is H, halo, $C_1$-$C_6$ alkyl, or —W—$R_w$. In other embodiments, $R_{4a}$ is H, halo, or $C_1$-$C_6$ alkyl. In other embodiments, $R_{4a}$ is H, $C_1$-$C_6$ alkyl, or —W—$R_w$. In other embodiments, $R_{4a}$ is H, or $C_1$-$C_6$ alkyl. In other embodiments, $R_{4a}$ is $C_1$-$C_6$ alkyl. In other embodiments, $R_{4a}$ is H, CH$_3$, or cyclopropyl. In other embodiments, $R_{4a}$ is H or CH$_3$. In other embodiments, $R_{4a}$ is H. In other embodiments, $R_{4a}$ is CH$_3$. In other embodiments, $R_{4a}$ is cyclopropyl.

In some embodiments, the invention relates to a compound of formula (II-A), or a pharmaceutically acceptable salt thereof, wherein $R_{1b}$ is H.

In some embodiments, the invention relates to a compound of formula (II-A), or a pharmaceutically acceptable salt thereof, wherein $R_{3b}$ is H.

In some embodiments, the invention relates to a compound of formula (II-A), or a pharmaceutically acceptable salt thereof, wherein $R_{4b}$ is H.

In some embodiments, the invention relates to a compound of formula (III-A), or a pharmaceutically acceptable salt thereof, wherein $R_{2c}$ is H.

In some embodiments, the invention relates to a compound of formula (III-A), or a pharmaceutically acceptable salt thereof, wherein $R_{3c}$ is H.

In some embodiments, the invention relates to a compound of formula (III-A), or a pharmaceutically acceptable salt thereof, wherein $R_{4c}$ is H.

In some embodiments, the invention relates to a compound of formula (I-A), (II-A), or (III-A) or a pharmaceutically acceptable salt thereof, wherein $R_5$ is H, halo, OH, $C_1$-$C_6$ alkyl, or $C_1$-$C_6$ haloalkyl. In other embodiments, $R_5$ is H, halo, $C_1$-$C_6$ alkyl, or $C_1$-$C_6$ haloalkyl. In other embodiments, $R_5$ is halo, OH, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—R$_w$. In other embodiments, $R_5$ is halo, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—R$_w$. In other embodiments, $R_5$ is H, halo, OH, or $C_1$-$C_6$ alkyl. In other embodiments, $R_5$ is H, halo, or $C_1$-$C_6$ alkyl. In other embodiments, $R_5$ is H or halo. In other embodiments, $R_5$ is halo. In other embodiments, $R_5$ is $C_1$-$C_6$ alkyl. In other embodiments, $R_5$ is H, F, OH, or CH$_3$. In other embodiments, $R_5$ is H, F, or CH$_3$. In other embodiments, $R_5$ is H or F. In other embodiments, $R_5$ is H. In other embodiments, $R_5$ is F. In other embodiments, $R_5$ is OH. In other embodiments, $R_5$ is CH$_3$.

In some embodiments, the invention relates to a compound of formula (I-A), (II-A), or (III-A), or a pharmaceutically acceptable salt thereof, wherein $R_6$ is H, halo, $C_1$-$C_6$ alkyl, $C_1$-$C_6$ haloalkyl, or $R_w$. In other embodiments, $R_6$ is halo, $C_1$-$C_6$ alkyl, $C_1$-$C_6$ haloalkyl, or $R_w$. In other embodiments, $R_6$ is H, halo, $C_1$-$C_6$ haloalkyl, or $R_w$. In other embodiments, $R_6$ is H, halo, $C_1$-$C_6$ alkyl, or $C_1$-$C_6$ haloalkyl. In other embodiments, $R_6$ is halo, $C_1$-$C_6$ alkyl, or $C_1$-$C_6$ haloalkyl. In other embodiments, $R_6$ is H, halo, or $C_1$-$C_6$ haloalkyl. In other embodiments, $R_6$ is halo or $C_1$-$C_6$ haloalkyl. In other embodiments, $R_6$ is halo, $C_1$-$C_6$ haloalkyl, or 3-6 membered cycloalkyl. In other embodiments, $R_6$ is halo. In other embodiments, $R_6$ is $C_1$-$C_6$ haloalkyl. In other embodiments, $R_6$ is 3-6 membered cycloalkyl. In other embodiments, $R_6$ is F, CF$_3$, or cyclopropyl. In other embodiments, $R_6$ is F or CF$_3$. In other embodiments, $R_6$ is F. In other embodiments, $R_6$ is CF$_3$. In other embodiments, $R_6$ is cyclopropyl.

In some embodiments, the invention relates to a compound of formula (I-A), (II-A), or (III-A), or a pharmaceutically acceptable salt thereof, wherein $R_7$ is H, halo, $C_1$-$C_6$ alkyl, or $C_1$-$C_6$ haloalkyl. In other embodiments, $R_7$ is H, $C_1$-$C_6$ alkyl, or $C_1$-$C_6$ haloalkyl. In other embodiments, $R_7$ is H, halo, or $C_1$-$C_6$ haloalkyl. In other embodiments, $R_7$ is H or $C_1$-$C_6$ haloalkyl. In other embodiments, $R_7$ is $C_1$-$C_6$ haloalkyl. In other embodiments, $R_7$ is H or CF$_3$. In other embodiments, $R_7$ is H. In other embodiments, $R_7$ is CF$_3$.

In some embodiments, the invention relates to a compound of formula (I-A), (II-A), or (III-A), or a pharmaceutically acceptable salt thereof, wherein $R_9$ is H, $C_1$-$C_6$ alkoxy, or $C_1$-$C_6$ haloalkoxy. In other embodiments, $R_9$ is H, halo, $C_1$-$C_6$ alkyl, $C_1$-$C_6$ haloalkyl, or $C_1$-$C_6$ haloalkoxy. In other embodiments, $R_9$ is H, halo, $C_1$-$C_6$ alkyl, or $C_1$-$C_6$ alkoxy. In other embodiments, $R_9$ is H or $C_1$-$C_6$ alkoxy. In other embodiments, $R_9$ is halo. In other embodiments, $R_9$ is $C_1$-$C_6$ alkyl. In other embodiments, $R_9$ is $C_1$-$C_6$ alkoxy. In other embodiments, $R_9$ is H, Cl, CH$_3$, OCH$_3$, OC($^1$H)$_3$, or OCD$_3$. In other embodiments, $R_9$ is H, OCH$_3$, OC($^1$H)$_3$, or OCD$_3$. In other embodiments, $R_9$ is H. In other embodiments, $R_9$ is Cl. In other embodiments, $R_9$ is CH$_3$. In other embodiments, $R_9$ is OCH$_3$. In other embodiments, $R_9$ is OC($^1$H)$_3$. In other embodiments, $R_9$ is OCD$_3$.

In some embodiments, the invention relates to a compound of formula (I-A), (II-A), or (III-A), or a pharmaceutically acceptable salt thereof, wherein $R_{10}$ is H. In other embodiments, $R_{10}$ is halo. In other embodiments, $R_{10}$ is F.

In some embodiments, the invention relates to a compound of formula (I-A), (II-A), or (III-A), or a pharmaceutically acceptable salt thereof, wherein $R_{11}$ is H, halo, $C_1$-$C_6$ alkoxy, or $C_1$-$C_6$ haloalkoxy. In other embodiments, $R_{11}$ is halo, $C_1$-$C_6$ alkoxy, or $C_1$-$C_6$ haloalkoxy. In other embodiments, $R_{11}$ is H, halo, or $C_1$-$C_6$ haloalkoxy. In other embodiments, $R_{11}$ is halo or $C_1$-$C_6$ haloalkoxy. In other embodiments, $R_{11}$ is halo. In other embodiments, $R_{11}$ is $C_1$-$C_6$ haloalkoxy. In other embodiments, $R_{11}$ is F or OCF$_3$. In other embodiments, $R_{11}$ is F. In other embodiments, $R_{11}$ is OCF$_3$.

In some embodiments, the invention relates to a compound of formula (I-A), (II-A), or (III-A), or a pharmaceutically acceptable salt thereof, wherein $R_{12}$ is H.

In some embodiments, the invention relates to a compound of formula (I-A), (II-A), or (III-A), or a pharmaceutically acceptable salt thereof, wherein $R_{13}$ is H.

In some embodiments, the invention relates to a compound of formula (I-A), (II-A), or (III-A), i.e., the compound in non-salt form.

In another aspect, the invention relates to a compound of formula (I-A)

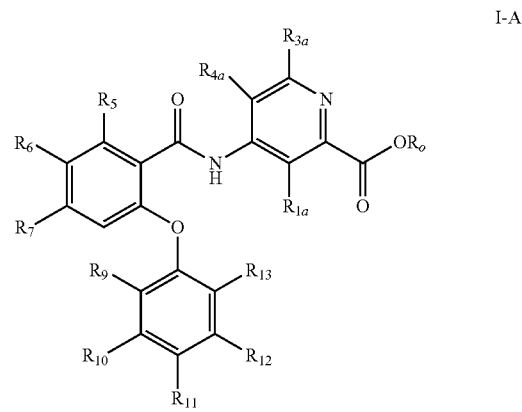

I-A or a pharmaceutically acceptable salt thereof, wherein:

each $R_o$ is independently $C_1$-$C_6$ alkyl;

$R_{1a}$ is H, halo, $C_1$-$C_6$ alkyl, $C_1$-$C_6$ haloalkyl, $C_1$-$C_6$ alkoxy, or $C_1$-$C_6$ haloalkoxy;

$R_{3a}$ is H, halo, $C_1$-$C_6$ alkyl, $C_1$-$C_6$ haloalkyl, $C_1$-$C_6$ alkoxy, $C_1$-$C_6$ haloalkoxy, or C(O)OR$_o$;

$R_{4a}$ is H, halo, $C_1$-$C_6$ alkyl, $C_1$-$C_6$ haloalkyl, $C_1$-$C_6$ alkoxy, $C_1$-$C_6$ haloalkoxy, or —W—R$_w$;

$R_5$ is H, halo, OH, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—R$_w$;

$R_6$ is H, halo, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—R$_w$;

$R_7$ is H, halo, $C_1$-$C_6$ alkyl, $C_1$-$C_6$ haloalkyl, $C_1$-$C_6$ alkoxy, $C_1$-$C_6$ haloalkoxy, or —W—(CH$_2$)$_n$—R;

$R_9$ is H, halo, $C_1$-$C_6$ alkyl, $C_1$-$C_6$ haloalkyl, $C_1$-$C_6$ alkoxy, or $C_1$-$C_6$ haloalkoxy;

$R_{10}$ is H, halo, $C_1$-$C_6$ alkyl, $C_1$-$C_6$ haloalkyl, $C_1$-$C_6$ alkoxy, or $C_1$-$C_6$ haloalkoxy;

$R_{11}$ is H, halo, $C_1$-$C_6$ alkyl, $C_1$-$C_6$ haloalkyl, $C_1$-$C_6$ alkoxy, or $C_1$-$C_6$ haloalkoxy;

$R_{12}$ is H, halo, $C_1$-$C_6$ alkyl, $C_1$-$C_6$ haloalkyl, $C_1$-$C_6$ alkoxy, or $C_1$-$C_6$ haloalkoxy;

$R_{13}$ is H, halo, $C_1$-$C_6$ alkyl, $C_1$-$C_6$ haloalkyl, $C_1$-$C_6$ alkoxy, or $C_1$-$C_6$ haloalkoxy;

each W is independently O or a single bond;

each $R_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, $C_1$-$C_6$ alkyl, and $C_1$-$C_6$ haloalkyl; and n is 0 or 1.

In some embodiments, the invention relates to a compound of formula (I-A), or a pharmaceutically acceptable salt thereof, wherein $R_{1a}$ is H; $R_{3a}$ is H, halo, $C_1$-$C_6$ alkyl, $C_1$-$C_6$ haloalkyl, $C_1$-$C_6$ alkoxy, or $C_1$-$C_6$ haloalkoxy; $R_{4a}$ is H, halo, $C_1$-$C_6$ alkyl, $C_1$-$C_6$ haloalkyl, $C_1$-$C_6$ alkoxy, or $C_1$-$C_6$ haloalkoxy; and $R_5$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$.

In some embodiments, the invention relates to a compound of formula (I-A), or a pharmaceutically acceptable salt thereof, wherein $R_o$ is $CH_3$.

In some embodiments, the invention relates to a compound of formula (I-A), or a pharmaceutically acceptable salt thereof, wherein $R_{1a}$ is H, halo, or $C_1$-$C_6$ alkyl. In other embodiments, $R_{1a}$ is H, F, or $CH_3$. In other embodiments, $R_{1a}$ is H. In other embodiments, $R_{1a}$ is F. In other embodiments, $R_{1a}$ is $CH_3$.

In some embodiments, the invention relates to a compound of formula (I-A), or a pharmaceutically acceptable salt thereof, wherein $R_{3a}$ is H. In other embodiments, $R_{3a}$ is $C(O)OR_o$.

In some embodiments, the invention relates to a compound of formula (I-A), or a pharmaceutically acceptable salt thereof, wherein $R_{4a}$ is H, halo, $C_1$-$C_6$ alkyl, $C_1$-$C_6$ haloalkyl, or —W—$R_w$. In other embodiments, $R_{4a}$ is H, halo, $C_1$-$C_6$ alkyl, or $C_1$-$C_6$ haloalkyl. In other embodiments, $R_{4a}$ is H, $C_1$-$C_6$ alkyl, $C_1$-$C_6$ haloalkyl, or —W—$R_w$. In other embodiments, $R_{4a}$ is H, $C_1$-$C_6$ alkyl, or $C_1$-$C_6$ haloalkyl. In other embodiments, $R_{4a}$ is H, halo, $C_1$-$C_6$ alkyl, or —W—$R_w$. In other embodiments, $R_{4a}$ is H, halo, or $C_1$-$C_6$ alkyl. In other embodiments, $R_{4a}$ is H, $C_1$-$C_6$ alkyl, or —W—$R_w$. In other embodiments, $R_{4a}$ is H or $C_1$-$C_6$ alkyl. In other embodiments, $R_{4a}$ is $C_1$-$C_6$ alkyl. In other embodiments, $R_{4a}$ is H, $CH_3$, or cyclopropyl. In other embodiments, $R_{4a}$ is H or $CH_3$. In other embodiments, $R_{4a}$ is H. In other embodiments, $R_{4a}$ is $CH_3$. In other embodiments, $R_{4a}$ is cyclopropyl.

In some embodiments, the invention relates to a compound of formula (I-A), or a pharmaceutically acceptable salt thereof, wherein $R_5$ is H, halo, OH, $C_1$-$C_6$ alkyl, or $C_1$-$C_6$ haloalkyl. In other embodiments, $R_5$ is H, halo, $C_1$-$C_6$ alkyl, or $C_1$-$C_6$ haloalkyl. In other embodiments, $R_5$ is H, halo, OH, or $C_1$-$C_6$ alkyl. In other embodiments, $R_5$ is H, halo, or $C_1$-$C_6$ alkyl. In other embodiments, $R_5$ is halo. In other embodiments, $R_5$ is $C_1$-$C_6$ alkyl. In other embodiments, $R_5$ is H, F, OH, or $CH_3$. In other embodiments, $R_5$ is H, F, or $CH_3$. In other embodiments, $R_5$ is H. In other embodiments, $R_5$ is F. In other embodiments, $R_5$ is OH. In other embodiments, $R_5$ is $CH_3$.

In some embodiments, the invention relates to a compound of formula (I-A), or a pharmaceutically acceptable salt thereof, wherein $R_6$ is H, halo, $C_1$-$C_6$ alkyl, $C_1$-$C_6$ haloalkyl, or R. In other embodiments, $R_6$ is halo, $C_1$-$C_6$ alkyl, $C_1$-$C_6$ haloalkyl, or R. In other embodiments, $R_6$ is H, halo, $C_1$-$C_6$ haloalkyl, or R. In other embodiments, $R_6$ is halo, $C_1$-$C_6$ haloalkyl, or 3-6 membered cycloalkyl. In other embodiments, $R_6$ is halo. In other embodiments, $R_6$ is $C_1$-$C_6$ haloalkyl. In other embodiments, $R_6$ is 3-6 membered cycloalkyl. In other embodiments, $R_6$ is F, $CF_3$, or cyclopropyl. In other embodiments, $R_6$ is F. In other embodiments, $R_6$ is $CF_3$. In other embodiments, $R_6$ is cyclopropyl.

In some embodiments, the invention relates to a compound of formula (I-A), or a pharmaceutically acceptable salt thereof, wherein $R_7$ is H, halo, $C_1$-$C_6$ alkyl, or $C_1$-$C_6$ haloalkyl. In other embodiments, $R_7$ is H, $C_1$-$C_6$ alkyl, or $C_1$-$C_6$ haloalkyl. In other embodiments, $R_7$ is H, halo, or $C_1$-$C_6$ haloalkyl. In other embodiments, $R_7$ is H or $C_1$-$C_6$ haloalkyl. In other embodiments, $R_7$ is $C_1$-$C_6$ haloalkyl. In other embodiments, $R_7$ is H or $CF_3$. In other embodiments, $R_7$ is H. In other embodiments, $R_7$ is $CF_3$.

In some embodiments, the invention relates to a compound of formula (I-A), or a pharmaceutically acceptable salt thereof, wherein $R_9$ is H, halo, $C_1$-$C_6$ alkyl, $C_1$-$C_6$ alkoxy, or $C_1$-$C_6$ haloalkoxy. In other embodiments, $R_9$ is H, $C_1$-$C_6$ alkoxy, or $C_1$-$C_6$ haloalkoxy. In other embodiments, $R_9$ is H, halo, $C_1$-$C_6$ alkyl, or $C_1$-$C_6$ alkoxy. In other embodiments, $R_9$ is H or $C_1$-$C_6$ alkoxy. In other embodiments, $R_5$ is halo. In other embodiments, $R_5$ is $C_1$-$C_6$ alkyl. In other embodiments, $R_9$ is $C_1$-$C_6$ alkoxy. In other embodiments, $R_9$ is H, Cl, $CH_3$, $OCH_3$, $OC(^1H)_3$, or $OCD_3$. In other embodiments, $R_9$ is H, $OCH_3$, $OC(^1H)_3$, or $OCD_3$. In other embodiments, $R_9$ is H. In other embodiments, $R_9$ is Cl. In other embodiments, $R_9$ is $CH_3$. In other embodiments, $R_9$ is $OCH_3$. In other embodiments, $R_9$ is $OC(^1H)_3$. In other embodiments, $R_9$ is $OCD_3$.

In some embodiments, the invention relates to a compound of formula (I-A), or a pharmaceutically acceptable salt thereof, wherein $R_{10}$ is H. In other embodiments, $R_{10}$ is halo. In other embodiments, $R_{10}$ is F.

In some embodiments, the invention relates to a compound of formula (I-A), or a pharmaceutically acceptable salt thereof, wherein $R_{11}$ is H, halo, $C_1$-$C_6$ alkoxy, or $C_1$-$C_6$ haloalkoxy. In other embodiments, $R_{11}$ is halo, $C_1$-$C_6$ alkoxy, or $C_1$-$C_6$ haloalkoxy. In other embodiments, $R_{11}$ is H, halo, or $C_1$-$C_6$ haloalkoxy. In other embodiments, $R_{11}$ is halo or $C_1$-$C_6$ haloalkoxy. In other embodiments, $R_{11}$ is halo. In other embodiments, $R_{11}$ is $C_1$-$C_6$ haloalkoxy. In other embodiments, $R_{11}$ is F or $OCF_3$. In other embodiments, $R_{11}$ is F. In other embodiments, $R_{11}$ is $OCF_3$.

In some embodiments, the invention relates to a compound of formula (I-A), or a pharmaceutically acceptable salt thereof, wherein $R_{12}$ is H.

In some embodiments, the invention relates to a compound of formula (I-A), or a pharmaceutically acceptable salt thereof, wherein $R_{13}$ is H.

In some embodiments, the invention relates to a compound of formula (I-A), i.e., the compound in non-salt form.

In another aspect, the invention relates to a compound of formula (II-A)

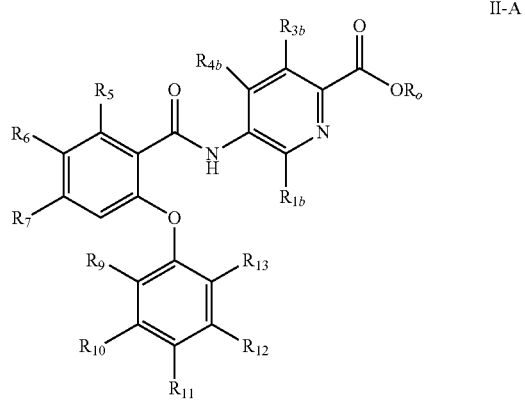

II-A or a pharmaceutically acceptable salt thereof, wherein:
R$_o$ is C$_1$-C$_6$ alkyl;
R$_{1b}$ is H, halo, C$_1$-C$_6$ alkyl, C$_1$-C$_6$ haloalkyl, C$_1$-C$_6$ alkoxy, or C$_1$-C$_6$ haloalkoxy;
R$_{3b}$ is H, halo, C$_1$-C$_6$ alkyl, C$_1$-C$_6$ haloalkyl, C$_1$-C$_6$ alkoxy, or C$_1$-C$_6$ haloalkoxy;
R$_{4b}$ is H, halo, C$_1$-C$_6$ alkyl, C$_1$-C$_6$ haloalkyl, C$_1$-C$_6$ alkoxy, or C$_1$-C$_6$ haloalkoxy;
R$_5$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_6$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_7$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_9$ is H, halo, C$_1$-C$_6$ alkyl, C$_1$-C$_6$ haloalkyl, C$_1$-C$_6$ alkoxy, or C$_1$-C$_6$ haloalkoxy;
R$_{10}$ is H, halo, C$_1$-C$_6$ alkyl, C$_1$-C$_6$ haloalkyl, C$_1$-C$_6$ alkoxy, or C$_1$-C$_6$ haloalkoxy;
R$_{11}$ is H, halo, C$_1$-C$_6$ alkyl, C$_1$-C$_6$ haloalkyl, C$_1$-C$_6$ alkoxy, or C$_1$-C$_6$ haloalkoxy;
R$_{12}$ is H, halo, C$_1$-C$_6$ alkyl, C$_1$-C$_6$ haloalkyl, C$_1$-C$_6$ alkoxy, or C$_1$-C$_6$ haloalkoxy;
R$_{13}$ is H, halo, C$_1$-C$_6$ alkyl, C$_1$-C$_6$ haloalkyl, C$_1$-C$_6$ alkoxy, or C$_1$-C$_6$ haloalkoxy;
each W is independently O or a single bond;
each R$_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, C$_1$-C$_6$ alkyl, and C$_1$-C$_6$ haloalkyl; and
n is 0 or 1;
wherein the compound of formula (II-A) is not methyl 5-(2-(2,4-dimethoxyphenoxy)-5-(trifluoromethyl)benzamido)picolinate or methyl 5-(4,5-dichloro-2-(4-fluoro-2-methoxyphenoxy)benzamido)picolinate.

In some embodiments, the invention relates to a compound of formula (II-A), or a pharmaceutically acceptable salt thereof, wherein R$_o$ is CH$_3$.

In some embodiments, the invention relates to a compound of formula (II-A), or a pharmaceutically acceptable salt thereof, wherein R$_{1b}$ is H.

In some embodiments, the invention relates to a compound of formula (II-A), or a pharmaceutically acceptable salt thereof, wherein R$_{3b}$ is H.

In some embodiments, the invention relates to a compound of formula (II-A), or a pharmaceutically acceptable salt thereof, wherein R$_{4b}$ is H.

In some embodiments, the invention relates to a compound of formula (II-A), or a pharmaceutically acceptable salt thereof, wherein R$_5$ is halo, C$_1$-C$_6$ haloalkyl, C$_1$-C$_6$ alkoxy, C$_1$-C$_6$ haloalkoxy, or —W—(CH$_2$)$_n$—R$_w$. In other embodiments, R$_5$ is H or halo. In other embodiments, R$_5$ is halo. In other embodiments, R$_5$ is H or F. In other embodiments, R$_5$ is H. In other embodiments, R$_5$ is F.

In some embodiments, the invention relates to a compound of formula (II-A), or a pharmaceutically acceptable salt thereof, wherein R$_6$ is H, halo, C$_1$-C$_6$ alkyl, or C$_1$-C$_6$ haloalkyl. In other embodiments, R$_6$ is halo, C$_1$-C$_6$ alkyl, or C$_1$-C$_6$ haloalkyl. In other embodiments, R$_6$ is H, halo, or C$_1$-C$_6$ haloalkyl. In other embodiments, R$_6$ is halo or C$_1$-C$_6$ haloalkyl. In other embodiments, R$_6$ is halo. In other embodiments, R$_6$ is C$_1$-C$_6$ haloalkyl. In other embodiments, R$_6$ is F or CF$_3$. In other embodiments, R$_6$ is F. In other embodiments, R$_6$ is CF$_3$.

In some embodiments, the invention relates to a compound of formula (II-A), or a pharmaceutically acceptable salt thereof, wherein R$_7$ is H, halo, C$_1$-C$_6$ alkyl, or C$_1$-C$_6$ haloalkyl. In other embodiments, R$_7$ is H, C$_1$-C$_6$ alkyl, or C$_1$-C$_6$ haloalkyl. In other embodiments, R$_7$ is H, halo, or C$_1$-C$_6$ haloalkyl. In other embodiments, R$_7$ is H or C$_1$-C$_6$ haloalkyl. In other embodiments, R$_7$ is C$_1$-C$_6$ haloalkyl. In other embodiments, R$_7$ is H or CF$_3$. In other embodiments, R$_7$ is H. In other embodiments, R$_7$ is CF$_3$.

In some embodiments, the invention relates to a compound of formula (II-A), or a pharmaceutically acceptable salt thereof, wherein R$_9$ is H, halo, C$_1$-C$_6$ alkyl, C$_1$-C$_6$ haloalkyl, or C$_1$-C$_6$ haloalkoxy. In other embodiments, R$_9$ is H, C$_1$-C$_6$ alkoxy, or C$_1$-C$_6$ haloalkoxy. In other embodiments, R$_9$ is H, halo, or C$_1$-C$_6$ alkoxy. In other embodiments, R$_9$ is H or C$_1$-C$_6$ alkoxy. In other embodiments, R$_9$ is C$_1$-C$_6$ alkoxy. In other embodiments, R$_9$ is H, OCH$_3$, OC($^1$H)$_3$, or OCD$_3$. In other embodiments, R$_9$ is H. In other embodiments, R$_9$ is OCH$_3$. In other embodiments, R$_9$ is OC($^1$H)$_3$. In other embodiments, R$_9$ is OCD$_3$.

In some embodiments, the invention relates to a compound of formula (II-A), or a pharmaceutically acceptable salt thereof, wherein R$_{10}$ is H. In other embodiments, R$_{10}$ is halo. In other embodiments, R$_{10}$ is F.

In some embodiments, the invention relates to a compound of formula (II-A), or a pharmaceutically acceptable salt thereof, wherein R$_{11}$ is H, halo, C$_1$-C$_6$ alkoxy, or C$_1$-C$_6$ haloalkoxy. In other embodiments, R$_{11}$ is halo, C$_1$-C$_6$ alkoxy, or C$_1$-C$_6$ haloalkoxy. In other embodiments, R$_{11}$ is H, halo, or C$_1$-C$_6$ haloalkoxy. In other embodiments, R$_{11}$ is halo or C$_1$-C$_6$ haloalkoxy. In other embodiments, R$_{11}$ is halo. In other embodiments, R$_{11}$ is C$_1$-C$_6$ haloalkoxy. In other embodiments, R$_{11}$ is F or OCF$_3$. In other embodiments, R$_{11}$ is F. In other embodiments, R$_{11}$ is OCF$_3$.

In some embodiments, the invention relates to a compound of formula (II-A), or a pharmaceutically acceptable salt thereof, wherein R$_{12}$ is H.

In some embodiments, the invention relates to a compound of formula (II-A), or a pharmaceutically acceptable salt thereof, wherein R$_{13}$ is H.

In some embodiments, the invention relates to a compound of formula (II-A), i.e., the compound in non-salt form.

In another aspect, the invention relates to a compound of formula (III-A)

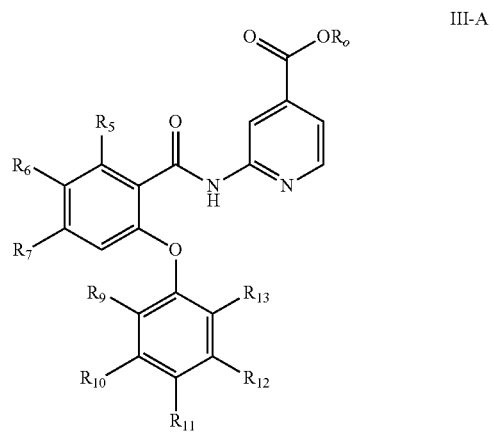

or a pharmaceutically acceptable salt thereof, wherein:
R$_o$ is C$_1$-C$_6$ alkyl;
R$_5$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;

$R_6$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_7$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_9$ is H, halo, $C_1$-$C_6$ alkyl, $C_1$-$C_6$ haloalkyl, $C_1$-$C_6$ alkoxy, or $C_1$-$C_6$ haloalkoxy;

$R_{10}$ is H, halo, $C_1$-$C_6$ alkyl, $C_1$-$C_6$ haloalkyl, $C_1$-$C_6$ alkoxy, or $C_1$-$C_6$ haloalkoxy;

$R_{11}$ is H, halo, $C_1$-$C_6$ alkyl, $C_1$-$C_6$ haloalkyl, $C_1$-$C_6$ alkoxy, or $C_1$-$C_6$ haloalkoxy;

$R_{12}$ is H, halo, $C_1$-$C_6$ alkyl, $C_1$-$C_6$ haloalkyl, $C_1$-$C_6$ alkoxy, or $C_1$-$C_6$ haloalkoxy;

$R_{13}$ is H, halo, $C_1$-$C_6$ alkyl, $C_1$-$C_6$ haloalkyl, $C_1$-$C_6$ alkoxy, or $C_1$-$C_6$ haloalkoxy;

each W is independently O or a single bond;

each $R_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, $C_1$-$C_6$ alkyl, and $C_1$-$C_6$ haloalkyl; and n is 0 or 1.

In some embodiments, the invention relates to a compound of formula (III-A), or a pharmaceutically acceptable salt thereof, wherein $R_o$ is $CH_3$.

In some embodiments, the invention relates to a compound of formula (III-A), or a pharmaceutically acceptable salt thereof, wherein $R_5$ is halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$. In other embodiments, $R_5$ is H, halo, or $C_1$-$C_6$ alkyl. In other embodiments, $R_5$ is halo. In other embodiments, $R_5$ is $C_1$-$C_6$ alkyl. In other embodiments, $R_5$ is F or $CH_3$. In other embodiments, $R_5$ is F. In other embodiments, $R_5$ is $CH_3$.

In some embodiments, the invention relates to a compound of formula (III-A), or a pharmaceutically acceptable salt thereof, wherein $R_6$ is H, halo, $C_1$-$C_6$ alkyl, or $C_1$-$C_6$ haloalkyl. In other embodiments, $R_6$ is halo, $C_1$-$C_6$ alkyl, or $C_1$-$C_6$ haloalkyl. In other embodiments, $R_6$ is H, halo, or $C_1$-$C_6$ haloalkyl. In other embodiments, $R_6$ is halo or $C_1$-$C_6$ haloalkyl. In other embodiments, $R_6$ is $C_1$-$C_6$ haloalkyl. In other embodiments, $R_6$ is $CF_3$.

In some embodiments, the invention relates to a compound of formula (III-A), or a pharmaceutically acceptable salt thereof, wherein $R_7$ is H, halo, $C_1$-$C_6$ alkyl, or $C_1$-$C_6$ haloalkyl. In other embodiments, $R_7$ is H, $C_1$-$C_6$ alkyl, or $C_1$-$C_6$ haloalkyl. In other embodiments, $R_7$ is H, halo, or $C_1$-$C_6$ haloalkyl. In other embodiments, $R_7$ is H or $C_1$-$C_6$ haloalkyl. In other embodiments, $R_7$ is H.

In some embodiments, the invention relates to a compound of formula (III-A), or a pharmaceutically acceptable salt thereof, wherein $R_9$ is H, halo, $C_1$-$C_6$ alkyl, $C_1$-$C_6$ haloalkyl, or $C_1$-$C_6$ haloalkoxy. In other embodiments, $R_9$ is H, $C_1$-$C_6$ alkoxy, or $C_1$-$C_6$ haloalkoxy. In other embodiments, $R_9$ is H, halo, or $C_1$-$C_6$ alkoxy. In other embodiments, $R_9$ is H or $C_1$-$C_6$ alkoxy. In other embodiments, $R_9$ is $C_1$-$C_6$ alkoxy. In other embodiments, $R_9$ is $OCH_3$.

In some embodiments, the invention relates to a compound of formula (III-A), or a pharmaceutically acceptable salt thereof, wherein $R_{10}$ is halo. In other embodiments, $R_{10}$ is F.

In some embodiments, the invention relates to a compound of formula (III-A), or a pharmaceutically acceptable salt thereof, wherein $R_{11}$ is H, halo, $C_1$-$C_6$ alkoxy, or $C_1$-$C_6$ haloalkoxy. In other embodiments, $R_{11}$ is halo, $C_1$-$C_6$ alkoxy, or $C_1$-$C_6$ haloalkoxy. In other embodiments, $R_{11}$ is H, halo, or $C_1$-$C_6$ haloalkoxy. In other embodiments, $R_{11}$ is halo or $C_1$-$C_6$ haloalkoxy. In other embodiments, $R_{11}$ is $C_1$-$C_6$ haloalkoxy. In other embodiments, $R_{11}$ is $OCF_3$.

In some embodiments, the invention relates to a compound of formula (III-A), or a pharmaceutically acceptable salt thereof, wherein $R_{12}$ is H.

In some embodiments, the invention relates to a compound of formula (III-A), or a pharmaceutically acceptable salt thereof, wherein $R_{13}$ is H.

In some embodiments, the invention relates to a compound of formula (III-A), i.e., the compound in non-salt form.

In another aspect, the invention relates to a compound of formula (I-B)

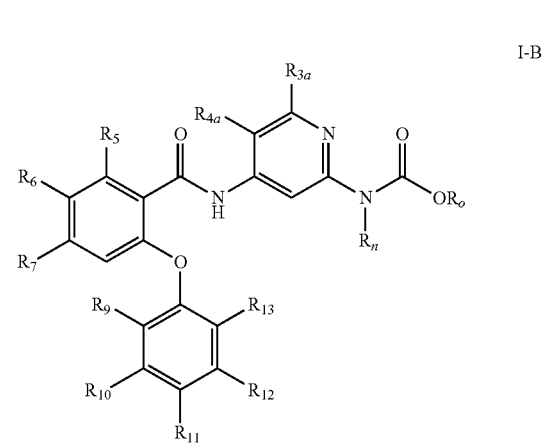

or a pharmaceutically acceptable salt thereof, wherein:

$R_n$ is H or $C_1$-$C_6$ alkyl;

$R_o$ is $C_1$-$C_6$ alkyl;

$R_{3a}$ is H, halo, $C_1$-$C_6$ alkyl, $C_1$-$C_6$ haloalkyl, $C_1$-$C_6$ alkoxy, or $C_1$-$C_6$ haloalkoxy;

$R_{4a}$ is H, halo, $C_1$-$C_6$ alkyl, $C_1$-$C_6$ haloalkyl, $C_1$-$C_6$ alkoxy, or $C_1$-$C_6$ haloalkoxy;

$R_5$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_6$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_7$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$;

$R_9$ is H, halo, $C_1$-$C_6$ alkyl, $C_1$-$C_6$ haloalkyl, $C_1$-$C_6$ alkoxy, or $C_1$-$C_6$ haloalkoxy;

$R_{10}$ is H, halo, $C_1$-$C_6$ alkyl, $C_1$-$C_6$ haloalkyl, $C_1$-$C_6$ alkoxy, or $C_1$-$C_6$ haloalkoxy;

$R_{11}$ is H, halo, $C_1$-$C_6$ alkyl, $C_1$-$C_6$ haloalkyl, $C_1$-$C_6$ alkoxy, or $C_1$-$C_6$ haloalkoxy;

$R_{12}$ is H, halo, $C_1$-$C_6$ alkyl, $C_1$-$C_6$ haloalkyl, $C_1$-$C_6$ alkoxy, or $C_1$-$C_6$ haloalkoxy;

$R_{13}$ is H, halo, $C_1$-$C_6$ alkyl, $C_1$-$C_6$ haloalkyl, $C_1$-$C_6$ alkoxy, or $C_1$-$C_6$ haloalkoxy;

each W is independently O or a single bond;

each $R_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, $C_1$-$C_6$ alkyl, and $C_1$-$C_6$ haloalkyl; and n is 0 or 1.

In some embodiments, the invention relates to a compound of formula (I-B), or a pharmaceutically acceptable salt thereof, wherein $R_n$ is H.

In some embodiments, the invention relates to a compound of formula (I-B), or a pharmaceutically acceptable salt thereof, wherein $R_o$ is tert-butyl.

In some embodiments, the invention relates to a compound of formula (I-B), or a pharmaceutically acceptable salt thereof, wherein $R_{3a}$ is H.

In some embodiments, the invention relates to a compound of formula (I-B), or a pharmaceutically acceptable salt thereof, wherein $R_{4a}$ is H.

In some embodiments, the invention relates to a compound of formula (I-B), or a pharmaceutically acceptable salt thereof, wherein $R_5$ is H.

In some embodiments, the invention relates to a compound of formula (I-B), or a pharmaceutically acceptable salt thereof, wherein $R_6$ is H, halo, $C_1$-$C_6$ alkyl, or $C_1$-$C_6$ haloalkyl. In other embodiments, $R_6$ is halo, $C_1$-$C_6$ alkyl, or $C_1$-$C_6$ haloalkyl. In other embodiments, $R_6$ is H, halo, or $C_1$-$C_6$ haloalkyl. In other embodiments, $R_6$ is halo or $C_1$-$C_6$ haloalkyl. In other embodiments, $R_6$ is halo. In other embodiments, $R_6$ is $C_1$-$C_6$ haloalkyl. In other embodiments, $R_6$ is F or $CF_3$. In other embodiments, $R_6$ is F. In other embodiments, $R_6$ is $CF_3$.

In some embodiments, the invention relates to a compound of formula (I-B), or a pharmaceutically acceptable salt thereof, wherein $R_7$ is H, halo, $C_1$-$C_6$ alkyl, or $C_1$-$C_6$ haloalkyl. In other embodiments, $R_7$ is H, $C_1$-$C_6$ alkyl, or $C_1$-$C_6$ haloalkyl. In other embodiments, $R_7$ is H, halo, or $C_1$-$C_6$ haloalkyl. In other embodiments, $R_7$ is H or $C_1$-$C_6$ haloalkyl. In other embodiments, $R_7$ is $C_1$-$C_6$ haloalkyl. In other embodiments, $R_7$ is H or $CF_3$. In other embodiments, $R_7$ is H. In other embodiments, $R_7$ is $CF_3$.

In some embodiments, the invention relates to a compound of formula (I-B), or a pharmaceutically acceptable salt thereof, wherein $R_9$ is H, $C_1$-$C_6$ alkoxy, or $C_1$-$C_6$ haloalkoxy. In other embodiments, $R_9$ is $C_1$-$C_6$ alkoxy or $C_1$-$C_6$ haloalkoxy. In other embodiments, $R_9$ is H or $C_1$-$C_6$ alkoxy. In other embodiments, $R_9$ is $C_1$-$C_6$ alkoxy. In other embodiments, $R_9$ is $OCH_3$, $OC(^1H)_3$, or $OCD_3$. In other embodiments, $R_9$ is $OCH_3$. In other embodiments, $R_9$ is $OC(^1H)_3$. In other embodiments, $R_9$ is $OCD_3$.

In some embodiments, the invention relates to a compound of formula (I-B), or a pharmaceutically acceptable salt thereof, wherein $R_{10}$ is H. In other embodiments, $R_{10}$ is halo. In other embodiments, $R_{10}$ is F.

In some embodiments, the invention relates to a compound of formula (I-B), or a pharmaceutically acceptable salt thereof, wherein $R_{11}$ is H, $C_1$-$C_6$ alkoxy, or $C_1$-$C_6$ haloalkoxy. In other embodiments, $R_{11}$ is $C_1$-$C_6$ alkoxy or $C_1$-$C_6$ haloalkoxy. In other embodiments, $R_{11}$ is H or $C_1$-$C_6$ haloalkoxy. In other embodiments, $R_{11}$ is $C_1$-$C_6$ haloalkoxy. In other embodiments, $R_{11}$ is $OCF_3$.

In some embodiments, the invention relates to a compound of formula (I-B), or a pharmaceutically acceptable salt thereof, wherein $R_{12}$ is H.

In some embodiments, the invention relates to a compound of formula (I-B), or a pharmaceutically acceptable salt thereof, wherein $R_{13}$ is H.

In some embodiments, the invention relates to a compound of formula (I-B), i.e., the compound in non-salt form.

In some embodiments, the invention relates to a compound selected from Table 1, or a pharmaceutically acceptable salt thereof. In other embodiments, the invention relates to a compound selected from Table 1, i.e., the compound in non-salt form.

TABLE 1

Compound Numbers and Structures

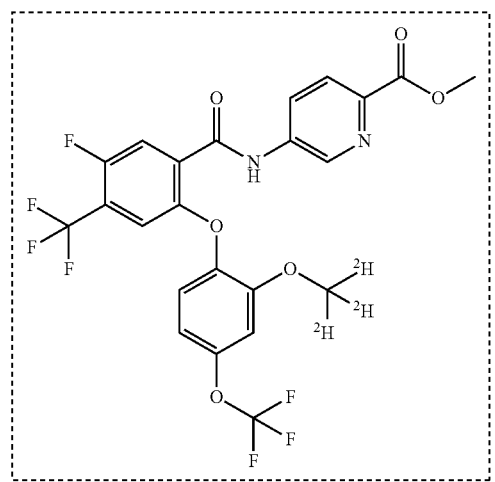 [SMILES: [2H]C([2H])([2H])Oc1cc(OC(F)(F)F)ccc1Oc1cc(C(F)(F)F)c(F)cc1C(=O)Nc1ccc(C(=O)OC)nc1]

1

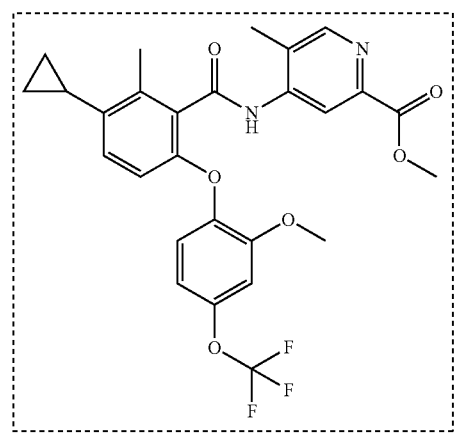 [SMILES: COC(=O)c1cc(NC(=O)c2c(Oc3ccc(OC(F)(F)F)cc3OC)ccc(C3CC3)c2C)c(C)cn1]

2

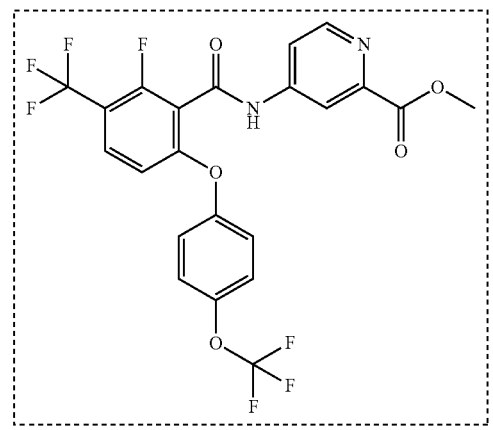 [SMILES: COC(=O)c1cc(NC(=O)c2c(Oc3ccc(OC(F)(F)F)cc3)ccc(C(F)(F)F)c2F)ccn1]

3

TABLE 1-continued
Compound Numbers and Structures
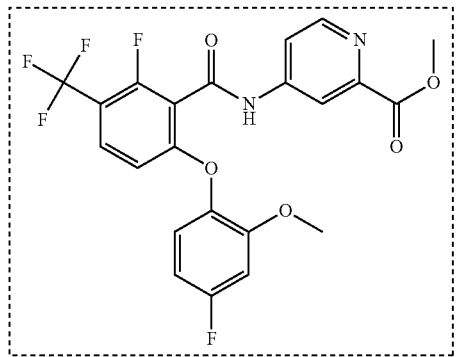 [SMILES: COC(=O)c1cc(NC(=O)c2c(Oc3ccc(F)cc3OC)ccc(C(F)(F)F)c2F)ccn1]
4
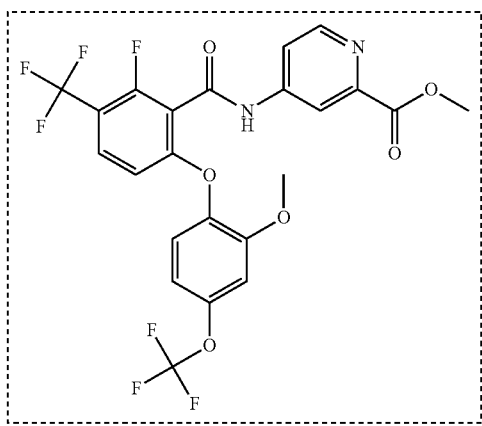 [SMILES: COC(=O)c1cc(NC(=O)c2c(Oc3ccc(OC(F)(F)F)cc3OC)ccc(C(F)(F)F)c2F)ccn1]
5
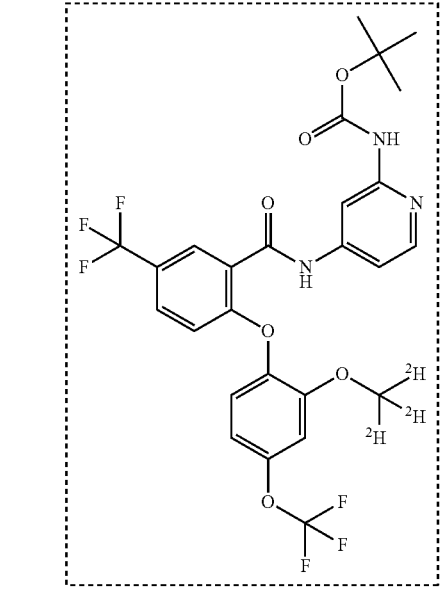 [SMILES: [2H]C([2H])([2H])Oc1cc(OC(F)(F)F)ccc1Oc1ccc(C(F)(F)F)cc1C(=O)Nc1ccnc(NC(=O)OC(C)(C)C)c1]
6
TABLE 1-continued
Compound Numbers and Structures
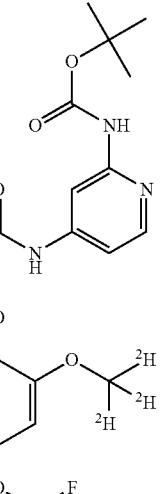
7
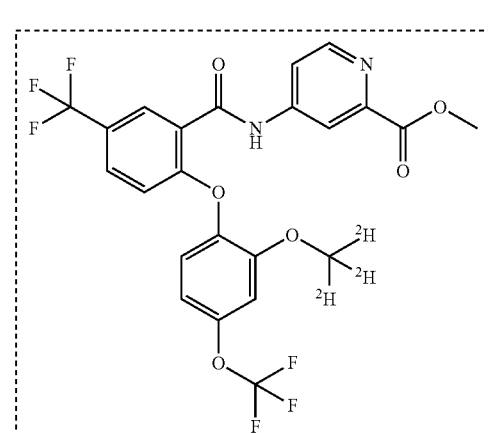
8
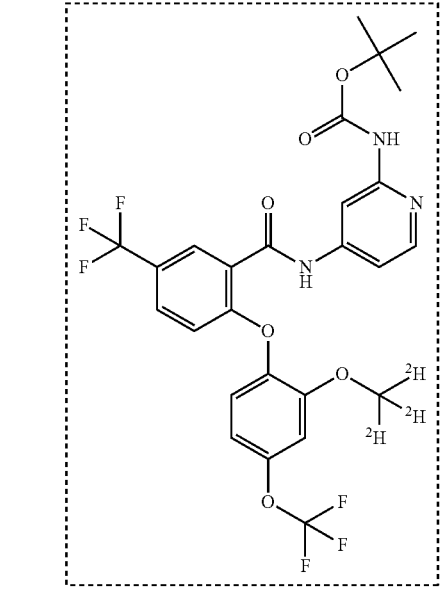 [SMILES: [2H]C([2H])([2H])Oc1cc(OC(F)(F)F)ccc1Oc1ccc(C(F)(F)F)cc1C(=O)Nc1ccnc(NC(=O)OC(C)(C)C)c1]
9

TABLE 1-continued

Compound Numbers and Structures

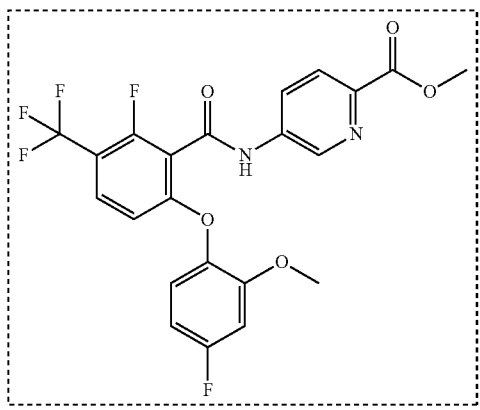 [SMILES: COC(=O)c1ccc(NC(=O)c2c(Oc3ccc(F)cc3OC)ccc(C(F)(F)F)c2F)cn1]
10

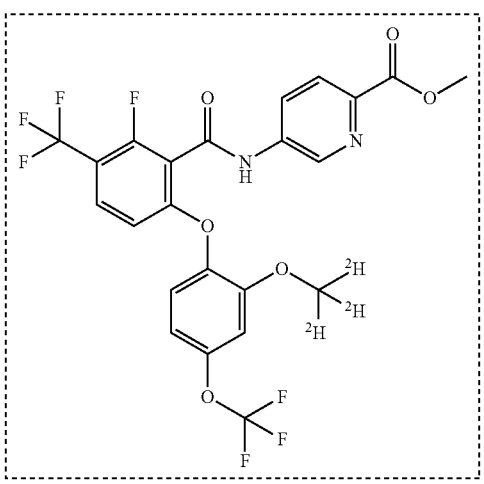 [SMILES: [2H]C([2H])([2H])Oc1cc(OC(F)(F)F)ccc1Oc1ccc(C(F)(F)F)c(F)c1C(=O)Nc1ccc(C(=O)OC)nc1]
11

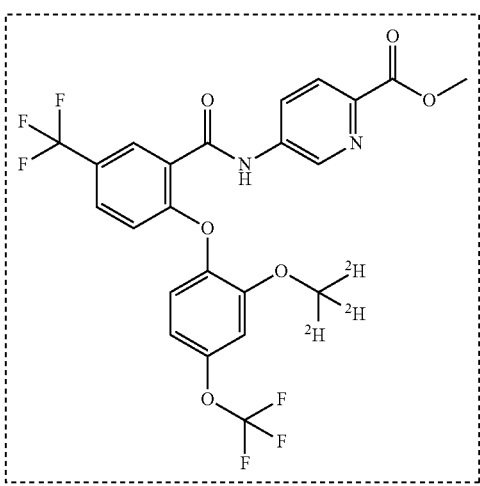 [SMILES: [2H]C([2H])([2H])Oc1cc(OC(F)(F)F)ccc1Oc1ccc(C(F)(F)F)cc1C(=O)Nc1ccc(C(=O)OC)nc1]
12

TABLE 1-continued

Compound Numbers and Structures

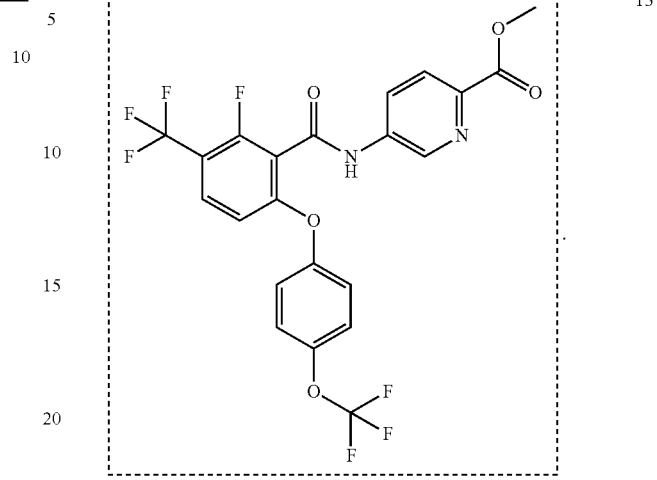
13

In some embodiments, the invention relates to a compound selected from Table 1A, or a pharmaceutically acceptable salt thereof. In other embodiments, the invention relates to a compound selected from Table 1A, i.e., the compound in non-salt form.

TABLE 1A

Additional Compound Numbers and Structures

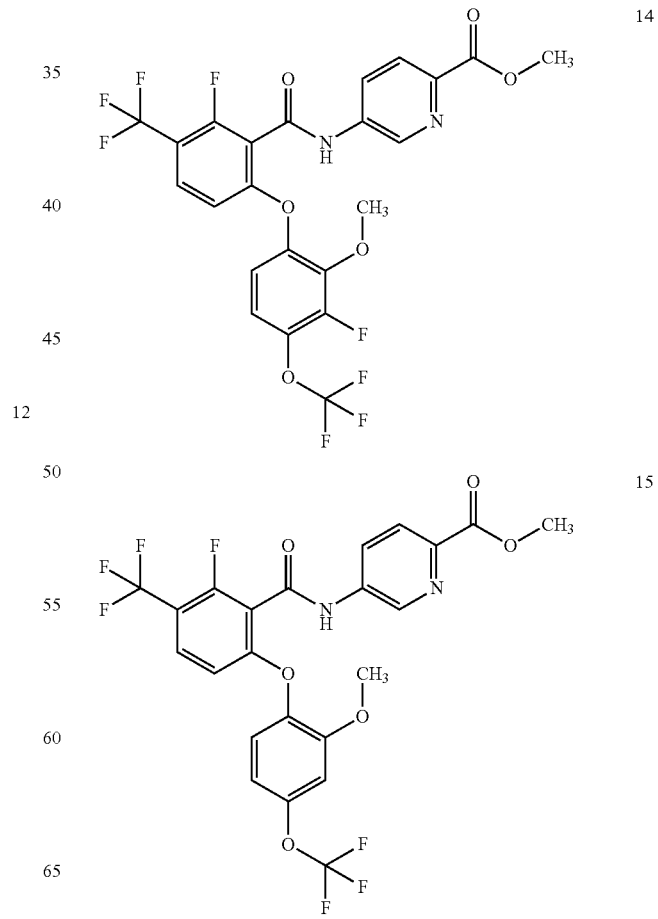

TABLE 1A-continued
Additional Compound Numbers and Structures
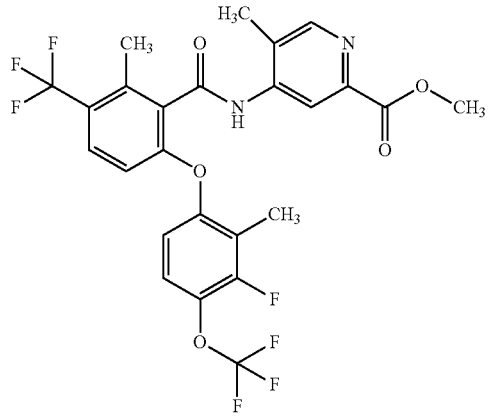 [SMILES: COC(=O)c1cc(NC(=O)c2c(Oc3ccc(OC(F)(F)F)c(F)c3C)ccc(C(F)(F)F)c2C)c(C)cn1]
16
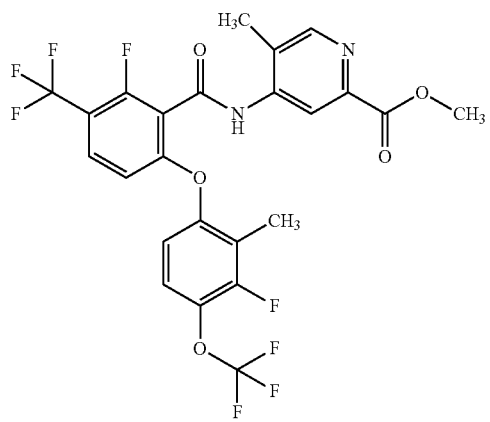 [SMILES: COC(=O)c1cc(NC(=O)c2c(Oc3ccc(OC(F)(F)F)c(F)c3C)ccc(C(F)(F)F)c2F)c(C)cn1]
17
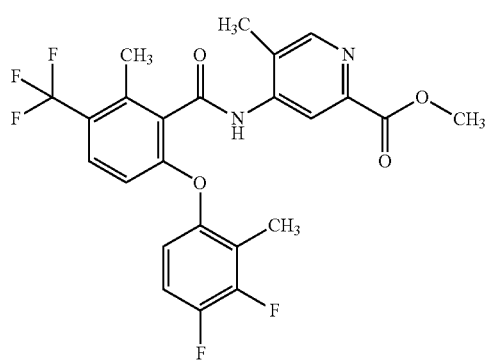 [SMILES: COC(=O)c1cc(NC(=O)c2c(Oc3ccc(F)c(F)c3C)ccc(C(F)(F)F)c2C)c(C)cn1]
18
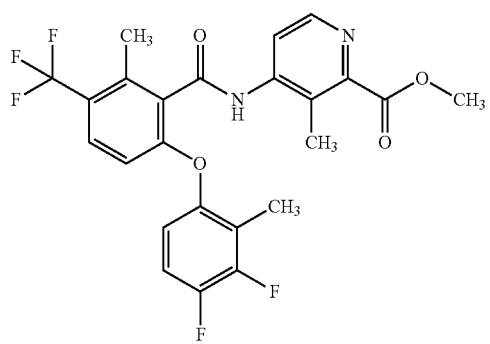 [SMILES: COC(=O)c1nccc(NC(=O)c2c(Oc3ccc(F)c(F)c3C)ccc(C(F)(F)F)c2C)c1C]
19
TABLE 1A-continued
Additional Compound Numbers and Structures
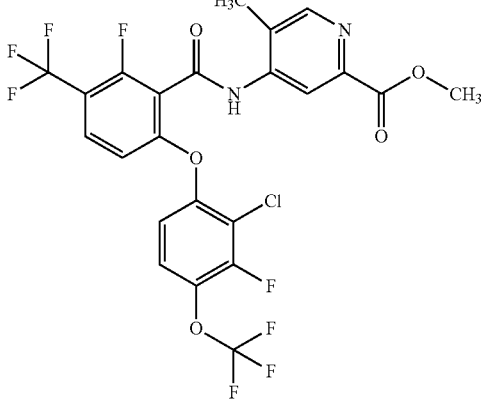
20
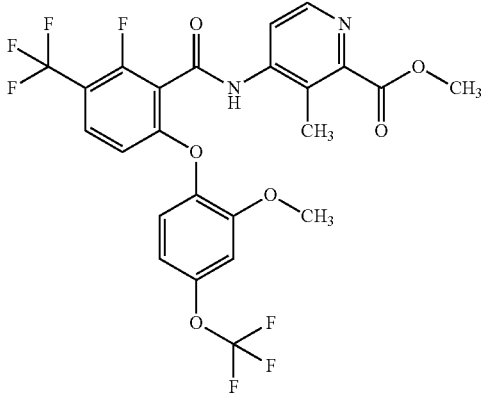 [SMILES: COC(=O)c1nccc(NC(=O)c2c(Oc3ccc(OC(F)(F)F)cc3OC)ccc(C(F)(F)F)c2F)c1C]
21
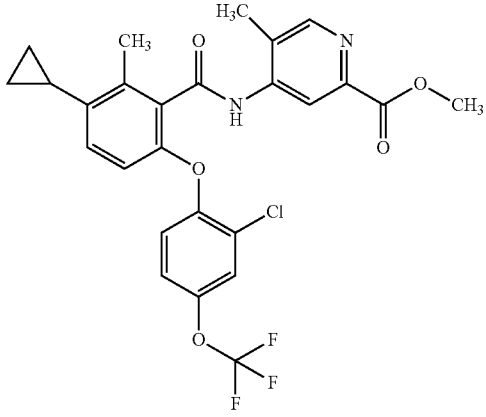 [SMILES: COC(=O)c1cc(NC(=O)c2c(Oc3ccc(OC(F)(F)F)cc3Cl)ccc(C3CC3)c2C)c(C)cn1]
22

TABLE 1A-continued

Additional Compound Numbers and Structures

TABLE 1B

Additional Compound Numbers and Structures

In some embodiments, the invention relates to a compound selected from Table 1B, or a pharmaceutically acceptable salt thereof. In other embodiments, the invention relates to a compound selected from Table 1B, i.e., the compound in non-salt form.

TABLE 1B-continued

Additional Compound Numbers and Structures

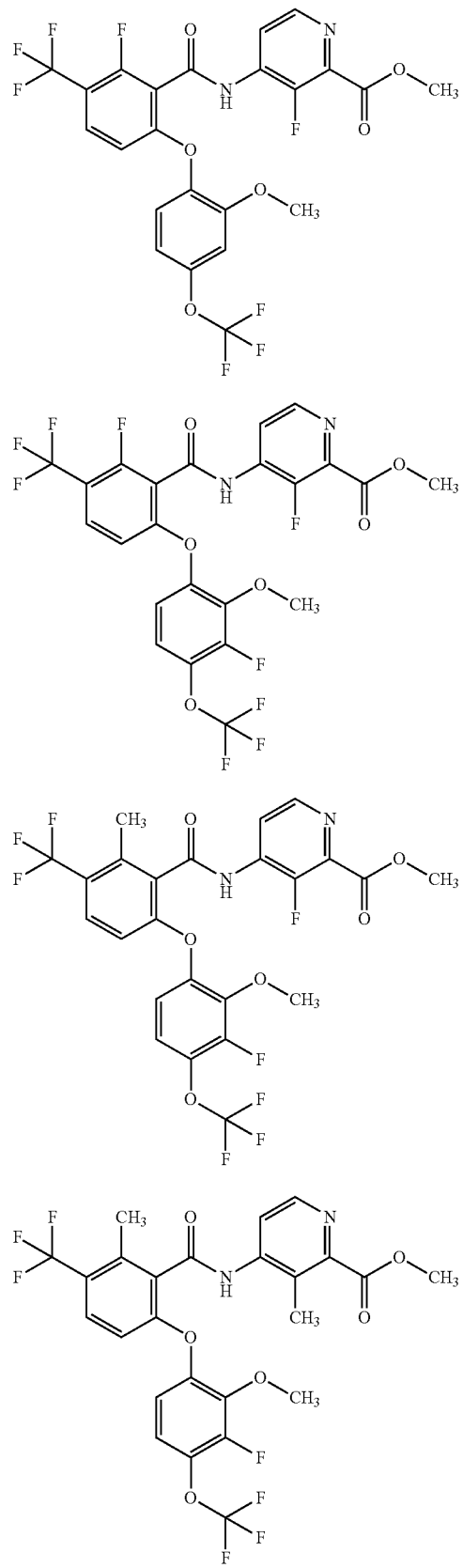

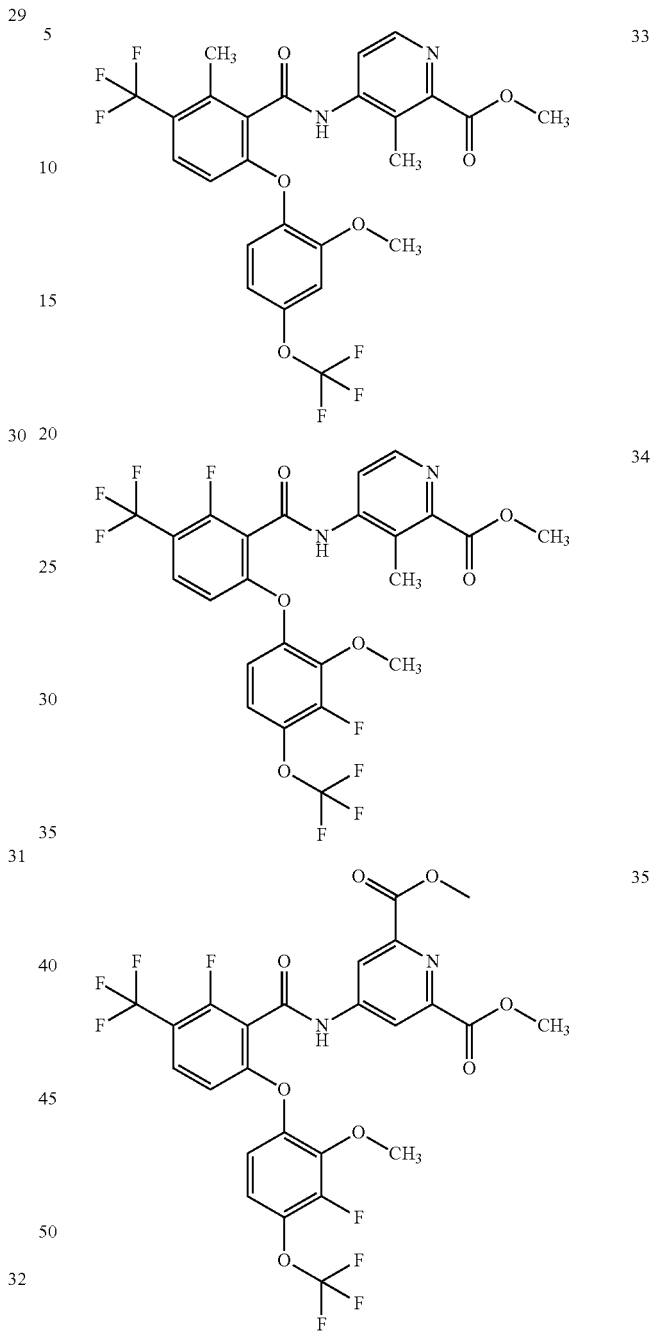

Salts, Compositions, Uses, Formulation, Administration and Additional Agents

Pharmaceutically Acceptable Salts and Compositions

As discussed herein, the invention provides compounds, and pharmaceutically acceptable salts thereof, that are inhibitors of voltage-gated sodium channels, and thus the present compounds, and pharmaceutically acceptable salts thereof, are useful for the treatment of diseases, disorders, and conditions including, but not limited to chronic pain, gut pain, neuropathic pain, musculoskeletal pain, acute pain, inflammatory pain, cancer pain, idiopathic pain, postsurgical pain (e.g., bunionectomy pain, herniorrhaphy pain or abdominoplasty pain), visceral pain, multiple sclerosis, Charcot-Marie-Tooth syndrome, incontinence, pathological cough, or cardiac arrhythmia. Accordingly, in another aspect of the invention, pharmaceutical compositions are provided, wherein these compositions comprise a compound as described herein, or a pharmaceutically acceptable salt thereof, and optionally comprise a pharmaceutically acceptable carrier, adjuvant or vehicle. In certain embodiments, these compositions optionally further comprise one or more additional therapeutic agents. In some embodiments, the additional therapeutic agent is a sodium channel inhibitor.

As used herein, the term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. A "pharmaceutically acceptable salt" of a compound of this invention includes any non-toxic salt that, upon administration to a recipient, is capable of providing, either directly or indirectly, a compound of this invention or an inhibitorily active metabolite or residue thereof. The salt may be in pure form, in a mixture (e.g., solution, suspension, or colloid) with one or more other substances, or in the form of a hydrate, solvate, or co-crystal. As used herein, the term "inhibitorily active metabolite or residue thereof" means that a metabolite or residue thereof is also an inhibitor of a voltage-gated sodium channel.

Pharmaceutically acceptable salts are well known in the art. For example, S. M. Berge, et al. describe pharmaceutically acceptable salts in detail in *J. Pharmaceutical Sciences*, 1977, 66, 1-19, incorporated herein by reference. Pharmaceutically acceptable salts of the compound of this invention include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium and $N^+(C_{1-4}$ alkyl$)_4$ salts. Representative alkali or alkaline earth metal salts include sodium, lithium, potassium, calcium, magnesium, and the like. Further pharmaceutically acceptable salts include, when appropriate, non-toxic ammonium, quaternary ammonium, and amine cations formed using counterions such as halide, hydroxide, carboxylate, sulfate, phosphate, nitrate, lower alkyl sulfonate and aryl sulfonate.

As described herein, the pharmaceutically acceptable compositions of the invention additionally comprise a pharmaceutically acceptable carrier, adjuvant, or vehicle, which, as used herein, includes any and all solvents, diluents, or other liquid vehicle, dispersion or suspension aids, surface active agents, isotonic agents, thickening or emulsifying agents, preservatives, solid binders, lubricants and the like, as suited to the particular dosage form desired. Remington's Pharmaceutical Sciences, Sixteenth Edition, E. W. Martin (Mack Publishing Co., Easton, Pa., 1980) discloses various carriers used in formulating pharmaceutically acceptable compositions and known techniques for the preparation thereof. Except insofar as any conventional carrier medium is incompatible with the compounds of the invention, such as by producing any undesirable biological effect or otherwise interacting in a deleterious manner with any other component(s) of the pharmaceutically acceptable composition, its use is contemplated to be within the scope of this invention. Some examples of materials which can serve as pharmaceutically acceptable carriers include, but are not limited to, ion exchangers, alumina, aluminum stearate, lecithin, serum proteins, such as human serum albumin, buffer substances such as phosphates, glycine, sorbic acid, or potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, polyacrylates, waxes, polyethylene-polyoxypropylene-block polymers, wool fat, sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols; such a propylene glycol or polyethylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

In another aspect, the invention features a pharmaceutical composition comprising a compound of the invention, or a pharmaceutically acceptable salt thereof, and a pharmaceutically acceptable carrier.

In another aspect, the invention features a pharmaceutical composition comprising a therapeutically effective amount of a compound, or a pharmaceutically acceptable salt thereof, and one or more pharmaceutically acceptable carriers or vehicles.

Uses of Compounds and Pharmaceutically Acceptable Salts and Compositions

In another aspect, the invention features a method of inhibiting a voltage-gated sodium channel in a subject comprising administering to the subject a compound of the invention or a pharmaceutically acceptable salt thereof or a pharmaceutical composition thereof. In another aspect, the voltage-gated sodium channel is $Na_v1.8$.

In yet another aspect, the invention features a method of treating or lessening the severity in a subject of chronic pain, gut pain, neuropathic pain, musculoskeletal pain, acute pain, inflammatory pain, cancer pain, idiopathic pain, postsurgical pain (e.g., bunionectomy pain, herniorrhaphy pain or abdominoplasty pain), visceral pain, multiple sclerosis, Charcot-Marie-Tooth syndrome, incontinence, pathological cough, or cardiac arrhythmia comprising administering an effective amount of a compound of the invention, a pharmaceutically acceptable salt thereof or a pharmaceutical composition thereof.

In yet another aspect, the invention features a method of treating or lessening the severity in a subject of chronic pain, gut pain, neuropathic pain, musculoskeletal pain, acute pain, inflammatory pain, cancer pain, idiopathic pain, postsurgical pain, herniorrhaphy pain, bunionectomy pain, multiple sclerosis, Charcot-Marie-Tooth syndrome, incontinence, or cardiac arrhythmia comprising administering an effective amount of a compound of the invention, a pharmaceutically acceptable salt thereof or a pharmaceutical composition thereof.

In yet another aspect, the invention features a method of treating or lessening the severity in a subject of gut pain, wherein gut pain comprises inflammatory bowel disease pain, Crohn's disease pain or interstitial cystitis pain wherein said method comprises administering an effective amount of a compound of the invention, a pharmaceutically acceptable salt thereof or a pharmaceutical composition thereof.

In yet another aspect, the invention features a method of treating or lessening the severity in a subject of neuropathic pain comprising administering an effective amount of a compound of the invention, a pharmaceutically acceptable salt thereof or a pharmaceutical composition thereof. In some aspects, the neuropathic pain comprises post-herpetic neuralgia, small fiber neuropathy or idiopathic small-fiber neuropathy. As used herein, the phrase "idiopathic small-fiber neuropathy" shall be understood to include any small fiber neuropathy.

In yet another aspect, the invention features a method of treating or lessening the severity in a subject of neuropathic pain, wherein neuropathic pain comprises post-herpetic neuralgia, diabetic neuralgia, painful HIV-associated sensory neuropathy, trigeminal neuralgia, burning mouth syndrome, post-amputation pain, phantom pain, painful neuroma; traumatic neuroma; Morton's neuroma; nerve entrapment injury, spinal stenosis, carpal tunnel syndrome, radicular pain, sciatica pain; nerve avulsion injury, brachial plexus avulsion injury; complex regional pain syndrome, drug therapy induced neuralgia, cancer chemotherapy induced neuralgia, anti-retroviral therapy induced neuralgia; post spinal cord injury pain, small fiber neuropathy, idiopathic small-fiber neuropathy, idiopathic sensory neuropathy or trigeminal autonomic cephalalgia wherein said method comprises administering an effective amount of a compound of the invention, a pharmaceutically acceptable salt thereof or a pharmaceutical composition thereof.

In yet another aspect, the invention features a method of treating or lessening the severity in a subject of musculoskeletal pain comprising administering an effective amount of a compound of the invention, a pharmaceutically acceptable salt thereof or a pharmaceutical composition thereof. In some aspects, the musculoskeletal pain comprises osteoarthritis pain.

In yet another aspect, the invention features a method of treating or lessening the severity in a subject of musculoskeletal pain, wherein musculoskeletal pain comprises osteoarthritis pain, back pain, cold pain, burn pain or dental pain wherein said method comprises administering an effective amount of a compound of the invention, a pharmaceutically acceptable salt thereof or a pharmaceutical composition thereof.

In yet another aspect, the invention features a method of treating or lessening the severity in a subject of inflammatory pain, wherein inflammatory pain comprises rheumatoid arthritis pain or vulvodynia wherein said method comprises administering an effective amount of a compound of the invention, a pharmaceutically acceptable salt thereof or a pharmaceutical composition thereof.

In yet another aspect, the invention features a method of treating or lessening the severity in a subject of inflammatory pain, wherein inflammatory pain comprises rheumatoid arthritis pain wherein said method comprises administering an effective amount of a compound of the invention, a pharmaceutically acceptable salt thereof or a pharmaceutical composition thereof.

In yet another aspect, the invention features a method of treating or lessening the severity in a subject of idiopathic pain, wherein idiopathic pain comprises fibromyalgia pain wherein said method comprises administering an effective amount of a compound of the invention, a pharmaceutically acceptable salt thereof or a pharmaceutical composition thereof.

In yet another aspect, the invention features a method of treating or lessening the severity in a subject of pathological cough wherein said method comprises administering an effective amount of a compound of the invention, a pharmaceutically acceptable salt thereof or a pharmaceutical composition thereof.

In yet another aspect, the invention features a method of treating or lessening the severity in a subject of acute pain comprising administering an effective amount of a compound of the invention, a pharmaceutically acceptable salt thereof or a pharmaceutical composition thereof. In some aspects, the acute pain comprises acute post-operative pain.

In yet another aspect, the invention features a method of treating or lessening the severity in a subject of postsurgical pain (e.g., herniorrhaphy pain, bunionectomy pain or abdominoplasty pain) comprising administering an effective amount of a compound of the invention, a pharmaceutically acceptable salt thereof or a pharmaceutical composition thereof.

In yet another aspect, the invention features a method of treating or lessening the severity in a subject of bunionectomy pain comprising administering an effective amount of a compound of the invention, a pharmaceutically acceptable salt thereof or a pharmaceutical composition thereof.

In yet another aspect, the invention features a method of treating or lessening the severity in a subject of herniorrhaphy pain comprising administering an effective amount of a compound of the invention, a pharmaceutically acceptable salt thereof or a pharmaceutical composition thereof.

In yet another aspect, the invention features a method of treating or lessening the severity in a subject of abdominoplasty pain comprising administering an effective amount of a compound of the invention, a pharmaceutically acceptable salt thereof or a pharmaceutical composition thereof.

In yet another aspect, the invention features a method of treating or lessening the severity in a subject of visceral pain comprising administering an effective amount of a compound of the invention, a pharmaceutically acceptable salt thereof or a pharmaceutical composition thereof. In some aspects, the visceral pain comprises visceral pain from abdominoplasty.

In yet another aspect, the invention features a method wherein the subject is treated with one or more additional therapeutic agents administered concurrently with, prior to, or subsequent to treatment with an effective amount of the compound, pharmaceutically acceptable salt or pharmaceutical composition. In some embodiments, the additional therapeutic agent is a sodium channel inhibitor.

In another aspect, the invention features a method of inhibiting a voltage-gated sodium channel in a biological sample comprising contacting the biological sample with an effective amount of a compound of the invention, a pharmaceutically acceptable salt thereof or a pharmaceutical composition thereof. In another aspect, the voltage-gated sodium channel is $Na_V1.8$.

In another aspect, the invention features a method of treating or lessening the severity in a subject of acute pain, chronic pain, neuropathic pain, inflammatory pain, arthritis, migraine, cluster headaches, trigeminal neuralgia, herpetic neuralgia, general neuralgias, epilepsy, epilepsy conditions, neurodegenerative disorders, psychiatric disorders, anxiety, depression, bipolar disorder, myotonia, arrhythmia, movement disorders, neuroendocrine disorders, ataxia, multiple sclerosis, irritable bowel syndrome, incontinence, pathological cough, visceral pain, osteoarthritis pain, postherpetic neuralgia, diabetic neuropathy, radicular pain, sciatica, back pain, head pain, neck pain, severe pain, intractable pain, nociceptive pain, breakthrough pain, postsurgical pain (e.g., herniorrhaphy pain, bunionectomy pain or abdominoplasty pain), cancer pain, stroke, cerebral ischemia, traumatic brain injury, amyotrophic lateral sclerosis, stress induced angina, exercise induced angina, palpitations, hypertension, or abnormal gastro-intestinal motility, comprising administering an effective amount of a compound of the invention, a pharmaceutically acceptable salt thereof or a pharmaceutical composition thereof.

In another aspect, the invention features a method of treating or lessening the severity in a subject of femur cancer pain; non-malignant chronic bone pain; rheumatoid arthritis; osteoarthritis; spinal stenosis; neuropathic low back pain; myofascial pain syndrome; fibromyalgia; temporomandibular joint pain; chronic visceral pain, abdominal pain; pancreatic pain; IBS pain; chronic and acute headache pain; migraine; tension headache; cluster headaches; chronic and acute neuropathic pain, post-herpetic neuralgia; diabetic neuropathy; HIV-associated neuropathy; trigeminal neuralgia; Charcot-Marie-Tooth neuropathy; hereditary sensory neuropathy; peripheral nerve injury; painful neuromas; ectopic proximal and distal discharges; radiculopathy; chemotherapy induced neuropathic pain; radiotherapy-induced neuropathic pain; post-mastectomy pain; central pain; spinal cord injury pain; post-stroke pain; thalamic pain; complex regional pain syndrome; phantom pain; intractable pain; acute pain, acute post-operative pain; acute musculoskeletal pain; joint pain; mechanical low back pain; neck pain; tendonitis; injury pain; exercise pain; acute visceral pain; pyelonephritis; appendicitis; cholecystitis; intestinal obstruction; hernias; chest pain, cardiac pain; pelvic pain, renal colic pain, acute obstetric pain, labor pain; cesarean section pain; acute inflammatory pain, burn pain, trauma pain; acute intermittent pain, endometriosis; acute herpes zoster pain; sickle cell anemia; acute pancreatitis; breakthrough pain; orofacial pain; sinusitis pain; dental pain; multiple sclerosis (MS) pain; pain in depression; leprosy pain; Behcet's disease pain; adiposis dolorosa; phlebitic pain; Guillain-Barre pain; painful legs and moving toes; Haglund syndrome; erythromelalgia pain; Fabry's disease pain; bladder and urogenital disease; urinary incontinence, pathological cough; hyperactive bladder; painful bladder syndrome; interstitial cystitis (IC); prostatitis; complex regional pain syndrome (CRPS), type I, complex regional pain syndrome (CRPS) type II; widespread pain, paroxysmal extreme pain, pruritus, tinnitus, or angina-induced pain, comprising administering an effective amount of a compound of the invention, a pharmaceutically acceptable salt thereof or a pharmaceutical composition thereof.

Compounds, Pharmaceutically Acceptable Salts, and Compositions for Use

In another aspect, the invention features a compound of the invention, or a pharmaceutically acceptable salt or pharmaceutical composition thereof, for use as a medicament.

In another aspect, the invention features a compound of the invention, or a pharmaceutically acceptable salt or pharmaceutical composition thereof, for use in a method of inhibiting a voltage-gated sodium channel in a subject. In another aspect, the voltage-gated sodium channel is $Na_V1.8$.

In another aspect, the invention features a compound of the invention, or a pharmaceutically acceptable salt or pharmaceutical composition thereof, for use in a method of treating or lessening the severity in a subject of chronic pain, gut pain, neuropathic pain, musculoskeletal pain, acute pain, inflammatory pain, cancer pain, idiopathic pain, postsurgical pain (e.g., herniorrhaphy pain, bunionectomy pain or abdominoplasty pain), visceral pain, multiple sclerosis, Charcot-Marie-Tooth syndrome, incontinence, pathological cough, or cardiac arrhythmia.

In another aspect, the invention features a compound of the invention, or a pharmaceutically acceptable salt or pharmaceutical composition thereof, for use in a method of treating or lessening the severity in a subject of chronic pain, gut pain, neuropathic pain, musculoskeletal pain, acute pain, inflammatory pain, cancer pain, idiopathic pain, postsurgical pain, herniorrhaphy pain, bunionectomy pain, multiple sclerosis, Charcot-Marie-Tooth syndrome, incontinence, or cardiac arrhythmia.

In another aspect, the invention features a compound of the invention, or a pharmaceutically acceptable salt or pharmaceutical composition thereof, for use in a method of treating or lessening the severity in a subject of gut pain, wherein gut pain comprises inflammatory bowel disease pain, Crohn's disease pain or interstitial cystitis pain.

In another aspect, the invention features a compound of the invention, or a pharmaceutically acceptable salt or pharmaceutical composition thereof, for use in a method of treating or lessening the severity in a subject of neuropathic pain. In some aspects, the neuropathic pain comprises post-herpetic neuralgia, small fiber neuropathy or idiopathic small-fiber neuropathy. As used herein, the phrase "idiopathic small-fiber neuropathy" shall be understood to include any small fiber neuropathy.

In another aspect, the invention features a compound of the invention, or a pharmaceutically acceptable salt or pharmaceutical composition thereof, for use in a method of treating or lessening the severity in a subject of neuropathic pain, wherein neuropathic pain comprises post-herpetic neuralgia, diabetic neuralgia, painful HIV-associated sensory neuropathy, trigeminal neuralgia, burning mouth syndrome, post-amputation pain, phantom pain, painful neuroma; traumatic neuroma; Morton's neuroma; nerve entrapment injury, spinal stenosis, carpal tunnel syndrome, radicular pain, sciatica pain; nerve avulsion injury, brachial plexus avulsion injury; complex regional pain syndrome, drug therapy induced neuralgia, cancer chemotherapy induced neuralgia, anti-retroviral therapy induced neuralgia; post spinal cord injury pain, small fiber neuropathy, idiopathic small-fiber neuropathy, idiopathic sensory neuropathy or trigeminal autonomic cephalalgia.

In another aspect, the invention features a compound of the invention, or a pharmaceutically acceptable salt or pharmaceutical composition thereof, for use in a method of treating or lessening the severity in a subject of musculoskeletal pain. In some aspects, the musculoskeletal pain comprises osteoarthritis pain.

In another aspect, the invention features a compound of the invention, or a pharmaceutically acceptable salt or pharmaceutical composition thereof, for use in a method of treating or lessening the severity in a subject of musculoskeletal pain, wherein musculoskeletal pain comprises osteoarthritis pain, back pain, cold pain, burn pain or dental pain.

In another aspect, the invention features a compound of the invention, or a pharmaceutically acceptable salt or pharmaceutical composition thereof, for use in a method of treating or lessening the severity in a subject of inflammatory pain, wherein inflammatory pain comprises rheumatoid arthritis pain or vulvodynia.

In another aspect, the invention features a compound of the invention, or a pharmaceutically acceptable salt or pharmaceutical composition thereof, for use in a method of treating or lessening the severity in a subject of inflammatory pain, wherein inflammatory pain comprises rheumatoid arthritis pain.

In another aspect, the invention features a compound of the invention, or a pharmaceutically acceptable salt or pharmaceutical composition thereof, for use in a method of treating or lessening the severity in a subject of idiopathic pain, wherein idiopathic pain comprises fibromyalgia pain.

In another aspect, the invention features a compound of the invention, or a pharmaceutically acceptable salt or pharmaceutical composition thereof, for use in a method of treating or lessening the severity in a subject of pathological cough.

In another aspect, the invention features a compound of the invention, or a pharmaceutically acceptable salt or pharmaceutical composition thereof, for use in a method of treating or lessening the severity in a subject of acute pain. In some aspects, the acute pain comprises acute post-operative pain.

In another aspect, the invention features a compound of the invention, or a pharmaceutically acceptable salt or pharmaceutical composition thereof, for use in a method of treating or lessening the severity in a subject of postsurgical pain (e.g., herniorrhaphy pain, bunionectomy pain or abdominoplasty pain).

In another aspect, the invention features a compound of the invention, or a pharmaceutically acceptable salt or pharmaceutical composition thereof, for use in a method of treating or lessening the severity in a subject of bunionectomy pain.

In another aspect, the invention features a compound of the invention, or a pharmaceutically acceptable salt or pharmaceutical composition thereof, for use in a method of treating or lessening the severity in a subject of herniorrhaphy pain.

In another aspect, the invention features a compound of the invention, or a pharmaceutically acceptable salt or pharmaceutical composition thereof, for use in a method of treating or lessening the severity in a subject of abdominoplasty pain.

In another aspect, the invention features a compound of the invention, or a pharmaceutically acceptable salt or pharmaceutical composition thereof, for use in a method of treating or lessening the severity in a subject of visceral pain. In some aspects, the visceral pain comprises visceral pain from abdominoplasty.

In another aspect, the invention features a compound of the invention, or a pharmaceutically acceptable salt or pharmaceutical composition thereof, for use in a method wherein the subject is treated with one or more additional therapeutic agents administered concurrently with, prior to, or subsequent to treatment with an effective amount of the compound, pharmaceutically acceptable salt or pharmaceutical composition. In some embodiments, the additional therapeutic agent is a sodium channel inhibitor.

In another aspect, the invention features a compound of the invention, or a pharmaceutically acceptable salt or pharmaceutical composition thereof, for use in a method of inhibiting a voltage-gated sodium channel in a biological sample comprising contacting the biological sample with an effective amount of a compound of the invention, a pharmaceutically acceptable salt thereof or a pharmaceutical composition thereof. In another aspect, the voltage-gated sodium channel is $Na_V1.8$.

In another aspect, the invention features a compound of the invention, or a pharmaceutically acceptable salt or pharmaceutical composition thereof, for use in a method of treating or lessening the severity in a subject of acute pain, chronic pain, neuropathic pain, inflammatory pain, arthritis, migraine, cluster headaches, trigeminal neuralgia, herpetic neuralgia, general neuralgias, epilepsy, epilepsy conditions, neurodegenerative disorders, psychiatric disorders, anxiety, depression, bipolar disorder, myotonia, arrhythmia, movement disorders, neuroendocrine disorders, ataxia, multiple sclerosis, irritable bowel syndrome, incontinence, pathological cough, visceral pain, osteoarthritis pain, postherpetic neuralgia, diabetic neuropathy, radicular pain, sciatica, back pain, head pain, neck pain, severe pain, intractable pain, nociceptive pain, breakthrough pain, postsurgical pain (e.g., herniorrhaphy pain, bunionectomy pain or abdominoplasty pain), cancer pain, stroke, cerebral ischemia, traumatic brain injury, amyotrophic lateral sclerosis, stress induced angina, exercise induced angina, palpitations, hypertension, or abnormal gastro-intestinal motility.

In another aspect, the invention features a compound of the invention, or a pharmaceutically acceptable salt or pharmaceutical composition thereof, for use in a method of treating or lessening the severity in a subject of femur cancer pain; non-malignant chronic bone pain; rheumatoid arthritis; osteoarthritis; spinal stenosis; neuropathic low back pain; myofascial pain syndrome; fibromyalgia; temporomandibular joint pain; chronic visceral pain, abdominal pain; pancreatic pain; IBS pain; chronic and acute headache pain; migraine; tension headache; cluster headaches; chronic and acute neuropathic pain, post-herpetic neuralgia; diabetic neuropathy; HIV-associated neuropathy; trigeminal neuralgia; Charcot-Marie-Tooth neuropathy; hereditary sensory neuropathy; peripheral nerve injury; painful neuromas; ectopic proximal and distal discharges; radiculopathy; chemotherapy induced neuropathic pain; radiotherapy-induced neuropathic pain; post-mastectomy pain; central pain; spinal cord injury pain; post-stroke pain; thalamic pain; complex regional pain syndrome; phantom pain; intractable pain; acute pain, acute post-operative pain; acute musculoskeletal pain; joint pain; mechanical low back pain; neck pain; tendonitis; injury pain; exercise pain; acute visceral pain; pyelonephritis; appendicitis; cholecystitis; intestinal obstruction; hernias; chest pain, cardiac pain; pelvic pain, renal colic pain, acute obstetric pain, labor pain; cesarean section pain; acute inflammatory pain, burn pain, trauma pain; acute intermittent pain, endometriosis; acute herpes zoster pain; sickle cell anemia; acute pancreatitis; breakthrough pain; orofacial pain; sinusitis pain; dental pain;

multiple sclerosis (MS) pain; pain in depression; leprosy pain; Behcet's disease pain; adiposis dolorosa; phlebitic pain; Guillain-Barre pain; painful legs and moving toes; Haglund syndrome; erythromelalgia pain; Fabry's disease pain; bladder and urogenital disease; urinary incontinence, pathological cough; hyperactive bladder; painful bladder syndrome; interstitial cystitis (IC); prostatitis; complex regional pain syndrome (CRPS), type I, complex regional pain syndrome (CRPS) type II; widespread pain, paroxysmal extreme pain, pruritus, tinnitus, or angina-induced pain.

Manufacture of Medicaments

In another aspect, the invention provides the use of a compound of the invention, or a pharmaceutically acceptable salt or pharmaceutical composition thereof, for the manufacture of a medicament.

In another aspect, the invention provides the use of a compound of the invention, a pharmaceutically acceptable salt thereof, or a pharmaceutical composition thereof for the manufacture of a medicament for use in inhibiting a voltage-gated sodium channel. In another aspect, the voltage-gated sodium channel is $Na_v1.8$.

In yet another aspect, the invention provides the use of a compound of the invention, a pharmaceutically acceptable salt thereof, or a pharmaceutical composition thereof for the manufacture of a medicament for use in treating or lessening the severity in a subject of chronic pain, gut pain, neuropathic pain, musculoskeletal pain, acute pain, inflammatory pain, cancer pain, idiopathic pain, postsurgical pain (e.g., herniorrhaphy pain, bunionectomy pain or abdominoplasty pain), visceral pain, multiple sclerosis, Charcot-Marie-Tooth syndrome, incontinence, pathological cough, or cardiac arrhythmia.

In yet another aspect, the invention provides the use of a compound of the invention, a pharmaceutically acceptable salt thereof, or a pharmaceutical composition thereof for the manufacture of a medicament for use in treating or lessening the severity in a subject of chronic pain, gut pain, neuropathic pain, musculoskeletal pain, acute pain, inflammatory pain, cancer pain, idiopathic pain, postsurgical pain, herniorrhaphy pain, bunionectomy pain, multiple sclerosis, Charcot-Marie-Tooth syndrome, incontinence, or cardiac arrhythmia.

In yet another aspect, the invention provides the use of the compound, pharmaceutically acceptable salt, or pharmaceutical composition described herein for the manufacture of a medicament for use in treating or lessening the severity in a subject of gut pain, wherein gut pain comprises inflammatory bowel disease pain, Crohn's disease pain or interstitial cystitis pain.

In yet another aspect, the invention provides a compound of the invention, a pharmaceutically acceptable salt thereof, or a pharmaceutical composition thereof for the manufacture of a medicament for use in treating or lessening the severity in a subject of neuropathic pain. In some aspects, the neuropathic pain comprises post-herpetic neuralgia, small fiber neuropathy or idiopathic small-fiber neuropathy.

In yet another aspect, the invention provides the use of a compound of the invention, a pharmaceutically acceptable salt thereof, or a pharmaceutical composition thereof for the manufacture of a medicament for use in a treating or lessening the severity in a subject of neuropathic pain, wherein neuropathic pain comprises post-herpetic neuralgia, diabetic neuralgia, painful HIV-associated sensory neuropathy, trigeminal neuralgia, burning mouth syndrome, post-amputation pain, phantom pain, painful neuroma; traumatic neuroma; Morton's neuroma; nerve entrapment injury, spinal stenosis, carpal tunnel syndrome, radicular pain, sciatica pain; nerve avulsion injury, brachial plexus avulsion injury; complex regional pain syndrome, drug therapy induced neuralgia, cancer chemotherapy induced neuralgia, antiretroviral therapy induced neuralgia; post spinal cord injury pain, small fiber neuropathy, idiopathic small-fiber neuropathy, idiopathic sensory neuropathy or trigeminal autonomic neuropathy.

In yet another aspect, the invention provides the use of a compound of the invention, a pharmaceutically acceptable salt thereof, or a pharmaceutical composition thereof for the manufacture of a medicament for use in treating or lessening the severity in a subject of musculoskeletal pain. In some aspects the musculoskeletal pain comprises osteoarthritis pain.

In yet another aspect, the invention provides the use of a compound of the invention, a pharmaceutically acceptable salt thereof, or a pharmaceutical composition thereof for the manufacture of a medicament for use in treating or lessening the severity in a subject of musculoskeletal pain, wherein musculoskeletal pain comprises osteoarthritis pain, back pain, cold pain, burn pain or dental pain.

In yet another aspect, the invention provides the use of a compound of the invention, a pharmaceutically acceptable salt thereof, or a pharmaceutical composition thereof for the manufacture of a medicament for use in treating or lessening the severity in a subject of inflammatory pain, wherein inflammatory pain comprises rheumatoid arthritis pain or vulvodynia.

In yet another aspect, the invention provides the use of a compound of the invention, a pharmaceutically acceptable salt thereof, or a pharmaceutical composition thereof for the manufacture of a medicament for use in treating or lessening the severity in a subject of inflammatory pain, wherein inflammatory pain comprises rheumatoid arthritis pain.

In yet another aspect, the invention provides the use of a compound of the invention, a pharmaceutically acceptable salt thereof, or a pharmaceutical composition thereof for the manufacture of a medicament for use in treating or lessening the severity in a subject of idiopathic pain, wherein idiopathic pain comprises fibromyalgia pain.

In yet another aspect, the invention provides the use of a compound of the invention, a pharmaceutically acceptable salt thereof, or a pharmaceutical composition thereof for the manufacture of a medicament for use in treating or lessening the severity in a subject of pathological cough.

In yet another aspect, the invention provides the use of a compound of the invention, a pharmaceutically acceptable salt thereof, or a pharmaceutical composition thereof for the manufacture of a medicament for use in treating or lessening the severity in a subject of acute pain. In some aspects, the acute pain comprises acute post-operative pain.

In yet another aspect, the invention provides the use of a compound of the invention, a pharmaceutically acceptable salt thereof, or a pharmaceutical composition thereof for the manufacture of a medicament for use in treating or lessening the severity in a subject of postsurgical pain (e.g., herniorrhaphy pain, bunionectomy pain or abdominoplasty pain).

In yet another aspect, the invention provides the use of a compound of the invention, a pharmaceutically acceptable salt thereof, or a pharmaceutical composition thereof for the manufacture of a medicament for use in treating or lessening the severity in a subject of herniorrhaphy pain.

In yet another aspect, the invention provides the use of a compound of the invention, a pharmaceutically acceptable salt thereof, or a pharmaceutical composition thereof for the manufacture of a medicament for use in treating or lessening the severity in a subject of bunionectomy pain.

In yet another aspect, the invention provides the use of a compound of the invention, a pharmaceutically acceptable salt thereof, or a pharmaceutical composition thereof for the manufacture of a medicament for use in treating or lessening the severity in a subject of abdominoplasty pain.

In yet another aspect, the invention provides the use of a compound of the invention, a pharmaceutically acceptable salt thereof, or a pharmaceutical composition thereof for the manufacture of a medicament for use in treating or lessening the severity in a subject of visceral pain. In some aspects, the visceral pain comprises visceral pain from abdominoplasty.

In yet another aspect, the invention provides the use of a compound of the invention, a pharmaceutically acceptable salt thereof, or a pharmaceutical composition thereof for the manufacture of a medicament for use in combination with one or more additional therapeutic agents administered concurrently with, prior to, or subsequent to treatment with the compound or pharmaceutical composition. In some embodiments, the additional therapeutic agent is a sodium channel inhibitor.

In another aspect, the invention provides the use of a compound of the invention, a pharmaceutically acceptable salt thereof, or a pharmaceutical composition thereof for the manufacture of a medicament for use in treating or lessening the severity of acute pain, chronic pain, neuropathic pain, inflammatory pain, arthritis, migraine, cluster headaches, trigeminal neuralgia, herpetic neuralgia, general neuralgias, epilepsy, epilepsy conditions, neurodegenerative disorders, psychiatric disorders, anxiety, depression, bipolar disorder, myotonia, arrhythmia, movement disorders, neuroendocrine disorders, ataxia, multiple sclerosis, irritable bowel syndrome, incontinence, pathological cough, visceral pain, osteoarthritis pain, postherpetic neuralgia, diabetic neuropathy, radicular pain, sciatica, back pain, head pain, neck pain, severe pain, intractable pain, nociceptive pain, breakthrough pain, postsurgical pain (e.g., herniorrhaphy pain, bunionectomy pain or abdominoplasty pain), cancer pain, stroke, cerebral ischemia, traumatic brain injury, amyotrophic lateral sclerosis, stress induced angina, exercise induced angina, palpitations, hypertension, or abnormal gastro-intestinal motility.

In another aspect, the invention provides the use of a compound of the invention, a pharmaceutically acceptable salt thereof, or a pharmaceutical composition thereof for the manufacture of a medicament for use in treating or lessening the severity of femur cancer pain; non-malignant chronic bone pain; rheumatoid arthritis; osteoarthritis; spinal stenosis; neuropathic low back pain; myofascial pain syndrome; fibromyalgia; temporomandibular joint pain; chronic visceral pain, abdominal pain; pancreatic pain; IBS pain; chronic and acute headache pain; migraine; tension headache; cluster headaches; chronic and acute neuropathic pain, post-herpetic neuralgia; diabetic neuropathy; HIV-associated neuropathy; trigeminal neuralgia; Charcot-Marie-Tooth neuropathy; hereditary sensory neuropathy; peripheral nerve injury; painful neuromas; ectopic proximal and distal discharges; radiculopathy; chemotherapy induced neuropathic pain; radiotherapy-induced neuropathic pain; post-mastectomy pain; central pain; spinal cord injury pain; post-stroke pain; thalamic pain; complex regional pain syndrome; phantom pain; intractable pain; acute pain, acute post-operative pain; acute musculoskeletal pain; joint pain; mechanical low back pain; neck pain; tendonitis; injury pain; exercise pain; acute visceral pain; pyelonephritis; appendicitis; cholecystitis; intestinal obstruction; hernias; chest pain, cardiac pain; pelvic pain, renal colic pain, acute obstetric pain, labor pain; cesarean section pain; acute inflammatory, burn pain, trauma pain; acute intermittent pain, endometriosis; acute herpes zoster pain; sickle cell anemia; acute pancreatitis; breakthrough pain; orofacial pain; sinusitis pain; dental pain; multiple sclerosis (MS) pain; pain in depression; leprosy pain; Behcet's disease pain; adiposis dolorosa; phlebitic pain; Guillain-Barre pain; painful legs and moving toes; Haglund syndrome; erythromelalgia pain; Fabry's disease pain; bladder and urogenital disease; urinary incontinence; pathological cough; hyperactive bladder; painful bladder syndrome; interstitial cystitis (IC); prostatitis; complex regional pain syndrome (CRPS) type I; complex regional pain syndrome (CRPS) type II; widespread pain, paroxysmal extreme pain, pruritus, tinnitus, or angina-induced pain.

Administration of Pharmaceutically Acceptable Salts and Compositions.

In certain embodiments of the invention an "effective amount" of a compound of the invention, a pharmaceutically acceptable salt thereof, or a pharmaceutical composition thereof is that amount effective for treating or lessening the severity of one or more of the conditions recited above.

The compounds, salts, and compositions, according to the method of the invention, may be administered using any amount and any route of administration effective for treating or lessening the severity of one or more of the pain or non-pain diseases recited herein. The exact amount required will vary from subject to subject, depending on the species, age, and general condition of the subject, the severity of the condition, the particular agent, its mode of administration, and the like. The compounds, salts, and compositions of the invention are preferably formulated in dosage unit form for ease of administration and uniformity of dosage. The expression "dosage unit form" as used herein refers to a physically discrete unit of agent appropriate for the subject to be treated. It will be understood, however, that the total daily usage of the compounds, salts, and compositions of the invention will be decided by the attending physician within the scope of sound medical judgment. The specific effective dose level for any particular subject or organism will depend upon a variety of factors including the disorder being treated and the severity of the disorder; the activity of the specific compound or salt employed; the specific composition employed; the age, body weight, general health, sex and diet of the subject; the time of administration, route of administration, and rate of excretion of the specific compound or salt employed; the duration of the treatment; drugs used in combination or coincidental with the specific compound or salt employed, and like factors well known in the medical arts. The term "subject" or "patient," as used herein, means an animal, preferably a mammal, and most preferably a human.

The pharmaceutically acceptable compositions of this invention can be administered to humans and other animals orally, rectally, parenterally, intracisternally, intravaginally, intraperitoneally, topically (as by powders, ointments, or drops), bucally, as an oral or nasal spray, or the like, depending on the severity of the condition being treated. In certain embodiments, the compound, salts, and compositions of the invention may be administered orally or parenterally at dosage levels of about 0.001 mg/kg to about 100 mg/kg, or about 0.01 mg/kg to about 50 mg/kg, of subject body weight per day, one or more times a day, effective to obtain the desired therapeutic effect.

Liquid dosage forms for oral administration include, but are not limited to, pharmaceutically acceptable emulsions, microemulsions, solutions, suspensions, syrups and elixirs. In addition to the active compound or salt, the liquid dosage forms may contain inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions can also include adjuvants such as wetting agents, emulsifying and suspending agents, sweetening, flavoring, and perfuming agents.

Injectable preparations, for example, sterile injectable aqueous or oleaginous suspensions may be formulated according to the known art using suitable dispersing or wetting agents and suspending agents. The sterile injectable preparation may also be a sterile injectable solution, suspension or emulsion in a nontoxic parenterally acceptable diluent or solvent, for example, as a solution in 1,3-butanediol. Among the acceptable vehicles and solvents that may be employed are water, Ringer's solution, U.S.P. and isotonic sodium chloride solution. In addition, sterile, fixed oils are conventionally employed as a solvent or suspending medium. For this purpose any bland fixed oil can be employed including synthetic mono- or diglycerides. In addition, fatty acids such as oleic acid are used in the preparation of injectables.

The injectable formulations can be sterilized, for example, by filtration through a bacterial-retaining filter, or by incorporating sterilizing agents in the form of sterile solid compositions which can be dissolved or dispersed in sterile water or other sterile injectable medium prior to use.

In order to prolong the effect of the compounds of the invention, it is often desirable to slow the absorption of the compounds from subcutaneous or intramuscular injection. This may be accomplished by the use of a liquid suspension of crystalline or amorphous material with poor water solubility. The rate of absorption of the compound then depends upon its rate of dissolution that, in turn, may depend upon crystal size and crystalline form. Alternatively, delayed absorption of a parenterally administered compound form is accomplished by dissolving or suspending the compound in an oil vehicle. Injectable depot forms are made by forming microencapsule matrices of the compound in biodegradable polymers such as polylactide-polyglycolide. Depending upon the ratio of compound to polymer and the nature of the particular polymer employed, the rate of compound release can be controlled. Examples of other biodegradable polymers include poly(orthoesters) and poly(anhydrides). Depot injectable formulations are also prepared by entrapping the compound in liposomes or microemulsions that are compatible with body tissues.

Compositions for rectal or vaginal administration are preferably suppositories which can be prepared by mixing the compound or salt of this invention with suitable non-irritating excipients or carriers such as cocoa butter, polyethylene glycol or a suppository wax which are solid at ambient temperature but liquid at body temperature and therefore melt in the rectum or vaginal cavity and release the active compound.

Solid dosage forms for oral administration include capsules, tablets, pills, powders, and granules. In such solid dosage forms, the active compound or salt is mixed with at least one inert, pharmaceutically acceptable excipient or carrier such as sodium citrate or dicalcium phosphate and/or a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may also comprise buffering agents.

Solid compositions of a similar type may also be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the pharmaceutical formulating art. They may optionally contain opacifying agents and can also be of a composition that they release the active ingredient(s) only, or preferentially, in a certain part of the intestinal tract, optionally, in a delayed manner. Examples of embedding compositions that can be used include polymeric substances and waxes. Solid compositions of a similar type may also be employed as fillers in soft and hard-filled gelatin capsules using such excipients as lactose or milk sugar as well as high molecular weight polyethylene glycols and the like.

The active compound or salt can also be in microencapsulated form with one or more excipients as noted above. The solid dosage forms of tablets, dragees, capsules, pills, and granules can be prepared with coatings and shells such as enteric coatings, release controlling coatings and other coatings well known in the pharmaceutical formulating art. In such solid dosage forms the active compound or salt may be admixed with at least one inert diluent such as sucrose, lactose or starch. Such dosage forms may also comprise, as is normal practice, additional substances other than inert diluents, e.g., tableting lubricants and other tableting aids such a magnesium stearate and microcrystalline cellulose. In the case of capsules, tablets and pills, the dosage forms may also comprise buffering agents. They may optionally contain opacifying agents and can also be of a composition that they release the active ingredient(s) only, or preferentially, in a certain part of the intestinal tract, optionally, in a delayed manner. Examples of embedding compositions that can be used include polymeric substances and waxes.

Dosage forms for topical or transdermal administration of a compound or salt of this invention include ointments, pastes, creams, lotions, gels, powders, solutions, sprays, inhalants or patches. The active component is admixed under sterile conditions with a pharmaceutically acceptable carrier and any needed preservatives or buffers as may be required. Ophthalmic formulation, eardrops, and eye drops are also contemplated as being within the scope of this invention. Additionally, the invention contemplates the use of transdermal patches, which have the added advantage of providing controlled delivery of a compound to the body. Such dosage forms are prepared by dissolving or dispensing the compound in the proper medium. Absorption enhancers can also be used to increase the flux of the compound across the skin. The rate can be controlled by either providing a rate controlling membrane or by dispersing the compound in a polymer matrix or gel.

As described generally above, the compounds of the invention are useful as inhibitors of voltage-gated sodium channels. In one embodiment, the compounds are inhibitors of $Na_V1.8$ and thus, without wishing to be bound by any particular theory, the compounds, salts, and compositions are particularly useful for treating or lessening the severity of a disease, condition, or disorder where activation or hyperactivity of $Na_V1.8$ is implicated in the disease, condition, or disorder. When activation or hyperactivity of $Na_V1.8$ is implicated in a particular disease, condition, or disorder, the disease, condition, or disorder may also be referred to as a "$Na_V1.8$-mediated disease, condition or disorder." Accordingly, in another aspect, the invention provides a method for treating or lessening the severity of a disease, condition, or disorder where activation or hyperactivity of $Na_V1.8$ is implicated in the disease state.

The activity of a compound utilized in this invention as an inhibitor of $Na_V1.8$ may be assayed according to methods described generally in International Publication No. WO 2014/120808 A9 and U.S. Publication No. 2014/0213616 A1, both of which are incorporated by reference in their entirety, methods described herein, and other methods known and available to one of ordinary skill in the art.

Additional Therapeutic Agents

It will also be appreciated that the compounds, salts, and pharmaceutically acceptable compositions of the invention can be employed in combination therapies, that is, the compounds, salts, and pharmaceutically acceptable compositions can be administered concurrently with, prior to, or subsequent to, one or more other desired therapeutics or medical procedures. The particular combination of therapies (therapeutics or procedures) to employ in a combination regimen will take into account compatibility of the desired therapeutics and/or procedures and the desired therapeutic effect to be achieved. It will also be appreciated that the therapies employed may achieve a desired effect for the same disorder (for example, an inventive compound may be administered concurrently with another agent used to treat the same disorder), or they may achieve different effects (e.g., control of any adverse effects). As used herein, additional therapeutic agents that are normally administered to treat or prevent a particular disease, or condition, are known as "appropriate for the disease, or condition, being treated." For example, exemplary additional therapeutic agents include, but are not limited to: non-opioid analgesics (indoles such as Etodolac, Indomethacin, Sulindac, Tolmetin; naphthylalkanones such as Nabumetone; oxicams such as Piroxicam; para-aminophenol derivatives, such as Acetaminophen; propionic acids such as Fenoprofen, Flurbiprofen, Ibuprofen, Ketoprofen, Naproxen, Naproxen sodium, Oxaprozin; salicylates such as Aspirin, Choline magnesium trisalicylate, Diflunisal; fenamates such as meclofenamic acid, Mefenamic acid; and pyrazoles such as Phenylbutazone); or opioid (narcotic) agonists (such as Codeine, Fentanyl, Hydromorphone, Levorphanol, Meperidine, Methadone, Morphine, Oxycodone, Oxymorphone, Propoxyphene, Buprenorphine, Butorphanol, Dezocine, Nalbuphine, and Pentazocine). Additionally, nondrug analgesic approaches may be utilized in conjunction with administration of one or more compounds of the invention. For example, anesthesiologic (intraspinal infusion, neural blockade), neurosurgical (neurolysis of CNS pathways), neurostimulatory (transcutaneous electrical nerve stimulation, dorsal column stimulation), physiatric (physical therapy, orthotic devices, diathermy), or psychologic (cognitive methods-hypnosis, biofeedback, or behavioral methods) approaches may also be utilized. Additional appropriate therapeutic agents or approaches are described generally in The Merck Manual, Nineteenth Edition, Ed. Robert S. Porter and Justin L. Kaplan, Merck Sharp &Dohme Corp., a subsidiary of Merck & Co., Inc., 2011, and the Food and Drug Administration website, www.fda.gov, the entire contents of which are hereby incorporated by reference.

In another embodiment, additional appropriate therapeutic agents are selected from the following:

(1) an opioid analgesic, e.g. morphine, heroin, hydromorphone, oxymorphone, levorphanol, levallorphan, methadone, meperidine, fentanyl, cocaine, codeine, dihydrocodeine, oxycodone, hydrocodone, propoxyphene, nalmefene, nalorphine, naloxone, naltrexone, buprenorphine, butorphanol, nalbuphine, pentazocine, or difelikefalin;

(2) a nonsteroidal antiinflammatory drug (NSAID), e.g. aspirin, diclofenac, diflunisal, etodolac, fenbufen, fenoprofen, flufenisal, flurbiprofen, ibuprofen (including without limitation intravenous ibuprofen (e.g., Caldolor®)), indomethacin, ketoprofen, ketorolac (including without limitation ketorolac tromethamine (e.g., Toradol®)), meclofenamic acid, mefenamic acid, meloxicam, nabumetone, naproxen, nimesulide, nitroflurbiprofen, olsalazine, oxaprozin, phenylbutazone, piroxicam, sulfasalazine, sulindac, tolmetin or zomepirac;

(3) a barbiturate sedative, e.g. amobarbital, aprobarbital, butabarbital, butalbital, mephobarbital, metharbital, methohexital, pentobarbital, phenobarbital, secobarbital, talbutal, thiamylal or thiopental;

(4) a benzodiazepine having a sedative action, e.g. chlordiazepoxide, clorazepate, diazepam, flurazepam, lorazepam, oxazepam, temazepam or triazolam;

(5) a histamine ($H_1$) antagonist having a sedative action, e.g. diphenhydramine, pyrilamine, promethazine, chlorpheniramine or chlorcyclizine;

(6) a sedative such as glutethimide, meprobamate, methaqualone or dichloralphenazone;

(7) a skeletal muscle relaxant, e.g. baclofen, carisoprodol, chlorzoxazone, cyclobenzaprine, methocarbamol or orphenadrine;

(8) an NMDA receptor antagonist, e.g. dextromethorphan ((+)-3-hydroxy-N-methylmorphinan) or its metabolite dextrorphan ((+)-3-hydroxy-N-methylmorphinan), ketamine, memantine, pyrroloquinoline quinine, cis-4-(phosphonomethyl)-2-piperidinecarboxylic acid, budipine, EN-3231 (MorphiDex®), a combination formulation of morphine and dextromethorphan), topiramate, neramexane or perzinfotel including an NR2B antagonist, e.g. ifenprodil, traxoprodil or (−)-(R)-6-{2-[4-(3-fluorophenyl)-4-hydroxy-1-piperidinyl]-1-hydroxyethyl-3,4-dihydro-2(1H)-quinolinone;

(9) an alpha-adrenergic, e.g. doxazosin, tamsulosin, clonidine, guanfacine, dexmedetomidine, modafinil, or 4-amino-6,7-dimethoxy-2-(5-methane-sulfonamido-1,2,3,4-tetrahydroisoquinolin-2-yl)-5-(2-pyridyl) quinazoline;

(10) a tricyclic antidepressant, e.g. desipramine, imipramine, amitriptyline or nortriptyline;

(11) an anticonvulsant, e.g. carbamazepine (Tegretol®), lamotrigine, topiramate, lacosamide (Vimpat®) or valproate;

(12) a tachykinin (NK) antagonist, particularly an NK-3, NK-2 or NK-1 antagonist, e.g. (alphaR,9R)-7-[3,5-bis (trifluoromethyl)benzyl]-8,9,10,11-tetrahydro-9-methyl-5-(4-methylphenyl)-7H-[1,4]diazocino[2,1-g][1,7]-naphthyridine-6-13-dione (TAK-637), 5-[[(2R,3S)-2-[(1R)-1-[3,5-bis(trifluoromethyl)phenyl]ethoxy-3-(4-fluorophenyl)-4-morpholinyl]-methyl]-1,2- dihydro-3H-1,2,4-triazol-3-one (MK-869), aprepitant, lanepitant, dapitant or 3-[[2-methoxy-5-(trifluoromethoxy)phenyl]-methylamino]-2-phenylpiperidine (2S,3S);

(13) a muscarinic antagonist, e.g oxybutynin, tolterodine, propiverine, tropsium chloride, darifenacin, solifenacin, temiverine and ipratropium;

(14) a COX-2 selective inhibitor, e.g. celecoxib, rofecoxib, parecoxib, valdecoxib, deracoxib, etoricoxib, or lumiracoxib;

(15) a coal-tar analgesic, in particular paracetamol;

(16) a neuroleptic such as droperidol, chlorpromazine, haloperidol, perphenazine, thioridazine, mesoridazine, trifluoperazine, fluphenazine, clozapine, olanzapine, risperidone, ziprasidone, quetiapine, sertindole, aripiprazole, sonepiprazole, blonanserin, iloperidone, perospirone, raclopride, zotepine, bifeprunox, asenapine, lurasidone, amisulpride, balaperidone, palindore, eplivanserin, osanetant, rimonabant, meclinertant, Miraxion® or sarizotan;

(17) a vanilloid receptor agonist (e.g. resinferatoxin or civamide) or antagonist (e.g. capsazepine, GRC-15300);

(18) a beta-adrenergic such as propranolol;

(19) a local anesthetic such as mexiletine;

(20) a corticosteroid such as dexamethasone;

(21) a 5-HT receptor agonist or antagonist, particularly a 5-HT$_{1B/1D}$ agonist such as eletriptan, sumatriptan, naratriptan, zolmitriptan or rizatriptan;

(22) a 5-HT$_{2A}$ receptor antagonist such as R(+)-alpha-(2,3-dimethoxy-phenyl)-1-[2-(4-fluorophenylethyl)]-4-piperidinemethanol (MDL-100907);

(23) a cholinergic (nicotinic) analgesic, such as ispronicline (TC-1734), (E)-N-methyl-4-(3-pyridinyl)-3-buten-1-amine (RJR-2403), (R)-5-(2-azetidinylmethoxy)-2-chloropyridine (ABT-594) or nicotine;

(24) Tramadol®, Tramadol ER (Ultram ER®), Tapentadol ER (Nucynta®);

(25) a PDE5 inhibitor, such as 5-[2-ethoxy-5-(4-methyl-1-piperazinyl-sulphonyl)phenyl]-1-methyl-3-n-propyl-1,6-dihydro-7H-pyrazolo[4,3-d]pyrimidin-7-one (sildenafil), (6R,12aR)-2,3,6,7,12,12a-hexahydro-2-methyl-6-(3,4-methylenedioxyphenyl)-pyrazino[2',1':6,1]-pyrido[3,4-b]indole-1,4-dione (IC-351 or tadalafil), 2-[2-ethoxy-5-(4-ethyl-piperazin-1-yl-1-sulphonyl)-phenyl]-5-methyl-7-propyl-3H-imidazo[5,1-f][1,2,4]triazin-4-one (vardenafil), 5-(5-acetyl-2-butoxy-3-pyridinyl)-3-ethyl-2-(1-ethyl-3-azetidinyl)-2,6-dihydro-7H-pyrazolo[4,3-d]pyrimidin-7-one, 5-(5-acetyl-2-propoxy-3-pyridinyl)-3-ethyl-2-(1-isopropyl-3-azetidinyl)-2,6-dihydro-7H-pyrazolo[4,3-d]pyrimidin-7-one, 5-[2-ethoxy-5-(4-ethylpiperazin-1-ylsulphonyl)pyridin-3-yl]-3-ethyl-2-[2-methoxyethyl]-2,6-dihydro-7H-pyrazolo[4,3-d]pyrimidin-7-one, 4-[(3-chloro-4-methoxybenzyl)amino]-2-[(2S)-2-(hydroxymethyl)pyrrolidin-1-yl]-N-(pyrimidin-2-ylmethyl)pyrimidine-5-carboxamide, 3-(1-methyl-7-oxo-3-propyl-6,7-dihydro-1H-pyrazolo[4,3-d]pyrimidin-5-yl)-N-[2-(1-methylpyrrolidin-2-yl)ethyl]-4-propoxybenzenesulfonamide;

(26) an alpha-2-delta ligand such as gabapentin (Neurontin®), gabapentin GR (Gralise®), gabapentin, enacarbil (Horizant®), pregabalin (Lyrica®), 3-methyl gabapentin, (1[alpha]3[alpha]5[alpha])(3-aminomethyl-bicyclo[3.2.0]hept-3-yl)-acetic acid, (3S,5R)-3-aminomethyl-5-methyl-heptanoic acid, (3S,5R)-3-amino-5-methyl-heptanoic acid, (3S,5R)-3-amino-5-methyl-octanoic acid, (2S,4S)-4-(3-chlorophenoxy) proline, (2S,4S)-4-(3-fluorobenzyl)-proline, [(1R,5R,6S)-6-(aminomethyl)bicyclo[3.2.0]hept-6-yl]acetic acid, 3-(1-aminomethyl-cyclohexylmethyl)-4H-[1,2,4] oxadiazol-5-one, C-[1-(1H-tetrazol-5-ylmethyl)-cycloheptyl]-methylamine, (3S,4S)-(1-aminomethyl-3,4-dimethyl-cyclopentyl)-acetic acid, (3S,5R)-3-aminomethyl-5-methyl-octanoic acid, (3S,5R)-3-amino-5-methyl-nonanoic acid, (3S,5R)-3-amino-5-methyl-octanoic acid, (3R,4R,5R)-3-amino-4,5-dimethyl-heptanoic acid and (3R,4R,5R)-3-amino-4,5-dimethyl-octanoic acid;

(27) a cannabinoid such as KHK-6188;

(28) metabotropic glutamate subtype 1 receptor (mGluR1) antagonist;

(29) a serotonin reuptake inhibitor such as sertraline, sertraline metabolite demethylsertraline, fluoxetine, norfluoxetine (fluoxetine desmethyl metabolite), fluvoxamine, paroxetine, citalopram, citalopram metabolite desmethylcitalopram, escitalopram, d,1-fenfluramine, femoxetine, ifoxetine, cyanodothiepin, litoxetine, dapoxetine, nefazodone, cericlamine and trazodone;

(30) a noradrenaline (norepinephrine) reuptake inhibitor, such as maprotiline, lofepramine, mirtazepine, oxaprotiline, fezolamine, tomoxetine, mianserin, bupropion, bupropion metabolite hydroxybupropion, nomifensine and viloxazine (Vivalan®), especially a selective noradrenaline reuptake inhibitor such as reboxetine, in particular (S,S)-reboxetine;

(31) a dual serotonin-noradrenaline reuptake inhibitor, such as venlafaxine, venlafaxine metabolite O-desmethylvenlafaxine, clomipramine, clomipramine metabolite desmethylclomipramine, duloxetine (Cymbalta®), milnacipran and imipramine;

(32) an inducible nitric oxide synthase (iNOS) inhibitor such as S-[2-[(1-iminoethyl)amino]ethyl]-L-homocysteine, S-[2-[(1-iminoethyl)-amino]ethyl]-4,4-dioxo-L-cysteine, S-[2-[(1-iminoethyl)amino]ethyl]-2-methyl-L-cysteine, (2S,5Z)-2-amino-2-methyl-7-[(1-iminoethyl)amino]-5-heptenoic acid, 2-[[(1R,3S)-3-amino-4-hydroxy-1-(5-thiazolyl)-butyl]thio]-S-chloro-S-pyridinecarbonitrile; 2-[[(1R,3S)-3-amino-4-hydroxy-1-(5-thiazolyl)butyl]thio]-4-chlorobenzonitrile, (2S,4R)-2-amino-4-[[2-chloro-5-(trifluoromethyl)phenyl]thio]-5-thiazolebutanol, 2-[[(1R,3S)-3-amino-4-hydroxy-1-(5-thiazolyl) butyl]thio]-6-(trifluoromethyl)-3-pyridinecarbonitrile, 2-[[(1R,3S)-3-amino-4-hydroxy-1-(5-thiazolyl)butyl]thio]-5-chlorobenzonitrile, N-[4-[2-(3-chlorobenzylamino) ethyl]phenyl]thiophene-2-carboxamidine, NXN-462, or guanidinoethyldisulfide;

(33) an acetylcholinesterase inhibitor such as donepezil;

(34) a prostaglandin E2 subtype 4 (EP4) antagonist such as N-[({2-[4-(2-ethyl-4,6-dimethyl-1H-imidazo[4,5-c] pyridin-1-yl)phenyl]ethyl}amino)-carbonyl]-4-methylbenzenesulfonamide or 4-[(15)-1-({[5-chloro-2-(3-fluorophenoxy)pyridin-3-yl]carbonyl}amino)ethyl] benzoic acid;

(35) a leukotriene B4 antagonist; such as 1-(3-biphenyl-4-ylmethyl-4-hydroxy-chroman-7-yl)-cyclopentanecarboxylic acid (CP-105696), 5-[2-(2-Carboxyethyl)-3-[6-(4-methoxyphenyl)-5E-hexenyl]oxyphenoxy]-valeric acid (ONO-4057) or DPC-11870;

(36) a 5-lipoxygenase inhibitor, such as zileuton, 6-[(3-fluoro-5-[4-methoxy-3,4,5,6-tetrahydro-2H-pyran-4- yl])phenoxy-methyl]-1-methyl-2-quinolone (ZD-2138), or 2,3,5-trimethyl-6-(3-pyridylmethyl)-1,4-benzoquinone (CV-6504);

(37) a sodium channel blocker, such as lidocaine, lidocaine plus tetracaine cream (ZRS-201) or eslicarbazepine acetate;

(38) a $Na_V1.7$ blocker, such as XEN-402, XEN403, TV-45070, PF-05089771, CNV1014802, GDC-0276, RG7893 BIIB-074, BIIB-095, ASP-1807, DSP-3905, OLP-1002, RQ-00432979, FX-301, DWP-17061, IMB-110, IMB-111, IMB-112 and such as those disclosed in WO2011/140425 (US2011/306607); WO2012/106499 (US2012196869); WO2012/112743 (US2012245136); WO2012/125613 (US2012264749), WO2012/116440 (US2014187533), WO2011026240 (US2012220605), U.S. Pat. Nos. 8,883,840, 8,466,188, or WO2013/109521 (US2015005304), the entire contents of each application hereby incorporated by reference.

(38a) a $Na_V1.7$ blocker such as (2-benzylspiro[3,4-dihydropyrrolo[1,2-a]pyrazine-1,4'-piperidine]-1'-yl)-(4-isopropoxy-3-methyl-phenyl)methanone, 2,2,2-trifluoro-1-[1'-[3-methoxy-4-[2-(trifluoromethoxy)ethoxy]benzoyl]-2,4-dimethyl-spiro[3,4-dihydropyrrolo[1,2-a]pyrazine-1,4'-piperidine]-6-yl]ethanone, [8-fluoro-2-methyl-6-(trifluoromethyl)spiro[3,4-dihydropyrrolo[1,2-a]pyrazine-1,4'-piperidine]-1'-yl]-(4-isobutoxy-3-methoxy-phenyl)methanone, 1-(4-benzhydrylpiperazin-1-yl)-3-[2-(3,4-dimethylphenoxy)ethoxy]propan-2-ol, (4-butoxy-3-methoxy-phenyl)-[2-methyl-6-(trifluoromethyl)spiro[3,4-dihydropyrrolo[1,2-a]pyrazine-1,4'-piperidine]-1'-yl]methanone, [8-fluoro-2-methyl-6-(trifluoromethyl)spiro[3,4-dihydropyrrolo[1,2-a]pyrazine-1,4'-piperidine]-1'-yl]-(5-isopropoxy-6-methyl-2-pyridyl)methanone, (4-isopropoxy-3-methyl-phenyl)-[2-methyl-6-(1,1,2,2,2-pentafluoroethyl)spiro[3,4-dihydropyrrolo[1,2-a]pyrazine-1,4'-piperidine]-1'-yl]methanone, 5-[2-methyl-4-[2-methyl-6-(2,2,2-trifluoroacetyl)spiro[3,4-dihydropyrrolo[1,2-a]pyrazine-1,4'-piperidine]-1'-carbonyl]phenyl]pyridine-2-carbonitrile, (4-isopropoxy-3-methyl-phenyl)-[6-(trifluoromethyl)spiro[3,4-dihydro-2H-pyrrolo[1,2-a]pyrazine-1,4'-piperidine]-1'-yl]methanone, 2,2,2-trifluoro-1-[1'-[3-methoxy-4-[2-(trifluoromethoxy)ethoxy]benzoyl]-2-methyl-spiro[3,4-dihydropyrrolo[1,2-a]pyrazine-1,4'-piperidine]-6-yl]ethanone, 2,2,2-trifluoro-1-[1'-(5-isopropoxy-6-methyl-pyridine-2-carbonyl)-3,3-dimethyl-spiro[2,4-dihydropyrrolo[1,2-a]pyrazine-1,4'-piperidine]-6-yl]ethanone, 2,2,2-trifluoro-1-[1'-(5-isopentyloxypyridine-2-carbonyl)-2-methyl-spiro[3,4-dihydropyrrolo[1,2-a]pyrazine-1,4'-piperidine]-6-yl]ethanone, (4-isopropoxy-3-methoxy-phenyl)-[2-methyl-6-(trifluoromethyl)spiro[3,4-dihydropyrrolo[1,2-a]pyrazine-1,4'-piperidine]-1'-yl]methanone, 2,2,2-trifluoro-1-[1'-(5-isopentyloxypyridine-2-carbonyl)-2,4-dimethyl-spiro[3,4-dihydropyrrolo[1,2-a]pyrazine-1,4'-piperidine]-6-yl]ethanone, 1-[(3S)-2,3-dimethyl-1'-[4-(3,3,3-trifluoropropoxymethyl)benzoyl]spiro[3,4-dihydropyrrolo[1,2-a]pyrazine-1,4'-piperidine]-6-yl]-2,2,2-trifluoroethanone, [8-fluoro-2-methyl-6-(trifluoromethyl)spiro[3,4-dihydropyrrolo[1,2-a]pyrazine-1,4'-piperidine]-1'-yl]-[3-methoxy-4-[(1R)-1-methylpropoxy]phenyl]methanone, 2,2,2-trifluoro-1-[1'-(5-isopropoxy-6-methyl-pyridine-2-carbonyl)-2,4-dimethyl-spiro[3,4-dihydropyrrolo[1,2-a]pyrazine-1,4'-piperidine]-6-yl]ethanone, 1-[1'-[4-methoxy-3-(trifluoromethyl)benzoyl]-2-methyl-spiro[3,4-dihydropyrrolo[1,2-a]pyrazine-1,4'-piperidine]-6-yl]-2,2-dimethyl-propan-1-one, (4-isopropoxy-3-methyl-phenyl)-[2-methyl-6-(trifluoromethyl)spiro[3,4-dihydropyrrolo[1,2-a]pyrazine-1,4'-piperidine]-1'-yl]methanone, [2-methyl-6-(1-methylcyclopropanecarbonyl)spiro[3,4-dihydropyrrolo[1,2-a]pyrazine-1,4'-piperidine]-1'-yl]-[4-(3,3,3-trifluoropropoxymethyl)phenyl]methanone, 4-bromo-N-(4-bromophenyl)-3-[(1-methyl-2-oxo-4-piperidyl)sulfamoyl]benzamide or (3-chloro-4-isopropoxy-phenyl)-[2-methyl-6-(1,1,2,2,2-pentafluoroethyl)spiro[3,4-dihydropyrrolo[1,2-a]pyrazine-1,4'-piperidine]-1'-yl]methanone.

(39) a $Na_V1.8$ blocker, such as PF-04531083, PF-06372865 and such as those disclosed in WO2008/135826 (US2009048306), WO2006/011050 (US2008312235), WO2013/061205 (US2014296313), US20130303535, WO2013131018, U.S. Pat. No. 8,466,188, WO2013114250 (US2013274243), WO2014/120808 (US2014213616), WO2014/120815 (US2014228371) WO2014/120820 (US2014221435), WO2015/010065 (US20160152561), WO2015/089361 (US20150166589) and WO2019014352 (US20190016671), the entire contents of each application hereby incorporated by reference.

(39a) a $Na_V1.8$ blocker such as 4,5-dichloro-2-(4-fluoro-2-methoxyphenoxy)-N-(2-oxo-1,2-dihydropyridin-4-yl)benzamide, 2-(4-fluoro-2-methoxyphenoxy)-N-(2-oxo-1,2-dihydropyridin-4-yl)-4-(perfluoroethyl)benzamide, 4,5-dichloro-2-(4-fluorophenoxy)-N-(2-oxo-1,2-dihydropyridin-4-yl)benzamide, 4,5-dichloro-2-(3-fluoro-4-methoxyphenoxy)-N-(2-oxo-1,2-dihydropyridin-4-yl)benzamide, 2-(4-fluoro-2-methoxyphenoxy)-N-(2-oxo-1,2-dihydropyridin-4-yl)-5-(trifluoromethyl)benzamide, N-(2-oxo-1,2-dihydropyridin-4-yl)-2-(4-(trifluoromethoxy)phenoxy)-4-(trifluoromethyl)benzamide, 2-(4-fluorophenoxy)-N-(2-oxo-1,2-dihydropyridin-4-yl)-4-(perfluoroethyl)benzamide, 5-chloro-2-(4-fluoro-2-methoxyphenoxy)-N-(2-oxo-1,2-dihydropyridin-4-yl)benzamide, N-(2-oxo-1,2-dihydropyridin-4-yl)-2-(4-(trifluoromethoxy)phenoxy)-5-(trifluoromethyl)benzamide, 2-(4-fluoro-2-methylphenoxy)-N-(2-oxo-1,2-dihydropyridin-4-yl)-5-(trifluoromethyl)benzamide, 2-(2-chloro-4-fluorophenoxy)-N-(2-oxo-1,2-dihydropyridin-4-yl)-5-(trifluoromethyl)benzamide, 5-chloro-2-(4-fluoro-2-methylphenoxy)-N-(2-oxo-1,2-dihydropyridin-4-yl)benzamide, 4-chloro-2-(4-fluoro-2-methylphenoxy)-N-(2-oxo-1,2-dihydropyridin-4-yl)benzamide, 5-chloro-2-(2-chloro-4-fluorophenoxy)-N-(2-oxo-1,2-dihydropyridin-4-yl)benzamide, 2-((5-fluoro-2-hydroxybenzyl)oxy)-N-(2-oxo-1,2-dihydropyridin-4-yl)-4-(trifluoromethyl)benzamide, N-(2-oxo-1,2-dihydropyridin-4-yl)-2-(o-tolyloxy)-5-(trifluoromethyl)benzamide, 2-(2,4-difluorophenoxy)-N-(2-oxo-1,2-dihydropyridin-4-yl)-4-(trifluoromethyl)benzamide, N-(2-oxo-1,2-dihydropyridin-4-yl)-2-(2-(trifluoromethoxy)phenoxy)-5-(trifluoromethyl)benzamide, 2-(4-fluorophenoxy)-N-(2-oxo-1,2-dihydropyridin-4-yl)-5-(trifluoromethyl)benzamide, 2-(4-fluoro-2-methyl-phenoxy)-N-(2-oxo-1H-pyridin-4-yl)-4-(trifluoromethyl)benzamide, [4-[[2-(4-fluoro-2-methyl-phenoxy)-4-(trifluoromethyl)benzoyl]amino]-2-oxo-1-pyridyl]methyl dihydrogen phosphate, 3-(4-fluoro-2-methoxyphenoxy)-N-(3-(methylsulfonyl)phenyl)quinoxaline-2-carboxamide, 3-(2-chloro-4-fluorophenoxy)-N-(3-sulfamoylphenyl)quinoxaline-2-carboxamide, 3-(2-chloro-4-methoxyphenoxy)-N-(3-sulfamoylphenyl)quinoxaline-2-carboxamide, 3-(4-chloro-2-methoxyphenoxy)-N-(3-sulfamoylphenyl)quinoxaline-2-carboxamide, 4-(3-(4-(trifluoromethoxy)phenoxy)quinoxaline-2-carboxamido)picolinic acid, 2-(2,4-difluorophenoxy)-N-(3-sulfamoylphenyl)quinoline-3-carboxamide, 2-(4-fluoro-2-methoxyphenoxy)-N-(3-sulfamoylphenyl)quinoline-3-carboxamide, 3-(2,4-difluorophenoxy)-N-(3-sulfamoylphenyl)quinoxaline-2-carboxamide, N-(3-sulfamoylphenyl)-2-(4-(trifluoromethoxy)phenoxy)quinoline-3-carboxamide, N-(3-sulfamoylphenyl)-3-(4-(trifluoromethoxy)phenoxy)quinoxaline-2-carboxamide, 3-(4-chloro-2-methylphenoxy)-N-(3-sulfamoylphenyl)quinoxaline-2-carboxamide, 5-(3-(4-(trifluoromethoxy)phenoxy)quinoxaline-2-carboxamido)picolinic acid, 3-(4-fluoro-2-methoxyphenoxy)-N-(2-oxo-2,3-dihydro-1H-benzo[d]imidazol-5-yl)quinoxaline-2-carboxamide, 3-(4-fluoro-2-methoxyphenoxy)-N-(pyridin-4-yl)quinoxaline-2-carboxamide, 3-(4-fluorophenoxy)-N-(3-sulfamoylphenyl)quinoxaline-2-carboxamide, N-(3-cyanophenyl)-3-(4-fluoro-2-methoxyphenoxy)quinoxaline-2-carboxamide, N-(4-carbamoylphenyl)-3-(4-fluoro-2-methoxyphenoxy)quinoxaline-2-carboxamide, 4-(3-(4-(trifluoromethoxy)phenoxy)quinoxaline-2-carboxamido)benzoic acid, N-(4-cyanophenyl)-3-(4-fluoro-2-methoxyphenoxy)quinoxaline-2-carboxamide, 5-(4,5-dichloro-2-(4-fluoro-2-methoxyphenoxy)benzamido)picolinic acid, 5-(2-(2,4-dimethoxyphenoxy)-4,6-bis(trifluoromethyl)benzamido)picolinic acid, 4-(4,5-dichloro-2-(4-fluoro-2-methoxyphenoxy)benzamido)benzoic acid, 5-(2-(4-fluoro-2-methoxyphenoxy)-4,6-bis(trifluoromethyl)benzamido)picolinic acid, 4-(2-(4-fluoro-2-methoxyphenoxy)-4-(perfluoroethyl)benzamido)benzoic acid, 5-(2-(4-fluoro-2-methoxyphenoxy)-4-(perfluoroethyl)benzamido)picolinic acid, 4-(2-(4-fluoro-2-methylphenoxy)-4-(trifluoromethyl)benzamido)benzoic acid, 5-(4,5-dichloro-2-(4-fluoro-2-methoxyphenoxy)benzamido)picolinic acid, 4-(2-(2-chloro-4-fluorophenoxy)-4-(perfluoroethyl)benzamido)benzoic acid, 4-(2-(4-fluoro-2-methylphenoxy)-4-(perfluoroethyl)benzamido)benzoic acid, 4-(4,5-dichloro-2-(4-(trifluoromethoxy)phenoxy)benzamido)benzoic acid, 4-(4,5-dichloro-2-(4-chloro-2-methylphenoxy)benzamido)benzoic acid, 5-(4-(tert-butyl)-2-(4-fluoro-2-methoxyphenoxy)benzamido)picolinic acid, 5-(4,5-dichloro-2-(4-(trifluoromethoxy)phenoxy)benzamido)picolinic acid, 4-(4,5-dichloro-2-(4-fluoro-2-methylphenoxy)benzamido)benzoic acid, 5-(4,5-dichloro-2-(2,4-dimethoxyphenoxy)benzamido)picolinic acid, 5-(4,5-dichloro-2-(2-chloro-4-fluorophenoxy)benzamido)picolinic acid, 5-(4,5-dichloro-2-(4-fluoro-2-methylphenoxy)benzamido)picolinic acid, 4-(4,5-dichloro-2-(4-chloro-2-methoxyphenoxy)benzamido)benzoic acid, 5-(4,5-dichloro-2-(2,4-difluorophenoxy)benzamido)picolinic acid, 2-(4-fluorophenoxy)-N-(3-sulfamoylphenyl)-5-(trifluoromethyl)benzamide, 2-(4-fluorophenoxy)-N-(3-sulfamoylphenyl)-4-(trifluoromethyl)benzamide, 2-(2-chloro-4-fluorophenoxy)-N-(3-sulfamoylphenyl)-5-(trifluoromethyl)benzamide, 2-(4-fluorophenoxy)-N-(3-sulfamoylphenyl)-4-(trifluoromethyl)benzamide, 2-(2-chloro-4-fluorophenoxy)-N-(3-sulfamoylphenyl)-6-(trifluoromethyl)benzamide, 2-(2-chloro-4-fluorophenoxy)-5-(difluoromethyl)-N-(3-sulfamoylphenyl)benzamide, 2-(4-fluorophenoxy)-4-(perfluoroethyl)-N-(3-sulfamoylphenyl)benzamide, 2-(4-chloro-2-methoxyphenoxy)-4-(perfluoroethyl)-N-(3-sulfamoylphenyl)benzamide, 2-(4-fluoro-2-methoxyphenoxy)-N-(3-sulfamoylphenyl)-5-(trifluoromethyl)benzamide, 5-chloro-2-(4-fluoro-2-methylphenoxy)-N-(3-sulfamoylphenyl)benzamide, 4,5-dichloro-2-(4-fluoro-2-methoxyphenoxy)-N-(3-sulfamoylphenyl)benzamide, 2,4-dichloro-6-(4-chloro-2-methoxyphenoxy)-N-(3-sulfamoylphenyl)benzamide, 2,4-dichloro-6-(4-fluoro-2-methylphenoxy)-N-(3-sulfamoylphenyl)benzamide, 2-(4-fluoro-2-methoxyphenoxy)-N-(3-sulfamoylphenyl)-4,6-bis(trifluoromethyl)benzamide, 2-(4-fluoro-2-methylphenoxy)-N-(3-sulfamoylphenyl)-4,6-bis(trifluoromethyl)benzamide, 5-chloro-2-(2-chloro-4-fluorophenoxy)-N-(3-sulfamoylphenyl)benzamide, 2-(4-fluoro-2-methoxyphenoxy)-N-(3-sulfamoylphenyl)-4-(trifluoromethoxy)benzamide, 2-(4-fluoro-2-methoxyphenoxy)-N-(3-sulfamoylphenyl)-4-(trifluoromethyl)benzamide, 4,5-dichloro-2-(4-fluorophenoxy)-N-(3-sulfamoylphenyl)benzamide, 2-(4-fluoro-2-methoxyphenoxy)-4-(perfluoroethyl)-N-(3-sulfamoylphenyl)benzamide, 5-fluoro-2-(4-fluoro-2-methylphenoxy)-N-(3-sulfamoylphenyl)benzamide, 2-(2-chloro-4-fluorophenoxy)-4-cyano-N-(3-sulfamoylphenyl)benzamide, N-(3-sulfamoylphenyl)-2-(4-(trifluoromethoxy)phenoxy)-4-(trifluoromethyl)benzamide, N-(3-carbamoyl-4-fluoro-phenyl)-2-fluoro-6-[2-(trideuteriomethoxy)-4-(trifluoromethoxy)phenoxy]-3-(trifluoromethyl)benzamide, N-(3-carbamoyl-4-fluoro-phenyl)-2-fluoro-6-[2-methoxy-4-(trifluoromethoxy)phenoxy]-3-(trifluoromethyl)benzamide, N-(3-carbamoyl-4-fluoro-phenyl)-2-fluoro-6-[2-(trideuteriomethoxy)-4-(trifluoromethoxy)phenoxy]-3-(trifluoromethoxy)benzamide, 4-[[2-fluoro-6-[2-methoxy-4-(trifluoromethoxy)phenoxy]-3-(trifluoromethyl)benzoyl]amino]pyridine-2-carboxamide, 4-[[3-chloro-2-fluoro-6-[2-methoxy-4-(trifluoromethoxy)phenoxy]benzoyl]amino]pyridine-2-carboxamide, 4-[[2-fluoro-6-[2-(trideuteriomethoxy)-4-(trifluoromethoxy)phenoxy]-3-(trifluoromethyl)benzoyl]amino]pyridine-2-carboxamide, N-(3-carbamoyl-4-fluoro-phenyl)-3-(difluoromethyl)-2-fluoro-6-[2-methoxy-4-(trifluoromethoxy)phenoxy]benzamide, 4-[[2-fluoro-6-[2-(trideuteriomethoxy)-4-(trifluoromethoxy)phenoxy]-3-(trifluoromethoxy)benzoyl]amino]pyridine-2-carboxamide, N-(3-carbamoyl-4-fluoro-phenyl)-6-[2-chloro-4-(trifluoromethoxy)phenoxy]-2-fluoro-3-(trifluoromethyl)benzamide, N-(3-carbamoyl-4-fluoro-phenyl)-2-fluoro-6-[2-methyl-4-(trifluoromethoxy)phenoxy]-3-(trifluoromethyl)benzamide, N-(3-carbamoyl-4-fluoro-phenyl)-2,3,4-trifluoro-6-[2-methoxy-4-(trifluoromethoxy)phenoxy]benzamide, N-(2-carbamoyl-4-pyridyl)-3-fluoro-5-[2-methoxy-4-(trifluoromethoxy)phenoxy]-2-(trifluoromethyl)pyridine-4-carboxamide, 4-[[6-[2-(difluoromethoxy)-4-(trifluoromethoxy)phenoxy]-2-fluoro-3-(trifluoromethyl)benzoyl]amino]pyridine-2-carboxamide, N-(3-carbamoyl-4-fluoro-phenyl)-6-[3-chloro-4-(trifluoromethoxy)phenoxy]-2-fluoro-3-(trifluoromethyl)benzamide, N-(3-carbamoyl-4-fluoro-phenyl)-2-fluoro-6-[4-(trifluoromethoxy)phenoxy]-3-(trifluoromethyl)benzamide, N-(4-carbamoyl-3-fluoro-phenyl)-2-fluoro-6-[2-methoxy-4-(trifluoromethoxy)phenoxy]-3-(trifluoromethyl)benzamide, 4-[[2-fluoro-6-[2-(trideuteriomethoxy)-4-(trifluoromethoxy)phenoxy]-4-(trifluoromethoxy)benzoyl]amino]pyridine-2-carboxamide, N-(3-carbamoyl-4-fluoro-phenyl)-2-fluoro-6-[3-fluoro-4-(trifluoromethoxy)phenoxy]-3-(trifluoromethyl)benzamide, N-(3-carbamoyl-4-fluorophenyl)-2-[2-methoxy-4-(trifluoromethoxy)phenoxy]-5-(1,1,2,2,2-pentafluoroethyl)benzamide, 4-[[4-(difluoromethoxy)-2-fluoro-6-[2-methoxy-4-(trifluoromethoxy)phenoxy]benzoyl]amino]pyridine-2-carboxamide, N-(3-carbamoyl-4-fluoro-phenyl)-2-fluoro-6-[2-fluoro-4-(trifluoromethoxy)phenoxy]-3-(trifluoromethyl)benzamide, 4-[[4-cyclopropyl-2-fluoro-6-[2-methoxy-4-(trifluoromethoxy)phenoxy]benzoyl]amino]pyridine-2-carboxamide, N-(3-carbamoyl-4-fluoro-phenyl)-5-fluoro-2-[2-methoxy-4-(trifluoromethoxy)phenoxy]-4-(trifluoromethyl)benzamide, 5-[[2-fluoro-6-[2-(trideuteriomethoxy)-4-(trifluoromethoxy)phenoxy]-3-(trifluoromethyl)benzoyl]amino]pyridine-2-carboxamide, N-(3-carbamoyl-4-fluoro-phenyl)-2-fluoro-6-(4-fluorophenoxy)-3-(trifluoromethyl)benzamide, or 4-[[2-fluoro-6-[3-fluoro-2-methoxy-4-(trifluoromethoxy)phenoxy]-3-(trifluoromethyl)benzoyl]amino]pyridine-2-carboxamide.

(40) a combined $Na_V1.7$ and $Na_V1.8$ blocker, such as DSP-2230, Lohocla201 or BL-1021;
(41) a 5-HT3 antagonist, such as ondansetron;
(42) a TPRV 1 receptor agonist, such as capsaicin (NeurogesX®, Qutenza®); and the pharmaceutically acceptable salts and solvates thereof;
(43) a nicotinic receptor antagonist, such as varenicline;
(44) an N-type calcium channel antagonist, such as Z-160;
(45) a nerve growth factor antagonist, such as tanezumab;
(46) an endopeptidase stimulant, such as senrebotase;
(47) an angiotensin II antagonist, such as EMA-401;
(48) acetaminophen (including without limitation intravenous acetaminophen (e.g., Ofirmev®));
(49) bupivacaine (including without limitation bupivacaine liposome injectable suspension (e.g., Exparel®) bupivacaine ER (Posimir), bupivacaine collagen (Xaracoll) and transdermal bupivacaine (Eladur®)); and
(50) bupivacaine and meloxicam combination (e.g., HTX-011).

In one embodiment, the additional appropriate therapeutic agents are selected from V-116517, Pregabalin, controlled release Pregabalin, Ezogabine (Potiga®). Ketamine/amitriptyline topical cream (Amiket®), AVP-923, Perampanel (E-2007), Ralfinamide, transdermal bupivacaine (Eladur®), CNV1014802, JNJ-10234094 (Carisbamate), BMS-954561 or ARC-4558.

In another embodiment, the additional appropriate therapeutic agents are selected from N-(6-amino-5-(2,3,5-trichlorophenyl)pyridin-2-yl)acetamide; N-(6-amino-5-(2-chloro-5-methoxyphenyl)pyridin-2-yl)-1-methyl-1H-pyrazole-5-carboxamide; or 3-((4-(4-(trifluoromethoxy)phenyl)-1H-imidazol-2-yl)methyl)oxetan-3-amine.

In another embodiment, the additional therapeutic agent is selected from a GlyT2/5HT2 inhibitor, such as Operanserin (VVZ149), a TRPV modulator such as CA008, CMX-020, NE06860, FTABS, CNTX4975, MCP101, MDR16523, or MDR652, a EGRI inhibitor such as Brivoglide (AYX1), an NGF inhibitor such as Tanezumab, Fasinumab, ASP6294, MEDI7352, a Mu opioid agonist such as Cebranopadol, NKTR181 (oxycodegol), a CB-1 agonist such as NEO1940 (AZN1940), an imidazoline 12 agonist such as CR4056 or a p75NTR-Fc modulator such as LEVI-04.

In another embodiment, the additional therapeutic agent is oliceridine or ropivacaine (TLC590).

In another embodiment, the additional therapeutic agent is a sodium channel inhibitor (also known as a sodium channel blocker), such as the $Na_V1.7$ and $Na_V1.8$ blockers identified above.

The amount of additional therapeutic agent present in the compositions of this invention may be no more than the amount that would normally be administered in a composition comprising that therapeutic agent as the only active agent. The amount of additional therapeutic agent in the presently disclosed compositions may range from about 10% to 100% of the amount normally present in a composition comprising that agent as the only therapeutically active agent.

The compounds and salts of this invention or pharmaceutically acceptable compositions thereof may also be incorporated into compositions for coating an implantable medical device, such as prostheses, artificial valves, vascular grafts, stents and catheters. Accordingly, the invention, in another aspect, includes a composition for coating an implantable device comprising a compound or salt of the invention as described generally above, and in classes and subclasses herein, and a carrier suitable for coating said implantable device. In still another aspect, the invention includes an implantable device coated with a composition comprising a compound or salt of the invention as described generally above, and in classes and subclasses herein, and a carrier suitable for coating said implantable device. Suitable coatings and the general preparation of coated implantable devices are described in U.S. Pat. Nos. 6,099,562; 5,886, 026; and 5,304,121. The coatings are typically biocompatible polymeric materials such as a hydrogel polymer, polymethyldisiloxane, polycaprolactone, polyethylene glycol, polylactic acid, ethylene vinyl acetate, and mixtures thereof. The coatings may optionally be further covered by a suitable topcoat of fluorosilicone, polysaccharides, polyethylene glycol, phospholipids or combinations thereof to impart controlled release characteristics in the composition.

Another aspect of the invention relates to inhibiting $Na_V1.8$ activity in a biological sample or a subject, which method comprises administering to the subject, or contacting said biological sample with a compound of the invention, a pharmaceutically acceptable salt thereof, or a pharmaceutical composition thereof. The term "biological sample," as used herein, includes, without limitation, cell cultures or extracts thereof, biopsied material obtained from a mammal or extracts thereof, and blood, saliva, urine, feces, semen, tears, or other body fluids or extracts thereof.

Inhibition of $Na_V1.8$ activity in a biological sample is useful for a variety of purposes that are known to one of skill in the art. Examples of such purposes include, but are not limited to, the study of sodium channels in biological and pathological phenomena; and the comparative evaluation of new sodium channel inhibitors.

Synthesis of the Compounds of the Invention

The compounds of the invention can be prepared from known materials by the following methods, similar methods, and other methods known to one skilled in the art. As one skilled in the art would appreciate, the functional groups of the intermediate compounds in the methods described below may need to be protected by suitable protecting groups. Protecting groups may be added or removed in accordance with standard techniques, which are well-known to those skilled in the art. The use of protecting groups is described in detail in T. G. M. Wuts et al., *Greene's Protective Groups in Organic Synthesis* (4th ed. 2006).

In general, the compounds of formulas (I), (II), and (III) can be synthesized according to the general methods outlined in Scheme 1 and specific procedures discussed in the Examples. Scheme 1 depicts the synthesis of the compounds of formula (I). The compounds of formula (II) and (III) can be synthesized by analogous methods. The starting materials for the synthesis described in Scheme 1 and the Examples are commercially available or can be prepared by methods known to one skilled in the art.

$^{14}C$, $^{32}P$, $^{35}S$, $^{18}F$, $^{36}Cl$, and the like, as well as the isotopes for which no decay mode is identified in V. S. Shirley & C. M. Lederer, Isotopes Project, Nuclear Science Division, Lawrence Berkeley Laboratory, Table of Nuclides (January 1980).

The radiolabeled analogs can be used in a number of beneficial ways, including in various types of assays, such as

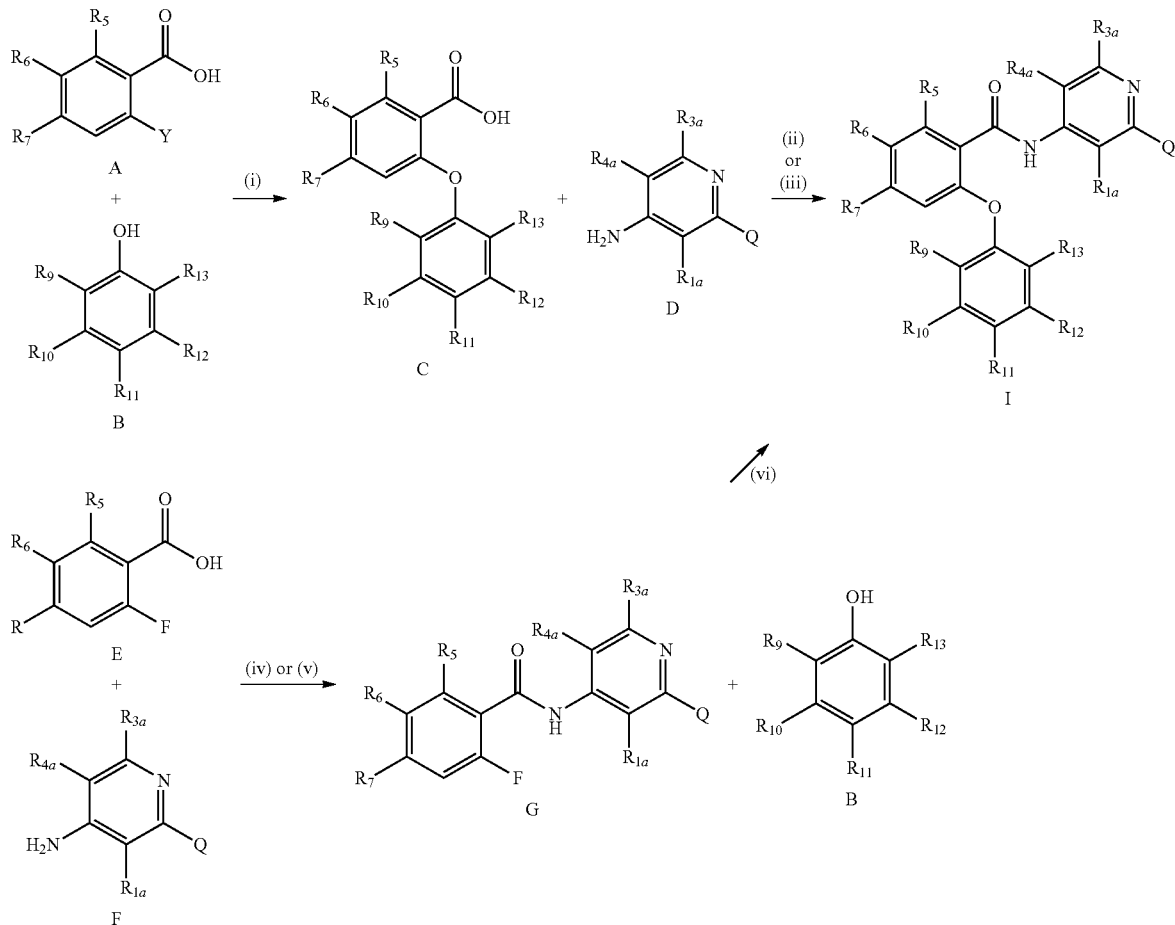

(i) base (e. g., Cs$_2$CO$_3$), solvent (e.g., toluene), and catalyst (e.g., CuI) (Y = Br, I); or base (e.g., K$_2$CO$_3$), solvent (e.g., DMF), and heat (Y = F);
(ii) oxalyl chloride/thionyl chloride, DMF and solvent (e.g., CH$_2$Cl$_2$), then D, base (e.g., DIEA), and solvent (e.g., THF);
(iii) coupling agent (e.g., HATU, EDCI, HOBT), base (e.g., N-methylmorpholine, Et$_3$N), solvent (e.g., DMF, dichloromethane);
(iv) oxalyl chloride/thoinyl chloride, DMF and solvent (e.g., CH$_2$Cl$_2$), then F, base (e.g., DIPEA), and solvent (e.g., THF, CH$_2$Cl$_2$);
(v) coupling agent (e.g., HATU, EDCI, HOBT), base (e.g., N-methylmorpholine, Et$_3$N), solvent (e.g., DMF, dichloromethane);
(vi) base e.g., K$_2$CO$_3$), solvent (e.g., DMF), and heat.

Radiolabeled Analogs of the Compounds of the Invention

In another aspect, the invention relates to radiolabeled analogs of the compounds of the invention. As used herein, the term "radiolabeled analogs of the compounds of the invention" refers to compounds that are identical to the compounds of the invention, including the compounds of formulas (I), (I-A), (I-B), (II), (II-A), (III), and (III-A), and all of the embodiments thereof, as described herein, and the compounds identified in Table 1, except that one or more atoms has been replaced with a radioisotope of the atom present in the compounds of the invention.

As used herein, the term "radioisotope" refers to an isotope of an element that is known to undergo spontaneous radioactive decay. Examples of radioisotopes include $^3H$, substrate tissue distribution assays. For example, tritium ($^3H$)- and/or carbon-14 ($^{14}C$)-labeled compounds may be useful for various types of assays, such as substrate tissue distribution assays, due to relatively simple preparation and excellent detectability.

In another aspect, the invention relates to pharmaceutically acceptable salts of the radiolabeled analogs, in accordance with any of the embodiments described herein in connection with the compounds of the invention.

In another aspect, the invention relates to pharmaceutical compositions comprising the radiolabeled analogs, or pharmaceutically acceptable salts thereof, and a pharmaceutically acceptable carrier, adjuvant or vehicle, in accordance with any of the embodiments described herein in connection with the compounds of the invention.

In another aspect, the invention relates to methods of inhibiting voltage-gated sodium channels and methods of treating or lessening the severity of various diseases and disorders, including pain, in a subject comprising administering an effective amount of the radiolabeled analogs, pharmaceutically acceptable salts thereof, and pharmaceutical compositions thereof, in accordance with any of the embodiments described herein in connection with the compounds of the invention.

In another aspect, the invention relates to radiolabeled analogs, pharmaceutically acceptable salts thereof, and pharmaceutical compositions thereof, for use, in accordance with any of the embodiments described herein in connection with the compounds of the invention.

In another aspect, the invention relates to the use of the radiolabeled analogs, or pharmaceutically acceptable salts thereof, and pharmaceutical compositions thereof, for the manufacture of medicaments, in accordance with any of the embodiments described herein in connection with the compounds of the invention.

In another aspect, the radiolabeled analogs, pharmaceutically acceptable salts thereof, and pharmaceutical compositions thereof, can be employed in combination therapies, in accordance with any of the embodiments described herein in connection with the compounds of the invention.

EXAMPLES

General methods. $^1$H NMR (400 MHz) spectra were obtained as solutions in an appropriate deuterated solvent such as dimethyl sulfoxide-$d_6$ (DMSO-d6).

Compound purity, retention time, and electrospray mass spectrometry (ESI-MS) data were determined by LC/MS analysis using one of the following methods or in another method described in the individual examples.

LC/MS Method A. LC/MS analysis was conducted using an Acquity UPLC BEH C18 column (30×2.1 mm, 1.7 μm particle) made by Waters (pn: 186002349), and a dual gradient run from 1-99% mobile phase B over 1.0 minutes. Mobile phase A=$H_2O$ (0.05% TFA). Mobile phase B=$CH_3CN$ (0.035% TFA). Flow rate=1.5 mL/min, injection volume=1.5 μL, and column temperature=60° C.

LC/MS Method B. LC/MS analysis was conducted using an Acquity UPLC BEH C18 column (50×2.1 mm, 1.7 μm particle) made by Waters (pn: 186002350), and a dual gradient run from 1-99% mobile phase B over 2.9 minutes. Mobile phase A=$H_2O$ (0.05% TFA). Mobile phase B=$CH_3CN$ (0.035% TFA). Flow rate=1.2 mL/min, injection volume=1.5 μL, and column temperature=60° C.

LC/MS Method C. LC/MS analysis was conducted using a Luna C18 column (50×3 mm, 3 m particle) over 2 minutes. Mobile phase conditions: Initial 95% $H_2O$ with 0.1% formic acid/5% acetonitrile with 0.10% formic acid, linear gradient to 95% acetonitrile with 0.10% formic acid over 1 minute, then hold for 1 minute at 95% acetonitrile with 0.1% formic acid. Flow rate=2 mL/min and column temperature 45° C.

LC/MS Method D. LC/MS analysis was conducted using a C18 column (100×4.6 mm) over 6 minutes. Mobile phase conditions: initial 98% $H_2O$ with 0.1% formic acid/2% acetonitrile with 0.1% formic acid isocratic for 1 minute, followed by a linear gradient to 95% $CH_3CN$ with 0.1% formic acid over 5 minutes, then hold for 1 minute at 95% acetonitrile with 0.1% formic acid. Flow rate=2 mL/min and column temperature 45° C.

LC/MS Method E. LC/MS analysis was conducted using an Acquity UPLC BEH C18 column (50×2.1 mm, 1.7 μm particle size) made by Waters (pn: 186002350), and a dual gradient run from 1-99% mobile phase B over 4.5 minutes. Mobile phase A=$H_2O$ (0.05% TFA). Mobile phase B=acetonitrile (0.035% TFA). Flow rate=1.2 mL/min, injection volume=1.5 μL, and column temperature=60° C.

LC/MS Method F. Merck Millipore Chromolith Speed-ROD C18 column (50×4.6 mm) and a dual gradient run from 5-100% mobile phase B over 6 minutes. Mobile phase A=water (0.1% TFA). Mobile phase B=acetonitrile (0.1% TFA).

LC/MS Method G. LC/MS analysis was conducted using Waters UPLC CSH C18 column (2.1×50 mm, 1.7 μm particle size) with Vanguard CSH C18 guard column (2.1×5 mm, 1.7 m particle size) using dual gradient run from 2%-98% mobile phase B over 3.45 minutes, holding at 98% B from 3.45-3.75 minutes, then re-equilibrating back to 2% from 3.75-4.00 min. Flow rate: 0.6 mL/minute. Mobile Phase A: water with 0.1% TFA; Mobile Phase B: acetonitrile.

LC/MS Method H. LC/MS analysis was conducted using an Acquity UPLC BEH C8 column (50×2.1 mm, 1.7 m particle size) made by Waters (pn: 186002877) and a dual gradient run from 2-98% mobile phase B over 1.5 minutes. Mobile phase A=$H_2O$ (10 mM ammonium formate with 0.05% ammonium hydroxide). Mobile phase B=acetonitrile. Flow rate=0.6 mL/min, injection volume=2 μL, and column temperature=45° C.

Unless otherwise noted, where purification by reverse phase HPLC is indicated in the Examples below, samples were purified using a reverse phase HPLC-MS method using a Luna $C_{18}$ (2) column (75×30 mm, 5 μm particle size) sold by Phenomenex (pn: 00C-4252-U0-AX), and a dual gradient run from 1-99% mobile phase B over 15.0 minutes. Mobile phase A=$H_2O$ (5 mM HCl). Mobile phase B=$CH_3CN$. Flow rate=50 mL/min, injection volume=950 μL, and column temperature=25° C.

Abbreviations

Unless otherwise noted, or where the context dictates otherwise, the following abbreviations shall be understood to have the following meanings:

| Abbreviation | Meaning |
| --- | --- |
| % w/v | Weight-volume concentration |
| BSA | Bovine Serum Albumin |
| ca. | Circa (approximately) |
| CC2-DMPE | Chlorocoumarin-2-dimyristoyl phosphatidylethanolamine |
| DCM | Dichloromethane |
| DCE | Dichloroethane |
| DIEA, DIPEA | N,N-Diisopropyl ethyl amine |
| DiSBAC$_6$(3) | Bis-(1,3-dihexyl-thiobarbituric acid) trimethine oxonol |
| DMA | N,N-Dimethylacetamide |
| DMEM | Dulbecco's Modified Eagle's Medium |
| DMF | N,N-Dimethylformamide |

-continued

| Abbreviation | Meaning |
| --- | --- |
| DMSO | Dimethyl sulfoxide |
| DRG | Dorsal root ganglia |
| EDCI | 1-Ethyl-3-(3-dimethylaminopropyl)carbodiimide |
| ESI | Electrospray ionization |
| ESI-MS | Electrospray mass spectrometry |
| EtOH | Ethanol |
| E-VIPR | Electrical stimulation voltage ion probe reader |
| FBS | Fetal bovine serum |
| g | grams |
| HATU | 1-[Bis(dimethylamino)methylene]-1H-1,2,3-triazolo[4,5-b]pyridinium 3-oxide hexafluorophosphate |
| HER | Human embryonic kidney |
| HEPES | 2-[4-(2-hydroxyethyl)piperazin-1-yl]ethanesulfonic acid |
| HPLC | High performance liquid chromatography |
| HPLC/MS/MS | High performance liquid chromatography/tandem mass spectrometry |
| hr, h | hours |
| HS | Human serum |
| Hz | Hertz |
| IS | Internal standard |
| KIR2.1 | Inward-rectifier potassium ion channel 2.1 |
| L | Liter(s) |
| LC/MS | Liquid chromatography-mass spectrometry |
| M | Molar (concentration) |
| MeOH | Methanol |
| mg | milligrams |
| MHz | Megahertz |
| min | Minutes |
| mL | Milliliters |
| mm | Millimeters |
| mM | Millimolar (concentration) |
| mmol | millimoles |
| ms | millisecond |
| MTBE | Methyl tert-butyl ether |
| N | Normal (concentration) |
| NEAA | Non-essential amino acids |
| nL | nanoliters |
| nm | nanometer |
| NMP | N-Methylpyrrolidone |
| NMR | Nuclear magnetic resonance |
| Pd(dba)$_2$ | Palladium (0) bis(dibenzylideneacetone) |
| Pd(t-Bu$_3$P)$_2$ | Bis(tri-tert-butylphosphine)palladium (0) |
| ppm | Parts per million |
| RB | Round bottom (flask) |
| RT | Room temperature |
| SFC | Supercritical fluid chromatography |
| T3P | Propylphosphonic anhydride, i.e., 2,4,6-tripropyl-1,3,5,2,4,6-trioxatriphosphinane 2,4,6-trioxide |
| t-BuOH | tert-butyl alcohol |
| tBuXPhos | 2-Di-tert-butylphosphino-2',4',6'-triisopropylbiphenyl |
| TEA | triethylamine |
| TFA | Trifluoroacetic acid |
| THF | Tetrahydrofuran |
| UPLC | Ultra performance liquid chromatography |
| VABSC-1 | Voltage Assay Background Suppression Compound |
| μL | Microliters |
| μm | Micrometers |
| μM | Micromolar (concentration) |

Preparation 1

Methyl 4-amino-5-methyl-pyridine-2-carboxylate

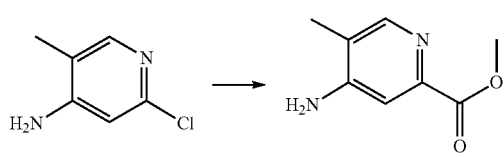

2-Chloro-5-methyl-pyridin-4-amine (0.5 g, 3.5 mmol) was diluted in methanol (6.6 mL) in an autoclave. Pd(dppf)Cl$_2$·CH$_3$CN (70 mg, 0.086 mmol) and triethylamine (1.0 mL, 7.2 mmol) were added, and the autoclave was purged with nitrogen, then with carbon monoxide. The mixture was heated to 130° C. and the carbon monoxide pressure was adjusted to 120 psi. The mixture was stirred 18 hours at 130° C., and then cooled to 25° C. The mixture was purged with nitrogen and concentrated in vacuo. After purification by silica gel chromatography (0-10% methanol/ethyl acetate), the resulting material was triturated with MTBE (10 mL) for 1 hour. The solid was isolated by filtration, washed with MTBE (5 mL) and dried under vacuum at 50° C. for 3 hours to provide methyl 4-amino-5-methyl-pyridine-2-carboxylate (380 mg, 64%) as a beige solid. $^1$H NMR (400 MHz, CDCl$_3$) δ 8.20 (s, 1H), 7.39 (s, 1H), 4.31 (br s, 2H), 3.95 (s, 3H), 2.16 (s, 3H) ppm. ESI-MS m/z calc. 166.07, found 167.4 (M+1)$^+$; LC/MS retention time (Method C): 0.2 minutes.

Preparation 2

Methyl 4-amino-3-methyl-pyridine-2-carboxylate

Step 1: 2-chloro-3-methyl-pyridin-4-amine

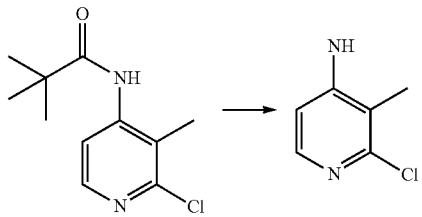

To a stirring solution of N-(2-chloro-3-methyl-4-pyridyl)-2,2-dimethyl-propanamide (2.0 g, 8.8 mmol) in methanol (16 mL) was added aqueous KOH (4.0 g of 50% w/w, 35 mmol). The mixture was heated at 60° C. for 2.5 hours, then cooled to room temperature, diluted with water (64 mL) and concentrated in vacuo. The aqueous concentrate was extracted with dichloromethane (2×) and the combined organic phases were dried over $Na_2SO_4$, filtered and concentrated to provide 2-chloro-3-methyl-pyridin-4-amine (1.24 g, 99%) as a white powder. $^1$H NMR (400 MHz, $CDCl_3$) δ 7.62 (d, J=5.5 Hz, 1H), 6.37 (d, J=5.6 Hz, 1H), 4.93 (s, 2H), 2.02 (s, 3H) ppm.

Step 2: methyl 4-amino-3-methyl-pyridine-2-carboxylate

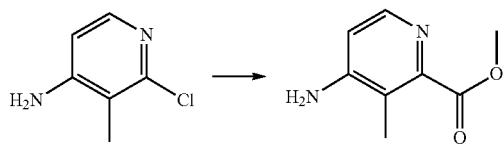

To a solution of 2-chloro-3-methyl-pyridin-4-amine (9.685 g, 67.92 mmol) in methanol (150 mL) in an autoclave was added $Pd(dppf)Cl_2·CH_3CN$ (1.122 g, 1.374 mmol) and triethylamine (19 mL, 136 mmol). The autoclave was purged with nitrogen, then with carbon monoxide. The mixture was heated to 130° C. and the carbon monoxide pressure was adjusted to 120 psi. The mixture was stirred for 5 hours at 130° C., then cooled to 25° C. and stirred overnight. The mixture was purged with nitrogen and concentrated in vacuo. Silica gel chromatography (70-100% ethyl acetate/heptane) provided methyl 4-amino-3-methyl-pyridine-2-carboxylate (8.015 g, 71%) as a beige solid. $^1$H NMR (400 MHz, $CDCl_3$) δ 8.18 (d, J=5.4 Hz, 1H), 6.65 (d, J=5.4 Hz, 1H), 4.30 (br s, 2H), 3.96 (s, 3H), 2.32 (s, 3H) ppm. ESI-MS m/z calc. 166.07, found 167.1 (M+1)$^+$; LC-MS retention time (Method D): 0.99 minutes.

Example 1

2-fluoro-6-[4-(trifluoromethoxy)phenoxy]-3-(trifluoromethyl)benzoic acid

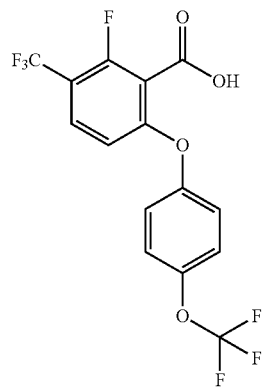 [SMILES: O=C(O)c1c(Oc2ccc(OC(F)(F)F)cc2)ccc(C(F)(F)F)c1F]

Step 1: 2-fluoro-6-[4-(trifluoromethoxy)phenoxy]-3-(trifluoromethyl)benzoic acid To a solution of 4-(trifluoromethoxy)phenol (5.5 mL, 42.5 mmol), 6-bromo-2-fluoro-3-(trifluoromethyl)benzoic acid (10.0 g, 34.8 mmol), and $Cs_2CO_3$ (22.73 g, 69.76 mmol) in toluene (75 mL, degassed with nitrogen purge prior to use) was added copper (I) iodide (1.6 g, 8.4 mmol). The mixture was stirred at 100° C. for 1 hour. The mixture was cooled to RT and diluted with cold water (150 mL). The mixture was acidified with 6 M HCl (slight foaming) and diluted with ethyl acetate (150 mL). The biphasic mixture was filtered through Celite to remove insoluble inorganics. The aqueous phase was separated and extracted with ethyl acetate (150 mL). The combined organic phases were washed with 150 mL of brine, dried over $MgSO_4$, filtered and concentrated under reduced pressure affording an oil. The crude material was purified by silica gel chromatography (dichloromethane/methanol gradient), followed by crystallization from heptane affording 2-fluoro-6-[4-(trifluoromethoxy)phenoxy]-3-(trifluoromethyl)benzoic acid (7.0 g, 52%) as an off-white solid. ESI-MS m/z calc. 384.02, found 385.1 (M+1)+; retention time (Method B): 1.78 minutes. $^1$H NMR (400 MHz, Chloroform-d3) δ 7.67-7.58 (m, 1H), 7.28 (dt, J=9.1, 1.0 Hz, 2H), 7.19-7.10 (m, 2H), 6.70 (dd, J=8.9, 1.1 Hz, 1H) ppm.

Example 2

2-fluoro-6-[2-(trideuteriomethoxy)-4-(trifluoromethoxy)phenoxy]-3-(trifluoromethyl)benzoic acid

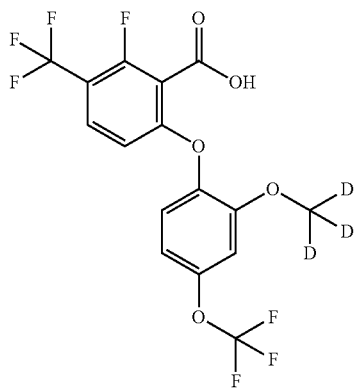 [SMILES: [2H]C([2H])([2H])Oc1cc(OC(F)(F)F)ccc1Oc1ccc(C(F)(F)F)c(F)c1C(=O)O]

Step 1: 1-bromo-2-(trideuteriomethoxy)-4-(trifluoromethoxy)benzene

2-Bromo-5-(trifluoromethoxy)phenol (57.5 g, 223.7 mmol) in DMF (400 mL) was treated with $K_2CO_3$ (62 g, 448.6 mmol), stirred for 15 minutes, and cooled in an ice bath, and iodomethane-d3 (Aldrich, >99.5% D, 15.3 mL, 245.8 mmol) was added dropwise. The pale yellow suspension was removed from the ice bath and stirred at RT for 16 hours. The suspension was partitioned between water (2 L) and methyl tert-butyl ether (500 mL) and separated. The organic phase was washed with 0.5 M NaOH (500 mL) and brine (2×300 mL) and the aqueous phases were back extracted once with methyl tert-butyl ether (250 mL). The combined organic phases were dried, filtered and evaporated to give 1-bromo-2-(trideuteriomethoxy)-4-(trifluoromethoxy)benzene (62.4 g, 97%) as a pale yellow liquid. LC/MS retention time (Method B): 1.84 minutes (3 minute run). $^1$H NMR (400 MHz, DMSO-d6) δ 7.71 (d, J=8.7 Hz, 1H), 7.14 (d, J=2.6 Hz, 1H), 6.92 (ddq, J=8.7, 2.5, 1.3 Hz, 1H) ppm.

Step 2: 2-(trideuteriomethoxy)-4-(trifluoromethoxy)phenol

A 1000-mL-neck flask was fitted with a mechanical stirrer, a heating mantle, a water cooled reflux condenser, temperature probe/controller and a nitrogen inlet/outlet was charged under a nitrogen atmosphere with tetrabutylammonium hydroxide (355 mL of 55% w/w, 730 mmol) and 1-bromo-2-(trideuteriomethoxy)-4-(trifluoromethoxy)benzene (50.0 g, 182 mmol). With stirring, the solution was degassed with nitrogen for 15 minutes. 1,10-Phenanthroline-4,7-diol (3.871 g, 18.24 mmol) was then added as a solid in one portion followed by copper (I) oxide (1.305 g, 9.120 mmol) in one portion. After these additions, the gas dispersion tube was removed and the vessel was fitted with a septum. The resulting mixture was then heated to a pot temperature of 100° C. for 15 hours. After cooling to RT, the reaction mixture was poured into ice cold hydrochloric acid (912 mL of 1 M, 912 mmol). The mixture was diluted with ethyl acetate (500 mL) and mixed for several minutes. The phases were separated and the aqueous phase was extracted with ethyl acetate (2×200 mL). The combined organic phases were washed with brine (2×250 mL), dried over $Na_2SO_4$ (200 g), filtered and concentrated. Silica gel chromatography (ethyl acetate/hexanes gradient) to provide 2-(trideuteriomethoxy)-4-(trifluoromethoxy)phenol (33 g, 86%) as a clear pale yellow oil. LC/MS retention time (Method B): 1.38 minutes (3 minute run). $^1$H NMR (400 MHz, DMSO-d6) δ 9.31 (s, 1H), 6.91 (dd, J=2.8, 0.9 Hz, 1H), 6.82 (d, J=8.6 Hz, 1H), 6.79-6.70 (m, 1H) ppm.

Step 3: 2-fluoro-6-[2-(trideuteriomethoxy)-4-(trifluoromethoxy)phenoxy]-3-(trifluoromethyl)benzoic acid A pressure bottle was charged with 2-(trideuteriomethoxy)-4-(trifluoromethoxy)phenol (2 g, 9.472 mmol), $Cs_2CO_3$ (6.50 g, 19.94 mmol) and 6-bromo-2-fluoro-3-(trifluoromethyl)benzoic acid (2.81 g, 9.97 mmol) in toluene (71 mL). The mixture was degassed with nitrogen. After ~2 minutes, copper (I) iodide (380 mg, 1.99 mmol) was added, the bottle was sealed, and the reaction was stirred at 110° C. for 40 minutes. After cooling to RT, the reaction was diluted with ethyl acetate and water. The organic phase was washed with brine and dried over $Na_2SO_4$. Trituration with hexanes and filtration gave 2-fluoro-6-[2-(trideuteriomethoxy)-4-(trifluoromethoxy)phenoxy]-3-(trifluoromethyl)benzoic acid (2.8 g, 67%). ESI-MS m/z calc. 417.05, found 418.1 (M+1)+; retention time (Method A): 0.73 minutes. $^1$H NMR (400 MHz, DMSO-d6) δ 7.35 (t, J=8.5 Hz, 1H), 7.20 (d, J=2.7 Hz, 1H), 7.13 (d, J=8.7 Hz, 1H), 6.97 (ddt, J=8.8, 2.7, 1.2 Hz, 1H), 6.39 (d, J=8.6 Hz, 1H) ppm.

Example 3

2-fluoro-6-[2-methoxy-4-(trifluoromethoxy)phenoxy]-3-(trifluoromethyl)benzoic acid

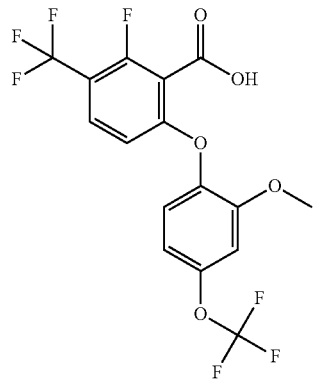 [SMILES: COc1cc(OC(F)(F)F)ccc1Oc1ccc(C(F)(F)F)c(F)c1C(=O)O]

Step 1: 1-bromo-2-methoxy-4-(trifluoromethoxy)benzene

A 500-mL 3-neck flask was fitted with a mechanical stirrer, a cooling bath, an addition funnel, temperature probe and a nitrogen inlet/outlet. The vessel was charged under a nitrogen atmosphere with 2-bromo-5-(trifluoromethoxy)phenol (80 g, 311.3 mmol) and DMF (800 mL) and was treated with $K_2CO_3$ (56.05 g, 405.6 mmol). The mixture was stirred at RT for 15 minutes and then cooled in an ice bath and methyl iodide (19.38 mL, 311.3 mmol) was added dropwise over 5 minutes. The cooling bath was removed and the resulting suspension was allowed to slowly warm to room temperature and stirred for 10 hours. The reaction mixture was then poured into crushed ice/water (1000 mL) and stirred for 5 minutes. The mixture was diluted with methyl tert-butyl ether (1000 mL) and transferred to a separatory funnel and allowed to stand for 10 minutes. The organic phase was separated and the aqueous was extracted with methyl tert-butyl ether (2×500 mL). The combined organic phases were washed with brine, dried over $Na_2SO_4$, filtered and concentrated. The crude product was purified by silica gel chromatography (starting with hexane, then 9:1 hexanes/dichloromethane and finally 8:1:1 hexanes/dichloromethane/ethyl acetate) to provide 1-bromo-2-methoxy-4-(trifluoromethoxy)benzene (82 g, 97%) as a pale yellow oil. $^1$H NMR (400 MHz, DMSO-d6) δ 7.71 (d, J=8.7 Hz, 1H), 7.25-7.06 (m, 1H), 6.93 (ddq, J=8.7, 2.5, 1.2 Hz, 1H), 3.89 (s, 3H) ppm.

Step 2: 2-methoxy-4-(trifluoromethoxy)phenol

A 1000-mL 3-neck flask was fitted with a mechanical stirrer, a heating mantle, a water cooled reflux condenser, a temperature probe/controller and a nitrogen inlet/outlet. The vessel was charged under a nitrogen atmosphere with tetrabutylammonium hydroxide (287.2 mL of 40% w/v, 442.7 mmol) in water and 1-bromo-2-methoxy-4-(trifluoromethoxy)benzene (30.0 g, 111 mmol). With stirring the solution was degassed with nitrogen for 15 minutes. The vessel was then charged with 1,10-phenanthroline-4,7-diol (2.349 g, 11.07 mmol) added as a solid in one portion followed by copper (I) oxide (792 mg, 5.54 mmol) added in one portion. After these additions the gas dispersion tube was removed and the vessel was fitted with a septum. The mixture was then heated to a pot temperature of 100° C. for 15 hours. After cooling to RT the reaction mixture was poured into ice cold hydrochloric acid (554 mL of 1 M, 554 mmol). The mixture was diluted with ethyl acetate (500 mL) and mixed for several minutes. The biphasic mixture was transferred to a separatory funnel and allowed to stand for 5 minutes. The phases were separated and the aqueous layer extracted with ethyl acetate (2×200 mL). The combined organic phases were washed with saturated brine (2×250 mL), dried over $Na_2SO_4$, filtered and concentrated. The residue was purified by silica gel chromatography (ethyl acetate/hexanes gradient) to provide 2-methoxy-4-(trifluoromethoxy)phenol (18 g, 78%) as a pale yellow oil. LC/MS retention time (Method B): 1.34 minutes. $^1$H NMR (400 MHz, DMSO-d6) δ 9.35 (s, 1H), 6.92 (dd, J=2.7, 0.8 Hz, 1H), 6.82 (d, J=8.6 Hz, 1H), 6.79-6.70 (m, 1H), 3.79 (s, 3H) ppm.

Step 3: 2-fluoro-6-[2-methoxy-4-(trifluoromethoxy)phenoxy]-3-(trifluoromethyl)benzoic acid A pressure flask was charged with 6-bromo-2-fluoro-3-(trifluoromethyl)benzoic acid (5.00 g, 17.4 mmol), 2-methoxy-4-(trifluoromethoxy)phenol (4.35 g, 20.9 mmol), $Cs_2CO_3$ (11.35 g, 34.84 mmol) and toluene (50 mL). The mixture was degassed with nitrogen. After ~2 minutes, copper (I) iodide (663 mg, 3.48 mmol) was added and the reaction was stirred at 100° C. for 1 hour. The reaction was diluted with 300 mL ethyl acetate and 200 mL of water and the phases were separated. The aqueous layer was acidified to pH-3 and extracted with ethyl acetate. The combined organic phases were dried over $Na_2SO_4$, filtered and concentrated. The residue was purified by silica gel chromatography (ethyl acetate/hexanes gradient, followed by 10% methanol/dichloromethane) to afford 2-fluoro-6-[2-methoxy-4-(trifluoromethoxy)phenoxy]-3-(trifluoromethyl)benzoic acid (5.45 g, 76%). ESI-MS m/z calc. 414.03, found 415.0 (M+1)+; retention time (Method B): 1.94 minutes. $^1$H NMR (400 MHz, DMSO-d6) δ 7.53 (t, J=8.4 Hz, 1H), 7.27-7.11 (m, 2H), 6.99 (ddd, J=8.8, 2.7, 1.3 Hz, 1H), 6.49 (d, J=8.8 Hz, 1H), 3.80 (s, 3H) ppm.

Example 4

2-[2-(trideuteriomethoxy)-4-(trifluoromethoxy)phenoxy]-5-(trifluoromethyl)benzoic acid

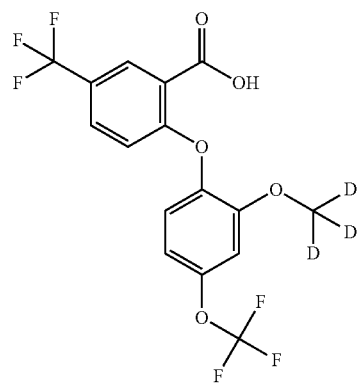 [SMILES: [2H]C([2H])([2H])Oc1cc(OC(F)(F)F)ccc1Oc1ccc(C(F)(F)F)cc1C(=O)O]

Step 1: 2-[2-(trideuteriomethoxy)-4-(trifluoromethoxy)phenoxy]-5-(trifluoromethyl)benzaldehyde To a stirring solution of 2-fluoro-5-(trifluoromethyl)benzaldehyde (5.02 g, 26.1 mmol) in DMF (50 mL) at 0° C. was added $Cs_2CO_3$ (10.68 g, 32.78 mmol) and 2-(trideuteriomethoxy)-4-(trifluoromethoxy)phenol (6.50 g, 30.8 mmol). The reaction mixture was allowed to warm to RT then stirred for 16 hours. The reaction mixture was partitioned between ethyl acetate and water. The organic layer was washed with water, 50% saturated aqueous $NaHCO_3$ and brine, then dried over $MgSO_4$, filtered and concentrated in vacuo. Silica gel chromatography (0-30% ethyl acetate/hexane) provided 2-[2-(trideuteriomethoxy)-4-(trifluoromethoxy)phenoxy]-5-(trifluoromethyl)benzaldehyde (8.84 g, 88%). ESI-MS m/z calc. 383.07, found 384.0 (M+1)+; Retention time (Method A): 0.81 minutes. $^1$H NMR (500 MHz, DMSO-d6) δ 10.50 (s, 1H), 8.06 (s, 1H), 7.92 (dd, J=8.9, 2.4 Hz, 1H), 7.44 (d, J=8.7 Hz, 1H), 7.29 (d, J=2.5 Hz, 1H), 7.07 (d, J=8.7 Hz, 1H), 6.88 (d, J=8.8 Hz, 1H) ppm.

Step 2: 2-[2-(trideuteriomethoxy)-4-(trifluoromethoxy)phenoxy]-5-(trifluoromethyl)benzoic acid A mixture of 2-[2-(trideuteriomethoxy)-4-(trifluoromethoxy)phenoxy]-5-(trifluoromethyl)benzaldehyde (8.84 g, 23.1 mmol) and sodium dihydrogenphosphate (2.92 g, 24.3 mmol) in tert-butyl alcohol (80 mL)/water (40 mL)/acetonitrile (40 mL) was cooled in an ice bath then 2-methy-2-butene (11 mL, 104 mmol) was added. Sodium chlorite (3.12 g, 27.6 mmol) was then added portionwise over 10 minutes. The mixture was allowed to warm to RT then stirred for 16 hours. The reaction mixture was acidified to pH~1-2 using aqueous HCl (8 mL of 12 M, 96 mmol), and partitioned with ethyl acetate. The organic layer was separated, dried over MgSO$_4$ and concentrated in vacuo to afford 2-[2-(trideuteriomethoxy)-4-(trifluoromethoxy)phenoxy]-5-(trifluoromethyl)benzoic acid (7.55 g, 82%) as a white solid. ESI-MS m/z calc. 399.06, found 400.1 (M+1)+; Retention time (Method A): 0.72 minutes. $^1$H NMR (400 MHz, DMSO-d6) δ 13.38 (s, 1H), 8.07 (d, J=2.4 Hz, 1H), 7.81 (dd, J=8.9, 2.4 Hz, 1H), 7.28-7.20 (m, 2H), 7.01 (dd, J=8.9, 1.7 Hz, 1H), 6.83 (d, J=8.7 Hz, 1H) ppm.

Example 5

2-fluoro-6-(4-fluoro-2-methoxy-phenoxy)-3-(trifluoromethyl)benzoic acid

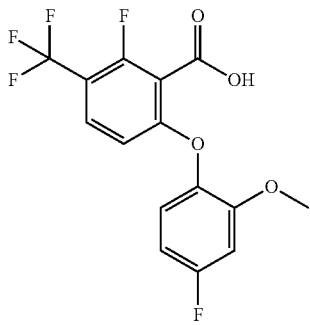 [SMILES: COc1cc(F)ccc1Oc1ccc(C(F)(F)F)c(F)c1C(=O)O]

Step 1: 2-fluoro-6-(4-fluoro-2-methoxy-phenoxy)-3-(trifluoromethyl)benzoic acid

A solution of 6-bromo-2-fluoro-3-(trifluoromethyl)benzoic acid (20.0 g, 69.7 mmol), 4-fluoro-2-methoxy-phenol (10.0 g, 70.4 mmol), Cs$_2$CO$_3$ (25 g, 77 mmol) in toluene (250 mL) was bubbled with nitrogen for 15 minutes then copper (I) iodide (2.8 g, 14.7 mmol) added. The flask was flushed with nitrogen and stirred at RT for 16 hours, then heated at 100° C. with stirring for 5 hours. The mixture was allowed to cool, and then diluted with ethyl acetate and water. The water layer was acidified with HCl (142 mL of 1 M, 142 mmol) and the product extracted into ethyl acetate. The organic layer was washed with brine, dried over Na$_2$SO$_4$, filtered and concentrated. The resulting gummy residue was dissolved in ethyl acetate and filtered through a pad of Celite and the filtrate was concentrated. Silica gel chromatography (methanol/0.5% acetic acid in dichloromethane gradient) provided the desired product. The material was dissolved in a minimum amount of dichloromethane and hexanes and allowed to stand overnight. The resulting precipitate was filtered, washed with hexanes and dried under vacuum to provide 2-fluoro-6-(4-fluoro-2-methoxy-phenoxy)-3-(trifluoromethyl)benzoic acid (9.8 g, 31%) as a light brown solid. ESI-MS m/z calc. 348.04, found 349.1 (M+1)+; Retention time (Method A): 0.58 minutes.

Example 6

5-fluoro-2-[2-(trideuteriomethoxy)-4-(trifluoromethoxy)phenoxy]-4-(trifluoromethyl)benzoic acid

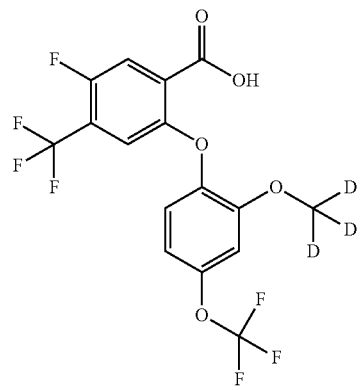 [SMILES: [2H]C([2H])([2H])Oc1cc(OC(F)(F)F)ccc1Oc1cc(C(F)(F)F)c(F)cc1C(=O)O]

Step 1: ethyl 2,5-difluoro-4-(trifluoromethyl)benzoate

To a solution of 2,5-difluoro-4-(trifluoromethyl)benzoic acid (5.00 g, 22.1 mmol) in ethanol (50 mL) was added H$_2$SO$_4$ (1.5 mL, 28 mmol) dropwise over 5 minutes. The solution was heated at reflux for 48 hours, then the reaction mixture was cooled to room temperature and concentrated under reduced pressure to provide ethyl 2,5-difluoro-4-(trifluoromethyl)benzoate (4.57 g, 81%) as a clear colorless liquid. $^1$H NMR (400 MHz, DMSO-d6) δ 7.96 (dd, J=10.1, 5.6 Hz, 2H), 4.37 (q, J=7.1 Hz, 2H), 1.33 (t, J=7.1 Hz, 3H) ppm.

Step 2: 5-fluoro-2-[2-(trideuteriomethoxy)-4-(trifluoromethoxy)phenoxy]-4-(trifluoromethyl)benzoic acid A mixture of 2-(trideuteriomethoxy)-4-(trifluoromethoxy)phenol (7.69 g, 36.4 mmol), ethyl 2,5-difluoro-4-(trifluoromethyl)benzoate (8.41 g, 33.1 mmol) and Cs$_2$CO$_3$ (16.17 g, 49.63 mmol) in acetonitrile (103 mL) was refluxed under nitrogen overnight. The reaction mixture was diluted with water and acidified to ~pH 2 with 6 M HCl. The mixture was extracted with dichloromethane (3×50 mL) and the combined organic layers dried over MgSO$_4$, filtered and concentrated. The residue was dissolved in methanol (50 mL) and treated with solid NaOH (2.65 g, 66.2 mmol) dissolved in 50 mL water. The mixture was stirred for 20 minutes then acidified with an aqueous solution of HCl (9 mL of 12 M, 108 mmol). The aqueous mixture was extracted with ethyl acetate, and the organic layer dried over MgSO$_4$, filtered and concentrated under reduced pressure. Silica gel chromatography (0-3% methanol/0.2% AcOH in dichloromethane) provided the desired product. The solid triturated with hexanes (2×) to provide 5-fluoro-2-[2-(trideuteriomethoxy)-4-(trifluoromethoxy)phenoxy]-4-(trifluoromethyl)benzoic acid. ESI-MS m/z calc. 417.05, found 418.1 (M+1)+; Retention time (Method A): 0.74 minutes. $^1$H NMR (500 MHz, DMSO-d6) δ 13.69 (br s, 1H), 7.88 (d, J=10.4 Hz, 1H), 7.20 (d, J=2.7 Hz, 1H), 7.14 (d, J=5.7 Hz, 1H), 7.07 (d, J=8.8 Hz, 1H), 6.95 (d, J=8.8 Hz, 1H) ppm.

Example 7

3-cyclopropyl-6-[2-methoxy-4-(trifluoromethoxy)phenoxy]-2-methyl-benzoic acid

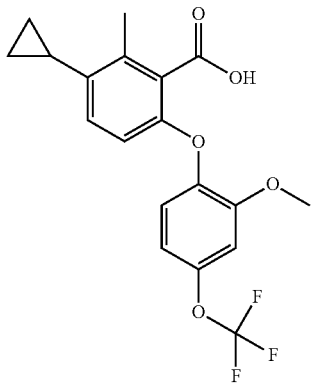 [SMILES: COc1cc(OC(F)(F)F)ccc1Oc1ccc(C2CC2)c(C)c1C(=O)O]

Step 1: 3-bromo-6-[2-methoxy-4-(trifluoromethoxy)phenoxy]-2-methyl-benzaldehyde To a solution of 3-bromo-6-fluoro-2-methyl-benzaldehyde (2.4 g, 11.0 mmol) and 2-methoxy-4-(trifluoromethoxy)phenol (2.19 g, 10.5 mmol) in DMF (50 mL) was added $Cs_2CO_3$ (3.42 g, 10.5 mmol) under nitrogen. The mixture was heated at 100° C. for 1.25 hours. After cooling to room temperature the mixture was diluted with ethyl acetate and was wash with water and brine, dried over $Na_2SO_4$, and concentrated under reduced pressure. Silica gel chromatography (ethyl acetate/hexanes gradient) provided 3-bromo-6-[2-methoxy-4-(trifluoromethoxy)phenoxy]-2-methyl-benzaldehyde (709 mg, 16%) as an off-white solid. $^1$H NMR (400 MHz, Chloroform-d) δ 10.68 (s, 1H), 7.58 (d, J=8.9 Hz, 1H), 7.06 (d, J=8.4 Hz, 1H), 6.85 (d, J=9.5 Hz, 2H), 6.46 (d, J=8.9 Hz, 1H), 3.79 (s, 3H), 2.71 (s, 3H) ppm. ESI-MS m/z calc. 405.99, found 407.14 (M+1)+; Retention time (Method A): 0.89 minutes.

Step 2: 3-cyclopropyl-6-[2-methoxy-4-(trifluoromethoxy)phenoxy]-2-methyl-benzaldehyde To a flask charged with 3-bromo-6-[2-methoxy-4-(trifluoromethoxy)phenoxy]-2-methyl-benzaldehyde (80 mg, 0.20 mmol) and bis(tri-tert-butylphosphine)palladium(0) (18 mg, 0.035 mmol) under an atmosphere of nitrogen at 0° C. was added THF (1 mL) followed by bromo(cyclopropyl)zinc (600 µL of 0.5 M in THF, 0.3 mmol) and the reaction mixture was gradually warmed to RT over 1 hour. The mixture as stirred at room temperature for 30 minutes. The reaction mixture was quenched with 1 M HCl, and the aqueous layer was extracted with dichloromethane (3×). The combined organic layers were dried over $Na_2SO_4$, filtered and concentrated. Silica gel chromatography (ethyl acetate/hexanes gradient) provided 3-cyclopropyl-6-[2-methoxy-4-(trifluoromethoxy)phenoxy]-2-methyl-benzaldehyde (69 mg, 95%) as a white solid. ESI-MS m/z calc. 366.11, found 367.26 (M+1)+; Retention time (Method A): 0.85 minutes. $^1$H NMR (400 MHz, Chloroform-d) δ 10.72 (s, 1H), 7.16 (d, J=8.6 Hz, 1H), 6.95 (d, J=8.7 Hz, 1H), 6.85 (d, J=2.7 Hz, 1H), 6.80 (d, J=8.9 Hz, 1H), 6.51 (d, J=8.6 Hz, 1H), 3.82 (s, 3H), 2.72 (s, 3H), 1.86 (td, J=8.1, 4.1 Hz, 1H), 1.05-0.87 (m, 2H), 0.56 (h, J=4.3 Hz, 2H) ppm.

Step 3: 3-cyclopropyl-6-[2-methoxy-4-(trifluoromethoxy)phenoxy]-2-methyl-benzoic acid To a solution of 3-cyclopropyl-6-[2-methoxy-4-(trifluoromethoxy)phenoxy]-2-methyl-benzaldehyde (69 mg, 0.19 mmol) in tert-butyl alcohol (1 mL), acetonitrile (0.6 mL), and water (0.6 mL) was added sodium dihydrogen phosphate (26 mg, 0.22 mmol) and 2-methyl-2-butene (100 µL, 0.945 mmol). To this mixture was added sodium chlorite (22 mg, 0.24 mmol) and the reaction mixture stirred at RT for 1.75 hours. The mixture was diluted with 1 M HCl (15 mL) and extracted with ethyl acetate (3×). The combined organics were dried over $Na_2SO_4$, filtered and concentrated under reduced pressure to provide 3-cyclopropyl-6-[2-methoxy-4-(trifluoromethoxy)phenoxy]-2-methyl-benzoic acid (71 mg, 94%). ESI-MS m/z calc. 382.10, found 383.25 (M+1)+; Retention time (Method A): 0.74 minutes. $^1$H NMR (400 MHz, Chloroform-d) δ 7.06 (d, J=8.3 Hz, 1H), 7.01 (d, J=8.6 Hz, 1H), 6.82 (d, J=9.0 Hz, 2H), 6.50 (d, J=8.6 Hz, 1H), 3.81 (s, 3H), 2.53 (s, 3H), 1.83 (td, J=9.1, 8.2, 4.6 Hz, 1H), 1.01-0.86 (m, 2H), 0.58 (t, J=5.2 Hz, 2H) ppm.

Example 8

Methyl 5-[[5-fluoro-2-[2-(trideuteriomethoxy)-4-(trifluoromethoxy)phenoxy]-4-(trifluoromethyl)benzoyl]amino]pyridine-2-carboxylate (1)

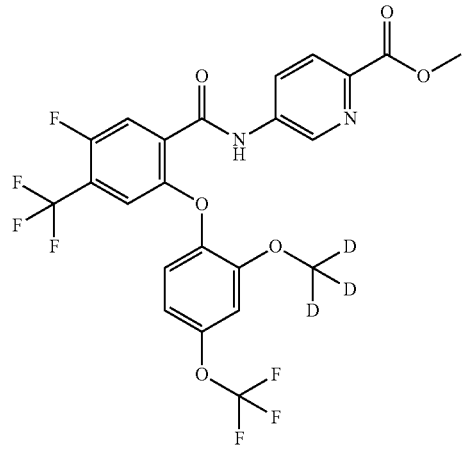 [SMILES: [2H]C([2H])([2H])Oc1cc(OC(F)(F)F)ccc1Oc1cc(C(F)(F)F)c(F)cc1C(=O)Nc1ccc(C(=O)OC)nc1]

Step 1: 5-fluoro-2-[2-(trideuteriomethoxy)-4-(trifluoromethoxy)phenoxy]-4-(trifluoromethyl)benzoyl chloride To a solution of 5-fluoro-2-[2-(trideuteriomethoxy)-4-(trifluoromethoxy)phenoxy]-4-(trifluoromethyl)benzoic acid (1.8 g, 4.3 mmol) and DMF (10 µL, 0.13 mmol) in dichloromethane (15 mL) at 0° C. was added oxalyl chloride (565 µL, 6.48 mmol) dropwise under nitrogen atmosphere. The ice bath was removed after 10 minutes and the reaction mixture stirred at room temperature for 1.5 hours. The solvent was evaporated under reduced pressure to afford 5-fluoro-2-[2-(trideuteriomethoxy)-4-(trifluoromethoxy)phenoxy]-4-(trifluoromethyl)benzoyl chloride.

Step 2: methyl 5-[[5-fluoro-2-[2-(trideuteriomethoxy)-4-(trifluoromethoxy)phenoxy]-4-(trifluoromethyl)benzoyl]amino]pyridine-2-carboxylate (1)

A solution of 5-fluoro-2-[2-(trideuteriomethoxy)-4-(trifluoromethoxy)phenoxy]-4-(trifluoromethyl)benzoyl chloride (60 mg, 0.14 mmol) in NMP (0.3 mL) was added to a solution of methyl 5-aminopyridine-2-carboxylate (31 mg, 0.20 mmol) and DIEA (96 µL, 0.55 mmol) in NMP (0.3 mL). The reaction mixture was stirred at room temperature for 2 hours, then filtered and purified by HPLC (10-75% CH$_3$CN/5 mM HCl) to provide methyl 5-[[5-fluoro-2-[2-(trideuteriomethoxy)-4-(trifluoromethoxy)phenoxy]-4-(trifluoromethyl)benzoyl]amino]pyridine-2-carboxylate (43 mg, 57%). ESI-MS m/z calc. 551.10, found 552.13 (M+1)+; Retention time (Method B): 1.94 minutes. $^1$H NMR (400 MHz, Chloroform-d) δ 10.87 (s, 1H), 9.35 (t, J=1.4 Hz, 1H), 9.30 (s, 1H), 7.95 (s, 1H), 7.79 (s, 1H), 7.35 (s, 1H), 7.21 (s, 2H), 6.94 (s, 1H) ppm.

The compounds set forth in Table 2 were prepared by methods analogous to the preparation of compound (1) in Example 8 using carboxylic acids in Examples 1-7 and the appropriate amine.

TABLE 2

Additional Compounds Prepared By Methods Analogous to Example 8.

| Cmpd No. | Compound Name | LC/MS (Method B) | NMR (shifts in ppm) |
|---|---|---|---|
| 2 | methyl 4-[[3-cyclopropyl-6-[2-methoxy-4-(trifluoromethoxy)phenoxy]-2-methyl-benzoyl]amino]-5-methyl-pyridine-2-carboxylate | ESI-MS m/z calc. 530.17, found 531.0 (M + 1)+; Retention time: 1.87 minutes | $^1$H NMR (400 MHz, DMSO-d$_6$) δ 10.33 (s, 1H), 8.52 (s, 2H), 7.15 (d, J = 2.8 Hz, 1H), 7.11 (d, J = 8.8 Hz, 1H), 7.05 (d, J = 8.6 Hz, 1H), 7.01-6.88 (m, 1H), 6.51 (d, J = 8.6 Hz, 1H), 3.88 (s, 3H), 3.77 (s, 3H), 2.43 (s, 3H), 2.28 (s, 3H), 2.01-1.81 (m, 1H), 1.02-0.83 (m, 2H), 0.65-0.48 (m, 2H). |
| 3 | methyl 4-[[2-fluoro-6-[4-(trifluoromethoxy)phenoxy]-3-(trifluoromethyl)benzoyl]amino]pyridine-2-carboxylate | ESI-MS m/z calc. 518.07, found 519.2 (M + 1)+; Retention time: 1.78 minutes | $^1$H NMR (500 MHz, DMSO-d6) δ 11.53 (s, 1H), 8.64 (d, J = 5.5 Hz, 1H), 8.35 (d, J = 2.1 Hz, 1H), 7.91 (t, J = 8.6 Hz, 1H), 7.83 (dd, J = 5.4, 2.2 Hz, 1H), 7.48 (dd, J = 9.1, 1.0 Hz, 2H), 7.35 (d, J = 9.1 Hz, 2H), 6.94 (d, J = 8.9 Hz, 1H), 3.89 (s, 3H). |
| 4 | methyl 4-[[2-fluoro-6-(4-fluoro-2-methoxy-phenoxy)-3-(trifluoromethyl)benzoyl]amino]pyridine-2-carboxylate | ESI-MS m/z calc. 482.09, found 483.0 (M + 1)+; Retention time: 1.76 minutes | |
| 5 | methyl 4-[[2-fluoro-6-[2-methoxy-4-(trifluoromethoxy)phenoxy]-3-(trifluoromethyl)benzoyl]amino]pyridine-2-carboxylate | ESI-MS m/z calc. 548.08, found 549.2 (M + 1)+; Retention time: 1.86 minutes | $^1$H NMR (400 MHz, DMSO-d6) δ 11.51 (s, 1H), 8.64 (d, J = 5.5 Hz, 1H), 8.39 (d, J = 2.1 Hz, 1H), 7.91-7.75 (m, 2H), 7.37 (d, J = 8.8 Hz, 1H), 7.26 (d, J = 2.7 Hz, 1H), 7.10-6.99 (m, 1H), 6.69 (d, J = 8.9 Hz, 1H), 3.89 (s, 3H), 3.79 (s, 3H). |
| 6 | methyl 4-[[5-fluoro-2-[2-(trideuteriomethoxy)-4-(trifluoromethoxy)phenoxy]-4-(trifluoromethyl)benzoyl]amino]pyridine-2-carboxylate | ESI-MS m/z calc. 551.10, found 552.13 (M + 1)+; Retention time: 1.85 minutes | $^1$H NMR (400 MHz, DMSO-d$_6$) δ 11.20 (s, 1H), 8.61 (d, J = 5.5 Hz, 1H), 8.35 (d, J = 2.1 Hz, 1H), 7.95 (d, J = 10.1 Hz, 1H), 7.80 (dd, J = 5.5, 2.1 Hz, 1H), 7.23-7.17 (m, 2H), 7.15 (d, J = 2.8 Hz, 1H), 6.96 (dd, J = 8.4, 2.4 Hz, 1H), 3.88 (s, 3H). |
| 7 | tert-butyl N-[4-[[5-fluoro-2-[2-(trideuteriomethoxy)-4-(trifluoromethoxy)phenoxy]-4-(trifluoromethyl)benzoyl]amino]-2-pyridyl]carbamate | ESI-MS m/z calc. 608.16, found 609.0 (M + 1)+; Retention time: 1.72 minutes | |
| 8 | methyl 4-[[2-[2-(trideuteriomethoxy)-4-(trifluoromethoxy)phenoxy]-5-(trifluoromethyl)benzoyl]amino]pyridine-2-carboxylate | ESI-MS m/z calc. 533.11, found 533.96 (M + 1)+; Retention time: 1.96 minutes | $^1$H NMR (400 MHz, DMSO-d$_6$) δ 11.11 (s, 1H), 8.62 (d, J = 5.4 Hz, 1H), 8.42 (d, J = 2.1 Hz, 1H), 8.03 (d, J = 2.3 Hz, 1H), 7.89 (dd, J = 5.4, 2.1 Hz, 1H), 7.82 (dd, J = 8.8, 2.4 Hz, 1H), 7.38 (d, J = 8.8 Hz, 1H), 7.24 (d, J = 2.7 Hz, 1H), 7.10-7.01 (m, 1H), 6.89 (d, J = 8.8 Hz, 1H), 3.89 (s, 3H). |
| 9 | tert-butyl N-[4-[[2-[2-(trideuteriomethoxy)-4-(trifluoromethoxy)phenoxy]-5-(trifluoromethyl)benzoyl]amino]-2-pyridyl]carbamate | ESI-MS m/z calc. 590.17, found 591.0 (M + 1)+; Retention time: 1.66 minutes | $^1$H NMR (400 MHz, DMSO-d$_6$) δ 10.99 (s, 1H), 8.08 (d, J = 2.4 Hz, 1H), 7.87-7.79 (m, 2H), 7.77 (d, J = 7.0 Hz, 1H), 7.29-7.21 (m, 2H), 7.02 (d, J = 8.9 Hz, 1H), 6.83 (d, J = 8.8 Hz, 1H), 6.50 (dd, J = 7.1, |

TABLE 2-continued

Additional Compounds Prepared By Methods Analogous to Example 8.

| Cmpd No. | Compound Name | LC/MS (Method B) | NMR (shifts in ppm) |
|---|---|---|---|
| | | | 2.2 Hz, 1H), 6.45 (d, J = 2.2 Hz, 1H), 1.51 (s, 9H). |
| 10 | methyl 5-[[2-fluoro-6-(4-fluoro-2-methoxy-phenoxy)-3-(trifluoromethyl)benzoyl]amino]pyridine-2-carboxylate | ESI-MS m/z calc. 482.09, found 483.1 (M + 1)+; Retention time: 1.74 minutes | |
| 11 | methyl 5-[[2-fluoro-6-[2-(trideuteriomethoxy)-4-(trifluoromethoxy)phenoxy]-3-(trifluoromethyl)benzoyl]amino]pyridine-2-carboxylate | ESI-MS m/z calc. 551.10, found 551.91 (M + 1)+; Retention time: 2.0 minutes | $^1$H NMR (400 MHz, DMSO-$d_6$) δ 11.50 (s, 1H), 8.91 (d, J = 2.5 Hz, 1H), 8.37 (dd, J = 8.7, 2.6 Hz, 1H), 8.12 (d, J = 8.6 Hz, 1H), 7.82 (t, J = 8.6 Hz, 1H), 7.38 (d, J = 8.8 Hz, 1H), 7.26 (d, J = 2.7 Hz, 1H), 7.05 (d, J = 8.5 Hz, 1H), 6.69 (d, J = 8.9 Hz, 1H), 3.87 (s, 3H). |
| 12 | methyl 5-[[2-[2-(trideuteriomethoxy)-4-(trifluoromethoxy)phenoxy]-5-(trifluoromethyl)benzoyl]amino]pyridine-2-carboxylate | ESI-MS m/z calc. 533.11, found 533.96 (M + 1)+; Retention time: 2.07 minutes | $^1$H NMR (400 MHz, DMSO-$d_6$) δ 11.06 (s, 1H), 8.95 (d, J = 2.5 Hz, 1H), 8.36 (dd, J = 8.8, 2.5 Hz, 1H), 8.10 (d, J = 8.6 Hz, 1H), 8.04 (d, J = 2.3 Hz, 1H), 7.82 (dd, J = 8.6, 2.2 Hz, 1H), 7.39 (d, J = 8.8 Hz, 1H), 7.24 (d, J = 2.7 Hz, 1H), 7.05 (d, J = 10.0 Hz, 1H), 6.89 (d, J = 8.7 Hz, 1H), 3.87 (s, 3H). |
| 13 | methyl 5-[[2-fluoro-6-[4-(trifluoromethoxy)phenoxy]-3-(trifluoromethyl)benzoyl]amino]pyridine-2-carboxylate | ESI-MS m/z calc. 518.07, found 519.1 (M + 1)+; Retention time: 2.68 minutes | $^1$H NMR (400 MHz, DMSO-$d_6$) δ 11.51 (s, 1H), 8.87 (d, J = 2.5 Hz, 1H), 8.34 (dd, J = 8.6, 2.5 Hz, 1H), 8.11 (d, J = 8.6 Hz, 1H), 7.90 (t, J = 8.6 Hz, 1H), 7.49 (d, J = 8.7 Hz, 2H), 7.35 (d, J = 9.1 Hz, 2H), 6.93 (d, J = 8.9 Hz, 1H), 3.87 (s, 3H). |

Example 9

Methyl 4-[[6-(3,4-difluoro-2-methyl-phenoxy)-2-methyl-3-(trifluoromethyl)benzoyl]amino]-5-methyl-pyridine-2-carboxylate (18)

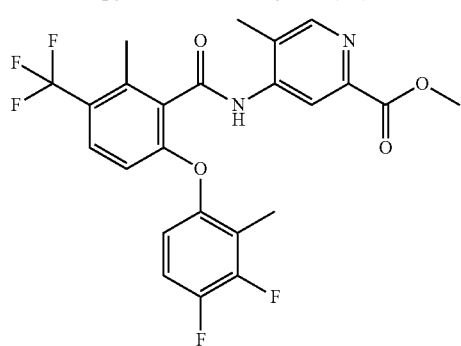 [SMILES: COC(=O)c1cc(NC(=O)c2c(Oc3ccc(F)c(F)c3C)ccc(C(F)(F)F)c2C)c(C)cn1]

Step 1: tertbutyl 2-bromo-6-fluoro-3-(trifluromethyl)benzaote

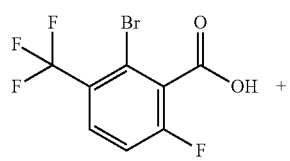

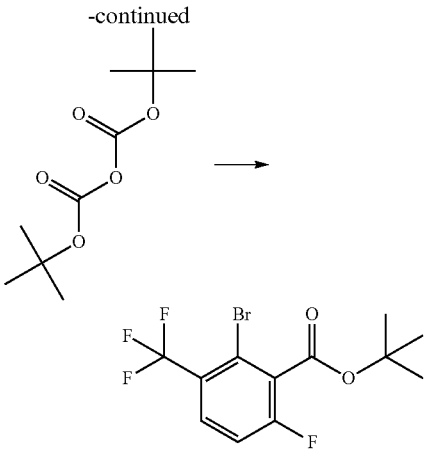

To a solution of 2-bromo-6-fluoro-3-(trifluoromethyl)benzoic acid (35.0 g, 116 mmol) in tert-butanol (700 mL) was added DMAP (3.0 g, 24.1 mmol) followed by tert-butoxycarbonyl tert-butyl carbonate (66.0 g, 69.5 mL, 296 mmol) at room temperature. The mixture was stirred at 40° C. overnight, then cooled to room temperature and concentrated in vacuo to provide a pale yellow oil. Hexanes (500 mL) were added and the resulting solid was filtered. The solids were washed with additional hexanes (500 mL), and the filtrate was washed with saturated NH$_4$Cl and brine, dried over Na$_2$SO$_4$, filtered and concentrated in vacuo to provide tert-butyl 2-bromo-6-fluoro-3-(trifluoromethyl)benzoate (38.4 g, 92%) as an off-white solid. $^1$H NMR (500 MHz, DMSO-$d_6$) δ 8.03 (dd, J=8.9, 5.6 Hz, 1H), 7.64 (t, J=8.6 Hz, 1H), 1.58 (s, 9H) ppm. ESI-MS m/z calc. 341.99, found 345.2 (M+1)⁺; LC/MS retention time (Method F): 4.09 minutes Step 2: tert-butyl 2-bromo-6-(3,4-difluoro-2-methyl-phenoxy)-3-(trifluoromethyl)benzoate

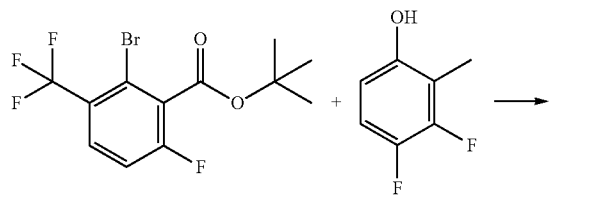

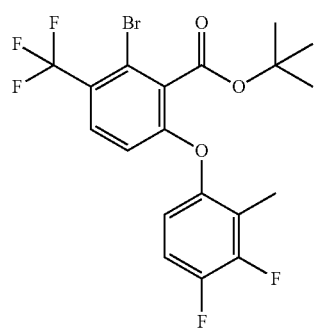

A stirring mixture of tert-butyl 2-bromo-6-fluoro-3-(trifluoromethyl)benzoate (3.0 g, 8.7 mmol), 3,4-difluoro-2-methyl-phenol (1.5 g, 10.4 mmol) and K₂CO₃ (2.4 g, 17.4 mmol) in DMSO (12 mL) was heated at 100° C. for 1 hour. The reaction mixture was cooled to room temperature and was then purified by silica gel column chromatography (1-20% ethyl acetate/hexanes) to provide tert-butyl 2-bromo-6-(3,4-difluoro-2-methyl-phenoxy)-3-(trifluoromethyl)benzoate (4.0 g, 98%) as a clear oil. ¹H NMR (400 MHz, CDCl₃) δ 7.55 (d, J=8.8 Hz, 1H), 7.04 (q, J=9.1 Hz, 1H), 6.76 (ddd, J=9.1, 4.1, 2.1 Hz, 1H), 6.61 (d, J=8.8 Hz, 1H), 2.16 (s, 3H), 1.59 (s, 9H) ppm.

Step 3: tert-butyl 6-(3,4-difluoro-2-methyl-phenoxy)-2-methyl-3-(trifluoromethyl)benzoate

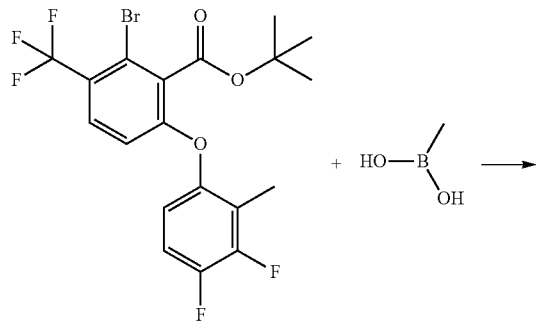

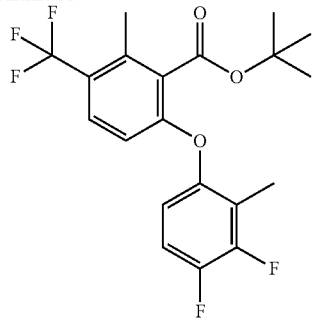

A microwave vial was loaded with tert-butyl 2-bromo-6-(3,4-difluoro-2-methyl-phenoxy)-3-(trifluoromethyl)benzoate (4.0 g, 8.6 mmol), methylboronic acid (2.6 g, 43 mmol), Pd(dppf)Cl₂ (700 mg, 0.857 mmol) and K₂CO₃ (3.5 g, 25 mmol). The microwave vial was capped, purged with nitrogen, and 1,4-dioxane (24 mL) and water (2.4 mL) were added via syringe. The mixture was heated at 120° C. for 30 minutes. Subsequently, the mixture was cooled to room temperature and was then directly purified by silica gel column chromatography (1-20% ethyl acetate/hexanes) to provide tert-butyl 6-(3,4-difluoro-2-methyl-phenoxy)-2-methyl-3-(trifluoromethyl)benzoate (3.3 g, 96%) as a clear oil. ¹H NMR (400 MHz, CDCl₃) δ 7.50 (d, J=8.8 Hz, 1H), 7.00 (q, J=9.1 Hz, 1H), 6.71 (ddd, J=9.1, 4.1, 2.1 Hz, 1H), 6.50 (d, J=8.8 Hz, 1H), 2.47 (q, J=1.7 Hz, 3H), 2.17 (s, 3H), 1.56 (s, 9H) ppm.

Step 4: 6-(3,4-difluoro-2-methyl-phenoxy)-2-methyl-3-(trifluoromethyl)benzoic acid

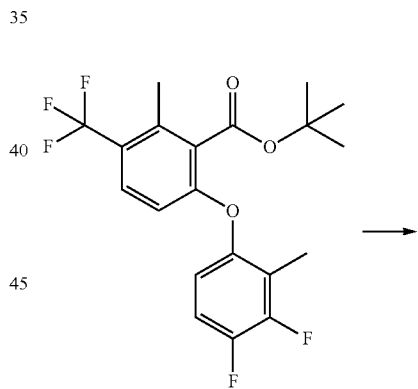

A solution of tert-butyl 6-(3,4-difluoro-2-methyl-phenoxy)-2-methyl-3-(trifluoromethyl)benzoate (3.3 g, 8.2 mmol) in TFA (95 mL, 1.2 mol), water (6 mL) and THF (13 mL) was stirred at room temperature for 1 hour. The solution was concentrated in vacuo, and the resulting residue was purified by silica gel chromatography (1-10% methanol/dichloromethane gradient) to provide 6-(3,4-difluoro-2-methyl-phenoxy)-2-methyl-3-(trifluoromethyl)benzoic acid (2.5 g, 88%) as a white solid. ¹H NMR (400 MHz, DMSO-d₆) δ 13.76 (s, 1H), 7.66 (d, J=8.8 Hz, 1H), 7.37 (q, J=9.4 Hz, 1H), 7.15-6.83 (m, 1H), 6.68 (d, J=8.8 Hz, 1H), 2.41 (s, 3H), 2.10 (s, 3H) ppm.

Step 5: 6-(3,4-difluoro-2-methyl-phenoxy)-2-methyl-3-(trifluoromethyl)benzoyl chloride

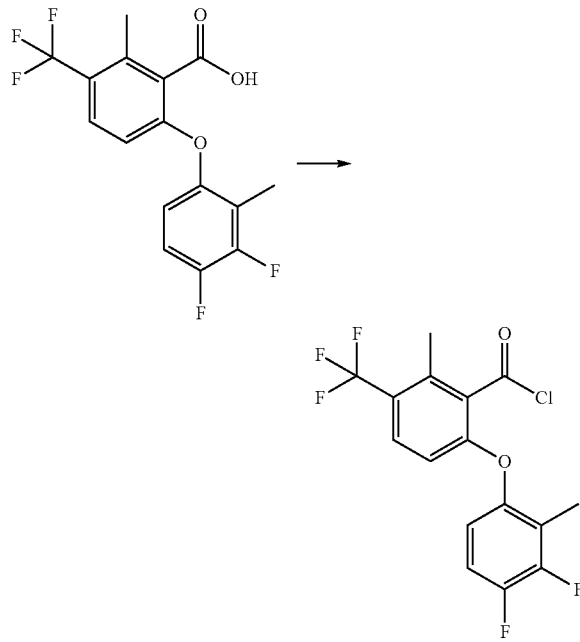

To a mixture of 6-(3,4-difluoro-2-methyl-phenoxy)-2-methyl-3-(trifluoromethyl)benzoic acid (300 mg, 0.866 mmol) and DMF (10 μL, 0.13 mmol) in dichloromethane (8 mL) at 0° C. was added oxalyl chloride (250 μL, 2.87 mmol) dropwise under nitrogen. The resulting mixture was stirred at 0° C. for 1 hour, and then warmed to room temperature and stirred for an additional 1 hour. The mixture was then concentrated in vacuo to provide 6-(3,4-difluoro-2-methyl-phenoxy)-2-methyl-3-(trifluoromethyl)benzoyl chloride.

Step 6: methyl 4-[[6-(3,4-difluoro-2-methyl-phenoxy)-2-methyl-3-(trifluoromethyl) benzoyl]amino]-5-methyl-pyridine-2-carboxylate (18)

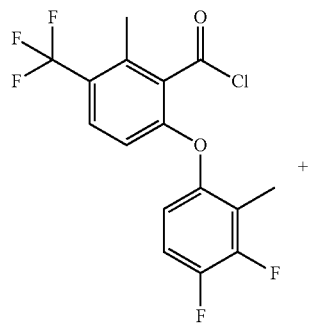

+

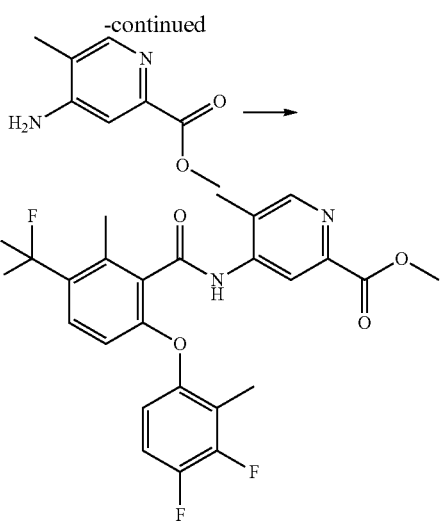

A solution of 6-(3,4-difluoro-2-methyl-phenoxy)-2-methyl-3-(trifluoromethyl)benzoyl chloride (50 mg, 0.14 mmol) in NMP (0.3 mL) was added to a mixture of methyl 4-amino-5-methyl-pyridine-2-carboxylate (34 mg, 0.21 mmol, Preparation 1) in NMP (0.3 mL) and DIEA (96 μL, 0.55 mmol). The resulting mixture was stirred at 50° C. for 16 hours, and then filtered and purified by HPLC (C18, 30-99% acetonitrile/5 mM HCl) to provide methyl 4-[[6-(3,4-difluoro-2-methyl-phenoxy)-2-methyl-3-(trifluoromethyl)benzoyl]amino]-5-methyl-pyridine-2-carboxylate (1.4 mg, 2%). ESI-MS m/z calc. 494.13, found 495.0 (M+1)⁺; LC-MS retention time (Method B): 1.83 minutes. ¹H NMR (400 MHz, DMSO-d₆) δ 10.61 (s, 1H), 8.55 (d, J=5.0 Hz, 2H), 7.72 (d, J=8.9 Hz, 1H), 7.40 (q, J=9.3 Hz, 1H), 7.13-6.97 (m, 2H), 6.71 (d, J=8.9 Hz, 1H), 3.88 (s, 3H), 2.49 (s, 4H), 2.31 (s, 3H), 2.12 (s, 2H) ppm.

Example 10

Methyl 4-[[6-(3,4-difluoro-2-methyl-phenoxy)-2-methyl-3-(trifluoromethyl)benzoyl]amino]-3-methyl-pyridine-2-carboxylate (19)

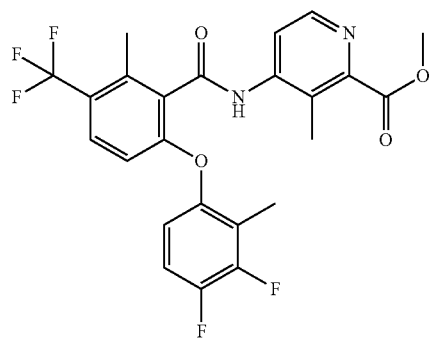 [SMILES: COC(=O)c1nccc(NC(=O)c2c(Oc3ccc(F)c(F)c3C)ccc(C(F)(F)F)c2C)c1C]

A solution of 6-(3,4-difluoro-2-methyl-phenoxy)-2-methyl-3-(trifluoromethyl)benzoyl chloride (50 mg, 0.14 mmol, see Example 9, step 5) in NMP (0.3 mL) was added to a mixture of methyl 4-amino-3-methyl-pyridine-2-carboxylate (34 mg, 0.21 mmol, Preparation 2) in NMP (0.3 mL) and DIEA (96 μL, 0.55 mmol). The resulting mixture was heated at 50° C. for 16 hours, then filtered and purified by HPLC (C18, 30-99% acetonitrile/5 mM HCl) to provide methyl 4-[[6-(3,4-difluoro-2-methyl-phenoxy)-2-methyl-3-(trifluoromethyl)benzoyl]amino]-3-methyl-pyridine-2-carboxylate (16.7 mg, 25%). ESI-MS m/z calc. 494.13, found 495.0 (M+1)$^+$; LC-MS retention time (Method B): 1.79 minutes. $^1$H NMR (400 MHz, DMSO-$d_6$) δ 10.62 (s, 1H), 8.43 (d, J=4.6 Hz, 1H), 7.89 (d, J=4.7 Hz, 1H), 7.71 (d, J=8.8 Hz, 1H), 7.38 (d, J=9.4 Hz, 1H), 7.12-6.88 (m, 1H), 6.70 (d, J=8.7 Hz, 1H), 3.86 (s, 3H), 2.54 (s, 3H), 2.27 (s, 3H), 2.12 (s, 3H) ppm.

Example 11

Methyl 5-[[2-fluoro-6-[2-methoxy-4-(trifluoromethoxy)phenoxy]-3-(trifluoromethyl)benzoyl]amino]pyridine-2-carboxylate (15)

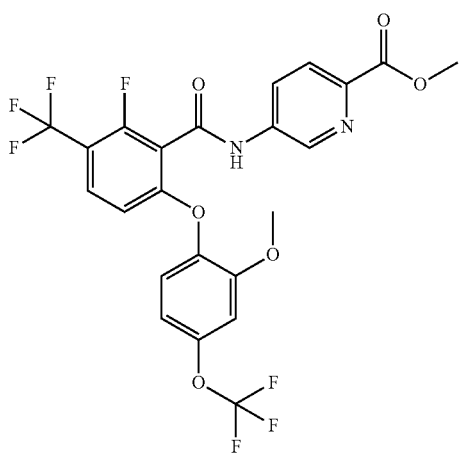 [SMILES: COC(=O)c1ccc(NC(=O)c2c(Oc3ccc(OC(F)(F)F)cc3OC)ccc(C(F)(F)F)c2F)cn1]

A solution of 2-fluoro-6-[2-methoxy-4-(trifluoromethoxy)phenoxy]-3-(trifluoromethyl)benzoyl chloride (see US 2019/0016671, Example 2, Steps 1-4, which is incorporated by reference) in dichloromethane (3 mL) was added dropwise to a solution of methyl 5-aminopyridine-2-carboxylate (395 mg, 2.60 mmol) in NMP (6 mL) and DIEA (1.05 mL, 6.03 mmol) at −10° C. The resulting mixture was warmed to room temperature over 16 hours, then diluted with ethyl acetate, washed with 50% saturated sodium bicarbonate solution, 1 M aqueous HCl and then brine. The solution was dried over anhydrous Na$_2$SO$_4$, filtered and concentrated in vacuo to provide methyl 5-[[2-fluoro-6-[2-methoxy-4-(trifluoromethoxy)phenoxy]-3-(trifluoromethyl)benzoyl]amino]pyridine-2-carboxylate (822 mg, 75%). ESI-MS m/z calc. 548.08, found 549.1 (M+1)$^+$; LC-MS retention time (Method B): 1.86 minutes. $^1$H NMR (400 MHz, DMSO-$d_6$) δ 11.47 (s, 1H), 8.91 (s, 1H), 8.36 (dd, J=8.6, 2.5 Hz, 1H), 8.12 (d, J=8.6 Hz, 1H), 7.82 (t, J=8.7 Hz, 1H), 7.37 (d, J=8.8 Hz, 1H), 7.26 (d, J=2.7 Hz, 1H), 7.05 (dd, J=8.8, 1.4 Hz, 1H), 6.69 (d, J=8.9 Hz, 1H), 3.87 (s, 3H), 3.78 (s, 3H) ppm.

Example 12

Methyl 4-[[2-fluoro-6-[2-methoxy-4-(trifluoromethoxy)phenoxy]-3-(trifluoromethyl)benzoyl]amino]-3-methyl-pyridine-2-carboxylate (21)

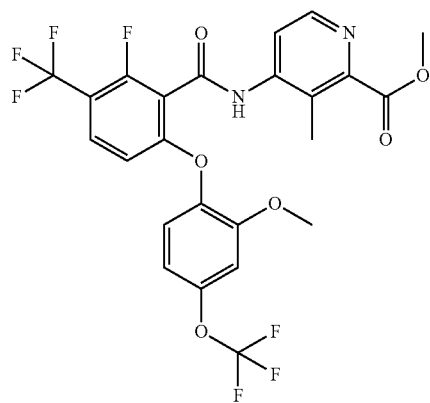 [SMILES: COC(=O)c1nccc(NC(=O)c2c(Oc3ccc(OC(F)(F)F)cc3OC)ccc(C(F)(F)F)c2F)c1C]

A solution of 2-fluoro-6-[2-methoxy-4-(trifluoromethoxy)phenoxy]-3-(trifluoromethyl)benzoyl chloride (50 mg, 0.12 mmol) in NMP (0.3 mL) was added to a mixture of methyl 4-amino-3-methyl-pyridine-2-carboxylate (29 mg, 0.17 mmol, Preparation 2) and DIEA (81 μL, 0.46 mmol) in NMP (0.3 mL). The resulting mixture was stirred at room temperature for 16 hours, then filtered and purified by HPLC (C18, 30-99% acetonitrile/5 mM HCl) to provide methyl 4-[[2-fluoro-6-[2-methoxy-4-(trifluoromethoxy)phenoxy]-3-(trifluoromethyl)benzoyl]amino]-3-methyl-pyridine-2-carboxylate (22.9 mg, 35%). ESI-MS m/z calc. 562.10, found 563.0 (M+1)$^+$; LC-MS retention time (Method B): 1.87 minutes. $^1$H NMR (400 MHz, DMSO-$d_6$) δ 10.72 (s, 1H), 8.46 (d, J=5.3 Hz, 1H), 7.90 (d, J=5.4 Hz, 1H), 7.81 (t, J=8.6 Hz, 1H), 7.39 (d, J=8.8 Hz, 1H), 7.30 (d, J=2.7 Hz, 1H), 7.08 (d, J=8.9 Hz, 1H), 6.66 (d, J=8.9 Hz, 1H), 3.88 (s, 3H), 3.81 (s, 3H), 2.31 (s, 3H) ppm.

Example 13

Methyl 4-[[2-fluoro-6-[3-fluoro-2-methyl-4-(trifluoromethoxy)phenoxy]-3-(trifluoromethyl)benzoyl]amino]-5-methyl-pyridine-2-carboxylate (17)

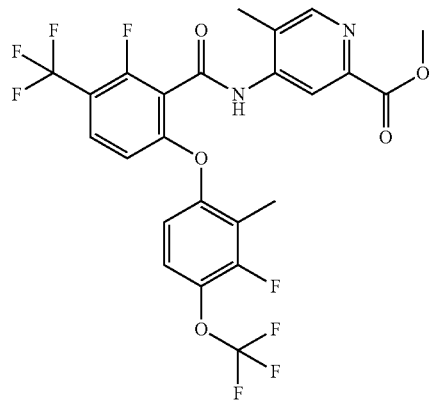 [SMILES: COC(=O)c1cc(NC(=O)c2c(Oc3ccc(OC(F)(F)F)c(F)c3C)ccc(C(F)(F)F)c2F)c(C)cn1]

Step 1: 1-bromo-3-fluoro-2-methyl-4-(trifluoromethoxy)benzene

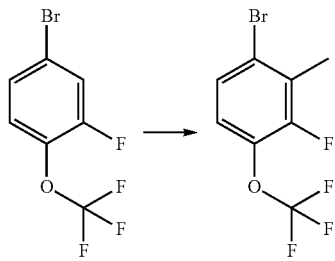

n-Butyllithium (14.5 mL of 1.6 M in hexanes, 23.2 mmol) was added to a stirring solution of diisopropylamine (3.0 mL, 21.4 mmol) in THF (50 mL) at −78° C. The resulting mixture was stirred for 20 minutes, then treated dropwise with 4-bromo-2-fluoro-1-(trifluoromethoxy)benzene (5.0 g, 19.3 mmol). The reaction was stirred at −78° C. for 20 minutes then treated with iodomethane (1.85 mL, 29.7 mmol). The mixture was stirred at −78° C. for an additional 30 minutes, then warmed to room temperature overnight. Aqueous $NH_4Cl$ (50 mL) and water were added to the mixture, which was then extracted with ethyl acetate (2×50 mL). The combined organic layers were concentrated in vacuo to provide 1-bromo-3-fluoro-2-methyl-4-(trifluoromethoxy)benzene (4.7 g, 89%). $^1H$ NMR (400 MHz, $CDCl_3$) δ 7.28 (dd, J=8.9, 2.0 Hz, 1H), 6.96 (dddt, J=9.0, 7.7, 1.3, 0.7 Hz, 1H), 2.30 (d, J=2.7 Hz, 3H) ppm.

Step 2:
3-fluoro-2-methyl-4-(trifluoromethoxy)phenol

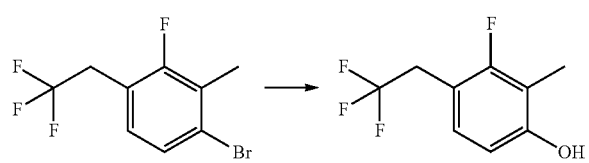

To a solution of 1-bromo-3-fluoro-2-methyl-4-(trifluoromethoxy)benzene (2.184 g, 7.999 mmol) in dioxane (11.4 mL) and water (7 mL) was added solid KOH (2.3 g, 41 mmol). The resulting solution was stirred for 15 minutes (until solids were dissolved). $Pd(dba)_2$ (115 mg, 0.200 mmol) and tBuXPhos (85 mg, 0.20 mmol) were added and the resulting mixture was heated at 90° C. for 12 hours. The resulting mixture was cooled to room temperature, partitioned between water and MTBE, and the biphasic mixture was filtered. The organic phase was isolated and concentrated in vacuo. The resulting oil was purified by silica gel chromatography (ethyl acetate/heptanes gradient) to provide 3-fluoro-2-methyl-4-(trifluoromethoxy)phenol (1.57 g, 93%). ESI-MS m/z calc. 210.03, found 209.3 (M−1)⁻; LC-MS retention time (Method G): 1.99 minutes. $^1H$ NMR (400 MHz, $CDCl_3$) δ 7.02 (ddtd, J=9.0, 8.4, 1.2, 0.6 Hz, 1H), 6.56 (dd, J=8.9, 1.9 Hz, 1H), 5.38 (s, 1H), 2.21 (dt, J=2.2, 0.5 Hz, 3H) ppm.

Step 3: 2-fluoro-6-[3-fluoro-2-methyl-4-(trifluoromethoxy)phenoxy]-3-(trifluoromethyl)benzoic acid

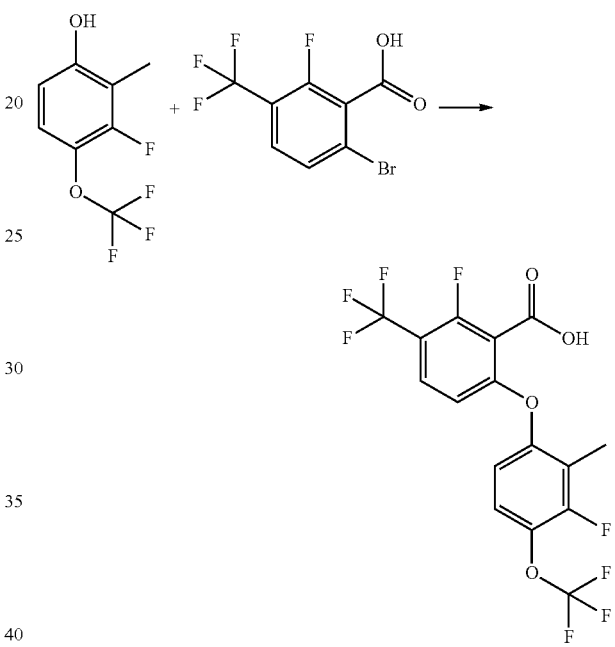

To a pressure flask was added 6-bromo-2-fluoro-3-(trifluoromethyl)benzoic acid (663 mg, 2.31 mmol), 3-fluoro-2-methyl-4-(trifluoromethoxy)phenol (450 mg, 2.14 mmol), $Cs_2CO_3$ (1.07 g, 3.28 mmol) and toluene (15 mL). The mixture was bubbled with nitrogen for 10 minutes, then copper (I) iodide (420 mg, 2.21 mmol) added. The flask was flushed with nitrogen, capped and heated at 100° C. with vigorous stirring for 16 hours. The mixture was then cooled and diluted with ethyl acetate and water. The aqueous layer was acidified with 1 M aqueous HCl and extracted with ethyl acetate (3×). The combined organic fractions were washed with brine, dried over $Na_2SO_4$ and concentrated in vacuo. HPLC purification (C18, 10-99% acetonitrile/5 mM HCl) provided 2-fluoro-6-[3-fluoro-2-methyl-4-(trifluoromethoxy)phenoxy]-3-(trifluoromethyl)benzoic acid (437 mg, 49%). ESI-MS m/z calc. 416.03, found 417.1 (M+1)⁺; LC/MS retention time (Method B): 1.92 minutes. $^1H$ NMR (400 MHz, DMSO-$d_6$) δ 14.22 (s, 1H), 7.81 (t, J=8.6 Hz, 1H), 7.50 (t, J=8.8 Hz, 1H), 7.06 (dd, J=9.2, 1.8 Hz, 1H), 6.85 (d, J=8.8 Hz, 1H), 2.15 (d, J=2.1 Hz, 3H) ppm.

Step 4: methyl 4-[[2-fluoro-6-[3-fluoro-2-methyl-4-(trifluoromethoxy)phenoxy]-3-(trifluoromethyl)benzoyl]amino]-5-methyl-pyridine-2-carboxylate (17)

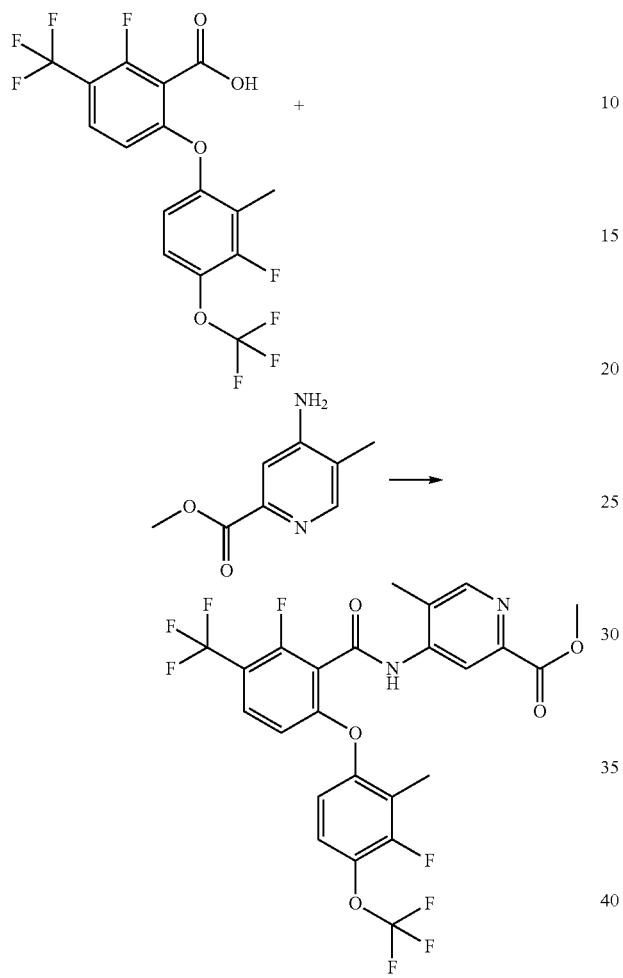

A solution of 2-fluoro-6-[3-fluoro-2-methyl-4-(trifluoromethoxy)phenoxy]-3-(trifluoromethyl)benzoic acid (40 mg, 0.096 mmol), DMF (0.6 μL, 0.007 mmol) and dichloromethane (0.5 mL) was cooled to 0° C. in an ice bath. To this solution was added oxalyl chloride (17 μL, 0.19 mmol). The resulting mixture was stirred in the ice bath for 10 minutes and then at room temperature for 50 minutes. The mixture was concentrated in vacuo. The resulting residue was dissolved in NMP (0.4 mL) and slowly added to a solution of methyl 4-amino-5-methyl-pyridine-2-carboxylate (48 mg, 0.29 mmol, Preparation 1), DIEA (100 μL, 0.58 mmol) and NMP (0.2 mL). The reaction was warmed to room temperature and stirred for 16 hours at room temperature. The mixture was then filtered and purified by HPLC (C18, acetonitrile/5 mM HCl gradient) to provide methyl 4-[[2-fluoro-6-[3-fluoro-2-methyl-4-(trifluoromethoxy)phenoxy]-3-(trifluoromethyl)benzoyl]amino]-5-methyl-pyridine-2-carboxylate (28 mg, 52%). ESI-MS m/z calc. 564.09, found 565.2 (M+1)$^+$; LC-MS retention time (Method B): 1.94 minutes. H NMR (400 MHz, DMSO-d$_6$) δ 10.70 (s, 1H), 8.56 (s, 1H), 8.49 (s, 1H), 7.87 (t, J=8.6 Hz, 1H), 7.53 (t, J=8.9 Hz, 1H), 7.13 (d, J=9.3 Hz, 1H), 6.87 (d, J=8.9 Hz, 1H), 3.88 (s, 3H), 2.30 (s, 3H), 2.16 (d, J=2.1 Hz, 3H) ppm.

Example 14

Methyl 4-[[6-[3-fluoro-2-methyl-4-(trifluoromethoxy)phenoxy]-2-methyl-3-(trifluoromethyl)benzoyl]amino]-5-methyl-pyridine-2-carboxylate (16)

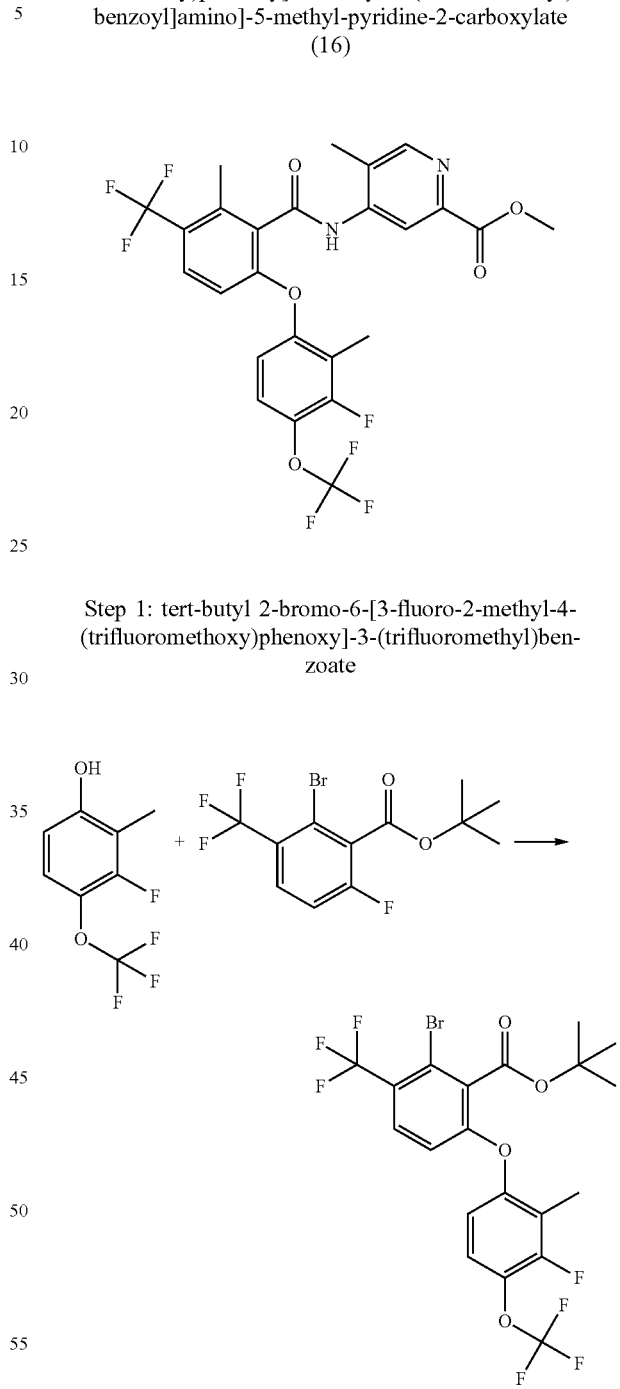

Step 1: tert-butyl 2-bromo-6-[3-fluoro-2-methyl-4-(trifluoromethoxy)phenoxy]-3-(trifluoromethyl)benzoate To a stirring solution of tert-butyl 2-bromo-6-fluoro-3-(trifluoromethyl)benzoate (1.66 g, 4.84 mmol) and 3-fluoro-2-methyl-4-(trifluoromethoxy)phenol (1.03 g, 4.90 mmol; see Example 13, step 2) in DMSO (6.5 mL) in a pressure vessel was added K$_2$CO$_3$ (1.35 g, 9.77 mmol, 325 mesh). The vessel was sealed and the resulting suspension was heated at 100° C. for 16 hours. After cooling to room temperature, the mixture was diluted with ethyl acetate and washed with water and brine. The organic phase was isolated and dried over Na$_2$SO$_4$, filtered and concentrated in vacuo. The resulting material was purified by silica gel chromatography (0-10% ethyl acetate/hexanes) to provide tert-butyl 2-bromo-6-[3-fluoro-2-methyl-4-(trifluoromethoxy)phenoxy]-3-(trifluoromethyl)benzoate (1.49 g, 58%). ESI-MS m/z calc. 532.01, found 476.9 (M-tert-butyl+1)$^+$; LC-MS retention time (Method A): 0.92 minutes. Step 2: tert-butyl 6-[3-fluoro-2-methyl-4-(trifluoromethoxy)phenoxy]-2-methyl-3-(trifluoromethyl)benzoate

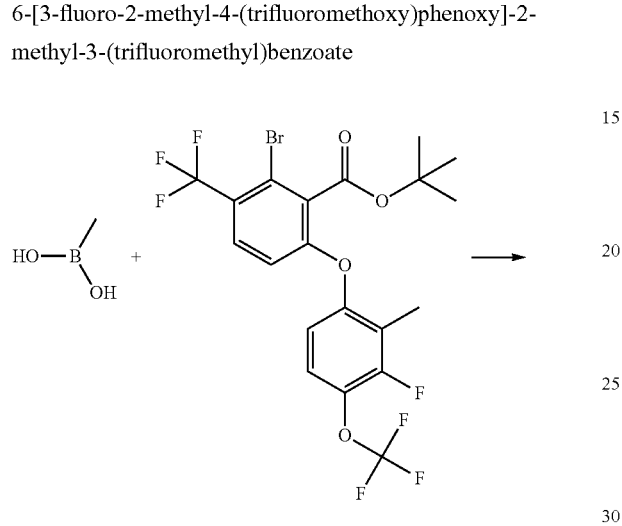

A mixture of tert-butyl 2-bromo-6-[3-fluoro-2-methyl-4-(trifluoromethoxy)phenoxy]-3-(trifluoromethyl)benzoate (1.49 g, 2.79 mmol), Cs$_2$CO$_3$ (2.736 g, 8.397 mmol) and methylboronic acid (841 mg, 14.1 mmol) in dioxane (22 mL) was sparged with nitrogen for 10 minutes. Pd(dppf)Cl$_2$ (52 mg, 0.071 mmol) was added and the mixture stirred at 90° C. for 4 hours. The resulting mixture was filtered over Celite and the collected solids were washed with dioxane. The filtrate was concentrated in vacuo, then diluted with heptane/MTBE 4:1 (100 mL) and water (100 mL). The resulting mixture was washed with water and brine, dried over Na$_2$SO$_4$, filtered and concentrated in vacuo to provide tert-butyl 6-[3-fluoro-2-methyl-4-(trifluoromethoxy)phenoxy]-2-methyl-3-(trifluoromethyl)benzoate (1.23 g, 94%) as a yellow liquid. ESI-MS m/z calc. 468.12, found 413.1 (M-tert-butyl+1)$^+$; LC-MS retention time (Method A): 0.96 minutes.

Step 3: 6-[3-fluoro-2-methyl-4-(trifluoromethoxy)phenoxy]-2-methyl-3-(trifluoromethyl)benzoic acid

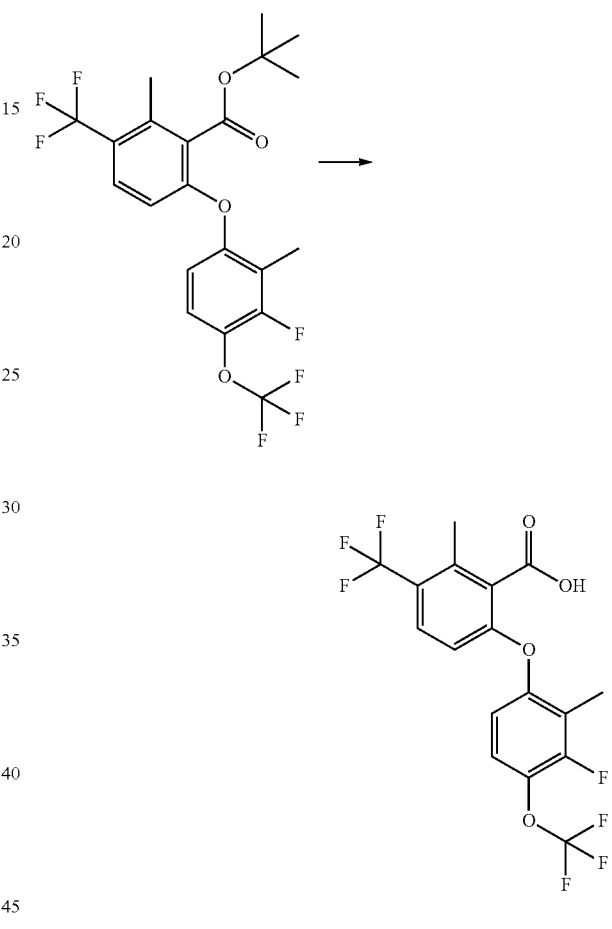

A solution of tert-butyl 6-[3-fluoro-2-methyl-4-(trifluoromethoxy)phenoxy]-2-methyl-3-(trifluoromethyl)benzoate (1.23 g, 2.63 mmol) in 2-propanol (6 mL) was treated with aqueous HCl (3 mL of 6 M, 18 mmol) and stirred at 90° C. for 1 hour. The mixture was cooled and diluted with ethyl acetate and water. The phases were separated and the aqueous phase was extracted with additional ethyl acetate (3×). The combined organic phases were washed with water and brine, dried over Na$_2$SO$_4$, filtered through Celite and concentrated in vacuo. HPLC purification (C18, 1-99% CH$_3$CN/5 mM HCl) provided 6-[3-fluoro-2-methyl-4-(trifluoromethoxy)phenoxy]-2-methyl-3-(trifluoromethyl)benzoic acid (579.3 mg, 53%) as an orange viscous liquid. ESI-MS m/z calc. 412.05, found 413.1 (M+1)$^+$; LC-MS retention time (Method E): 2.86 minutes.

Step 4: 6-[3-fluoro-2-methyl-4-(trifluoromethoxy)phenoxy]-2-methyl-3-(trifluoromethyl)benzoyl chloride

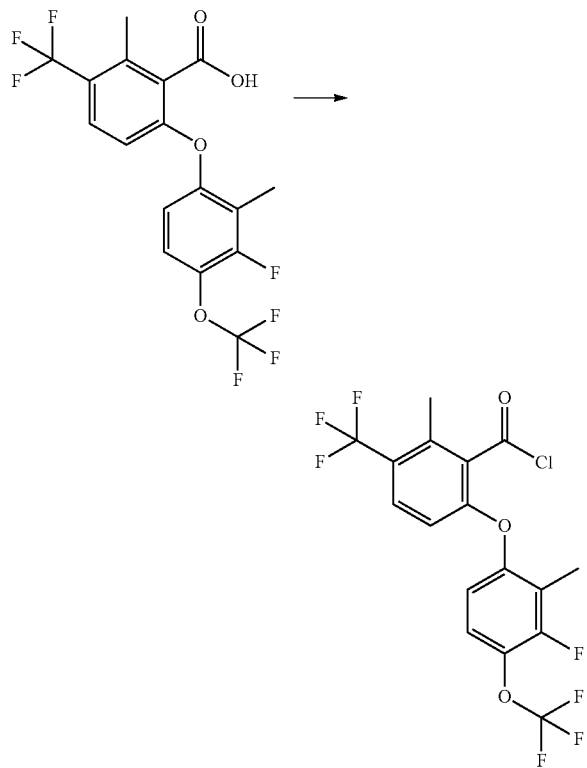

To a solution of 6-[3-fluoro-2-methyl-4-(trifluoromethoxy)phenoxy]-2-methyl-3-(trifluoromethyl)benzoic acid (480 mg, 1.16 mmol) and DMF (15 μL, 0.19 mmol) in dichloromethane (8 mL) at 0° C. was added oxalyl chloride (285 μL, 3.26 mmol) dropwise under nitrogen. The ice bath was removed after 10 minutes and the mixture was stirred at room temperature for 1 hour. The resulting mixture was concentrated in vacuo to provide 6-[3-fluoro-2-methyl-4-(trifluoromethoxy)phenoxy]-2-methyl-3-(trifluoromethyl)benzoyl chloride which was used in the next step without further purification.

Step 5: methyl 4-[[6-[3-fluoro-2-methyl-4-(trifluoromethoxy)phenoxy]-2-methyl-3-(trifluoromethyl)benzoyl]amino]-5-methyl-pyridine-2-carboxylate (16)

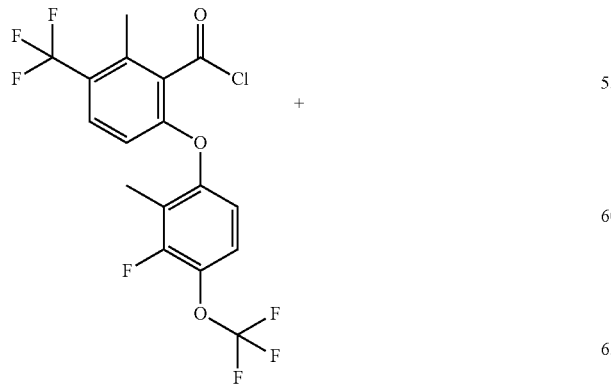

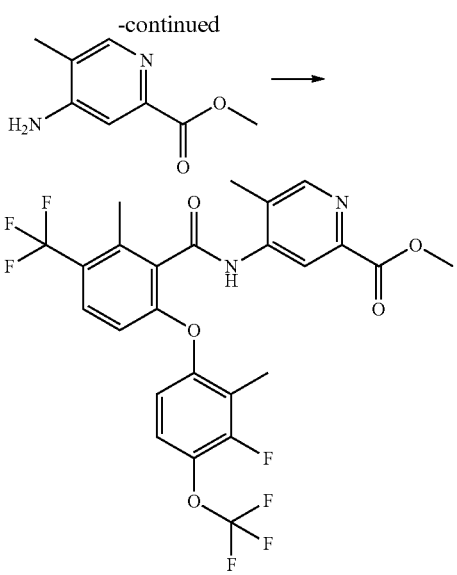

To a solution of methyl 4-amino-5-methyl-pyridine-2-carboxylate (46 mg, 0.28 mmol, Preparation 1) and DIEA (121 μL, 0.697 mmol) in NMP (500 μL) at 0° C. was added a solution of 6-[3-fluoro-2-methyl-4-(trifluoromethoxy)phenoxy]-2-methyl-3-(trifluoromethyl)benzoyl chloride (60 mg, 0.14 mmol) in NMP (500 μL). The mixture was stirred at 75° C. for 11 hours, and then was filtered and purified by HPLC (C18, 1-99% CH$_3$CN/5 mM HCl) to provide methyl 4-[[6-[3-fluoro-2-methyl-4-(trifluoromethoxy)phenoxy]-2-methyl-3-(trifluoromethyl)benzoyl]amino]-5-methyl-pyridine-2-carboxylate (hydrochloride salt) (14.2 mg, 18%). ESI-MS m/z calc. 560.12, found 561.2 (M+1)$^+$; LC-MS retention time (Method E): 2.81 minutes. $^1$H NMR (400 MHz, DMSO-d$_6$) δ 10.57 (s, 1H), 8.54 (s, 1H), 8.53 (s, 1H), 7.76 (d, J=8.8 Hz, 1H), 7.50 (t, J=8.9 Hz, 1H), 7.05 (dd, J=9.1, 1.8 Hz, 1H), 6.85 (d, J=8.8 Hz, 1H), 3.87 (s, 3H), 2.49 (s, 3H), 2.28 (s, 3H), 2.15 (d, J=2.1 Hz, 3H) ppm.

Example 15

Methyl 5-[[2-fluoro-6-[3-fluoro-2-methoxy-4-(trifluoromethoxy)phenoxy]-3-(trifluoromethyl)benzoyl]amino]pyridine-2-carboxylate (14)

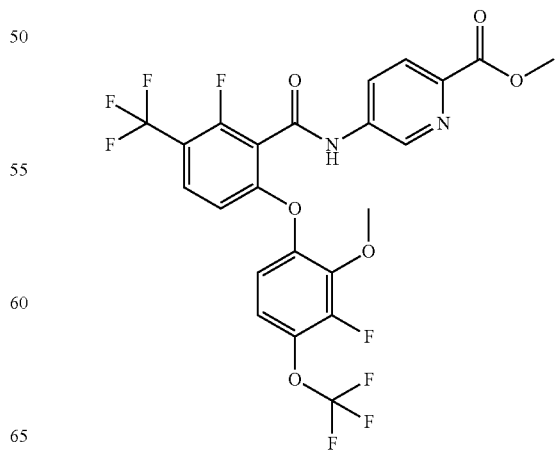

Step 1: 3-fluoro-2-methoxy-4-(trifluoromethoxy)phenol

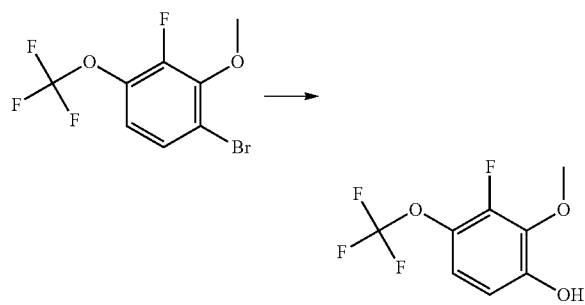

To a solution of 1-bromo-3-fluoro-2-methoxy-4-(trifluoromethoxy)benzene (900 mg, 2.52 mmol) in dioxane (4 mL) was added tris(dibenzylideneacetone)dipalladium (116 mg, 0.127 mmol), tBuXPhos (112 mg, 0.264 mmol) and KOH (425 mg, 7.58 mmol) followed by water (2 mL). The mixture was heated at 90° C. overnight, then cooled to room temperature and partitioned between MTBE (20 mL) and water (10 mL). The aqueous layer was separated and acidified to pH 1 by addition of 2 M aqueous HCL. The aqueous layer was then extracted with MTBE (2×20 mL). The combined organics were washed with brine, dried over MgSO$_4$, filtered and concentrated in vacuo to provide 3-fluoro-2-methoxy-4-(trifluoromethoxy)phenol (456 mg, 75%) as an orange oil. ESI-MS m/z calc. 226.03, found 225.6 (M−1)$^-$; LC-MS retention time (Method H): 0.87 minutes. $^1$H NMR (400 MHz, DMSO-d$_6$) δ 10.18 (s, 1H), 7.14-7.01 (m, 1H), 6.73 (dd, J=9.2, 2.2 Hz, 1H), 3.83 (s, 3H) ppm.

Step 2: 2-fluoro-6-[3-fluoro-2-methoxy-4-(trifluoromethoxy)phenoxy]-3-(trifluoromethyl)benzoic acid

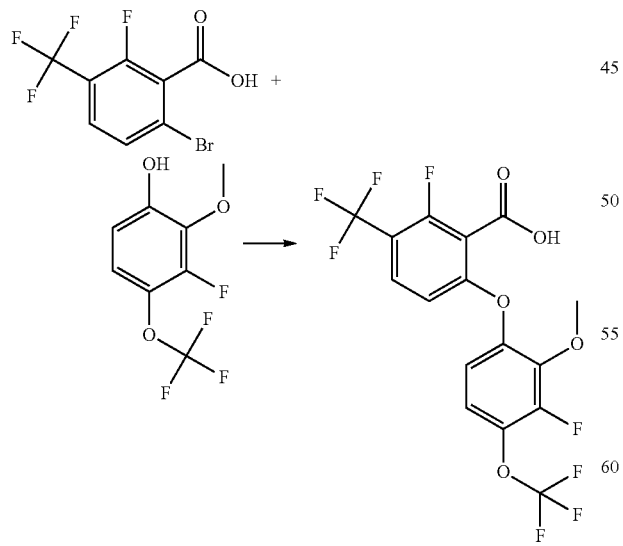

A mixture of 6-bromo-2-fluoro-3-(trifluoromethyl)benzoic acid (35.0 g, 122 mmol), 3-fluoro-2-methoxy-4-(trifluoromethoxy)phenol (27.6 g, 122 mmol) and Cs$_2$CO$_3$ (79.5 g, 244 mmol) in degassed toluene (657 mL, bubbled with nitrogen for 20 minutes) was stirred for 10 minutes. Copper (I) iodide (4.65 g, 24.4 mmol) was added and the mixture heated at 100° C. for 1 hour. The mixture was cooled to room temperature and diluted with MTBE (350 mL). The mixture was washed with 4 M aqueous NH$_4$Cl (4×200 mL), 1 M aqueous HCl (183 mL) and brine (125 mL). The organic layer was then dried over MgSO$_4$ and concentrated in vacuo to provide an oil (52.1 g). The resulting oil was crystallized from heptane (225 mL) to provide 2-fluoro-6-[3-fluoro-2-methoxy-4-(trifluoromethoxy)phenoxy]-3-(trifluoromethyl)benzoic acid (39.0 g, 73%). $^1$H NMR (400 MHz, DMSO-d$_6$) δ 14.22 (s, 1H), 7.80 (t, J=8.6 Hz, 1H), 7.45-7.33 (m, 1H), 7.19 (dd, J=9.3, 2.2 Hz, 1H), 6.87 (d, J=8.9 Hz, 1H), 3.87 (s, 3H) ppm.

Step 3: methyl 5-[[2-fluoro-6-[3-fluoro-2-methoxy-4-(trifluoromethoxy)phenoxy]-3-(trifluoromethyl)benzoyl]amino]pyridine-2-carboxylate (14)

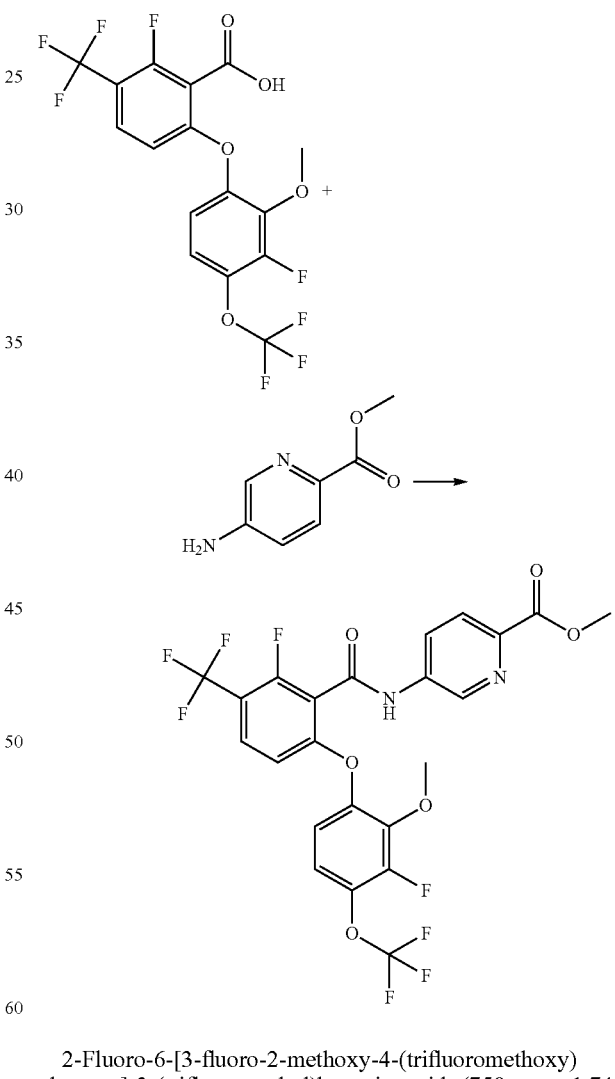

2-Fluoro-6-[3-fluoro-2-methoxy-4-(trifluoromethoxy)phenoxy]-3-(trifluoromethyl)benzoic acid (750 mg, 1.74 mmol) in anhydrous dichloromethane (6 mL) and DMF (6 µL, 0.08 mmol) at 0° C. was treated with oxalyl chloride (230 µL, 2.64 mmol) under nitrogen. The resulting mixture was stirred for 5 minutes then removed from the ice bath and warmed to room temperature over 30 minutes, then warmed briefly to ~35° C. until no more bubbling was observed. The mixture was concentrated in vacuo to provide 2-fluoro-6-[3-fluoro-2-methoxy-4-(trifluoromethoxy)phenoxy]-3-(trifluoromethyl)benzoyl chloride. The acid chloride was dissolved in dichloromethane (3 mL) and added dropwise to a solution of methyl 5-aminopyridine-2-carboxylate (396 mg, 2.60 mmol) in NMP (7.5 mL) and DIEA (950 µL, 5.45 mmol) at −10° C. The mixture was warmed to room temperature and stirred for 16 hours. The mixture was then diluted with ethyl acetate and washed with 50% saturated sodium bicarbonate solution, 1 M aqueous HCl and brine, dried over anhydrous Na$_2$SO$_4$, filtered and concentrated in vacuo to provide methyl 5-[[2-fluoro-6-[3-fluoro-2-methoxy-4-(trifluoromethoxy)phenoxy]-3-(trifluoromethyl)benzoyl]amino]pyridine-2-carboxylate (820 mg, 83%). ESI-MS m/z calc. 566.07, found 567.0 (M+1)$^+$; LC-MS retention time (Method B): 1.89 minutes. $^1$H NMR (400 MHz, DMSO-d$_6$) δ 11.52 (s, 1H), 8.89 (d, J=2.5 Hz, 1H), 8.36 (dd, J=8.6, 2.5 Hz, 1H), 8.11 (d, J=8.6 Hz, 1H), 7.87 (t, J=8.6 Hz, 1H), 7.40 (t, J=8.6 Hz, 1H), 7.23 (dd, J=9.3, 2.1 Hz, 1H), 6.93 (d, J=8.9 Hz, 1H), 3.87 (s, 3H), 3.86 (s, 3H) ppm.

Example 16

Methyl 2-[[2-fluoro-6-[3-fluoro-2-methoxy-4-(trifluoromethoxy)phenoxy]-3-(trifluoromethyl)benzoyl]amino]pyridine-4-carboxylate (23)

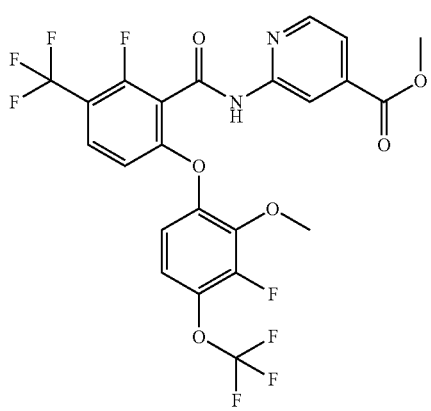 [SMILES: COC(=O)c1ccnc(NC(=O)c2c(Oc3ccc(OC(F)(F)F)c(F)c3OC)ccc(C(F)(F)F)c2F)c1]

2-Fluoro-6-[3-fluoro-2-methoxy-4-(trifluoromethoxy)phenoxy]-3-(trifluoromethyl)benzoyl chloride (50 mg, 0.11 mmol) in NMP (0.3 mL) was added to methyl 2-aminopyridine-4-carboxylate (20 mg, 0.13 mmol) and DIEA (77 µL, 0.44 mmol) in NMP (0.3 mL). The resulting mixture was stirred at 50° C. for 2 hours, then filtered and purified by HPLC (C18, 30-99% acetonitrile/5 mM HCl) to provide methyl 2-[[2-fluoro-6-[3-fluoro-2-methoxy-4-(trifluoromethoxy)phenoxy]-3-(trifluoromethyl)benzoyl]amino]pyridine-4-carboxylate (10.7 mg, 17%). ESI-MS m/z calc. 566.07, found 567.0 (M+1)$^+$; LC-MS retention time (Method E): 2.94 minutes. $^1$H NMR (400 MHz, DMSO-d$_6$) δ 11.75 (s, 1H), 8.66 (s, 1H), 8.58 (d, J=5.1 Hz, 1H), 7.83 (t, J=8.6 Hz, 1H), 7.65 (d, J=4.8 Hz, 1H), 7.40 (t, J=8.6 Hz, 1H), 7.21 (d, J=9.7 Hz, 1H), 6.90 (d, J=8.9 Hz, 1H), 3.92 (s, 3H), 3.86 (s, 3H) ppm.

Example 17

Methyl 4-[[6-[2-chloro-3-fluoro-4-(trifluoromethoxy)phenoxy]-2-fluoro-3-(trifluoromethyl)benzoyl]amino]-5-methyl-pyridine-2-carboxylate (20)

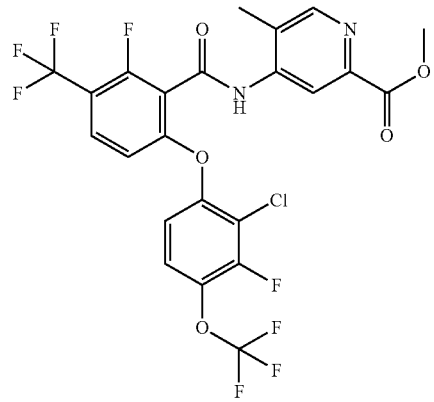 [SMILES: COC(=O)c1cc(NC(=O)c2c(Oc3ccc(OC(F)(F)F)c(F)c3Cl)ccc(C(F)(F)F)c2F)c(C)cn1]

Step 1: 2-[3-fluoro-4-(trifluoromethoxy)phenoxy]tetrahydropyran

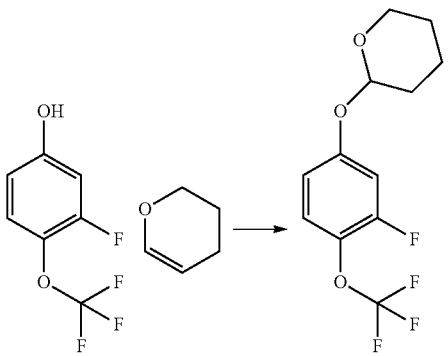

To a stirring solution of 3-fluoro-4-(trifluoromethoxy)phenol (10.0 g, 51.0 mmol) and concentrated HCl (43 µL of 12 M, 0.52 mmol) in dichloromethane (150 mL) was added dropwise a solution of 3,4-dihydro-2H-pyran (7.0 mL, 76.7 mmol) in dichloromethane (40 mL). The resulting mixture was stirred at room temperature for 2 hours, and then washed with 1 M aqueous NaOH (2×). The organic layer was dried over MgSO$_4$, filtered and concentrated in vacuo. Purification via silica gel chromatography (0-20% ethyl acetate/hexanes gradient) provided 2-[3-fluoro-4-(trifluoromethoxy)phenoxy]tetrahydropyran (10.4 g, 73%) as a colorless oil. $^1$H NMR (400 MHz, CDCl$_3$) δ 7.19 (td, J=8.8, 1.2 Hz, 1H), 6.92 (dd, J=11.8, 2.8 Hz, 1H), 6.81 (ddd, J=9.1, 2.9, 1.6 Hz, 1H), 5.37 (t, J=3.2 Hz, 1H), 3.85 (ddd, J=11.3, 9.9, 3.1 Hz, 1H), 3.62 (dtd, J=11.4, 4.1, 1.4 Hz, 1H), 2.04-1.91 (m, 1H), 1.89-1.83 (m, 2H), 1.77-1.55 (m, 3H) ppm.

Step 2: 2-[2-chloro-3-fluoro-4-(trifluoromethoxy)phenoxy]tetrahydropyran

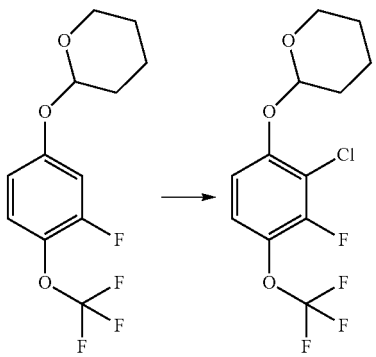 [SMILES: Fc1cc(OC2CCCCO2)ccc1OC(F)(F)F ; Fc1c(OC(F)(F)F)ccc(OC2CCCCO2)c1Cl]

A solution of 2-[3-fluoro-4-(trifluoromethoxy)phenoxy]tetrahydropyran (3.0 g, 10.7 mmol) in THF (48 mL) was cooled to −78° C. To this solution was added a solution of (diisopropylamino)lithium (7.0 mL of 2.0 M in THF/heptane/ethylbenzene, 14.0 mmol) over 5 minutes. After stirring for 1 hour at −78° C., a suspension of N-chlorosuccinimide (2.15 g, 16.1 mmol) in THF (1 mL) was added dropwise. The resulting mixture was stirred at −78° C. for 30 minutes, then slowly warmed to room temperature. The mixture was stirred at room temperature for 16 hours, and then diluted with saturated aqueous NH$_4$Cl solution. The aqueous phase was isolated and extracted with diethyl ether (3×). The combined organic phases were dried over Na$_2$SO$_4$, filtered and concentrated in vacuo. Purification via silica gel chromatography (ethyl acetate/hexanes gradient) provided a colorless oil, which was further purified by HPLC (C18, CH$_3$CN/water gradient) to provide 2-[2-chloro-3-fluoro-4-(trifluoromethoxy)phenoxy]tetrahydropyran (1.0 g, 30%) as a colorless oil. $^1$H NMR (400 MHz, CDCl$_3$) δ 7.15 (ddd, J=9.4, 8.2, 1.3 Hz, 1H), 6.98 (dd, J=9.4, 2.1 Hz, 1H), 5.51 (t, J=2.8 Hz, 1H), 3.84 (td, J=11.0, 3.0 Hz, 1H), 3.67-3.60 (m, 1H), 2.14-1.94 (m, 2H), 1.95-1.83 (m, 1H), 1.80-1.58 (m, 3H) ppm.

Step 3: 2-chloro-3-fluoro-4-(trifluoromethoxy)phenol

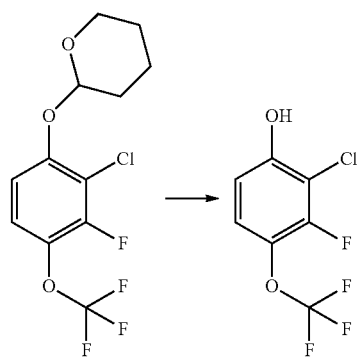 [SMILES: Fc1c(OC(F)(F)F)ccc(OC2CCCCO2)c1Cl ; Oc1ccc(OC(F)(F)F)c(F)c1Cl]

2-[2-Chloro-3-fluoro-4-(trifluoromethoxy)phenoxy]tetrahydropyran (2.5 g, 7.9 mmol) was dissolved in a solution of HCl in dioxane (40 mL of 4.0 M, 160 mmol). The resulting mixture was stirred at room temperature for 16 hours and then concentrated in vacuo. The residue was treated with 2 M aqueous NaOH (pH ~10) and washed with diethyl ether. The aqueous phase was acidified with 1 M aqueous HCl and extracted with diethyl ether (3×). The combined organic phases were dried over MgSO$_4$, filtered and concentrated in vacuo to provide 2-chloro-3-fluoro-4-(trifluoromethoxy)phenol (1.7 g, 93%) as a colorless oil. $^1$H NMR (400 MHz, CDCl$_3$) δ 7.16 (ddd, J=9.3, 8.0, 1.1 Hz, 1H), 6.84 (dd, J=9.2, 2.2 Hz, 1H), 5.67 (s, 1H) ppm.

Step 4: 6-[2-chloro-3-fluoro-4-(trifluoromethoxy)phenoxy]-2-fluoro-3-(trifluoromethyl)benzoic acid

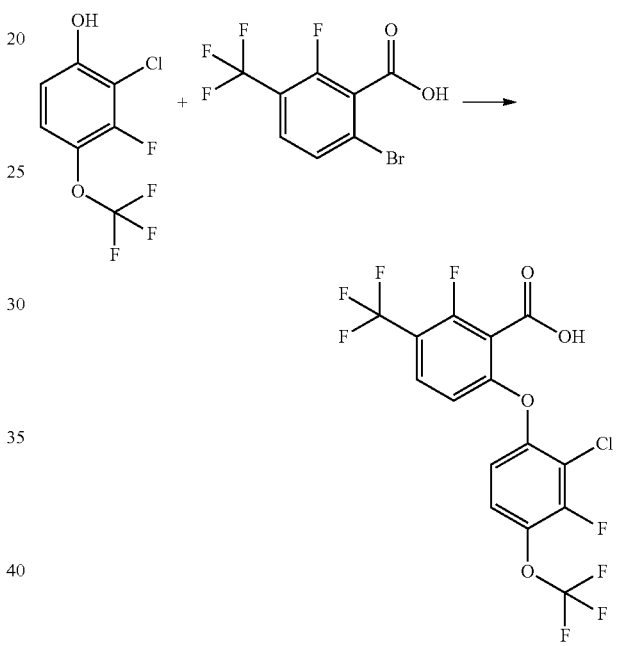

To a pressure flask was added 6-bromo-2-fluoro-3-(trifluoromethyl)benzoic acid (818 mg, 2.85 mmol), 2-chloro-3-fluoro-4-(trifluoromethoxy)phenol (610 mg, 2.65 mmol), Cs$_2$CO$_3$ (1.3 g, 4.0 mmol) and toluene (20 mL). The mixture was bubbled with nitrogen for 10 minutes, then copper (I) iodide (520 mg, 2.73 mmol) added. The flask was flushed with nitrogen, capped and heated at 100° C. with vigorous stirring for 16 hours. The mixture was cooled and then diluted with water and ethyl acetate, and the layers were separated. The aqueous phase was acidified with 1 M aqueous HCl and extracted with ethyl acetate (3×). The combined organic phases were washed with brine, dried over Na$_2$SO$_4$ and concentrated in vacuo. HPLC purification (C18, acetonitrile/water gradient) provided 6-[2-chloro-3-fluoro-4-(trifluoromethoxy)phenoxy]-2-fluoro-3-(trifluoromethyl)benzoic acid (724 mg, 63%). $^1$H NMR (400 MHz, DMSO-d$_6$) δ 14.26 (s, 1H), 7.86 (t, J=8.6 Hz, 1H), 7.69 (t, J=8.8 Hz, 1H), 7.25 (dd, J=9.3, 2.1 Hz, 1H), 7.03 (d, J=8.8 Hz, 1H) ppm.

Step 5: methyl 4-[[6-[2-chloro-3-fluoro-4-(trifluoromethoxy)phenoxy]-2-fluoro-3-(trifluoromethyl)benzoyl]amino]-5-methyl-pyridine-2-carboxylate (20)

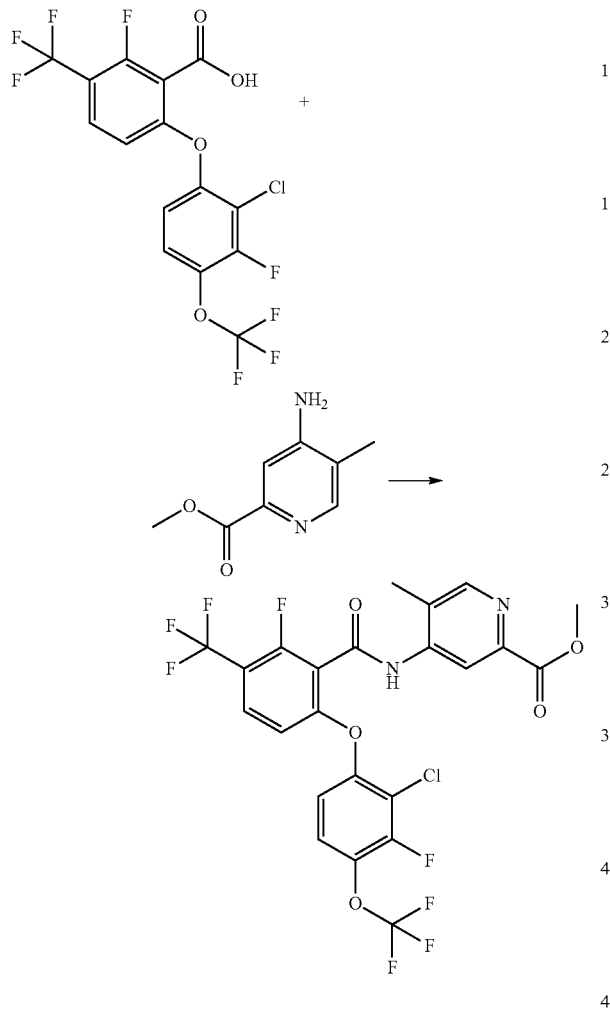

A mixture of 6-[2-chloro-3-fluoro-4-(trifluoromethoxy)phenoxy]-2-fluoro-3-(trifluoromethyl)benzoic acid (40 mg, 0.092 mmol), DMF (0.2 µL, 0.002 mmol) and dichloromethane (0.4 mL) was cooled to 0° C. in an ice bath. To this solution was added oxalyl chloride (5.3 µL, 0.061 mmol). The resulting mixture was stirred at room temperature for 20 minutes then concentrated in vacuo. The resulting acid chloride was dissolved in NMP (400 µL) and slowly added to a solution of methyl 4-amino-5-methyl-pyridine-2-carboxylate (46 mg, 0.27 mmol, Preparation 1) and DIEA (10.6 µL, 0.061 mmol) in NMP (200 µL) at 0° C. The mixture was warmed to room temperature and stirred for 16 hours. HPLC purification (C18, acetonitrile/5 mM HCl gradient) provided methyl 4-[[6-[2-chloro-3-fluoro-4-(trifluoromethoxy)phenoxy]-2-fluoro-3-(trifluoromethyl)benzoyl]amino]-5-methyl-pyridine-2-carboxylate (34 mg, 63%). ESI-MS m/z calc. 584.04, found 585.1 (M+1)⁺; LC-MS retention time (Method B): 1.45 minutes. ¹H NMR (400 MHz, DMSO-d₆) δ 10.71 (s, 1H), 8.57 (s, 1H), 8.47 (s, 1H), 7.91 (t, J=8.6 Hz, 1H), 7.73 (t, J=8.8 Hz, 1H), 7.34 (dd, J=9.3, 2.0 Hz, 1H), 7.07 (d, J=8.8 Hz, 1H), 3.88 (s, 3H), 2.31 (s, 3H) ppm.

Example 18

Methyl 4-[[6-[2-chloro-4-(trifluoromethoxy)phenoxy]-3-cyclopropyl-2-methyl-benzoyl]amino]-5-methyl-pyridine-2-carboxylate (22)

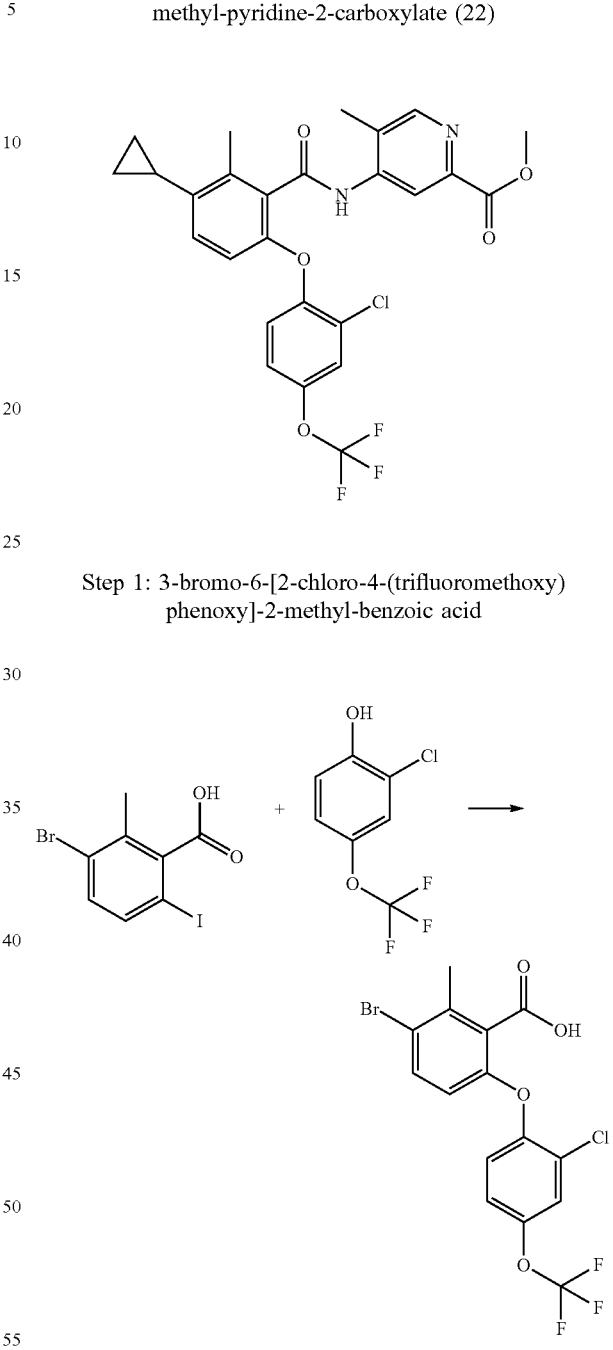

Step 1: 3-bromo-6-[2-chloro-4-(trifluoromethoxy)phenoxy]-2-methyl-benzoic acid

To a pressure flask was added 3-bromo-6-iodo-2-methyl-benzoic acid (1.170 g, 3.432 mmol), 2-chloro-4-(trifluoromethoxy)phenol (730 mg, 3.434 mmol), Cs₂CO₃ (1.8 g, 5.5 mmol) and toluene (22 mL). The mixture was bubbled with nitrogen for 10 minutes, then copper (I) iodide (660 mg, 3.47 mmol) added. The flask was flushed with nitrogen, capped, and heated at 100° C. with vigorous stirring for 16 hours. The mixture was cooled, and then diluted with ethyl acetate and water. The aqueous phase was acidified with 1 M HCl and then extracted with ethyl acetate. The aqueous layer was extracted with additional ethyl acetate (3×). The combined organic layers were washed with brine, dried over MgSO₄, filtered and concentrated in vacuo. HPLC purification (30-99% acetonitrile/5 mM HCl) provided 3-bromo-6-[2-chloro-4-(trifluoromethoxy)phenoxy]-2-methyl-benzoic acid (800 mg, 55%) as a white solid. ESI-MS m/z calc. 423.93, found 426.9 (M+1); LC-MS retention time (Method A): 0.75 minutes. ¹H NMR (400 MHz, DMSO-d₆) δ 13.65 (s, 1H), 7.76 (dd, J=2.9, 0.8 Hz, 1H), 7.66 (d, J=8.8 Hz, 1H), 7.39 (ddd, J=9.0, 2.8, 1.1 Hz, 1H), 7.10 (d, J=9.0 Hz, 1H), 6.77 (d, J=8.7 Hz, 1H), 2.36 (s, 3H) ppm.

Step 2: tert-butyl 3-bromo-6-[2-chloro-4-(trifluoromethoxy)phenoxy]-2-methyl-benzoate

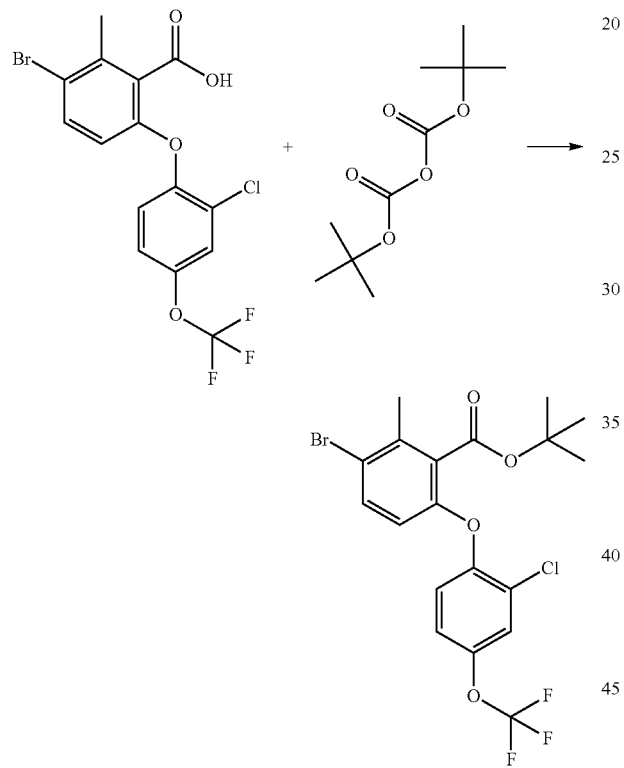

A stirring mixture of 3-bromo-6-[2-chloro-4-(trifluoromethoxy)phenoxy]-2-methyl-benzoic acid (795 mg, 1.87 mmol), tert-butoxycarbonyl tert-butyl carbonate (610 mg, 2.795 mmol) and DMAP (46 mg, 0.38 mmol) in t-BuOH (800 µL) was heated at 90° C. for 1 hour. The mixture was cooled and additional tert-butoxycarbonyl tert-butyl carbonate (610 mg, 2.795 mmol) was added. The resulting mixture was stirred at 90° C. for an additional 5 minutes. The mixture was then cooled to room temperature and purified using silica gel column chromatography (1-10% ethyl acetate/hexanes) to provide tert-butyl 3-bromo-6-[2-chloro-4-(trifluoromethoxy)phenoxy]-2-methyl-benzoate (845 mg, 94%) as a clear, colorless oil. ESI-MS m/z calc. 480.00, found 426.8 (M-tert-butyl+1)⁺; LC-MS retention time: 0.84 minutes (Method A). ¹H NMR (400 MHz, DMSO-d₆) δ 7.76 (dd, J=3.0, 0.8 Hz, 1H), 7.73 (d, J=8.8 Hz, 1H), 7.39-7.31 (m, 1H), 6.94 (dd, J=9.0, 1.4 Hz, 2H), 2.35 (s, 3H), 1.35 (s, 9H) ppm.

Step 3: tert-butyl 6-[2-chloro-4-(trifluoromethoxy)phenoxy]-3-cyclopropyl-2-methyl-benzoate

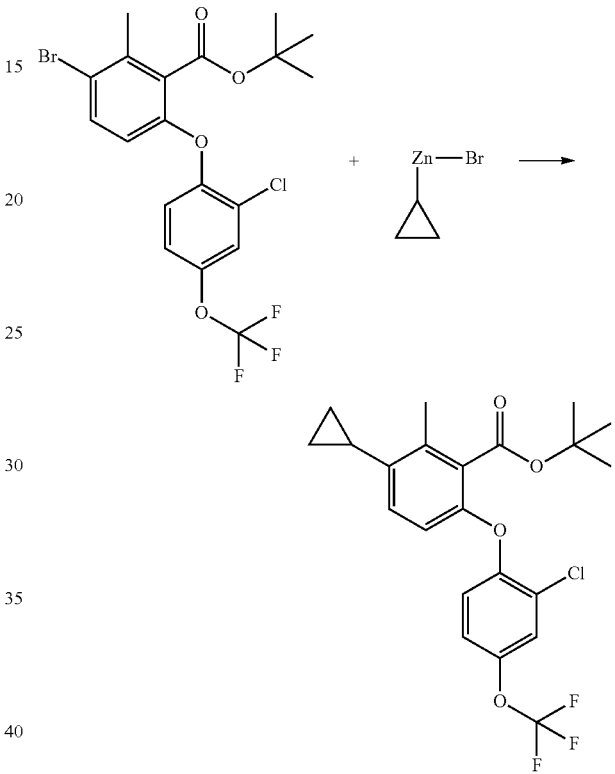

To a vial charged with tert-butyl 3-bromo-6-[2-chloro-4-(trifluoromethoxy)phenoxy]-2-methyl-benzoate (140 mg, 0.291 mmol), Pd(t-Bu₃P)₂ (7.4 mg, 0.015 mmol) and THF (1 mL) under nitrogen at 0° C. was slowly added a solution of bromo(cyclopropyl)zinc in THF (639 µL of 0.5 M, 0.32 mmol) and the mixture was gradually warmed to room temperature over 1 hour and stirred for an additional 15 minutes. The mixture was then quenched with 1 M aqueous HCl and the aqueous phase was extracted with dichloromethane (3×). The combined organic phases were dried over Na₂SO₄, filtered and concentrated in vacuo. Purification via silica gel chromatography (0-15% ethyl acetate/hexanes) provided tert-butyl 6-[2-chloro-4-(trifluoromethoxy)phenoxy]-3-cyclopropyl-2-methyl-benzoate (98 mg, 76%). ¹H NMR (400 MHz, CDCl₃) δ 7.33 (dq, J=2.9, 0.9 Hz, 1H), 7.06-6.97 (m, 2H), 6.80 (d, J=9.0 Hz, 1H), 6.67 (d, J=8.5 Hz, 1H), 2.44 (s, 3H), 1.85 (tt, J=8.5, 5.4 Hz, 1H), 1.44 (s, 9H), 1.00-0.87 (m, 2H), 0.67-0.58 (m, 2H) ppm.

Step 4: 6-[2-chloro-4-(trifluoromethoxy)phenoxy]-
3-cyclopropyl-2-methyl-benzoic acid

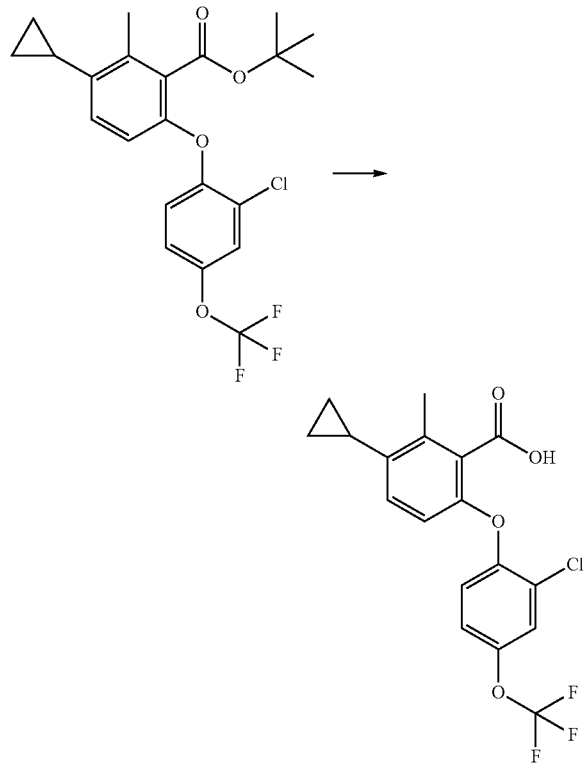

To a solution of tert-butyl 6-[2-chloro-4-(trifluoromethoxy)phenoxy]-3-cyclopropyl-2-methyl-benzoate (95 mg, 0.215 mmol) in THF (750 μL) and water (150 μL) at 0° C. was added TFA (2.5 mL, 32.5 mmol) dropwise over ~4 minutes. The ice bath was removed and the mixture was stirred while warming to room temperature for 1.25 hours. The mixture was then concentrated in vacuo to provide 6-[2-chloro-4-(trifluoromethoxy)phenoxy]-3-cyclopropyl-2-methyl-benzoic acid (83 mg, 100%). ESI-MS m/z calc. 386.05, found 387.23 (M+1)$^+$; LC-MS retention time (Method A): 0.83 minutes.

Step 5: 6-[2-chloro-4-(trifluoromethoxy)phenoxy]-
3-cyclopropyl-2-methyl-benzoyl chloride

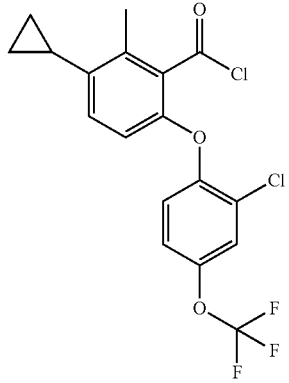

To a solution of 6-[2-chloro-4-(trifluoromethoxy)phenoxy]-3-cyclopropyl-2-methyl-benzoic acid (300 mg, 0.775 mmol) and DMF (10 μL, 0.13 mmol) in dichloromethane (20 mL) at 0° C. was added oxalyl chloride (300 μL, 3.44 mmol) dropwise under nitrogen. The ice bath was removed after 1 hour and the mixture was stirred while warming to room temperature for 1 hour. The mixture was then concentrated in vacuo to afford [6-[2-chloro-4-(trifluoromethoxy)phenoxy]-3-cyclopropyl-2-methyl-benzoyl chloride which was used as is without further purification.

Step 6: methyl 4-[[6-[2-chloro-4-(trifluoromethoxy)
phenoxy]-3-cyclopropyl-2-methyl-benzoyl]amino]-
5-methyl-pyridine-2-carboxylate (22)

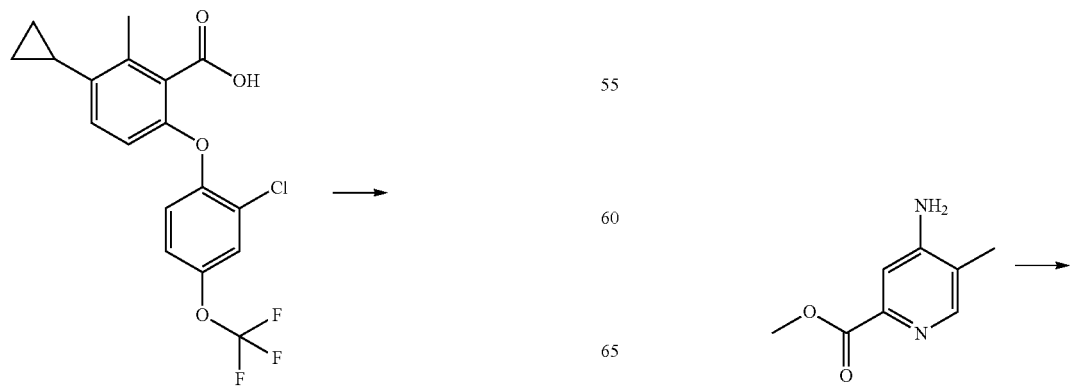

111

-continued

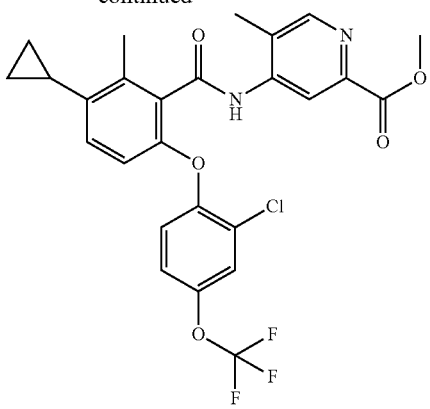

A mixture of 6-[2-chloro-4-(trifluoromethoxy)phenoxy]-3-cyclopropyl-2-methyl-benzoyl chloride (40 mg, 0.099 mmol) in NMP (0.3 mL) was added to a mixture of methyl 4-amino-5-methyl-pyridine-2-carboxylate (24.6, 0.148 mmol, Preparation 1) in NMP (0.3 mL) and DIEA (69 µL, 0.40 mmol). The resulting mixture was stirred at room temperature for 16 hours, after which HATU (75 mg, 0.20 mmol) and additional DIEA 69 µL, 0.40 mmol) were added. The resulting mixture was stirred at 60° C. for 16 hours. The mixture was then filtered and purified by HPLC (C18, 30-99% acetonitrile/5 mM HCl) to provide methyl 4-[[6-[2-chloro-4-(trifluoromethoxy)phenoxy]-3-cyclopropyl-2-methyl-benzoyl]amino]-5-methyl-pyridine-2-carboxylate (0.7 mg, 1%). ESI-MS m/z calc. 534.12, found 535.0 (M+1)+; LC-MS retention time (Method B): 1.95 minutes.

Example 19

Methyl 2-[[6-[3-fluoro-2-methoxy-4-(trifluoromethoxy)phenoxy]-2-methyl-3-(trifluoromethyl)benzoyl]amino]pyridine-4-carboxylate (24)

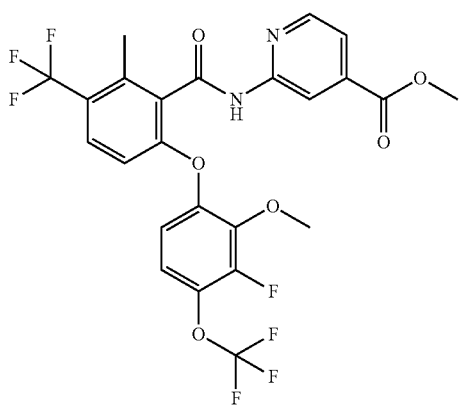 [SMILES: COC(=O)c1ccnc(NC(=O)c2c(Oc3ccc(OC(F)(F)F)c(F)c3OC)ccc(C(F)(F)F)c2C)c1]

112

Step 1: 2-bromo-6-fluoro-3-(trifluoromethyl)benzoic acid

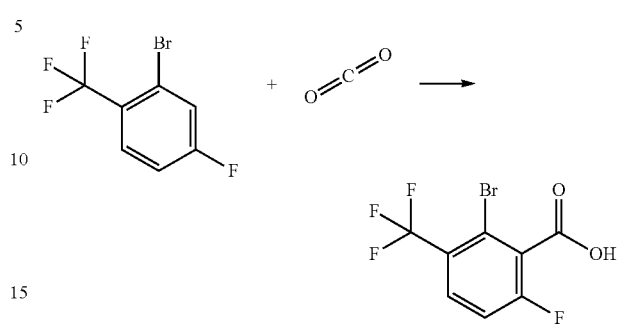

Diisopropylamine (49.96 g, 69.2 mL, 493.7 mmol) was diluted in tetrahydrofuran (1000 mL) and the mixture was cooled to −20° C. n-Butyllithium (181 mL of 2.5 M in hexanes, 452 mmol) was added over 30 minutes and the mixture was stirred at −20° C. for 30 minutes. The mixture was then cooled to −78° C. and treated with a mixture of 2-bromo-4-fluoro-1-(trifluoromethyl)benzene (100 g, 411.5 mmol) in tetrahydrofuran (100 mL) over 30 minutes. The mixture was stirred for 1 hour, then carbon dioxide (dry ice) pellets (181 g, 4.11 mol) were added over 20 minutes at −78° C. The resulting mixture was stirred at −78° C. for 30 minutes, and then warmed to 0° C. over 1 hour. The mixture was then diluted with water (200 mL) and MTBE (200 mL) and the aqueous phase was adjusted to pH 2 by adding 3 M aqueous HCl (250 mL). The phases were separated and the aqueous phase was extracted with additional MTBE (3×200 mL). The combined organic phases were washed with brine (250 mL), dried over anhydrous $Na_2SO_4$ and filtered. The solution was concentrated in vacuo, then redissolved in MTBE (200 mL) and a solution of 2 M aqueous NaOH (300 mL) was added. The aqueous phase was isolated and washed with MTBE (2×100 mL). The aqueous phase was acidified with 12 M aqueous HCl (100 mL) and extracted with MTBE (3×100 mL). The combined organic phases were washed with brine (250 mL), dried over anhydrous $Na_2SO_4$ and concentrated in vacuo to provide 2-bromo-6-fluoro-3-(trifluoromethyl)benzoic acid (111.7 g, 89%) as a beige solid. ESI-MS m/z calc. 285.93, found 570.8 (2M−1)−. LC-MS retention time (Method D): 1.19 minutes. $^1$H NMR (400 MHz, DMSO-$d_6$) δ 14.84-14.11 (m, 1H), 8.00 (dd, J=9.0, 5.6 Hz, 1H), 7.62 (t, J=8.7 Hz, 1H) ppm. $^{19}$F NMR (377 MHz, DMSO-$d_6$) δ −60.63 (s, 3F), −107.91 (s, 1F) ppm.

Step 2: tert-butyl 2-bromo-6-fluoro-3-(trifluoromethyl)benzoate

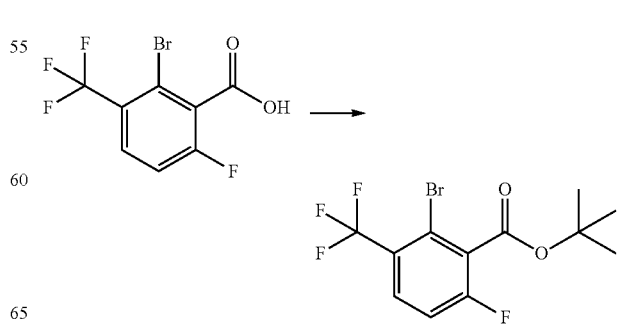

To a stirring suspension of MgSO$_4$ (8484 g, 70.48 mol) in dichloromethane (380 mL) under a nitrogen atmosphere was slowly added H$_2$SO$_4$ (9.3 mL of 100% w/w, 174.5 mmol) via syringe. The mixture was stirred at room temperature for 30 minutes. Solid 2-bromo-6-fluoro-3-(trifluoromethyl)benzoic acid (50 g, 174 mmol) was slowly added to the stirring solution, followed by the dropwise addition of a solution of tert-butanol (83 mL, 867.8 mmol) in dichloromethane (15 mL) over 1 hour. The mixture was stirred at room temperature for 24 hours, after which it was filtered and the solids were washed with dichloromethane (100 mL). The filtrate was added to a cold, stirring solution of K$_2$CO$_3$ (48 g, 347 mmol) in water (480 mL, pH ~10) and stirred for 10 minutes. The organic phase was isolated and washed with brine (150 mL). The combined aqueous phases were extracted with additional dichloromethane (100 mL), and the combined organics were then dried, filtered and concentrated in vacuo to provide a pale yellow oil (59 g). The oil was crystallized from cold heptane to provide tert-butyl 2-bromo-6-fluoro-3-(trifluoromethyl)benzoate as an off-white solid (45 g, 75%). $^1$H NMR (400 MHz, DMSO-d$_6$) δ 8.03 (dd, J=9.0, 5.6 Hz, 1H), 7.68-7.59 (m, 1H), 1.58 (s, 9H) ppm.

Step 3: tert-butyl 2-bromo-6-[3-fluoro-2-methoxy-4-(trifluoromethoxy)phenoxy]-3-(trifluoromethyl)benzoate

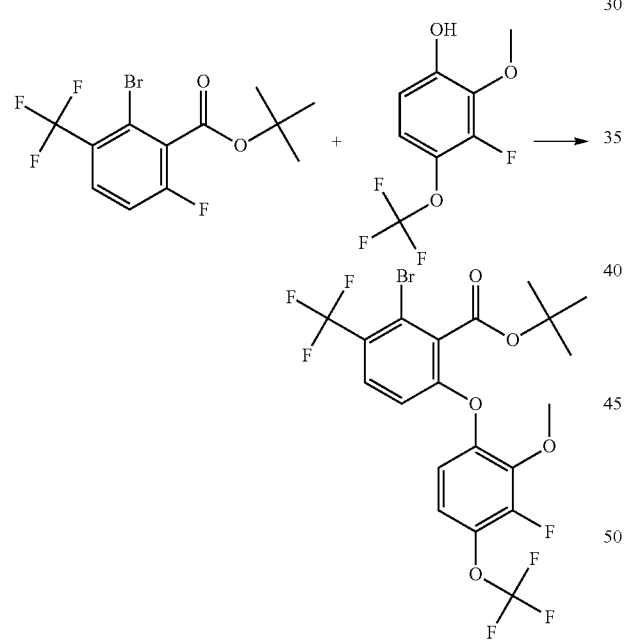

tert-Butyl 2-bromo-6-fluoro-3-(trifluoromethyl)benzoate (10 g, 29 mmol) and 3-fluoro-2-methoxy-4-(trifluoromethoxy)phenol (6.8 g, 30 mmol) were combined with DMSO (40 mL) and K$_2$CO$_3$ (8.1 g, 58.6 mmol) (325 mesh) while stirring. The yellow suspension was heated at 100° C. (internal temperature) for 2 hours. After cooling, the suspension was diluted with water (200 mL) and 4:1 heptane/MTBE (200 mL). The organic phase was isolated and washed ~20 wt % aqueous K$_2$CO$_3$ (2×100 mL), dried, filtered and concentrated in vacuo. Purification via silica gel chromatography (loaded with 95:5 hexane/dichloromethane; 0-20% ethyl acetate/hexane gradient) provided tert-butyl 2-bromo-6-[3-fluoro-2-methoxy-4-(trifluoromethoxy)phenoxy]-3-(trifluoromethyl)benzoate (13.5 g, 84%). ESI-MS m/z calc. 548.01; LC-MS retention time (Method B): 2.07 minutes. $^1$H NMR (400 MHz, DMSO-d$_6$) δ 7.84 (d, J=8.9 Hz, 1H), 7.39 (ddd, J=9.3, 8.1, 1.3 Hz, 1H), 7.15 (dd, J=9.3, 2.2 Hz, 1H), 7.06 (d, J=8.8 Hz, 1H), 3.88 (d, J=1.0 Hz, 3H), 1.52 (s, 9H) ppm.

Step 4: tert-butyl 6-[3-fluoro-2-methoxy-4-(trifluoromethoxy)phenoxy]-2-methyl-3-(trifluoromethyl)benzoate

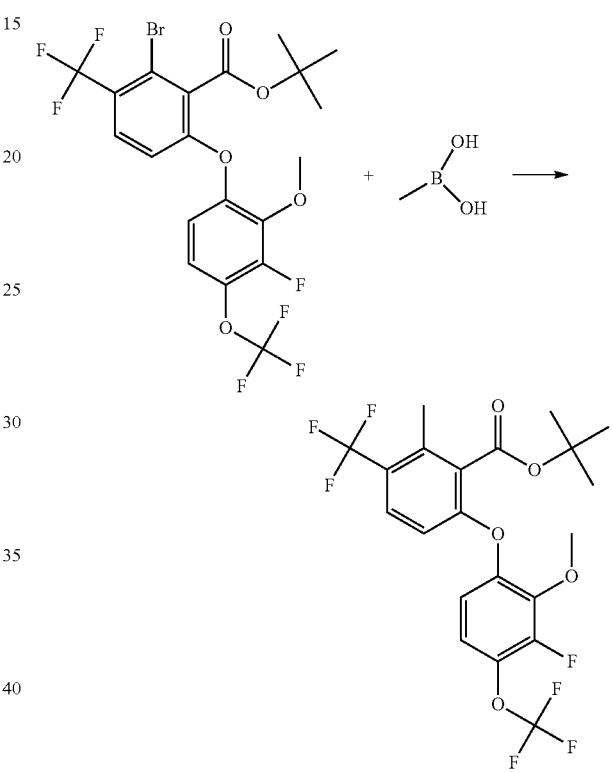

To a mixture of tert-Butyl 2-bromo-6-[3-fluoro-2-methoxy-4-(trifluoromethoxy)phenoxy]-3-(trifluoromethyl)benzoate (143.8 g, 261.8 mmol) in 2-methyltetrahydrofuran (2.2 L) was added methylboronic acid (78.5 g, 1.31 mol) and Cs$_2$CO$_3$ (256 g, 786 mmol) while stirring. The suspension was purged with nitrogen for 30 minutes, treated with Pd(dppf)Cl$_2$ (2.88 g, 3.94 mmol) and heated at 80° C. (internal temperature) for 1 hour. The mixture was then cooled to room temperature and diluted with water (1 L). The organic phase was isolated and washed water (2×1 L) and brine (500 mL). The organic phase was dried, filtered and concentrated in vacuo. The resulting residue was diluted with 4:1 heptane/MTBE (500 mL) and water. The organic phase was isolated and washed with water (2×500 mL). The aqueous phases were back extracted with heptane (200 mL). The combined organic phases were stirred with MgSO$_4$ and charcoal for 30 minutes, filtered over a bed of MgSO$_4$ and concentrated in vacuo to provide tert-butyl 6-[3-fluoro-2-methoxy-4-(trifluoromethoxy)phenoxy]-2-methyl-3-(trifluoromethyl)benzoate (127 g, 100%). ESI-MS m/z calc. 484.11; LC-MS retention time (Method B): 2.05 minutes. $^1$H NMR (400 MHz, DMSO-d$_6$) δ 7.72 (d, J=8.8 Hz, 1H), 7.35

(ddd, J=9.4, 8.1, 1.3 Hz, 1H), 7.00 (dd, J=9.3, 2.2 Hz, 1H), 6.91 (d, J=8.8 Hz, 1H), 3.89 (d, J=0.9 Hz, 3H), 2.41 (d, J=1.7 Hz, 3H), 1.49 (s, 9H) ppm.

Step 5: 6-[3-fluoro-2-methoxy-4-(trifluoromethoxy) phenoxy]-2-methyl-3-(trifluoromethyl)benzoic acid

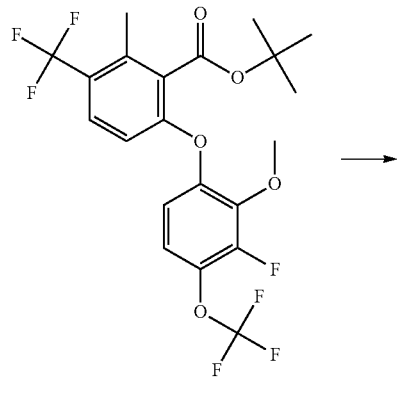

tert-Butyl 6-[3-fluoro-2-methoxy-4-(trifluoromethoxy)phenoxy]-2-methyl-3-(trifluoromethyl)benzoate (125 g, 258 mmol) was combined with isopropanol (625 mL), treated with 6 M aqueous HCl (260 mL, 1.56 mol) and heated at 80-90° C. for 2 hours. The resulting mixture was concentrated and azeotroped with isopropanol. The resulting residue was crystallized twice from heptane and once from toluene to provide 6-[3-fluoro-2-methoxy-4-(trifluoromethoxy)phenoxy]-2-methyl-3-(trifluoromethyl)benzoic acid (91.8 g, 82%) as a white solid. ESI-MS m/z calc. 428.05, found 427.0 (M−1)⁻; LC-MS retention time (Method C): 2.14 minutes. ¹H NMR (400 MHz, DMSO-$d_6$) δ 13.80 (s, 1H), 7.69 (d, J=8.9 Hz, 1H), 7.36 (ddd, J=9.4, 8.2, 1.3 Hz, 1H), 7.06 (dd, J=9.3, 2.2 Hz, 1H), 6.86 (d, J=8.8 Hz, 1H), 3.87 (d, J=1.0 Hz, 3H), 2.43 (d, J=1.7 Hz, 3H) ppm.

Step 6: 6-[3-fluoro-2-methoxy-4-(trifluoromethoxy) phenoxy]-2-methyl-3-(trifluoromethyl)benzoyl chloride

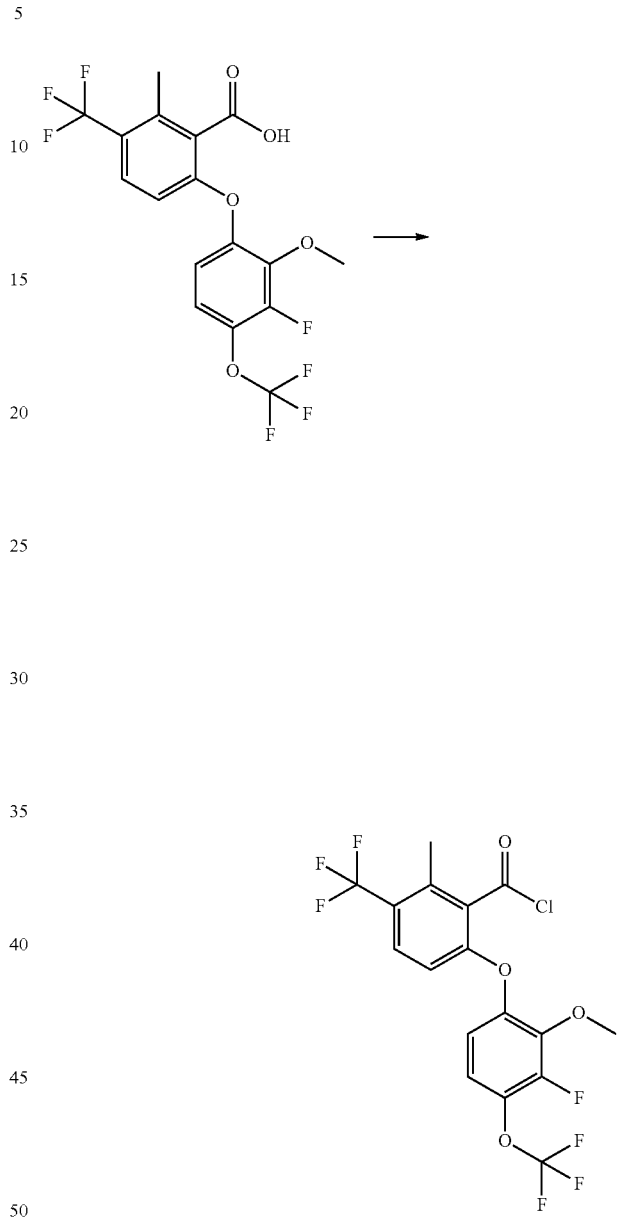

To a mixture of 6-[3-fluoro-2-methoxy-4-(trifluoromethoxy)phenoxy]-2-methyl-3-(trifluoromethyl)benzoic acid (950 mg, 2.22 mmol) and DMF (10 μL, 0.13 mmol) in dichloromethane (25 mL) at 0° C. was added oxalyl chloride (600 μL, 6.88 mmol) dropwise under a nitrogen atmosphere. The mixture was stirred at 0° C. for 1 hour and then at room temperature for 1 hour. The resulting mixture was then concentrated in vacuo to provide 6-[3-fluoro-2-methoxy-4-(trifluoromethoxy)phenoxy]-2-methyl-3-(trifluoromethyl) benzoyl chloride) which was used as is without further purification.

Step 7: methyl 2-[[6-[3-fluoro-2-methoxy-4-(trifluoromethoxy)phenoxy]-2-methyl-3-(trifluoromethyl)benzoyl]amino]pyridine-4-carboxylate (24)

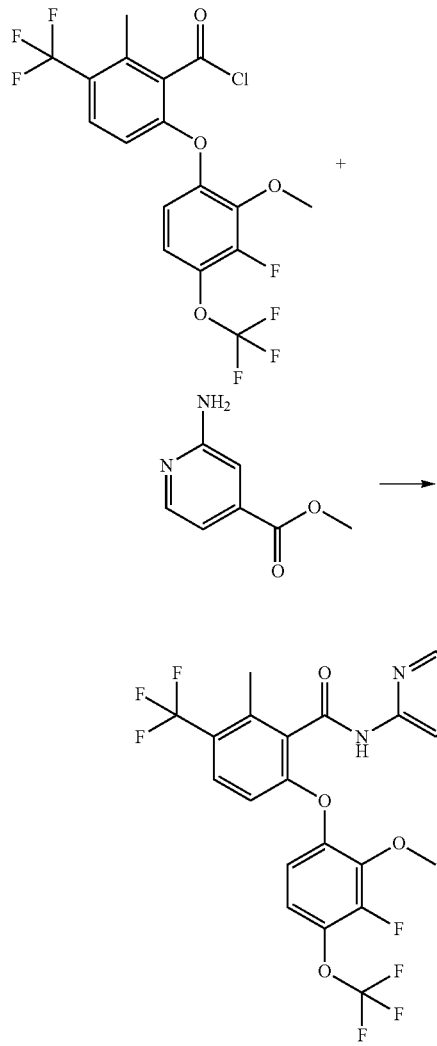

A mixture of 6-[3-fluoro-2-methoxy-4-(trifluoromethoxy)phenoxy]-2-methyl-3-(trifluoromethyl)benzoyl chloride (50 mg, 0.11 mmol) and NMP (0.3 mL) was added to a mixture of methyl 2-aminopyridine-4-carboxylate (26 mg, 0.17 mmol) and DIEA (58 mg, 78 μL, 0.45 mmol) in NMP (0.3 mL). The resulting mixture was stirred at room temperature for 16 hours, then purified by HPLC (C18, 30-99% CH₃CN/5 mM HCl) to provide methyl 2-[[6-[3-fluoro-2-methoxy-4-(trifluoromethoxy)phenoxy]-2-methyl-3-(trifluoromethyl)benzoyl]amino]pyridine-4-carboxylate (8.8 mg, 14%). ESI-MS m/z calc. 562.10, found 563.0 (M+1)$^+$; LC-MS retention time (Method B): 2.15 minutes. H NMR (400 MHz, DMSO-$d_6$) δ 11.53 (s, 1H), 8.73 (s, 1H), 8.56 (d, J=5.1 Hz, 1H), 7.73 (d, J=8.9 Hz, 1H), 7.62 (d, J=4.8 Hz, 1H), 7.38 (t, J=8.6 Hz, 1H), 7.14 (d, J=10.3 Hz, 1H), 6.88 (d, J=8.8 Hz, 1H), 3.92 (s, 3H), 3.84 (s, 3H), 2.45 (s, 3H) ppm.

Example 20

Methyl 4-[[2-hydroxy-6-[2-methoxy-4-(trifluoromethoxy)phenoxy]-3-(trifluoromethyl)benzoyl]amino]pyridine-2-carboxylate (25)

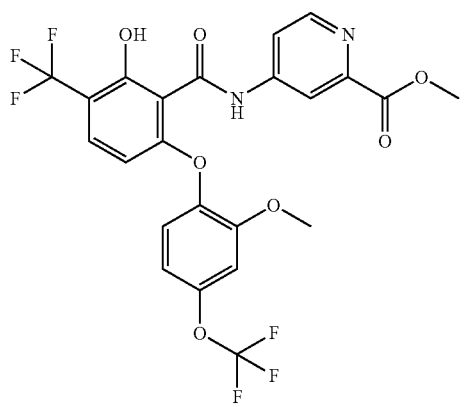 [SMILES: COC(=O)c1cc(NC(=O)c2c(Oc3ccc(OC(F)(F)F)cc3OC)ccc(C(F)(F)F)c2O)ccn1]

Step 1: 2-fluoro-6-[2-methoxy-4-(trifluoromethoxy)phenoxy]-3-(trifluoromethyl)benzoyl chloride Thionyl chloride (13.2 mL, 181 mmol) was added to a solution of 2-fluoro-6-[2-methoxy-4-(trifluoromethoxy)phenoxy]-3-(trifluoromethyl)benzoic acid (50.0 g, 121 mmol, see Example 3) in toluene (375 mL) under nitrogen. The mixture was heated at 70° C. for 14 hours. The reaction was cooled to 0° C. then washed with ice water (2×375 mL) and brine. The organic layer was dried over MgSO₄, filtered and concentrated to provide 2-fluoro-6-[2-methoxy-4-(trifluoromethoxy)phenoxy]-3-(trifluoromethyl)benzoyl chloride.

Step 2: methyl 4-[[2-fluoro-6-[2-methoxy-4-(trifluoromethoxy)phenoxy]-3-(trifluoromethyl)benzoyl]amino]pyridine-2-carboxylate

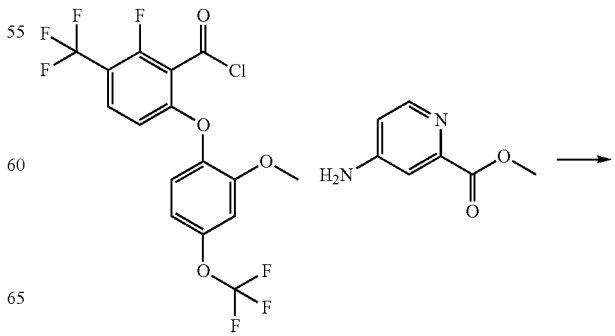

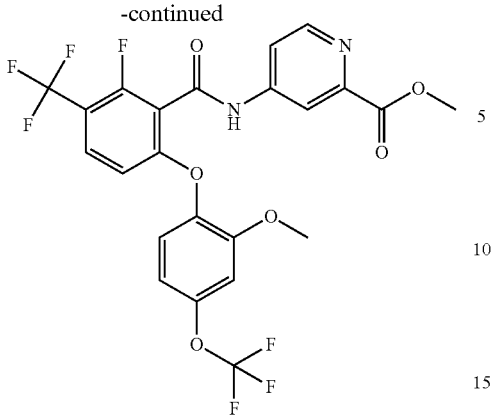

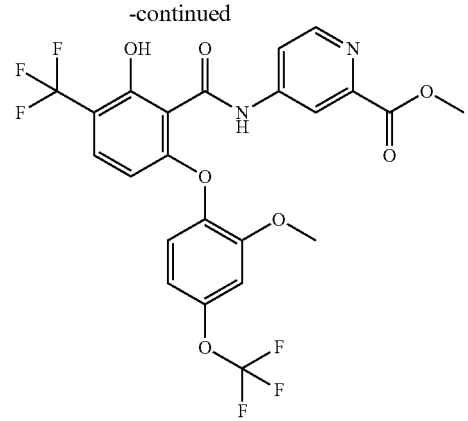

A solution of 2-fluoro-6-[2-methoxy-4-(trifluoromethoxy)phenoxy]-3-(trifluoromethyl)benzoyl chloride (6.35 g, 14.7 mmol) in dichloromethane (16 mL) was added to a suspension of methyl 4-aminopyridine-2-carboxylate (2.69 g, 17.7 mmol) in 2-MeTHF (63.5 mL) and DIEA (6.4 mL, 37 mmol) at 19.2° C. over 4 minutes (reaction exotherm raised the solution temperature to 27.8° C.). The mixture was stirred for 23 hours, then washed sequentially with a solution of 2:1 water/brine (100 mL), a solution of 2:1 brine/1 M aqueous HCl (2×100 mL), a solution of 1:1 brine/saturated sodium bicarbonate (100 mL) and brine. The organic phase was dried with $MgSO_4$, filtered and concentrated. Purification by silica gel chromatography (10-70% ethyl acetate/hexanes) provided methyl 4-[[2-fluoro-6-[2-methoxy-4-(trifluoromethoxy)phenoxy]-3-(trifluoromethyl)benzoyl]amino]pyridine-2-carboxylate (6.6 g, 81%). ESI-MS m/z calc. 548.08, found 549.2 (M+1)$^+$; LC/MS retention time (Method B): 1.86 minutes. $^1$H NMR (400 MHz, DMSO-$d_6$) δ 11.51 (s, 1H), 8.64 (d, J=5.5 Hz, 1H), 8.39 (d, J=2.1 Hz, 1H), 7.91-7.75 (m, 2H), 7.37 (d, J=8.8 Hz, 1H), 7.26 (d, J=2.7 Hz, 1H), 7.10-6.99 (m, 1H), 6.69 (d, J=8.9 Hz, 1H), 3.89 (s, 3H), 3.79 (s, 3H) ppm.

Step 3: methyl 4-[[2-hydroxy-6-[2-methoxy-4-(trifluoromethoxy)phenoxy]-3-(trifluoromethyl)benzoyl]amino]pyridine-2-carboxylate (25)

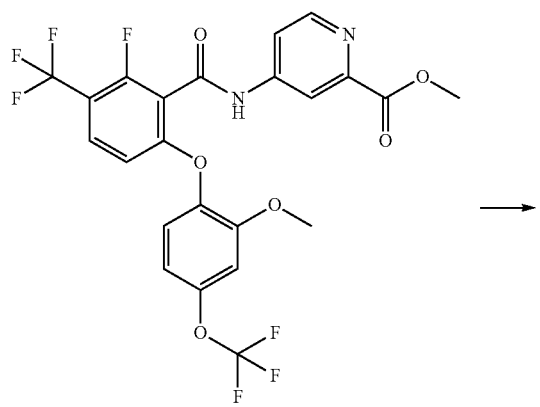

A mixture of methyl 4-[[2-fluoro-6-[2-methoxy-4-(trifluoromethoxy)phenoxy]-3-(trifluoromethyl)benzoyl]amino]pyridine-2-carboxylate (50 mg, 0.091 mmol), hydroxylamine hydrochloride (32 mg, 0.46 mmol) and $K_2CO_3$ (63 mg, 0.46 mmol) in DMF (500 μL) was stirred at room temperature for 24 hours and then at 75° C. for 18 hours. In a separate reaction vessel, a mixture of methyl 4-[[2-fluoro-6-[2-methoxy-4-(trifluoromethoxy)phenoxy]-3-(trifluoromethyl)benzoyl]amino]pyridine-2-carboxylate (50 mg, 0.091 mmol), N-methylhydroxylamine hydrochloride (38 mg, 0.46 mmol) and $K_2CO_3$ (63 mg, 0.46 mmol) in DMF (500 μL) was stirred at room temperature for 24 hours and then at 75° C. for 18 hours. Both reactions resulted in predominant formation of methyl 4-[[2-hydroxy-6-[2-methoxy-4-(trifluoromethoxy)phenoxy]-3-(trifluoromethyl)benzoyl]amino]pyridine-2-carboxylate. The two reaction mixtures were combined, partitioned between ethyl acetate and 1 M aqueous citric acid and the layers separated. The organic layer was concentrated and purified by silica gel chromatography (0-100% ethyl acetate/hexane) to provide methyl 4-[[2-hydroxy-6-[2-methoxy-4-(trifluoromethoxy)phenoxy]-3-(trifluoromethyl)benzoyl]amino]pyridine-2-carboxylate (22 mg, 22%). ESI-MS m/z calc. 546.09, found 547.0 (M+1)$^+$; LC/MS retention time (Method E): 2.92 minutes. $^1$H NMR (400 MHz, DMSO-$d_6$) δ 11.17 (s, 1H), 10.87 (s, 1H), 8.59 (d, J=5.5 Hz, 1H), 8.44 (d, J=2.1 Hz, 1H), 7.83 (dd, J=5.6, 2.1 Hz, 1H), 7.56 (d, J=8.9 Hz, 1H), 7.28 (d, J=9.0 Hz, 1H), 7.20 (d, J=2.7 Hz, 1H), 7.01 (ddd, J=8.8, 2.9, 1.4 Hz, 1H), 6.22 (d, J=8.8 Hz, 1H), 3.88 (s, 3H), 3.77 (s, 3H) ppm.

Example 21

Additional Compounds of the Invention

The compounds set forth in Table 3 can be prepared by methods analogous to the preparation of compounds (1-24) in Examples 8-19 using suitable carboxylic acids or acid chlorides and amines.

TABLE 3

Additional Compounds that Can Be Prepared By Methods Analogous to Examples 8-19.

| Cmpd No. | Compound Name | LC/MS | NMR (shifts in ppm) |
|---|---|---|---|
| 26 | methyl 5-cyclopropyl-4-(2-fluoro-6-(2-methoxy-4-(trifluoromethoxy)phenoxy)-3-(trifluoromethyl)benzamido)picolinate | ESI-MS found 607.0 (M + 1)+; Retention time: 2.01 minutes | $^1$H NMR (400 MHz, DMSO-d6) δ 10.87 (s, 1H), 8.64 (s, 1H), 8.45 (s, 1H), 7.90 (s, 1H), 7.46 (d, J = 8.8 Hz, 1H), 7.37 (s, 1H), 7.16 (d, J = 8.8 Hz, 1H), 6.76 (d, J = 8.9 Hz, 1H), 3.97 (s, 3H), 3.89 (s, 3H), 2.21 (s, 1H), 1.08 (d, J = 4.2 Hz, 2H), 0.91 (s, 2H). |
| 27 | methyl 5-cyclopropyl-4-(2-fluoro-6-(3-fluoro-2-methoxy-4-(trifluoromethoxy)phenoxy)-3-(trifluoromethyl)benzamido)picolinate | ESI-MS found 589.0 (M + 1)+; Retention time: 1.94 minutes | $^1$H NMR (400 MHz, DMSO-d6) δ 10.83 (s, 1H), 8.51 (s, 1H), 8.35 (s, 1H), 7.86 (s, 1H), 7.41 (s, 1H), 7.20 (d, J = 9.2 Hz, 1H), 6.93 (d, J = 8.8 Hz, 1H), 3.88 (s, 6H), 2.07 (s, 1H), 1.00 (d, J = 7.9 Hz, 2H), 0.82 (d, J = 5.0 Hz, 2H). [1] |
| 28 | methyl 5-cyclopropyl-4-(6-(3-fluoro-2-methoxy-4-(trifluoromethoxy)phenoxy)-2-methyl-3-(trifluoromethyl)benzamido)picolinate | ESI-MS found 603.0 (M + 1)+; Retention time: 2.01 minutes | |
| 29 | methyl 3-fluoro-4-(2-fluoro-6-(2-methoxy-4-(trifluoromethoxy)phenoxy)-3-(trifluoromethyl)benzamido)picolinate | ESI-MS found 567.0 (M + 1)+; Retention time: 1.98 minutes | $^1$H NMR (400 MHz, DMSO-d6) δ 11.38 (s, 1H), 8.45 (s, 2H), 7.80 (s, 1H), 7.37 (d, J = 8.9 Hz, 1H), 7.26 (s, 1H), 7.05 (d, J = 10.0 Hz, 1H), 6.66 (d, J = 8.7 Hz, 1H), 3.90 (s, 3H), 3.79 (s, 3H). |
| 30 | methyl 3-fluoro-4-(2-fluoro-6-(3-fluoro-2-methoxy-4-(trifluoromethoxy)phenoxy)-3-(trifluoromethyl)benzamidolpicolinate | ESI-MS found 585.0 (M + 1)+; Retention time: 1.99 minutes | $^1$H NMR (400 MHz, DMSO-d6) δ 11.45 (s, 1H), 8.55-8.36 (m, 2H), 7.85 (s, 1H), 7.40 (s, 1H), 7.21 (d, J = 9.2 Hz, 1H), 6.90 (d, J = 9.0 Hz, 1H), 3.88 (d, J = 13.3 Hz, 6H). |
| 31 | methyl 3-fluoro-4-(6-(3-fluoro-2-methoxy-4-(trifluoromethoxy)phenoxy)-2-methyl-3-(trifluoromethyl)benzamido)picolinate | ESI-MS found 581.0 (M + 1)+; Retention time: 2.11 minutes | $^1$H NMR (400 MHz, DMSO-$d_6$) δ 11.29 (s, 1H), 8.49-8.37 (m, 2H), 7.84-7.67 (m, 1H), 7.45-7.32 (m, 1H), 7.22-7.04 (m, 1H), 6.87 (d, J = 8.8 Hz, 1H), 3.88 (s, 3H), 3.85 (s, 3H), 2.44 (s, 3H) ppm. |
| 32 | methyl 4-(6-(3-fluoro-2-methoxy-4-(trifluoromethoxy)phenoxy)-2-methyl-3-(trifluoromethyl)benzamido)-3-methylpicolinate | ESI-MS found 577.0 (M + 1)+; Retention time: 1.95 minutes | $^1$H NMR (400 MHz, DMSO-d6) δ 10.60 (s, 1H), 8.44 (d, J = 5.3 Hz, 1H), 7.88 (d, J = 5.3 Hz, 1H), 7.75 (d, J = 8.9 Hz, 1H), 7.39 (t, J = 8.6 Hz, 1H), 7.12 (dd, J = 9.3, 1.9 Hz, 1H), 6.89 (d, J = 8.8 Hz, 1H), 3.86 (s, 6H), 2.50 (s, 3H), 2.27 (s, 3H). |
| 33 | methyl 4-(6-(2-methoxy-4-(trifluoromethoxy)phenoxy)-2-methyl-3-(trifluoromethyl)benzamido)-3-methylpicolinate | ESI-MS found 559.0 (M + 1)+; Retention time: 1.87 minutes | $^1$H NMR (400 MHz, DMSO-d6) δ 10.51(s, 1H), 8.44 (d, J = 5.3 Hz, 1H), 7.90 (d, J = 5.3 Hz, 1H), 7.70 (d, J = 8.9 Hz, 1H), 7.34-7.18 (m, 2H), 7.04 (d, J = 8.3 Hz, 1H), 6.63 (d, J = 8.8 Hz, 1H), 3.86 (s, 3H), 3.79 (s, 3H), 2.48 (s, 3H), 2.29 (s, 3H). |
| 34 | methyl 4-(2-fluoro-6-(3-fluoro-2-methoxy-4-(trifluoromethoxy)phenoxy)-3-(trifluoromethyl)benzamido)-3-methylpicolinate | ESI-MS found 581.0 (M + 1)+; Retention time: 1.95 minutes | $^1$H NMR (400 MHz, DMSO-d6) δ 10.78 (s, 1H), 8.46 (d, J = 5.3 Hz, 1H), 7.85 (t, J = 7.1 Hz, 2H), 7.42 (t, J = 8.5 Hz, 1H), 7.23 (dd, J = 9.3, 1.6 Hz, 1H), 6.92 (d, J = 8.9 Hz, 1H), 3.88 (s, 3H), 3.88 (s, 3H), 2.30 (s, 3H). |
| 35 | dimethyl 4-(2-fluoro-6-(3-fluoro-2-methoxy-4-(trifluoromethoxy)phenoxy)-3-(trifluoromethyl)benzamido)pyridine-2,6-dicarboxylate | ESI-MS found 625.2 (M + 1)+; Retention time: 2.82 minutes | $^1$H NMR (400 MHz, DMSO-d6) δ 11.79 (s, 1H), 8.53 (s, 2H), 7.88 (t, J = 8.6 Hz, 1H), 7.40 (t, J = 8.6 Hz, 1H), 7.23 (dd, J = 9.3, 2.1 Hz, 1H), 6.94 (d, J = 8.9 Hz, 1H), 3.92 (s, 6H), 3.85 (s, 3H). |

Example 22

E-VIPR Assay for Detecting and Measuring $Na_V$ Inhibition Properties

Sodium ion channels are voltage-dependent proteins that can be activated by inducing membrane voltage changes by applying electric fields. The electrical stimulation instrument and methods of use, referred to as E-VIPR, are described in International Publication No. WO 2002/008748 A3 and C.-J. Huang et al. Characterization of voltage-gated sodium channel blockers by electrical stimulation and fluorescence detection of membrane potential, 24 Nature Biotech. 439-46 (2006), both of which are incorporated by reference in their entirety. The instrument comprises a microtiter plate handler, an optical system for exciting the coumarin dye while simultaneously recording the coumarin and oxonol emissions, a waveform generator, a current- or voltage-controlled amplifier, and parallel electrode pairs that are inserted into assay plate wells. Under integrated computer control, this instrument passes user-programmed electrical stimulus protocols to cells within the wells of the microtiter plate.

16-20 hours prior to running the assay on E-VIPR, HEK cells expressing a truncated form of human $Na_V 1.8$ with full channel activity were seeded into microtiter 384-well plates, pre-coated with matrigel, at a density of 25,000 cells per well. 2.5-5% KIR2.1 Bacmam virus was added to the final cell suspension before seeding into cell plates. HEK cells were grown in Dulbecco's Modified Eagle's Medium (DMEM) supplemented with 10% FBS (Fetal Bovine Serum, qualified; Sigma #F4135), 1% NEAA (Non-Essential Amino Acids, Gibco #11140), 1% HEPES (Gibco #15630), 1% Pen-Strep (Penicillin-Streptomycin; Gibco #15140) and 5 µg/ml Blasticidin (Gibco #R210-01). Cells were expanded in vented cap cell culture flasks, with 90-95% humidity and 5% $CO_2$.

Reagents and Stock Solutions:
  100 mg/mL Pluronic F-127 (Sigma #P2443), in dry DMSO
  Compound Plates: Corning 384-well Polypropylene Round Bottom #3656
  Cell Plates: 384-well tissue culture treated plates (Greiner #781091-1B)
  2.5-5% KIR 2.1 Bacmam virus (produced in-house), prepared as described in Section 3.3 of J. A. Fornwald et al., *Gene Expression in Mammalian Cells Using BacMam, a Modified Baculovirus System,* 1350 Methods in Molecular Biology 95-116 (2016), the entire contents of which are incorporated by reference. The concentration used can be dependent on viral titer of each batch.
  5 mM $DiSBAC_6$ (3), a voltage sensitive oxonol acceptor (CAS number 169211-44-3; 5-[3-(1,3-dihexylhexahydro-4,6-dioxo-2-thioxo-5-pyrimidinyl)-2-propen-1-ylidene]-1,3-dihexyldihydro-2-thioxo-4,6(1H,5H)-pyrimidinedione), in dry DMSO. The preparation of $DiSBAC_6$ (3) is analogous to that of $DiSBAC_4$ (3) as described in *Voltage Sensing by Fluorescence Resonance Energy Transfer in Single Cells*, Gonzalez, J. E. and Tsien, R. Y. (1995) Biophys. J. 69, 1272-1280.
  5 mM CC2-DMPE, a commercially available membrane-bound coumarin phospholipid FRET donor (ThermoFisher Scientific catalog number K1017, CAS number 393782-57-5; tetradecanoic acid, 1,1'-[(1R)-1-[8-(6-chloro-7-hydroxy-2-oxo-2H-1-benzopyran-3-yl)-3-hydroxy-3-oxido-8-oxo-2,4-dioxa-7-aza-3-phosphaoct-1-yl]-1,2-ethanediyl] ester) was prepared in dry DMSO. See also, *Improved indicators of cell membrane potential that use fluorescence resonance energy transfer*, Gonzalez, J. E. and Tsien, R. Y. (1997) Chem. Biol. 4, 269-277.
  Voltage Assay Background Suppression Compound (VABSC-1) is prepared in $H_2O$ (89-363 mM, range used to maintain solubility)
  Human Serum (HS, Millipore #S1P1-01KL, or Sigma SLBR5469V and SLBR5470V as a 50%/50% mixture, for 25% assay final concentration)
Bath1 Buffer:
  Sodium Chloride 160 mM (9.35 g/L), Potassium Chloride, 4.5 mM (0.335 g/L), Glucose 10 mM (1.8 g/L), Magnesium Chloride (Anhydrous) 1 mM (0.095 g/L), Calcium Chloride 2 mM (0.222 g/L), HEPES 10 mM (2.38 g/L) in water.
Na/TMA Cl Bath1 Buffer:
  Sodium Chloride 96 mM (5.61 g/L), Potassium Chloride 4.5 mM (0.335 g/L), Tetramethylammonium (TMA)-Cl 64 mM (7.01 g/L), Glucose 10 mM (1.8 g/L), Magnesium Chloride (Anhydrous) 1 mM (0.095 g/L), Calcium Chloride 2 mM (0.222 g/L) HEPES 10 mM (2.38 g/L) in water.
Hexyl Dye Solution (2× Concentration):
  Bath1 Buffer containing 0.5% β-cyclodextrin (made fresh prior to each use, Sigma #C4767), 8 µM CC2-DMPE and 2 µM $DiSBAC_6$ (3). The solution was made by adding 10% Pluronic F127 stock equal to combined volumes of CC2-DMPE and $DiSBAC_6$ (3). The order of preparation was first mix Pluronic and CC2-DMPE, then add $DiSBAC_6$ (3), then while vortexing add Bath1/β-Cyclodextrin.
  Compound Loading Buffer (2× concentration): Na/TMA Cl Bath1 Buffer containing HS (omitted in experiments run in the absence of human serum (HS))$_{50}$%, VABSC-1 1 mM, BSA 0.2 mg/ml (in Bath-1), KCl 9 mM, DMSO 0.75%.

Assay Protocol (7 Key Steps):

1) To reach the final concentration in each well, 400 nL of each compound was pre-spotted (in neat DMSO) into polypropylene compound plates at 250× desired final concentration from an intermediate stock concentration of 0.075 mM, in an 11 point dose response, 3-fold dilution, resulting in a top dose of 300 nM final concentration in the cell plate. Vehicle control (neat DMSO), and positive control (an established $Na_V 1.8$ inhibitor, 25 µM final in assay in DMSO) were added manually to the outermost columns of each plate respectively. The compound plate was backfilled with 45 µL per well of Compound Loading Buffer resulting in a 250 fold dilution of compound following a 1:1 transfer of compound into the cell plate (see Step 6). Final DMSO concentration for all wells in the assay was 0.625% (0.75% DMSO was supplemented to the Compound Loading Buffer for a final DMSO concentration of 0.625%). This assay dilution protocol was adjusted to enable a higher dose range to be tested in the presence of HS or if the final assay volume was altered.

2) Hexyl Dye Solution was prepared.

3) Cell plates were prepared. On the day of the assay, the media was aspirated, and the cells were washed three times with 80 µL of Bath-1 buffer, maintaining 25 µL residual volume in each well.

4) 25 µL per well of Hexyl Dye Solution was dispensed into the cell plates. The cells were incubated for 20 minutes at room temperature or ambient conditions in darkness.

5) 45 μL per well of Compound Loading Buffer was dispensed into compound plates.

6) The cell plates were washed three times with 80 μL per well of Bath-1 Buffer, leaving 25 L of residual volume. Then 25 μL per well from compound plate was transferred to each cell plate. The mixture was incubated for 30 minutes at room temperature/ambient conditions.

7) The cell plate containing compound was read on E-VIPR using the current-controlled amplifier to deliver stimulation wave pulses using a symmetrical biphasic waveform. The user-programmed electrical stimulus protocols were 1.25-4 Amps and 4-6 millisecond pulse width (dependent on electrode composition) were delivered at 10 Hz for 10 seconds. A pre-stimulus recording was performed for each well for 0.5 seconds to obtain the un-stimulated intensities baseline. The stimulatory waveform was followed by 0.5 seconds of post-stimulation recording to examine the relaxation to the resting state. All E-VIPR responses were measured at 200 Hz acquisition rate.

Data Analysis:

Data were analyzed and reported as normalized ratios of emission intensities measured in the 460 nm and 580 nm channels. The response as a function of time was reported as the ratios obtained using the following formula:

$$R(t) = \frac{(\text{intensity}_{460\ nm})}{(\text{intensity}_{580\ nm})}$$

The data were further reduced by calculating the initial $(R_i)$ and final $(R_f)$ ratios. These were the average ratio values during part or all of the pre-stimulation period and during sample points during the stimulation period. The fluorescence ratio $(R_f/R_i)$ was then calculated and reported as a function of time.

Control responses were obtained by performing assays in the presence of the positive control, and in the absence of pharmacological agents (DMSO vehicle negative control). Responses to the negative (N) and positive (P) controls were calculated as above. The compound antagonist % activity A was then defined as:

$$A = \frac{X - N}{P - N} \times 100$$

where X is the ratio response of the test compound. Using this analysis protocol, dose response curves were plotted and $IC_{50}$ values were generated for various compounds of the present invention as reported below in Table 4.

TABLE 4

$IC_{50}$ Values of Compounds of the Invention in E-VIPR Assay
(A = $IC_{50}$ < 0.1 μM; B = 0.5 μM > $IC_{50}$ ≥ 0.1 μM;
C = 1 μM > $IC_{50}$ ≥ 0.5 μM; D = $IC_{50}$ ≥ 1 μM)

| Cmpd # | EVIPR HS $IC_{50}$ (μM) |
|---|---|
| 1 | D |
| 2 | B |
| 3 | B |
| 4 | |
| 5 | |
| 6 | B |
| 7 | D |
| 8 | C |
| 9 | D |

TABLE 4-continued $IC_{50}$ Values of Compounds of the Invention in E-VIPR Assay
(A = $IC_{50}$ < 0.1 μM; B = 0.5 μM > $IC_{50}$ ≥ 0.1 μM;
C = 1 μM > $IC_{50}$ ≥ 0.5 μM; D = $IC_{50}$ ≥ 1 μM)

| Cmpd # | EVIPR HS $IC_{50}$ (μM) |
|---|---|
| 10 | D |
| 11 | B |
| 12 | D |
| 13 | D |
| 14 | B |
| 15 | B |
| 16 | A |
| 17 | A |
| 18 | C |
| 19 | D |
| 20 | A |
| 21 | D |
| 22 | D |
| 23 | C |
| 24 | D |
| 25 | B |
| 26 | D |
| 27 | D |
| 28 | D |
| 29 | C |
| 30 | B |
| 31 | D |
| 32 | D |
| 33 | D |
| 34 | D |
| 35 | B |

Many modifications and variations of the embodiments described herein may be made without departing from the scope, as is apparent to those skilled in the art. The specific embodiments described herein are offered by way of example only.

What is claimed is:

1. A compound of formula (I), (II), or (III)

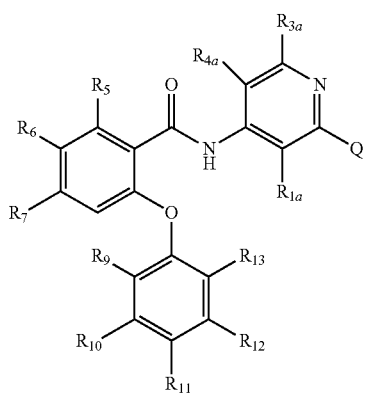

I

-continued

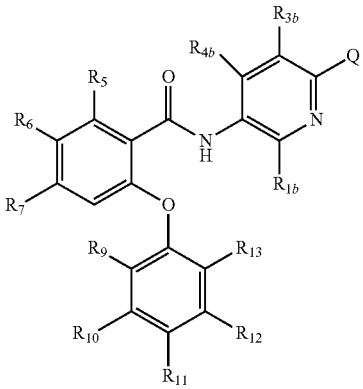

II

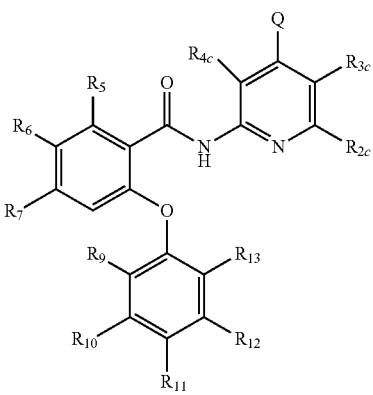

III or a pharmaceutically acceptable salt thereof, wherein:
Q is C(O)OR$_o$ or NR$_n$C(O)OR$_o$;
R$_n$ is H or C$_1$-C$_6$ alkyl;
each R$_o$ is independently C$_1$-C$_6$ alkyl;
R$_{1a}$ is H, halo, C$_1$-C$_6$ alkyl, C$_1$-C$_6$ haloalkyl, C$_1$-C$_6$ alkoxy, or C$_1$-C$_6$ haloalkoxy;
R$_{3a}$ is H, halo, C$_1$-C$_6$ alkyl, C$_1$-C$_6$ haloalkyl, C$_1$-C$_6$ alkoxy, C$_1$-C$_6$ haloalkoxy or C(O)OR$_o$;
R$_{4a}$ is H, halo, C$_1$-C$_6$ alkyl, C$_1$-C$_6$ haloalkyl, C$_1$-C$_6$ alkoxy, C$_1$-C$_6$ haloalkoxy, or —W—R$_w$;
R$_{1b}$ is H, halo, C$_1$-C$_6$ alkyl, C$_1$-C$_6$ haloalkyl, C$_1$-C$_6$ alkoxy, or C$_1$-C$_6$ haloalkoxy;
R$_{3b}$ is H, halo, C$_1$-C$_6$ alkyl, C$_1$-C$_6$ haloalkyl, C$_1$-C$_6$ alkoxy, or C$_1$-C$_6$ haloalkoxy;
R$_{4b}$ is H, halo, C$_1$-C$_6$ alkyl, C$_1$-C$_6$ haloalkyl, C$_1$-C$_6$ alkoxy, or C$_1$-C$_6$ haloalkoxy;
R$_{2c}$ is H, halo, C$_1$-C$_6$ alkyl, C$_1$-C$_6$ haloalkyl, C$_1$-C$_6$ alkoxy, or C$_1$-C$_6$ haloalkoxy;
R$_{3c}$ is H, halo, C$_1$-C$_6$ alkyl, C$_1$-C$_6$ haloalkyl, C$_1$-C$_6$ alkoxy, or C$_1$-C$_6$ haloalkoxy;
R$_{4c}$ is H, halo, C$_1$-C$_6$ alkyl, C$_1$-C$_6$ haloalkyl, C$_1$-C$_6$ alkoxy, or C$_1$-C$_6$ haloalkoxy;
R$_5$ is H, halo, OH, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_6$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_7$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$;
R$_9$ is H, halo, C$_1$-C$_6$ alkyl, C$_1$-C$_6$ haloalkyl, C$_1$-C$_6$ alkoxy, or C$_1$-C$_6$ haloalkoxy;
R$_{10}$ is H, halo, C$_1$-C$_6$ alkyl, C$_1$-C$_6$ haloalkyl, C$_1$-C$_6$ alkoxy, or C$_1$-C$_6$ haloalkoxy;
R$_{11}$ is H, halo, C$_1$-C$_6$ alkyl, C$_1$-C$_6$ haloalkyl, C$_1$-C$_6$ alkoxy, or C$_1$-C$_6$ haloalkoxy;
R$_{12}$ is H, halo, C$_1$-C$_6$ alkyl, C$_1$-C$_6$ haloalkyl, C$_1$-C$_6$ alkoxy, or C$_1$-C$_6$ haloalkoxy;
R$_{13}$ is H, halo, C$_1$-C$_6$ alkyl, C$_1$-C$_6$ haloalkyl, C$_1$-C$_6$ alkoxy, or C$_1$-C$_6$ haloalkoxy;
each W is independently O or a single bond;
each R$_w$ is independently 3-6 membered cycloalkyl, phenyl, or 5-6 membered heteroaryl, wherein said 3-6 membered cycloalkyl, phenyl, or 5-6 membered heteroaryl may be unsubstituted or may be substituted with 1-3 substituents selected from a group consisting of halo, C$_1$-C$_6$ alkyl, and C$_1$-C$_6$ haloalkyl; and
n is 0 or 1;
wherein the compound of formula (I), (II), or (III) is not methyl 5-(2-(2,4-dimethoxyphenoxy)-5-(trifluoromethyl)benzamido)picolinate or methyl 5-(4,5-dichloro-2-(4-fluoro-2-methoxyphenoxy)benzamido)picolinate.

2. The compound of claim 1, wherein:
the compound is of formula (I) or (II);
R$_{1a}$ is H;
R$_{3a}$ is H, halo, C$_1$-C$_6$ alkyl, C$_1$-C$_6$ haloalkyl, C$_1$-C$_6$ alkoxy, or C$_1$-C$_6$ haloalkoxy;
R$_{4a}$ is H, halo, C$_1$-C$_6$ alkyl, C$_1$-C$_6$ haloalkyl, C$_1$-C$_6$ alkoxy, or C$_1$-C$_6$ haloalkoxy; and
R$_5$ is H, halo, C$_1$-C$_6$ alkyl, C$_1$-C$_6$ haloalkyl, C$_1$-C$_6$ alkoxy, C$_1$-C$_6$ haloalkoxy, or —W—(CH$_2$)$_n$—R$_w$.

3. The compound of claim 1, or a pharmaceutically acceptable salt thereof, wherein Q is C(O)OR$_o$.

4. The compound of claim 1, or a pharmaceutically acceptable salt thereof, wherein Q is NHC(O)OR$_o$.

5. The compound of claim 1, wherein the compound has formula (I-A)

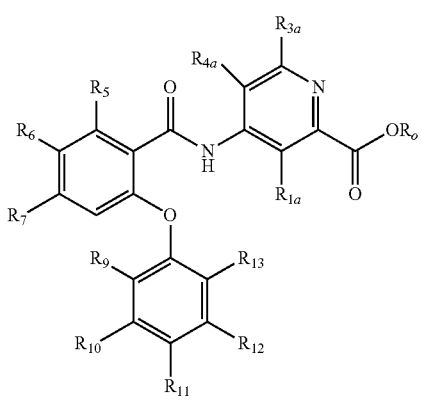

I-A or a pharmaceutically acceptable salt thereof, wherein R$_o$, R$_{1a}$, R$_{3a}$, R$_{4a}$, R$_5$, R$_6$, R$_7$, R$_9$, R$_{10}$, R$_{11}$, R$_{12}$, R$_{13}$, W, R$_w$, and n are as defined in claim 1 or 2.

6. The compound of claim 1, wherein the compound has formula (II-A)

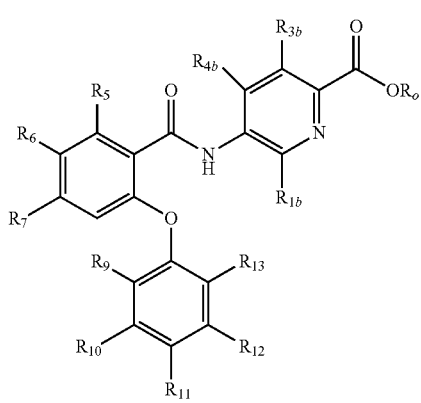

or a pharmaceutically acceptable salt thereof, wherein $R_o$, $R_{1b}$, $R_{3b}$, $R_{4b}$, $R_5$, $R_6$, $R_7$, $R_9$, $R_{10}$, $R_{11}$, $R_{12}$, $R_{13}$, W, $R_w$, and n are as defined in claim 1 or 2;

wherein the compound of formula (II-A) is not methyl 5-(2-(2,4-dimethoxyphenoxy)-5-(trifluoromethyl)benzamido)picolinate or methyl 5-(4,5-dichloro-2-(4-fluoro-2-methoxyphenoxy)benzamido)picolinate.

7. The compound of claim 1, wherein the compound has formula (III-A)

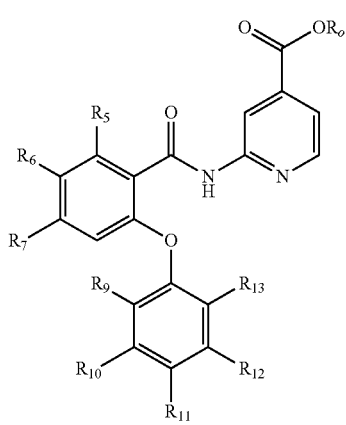

or a pharmaceutically acceptable salt thereof, wherein $R_o$, $R_5$, $R_6$, $R_7$, $R_9$, $R_{10}$, $R_{11}$, $R_{12}$, $R_{13}$, W, $R_w$, and n are as defined in claim 1.

8. The compound of claim 1, wherein the compound has formula (I-B)

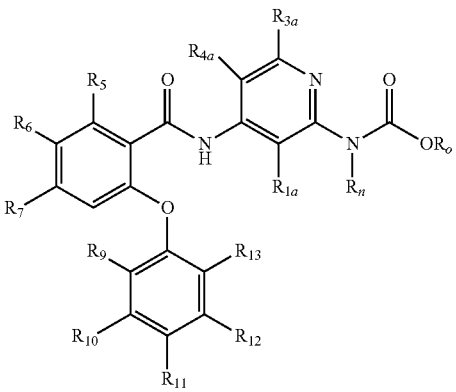

or a pharmaceutically acceptable salt thereof, wherein $R_n$, $R_o$, $R_{1a}$, $R_{3a}$, $R_{4a}$, $R_5$, $R_6$, $R_7$, $R_9$, $R_{10}$, $R_{11}$, $R_{12}$, $R_{13}$, W, $R_w$, and n are as defined in claim 1 or 2.

9. The compound of claim 5, wherein $R_{1a}$ is H, F, or $CH_3$; $R_{3a}$ is H; and $R_{4a}$ is H, $C_1$-$C_6$ alkyl, or cyclopropyl.

10. The compound of claim 6, or a pharmaceutically acceptable salt thereof, wherein $R_{1b}$, $R_{3b}$, and $R_{4b}$ are each H.

11. The compound of claim 1, or a pharmaceutically acceptable salt thereof, wherein $R_5$ is H, halo, OH, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$.

12. The compound of claim 1, or a pharmaceutically acceptable salt thereof, wherein $R_6$ is H, halo, $C_1$-$C_6$ alkyl, $C_1$-$C_6$ haloalkyl, $C_1$-$C_6$ alkoxy, $C_1$-$C_6$ haloalkoxy, 3-6 membered cycloalkyl, or —W—$(CH_2)_n$—$R_w$.

13. The compound of claim 1, or a pharmaceutically acceptable salt thereof, wherein $R_7$ is H, halo, $C_1$-$C_6$ alkyl, $C_1$-$C_6$ haloalkyl, $C_1$-$C_6$ alkoxy, $C_1$-$C_6$ haloalkoxy, or —W—$(CH_2)_n$—$R_w$.

14. The compound of claim 1, or a pharmaceutically acceptable salt thereof, wherein $R_9$ is H, halo, $C_1$-$C_6$ alkyl, $C_1$-$C_6$ alkoxy, $C_1$-$C_6$ haloalkyl, or $C_1$-$C_6$ haloalkoxy.

15. The compound of claim 1, or a pharmaceutically acceptable salt thereof, wherein $R_{10}$ is H or F.

16. The compound of claim 1, or a pharmaceutically acceptable salt thereof, wherein $R_{11}$ is H, halo, $C_1$-$C_6$ alkyl, $C_1$-$C_6$ alkoxy, $C_1$-$C_6$ haloalkyl, or $C_1$-$C_6$ haloalkoxy.

17. The compound of claim 1, or a pharmaceutically acceptable salt thereof, wherein $R_{12}$ is H.

18. The compound of claim 1, or a pharmaceutically acceptable salt thereof, wherein $R_{13}$ is H.

19. The compound of claim 1, wherein the compound is selected from:

1
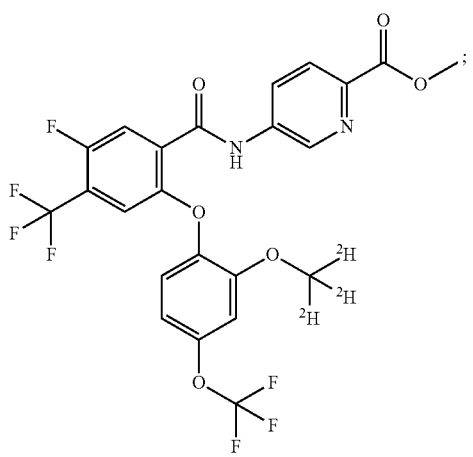
2
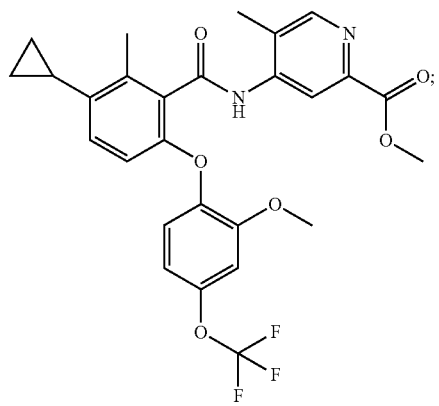
3
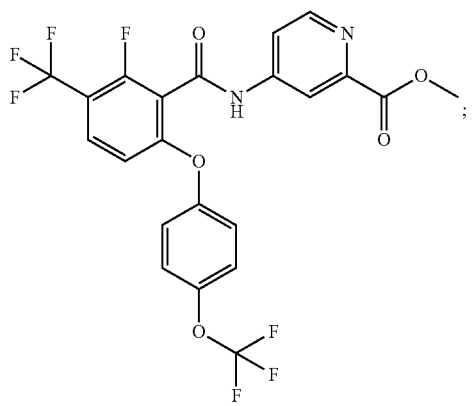
4
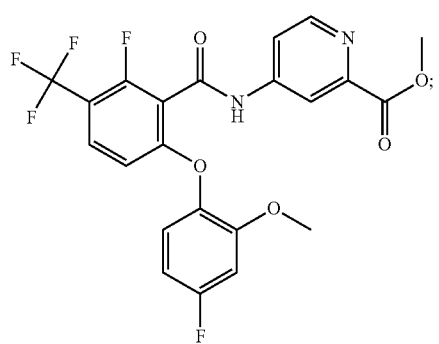
5
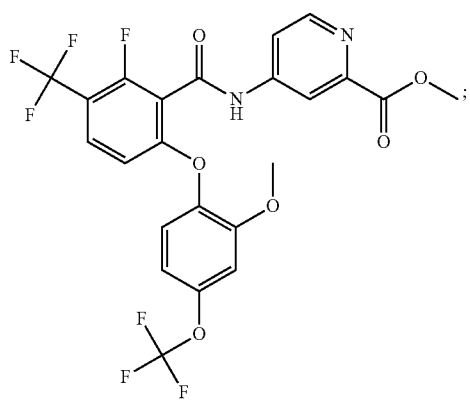
6
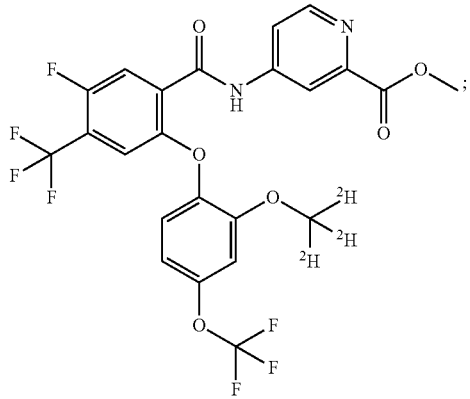
7
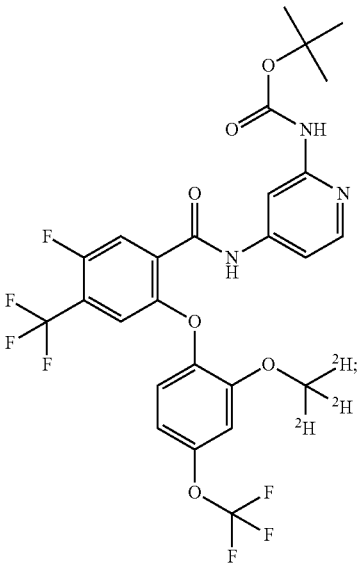

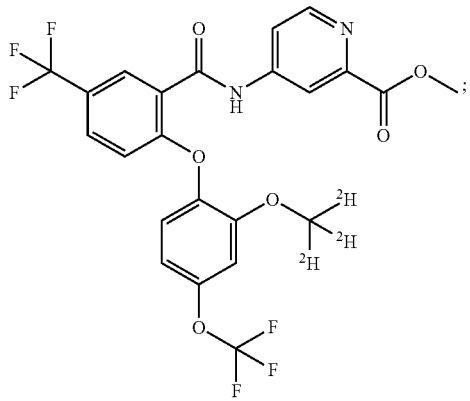
8
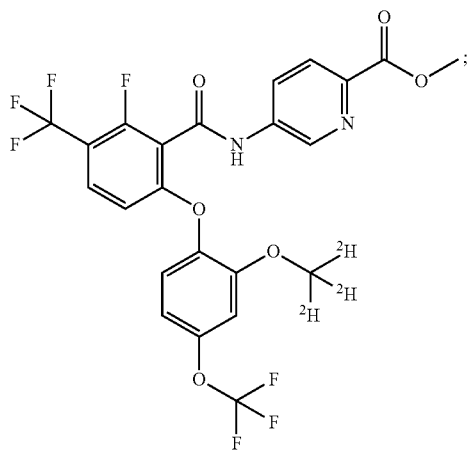
11
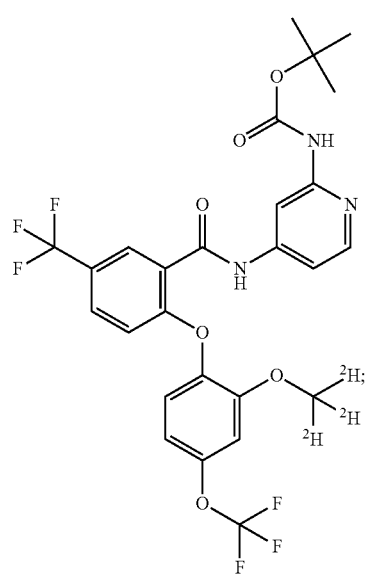
9
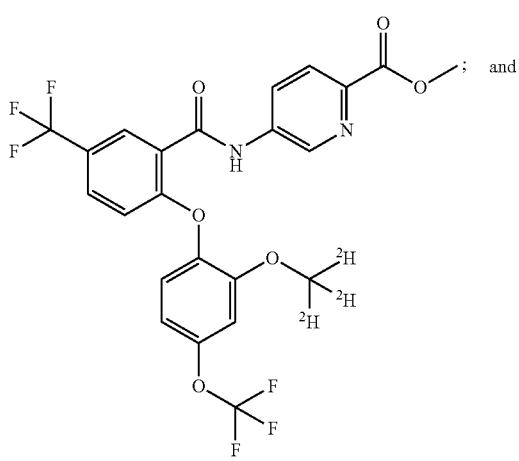
12
and
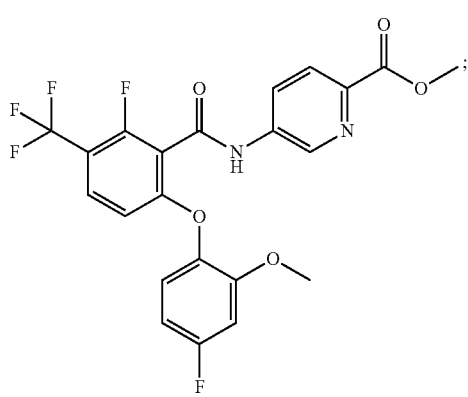
10
13
or a pharmaceutically acceptable salt thereof.
20. The compound of claim 1, wherein the compound is selected from:

14
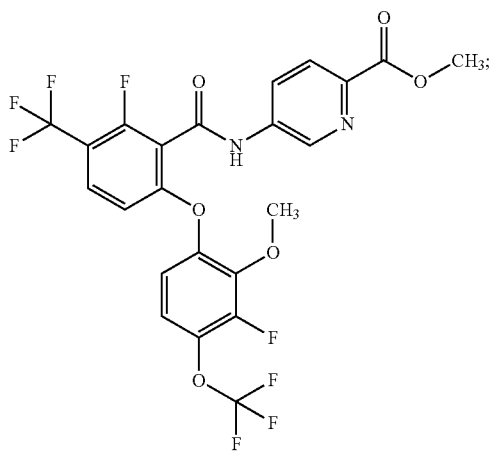
15
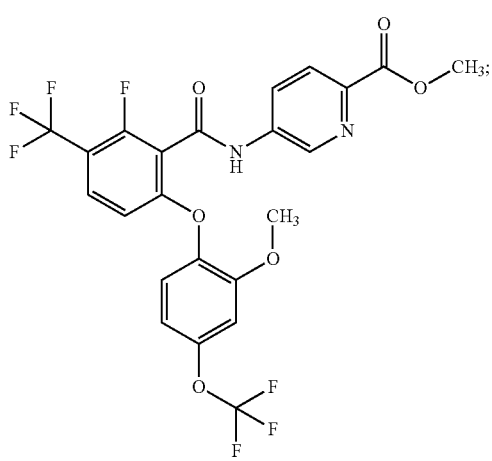
16
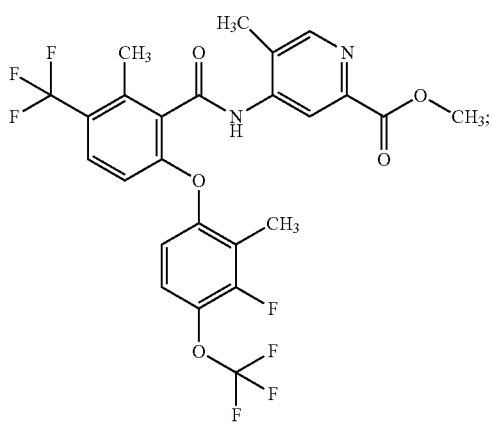
17
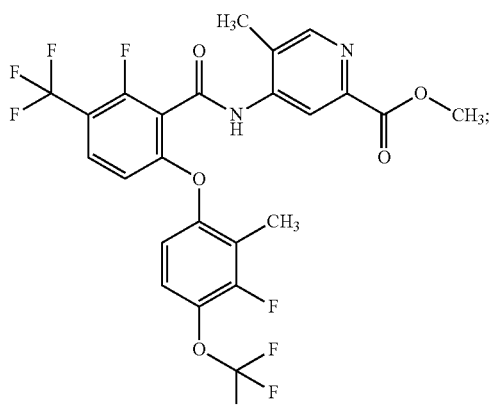
18
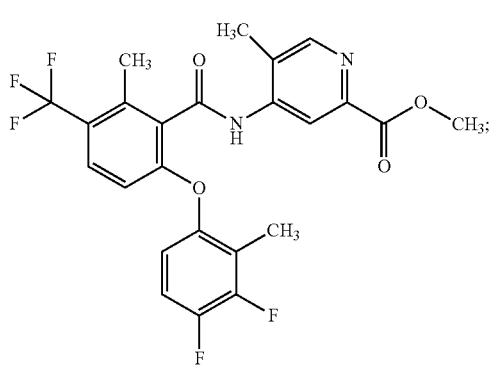
19
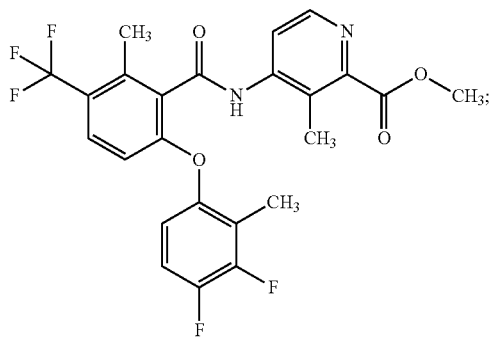
20
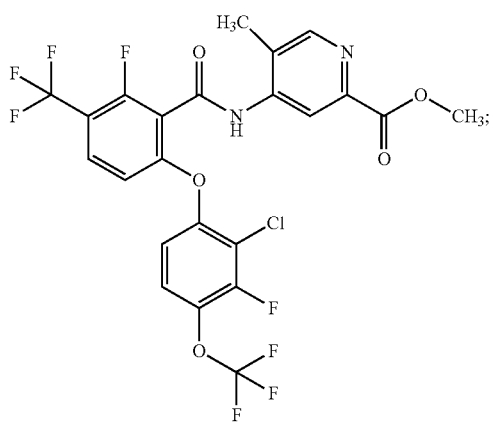

21
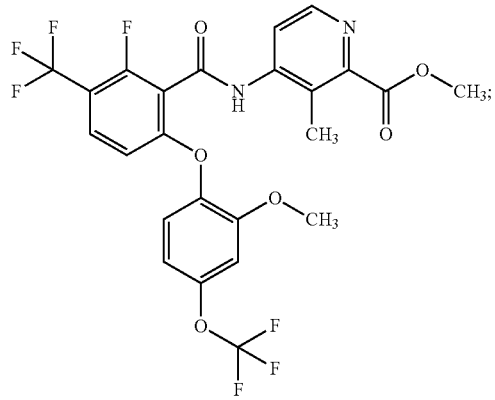
22
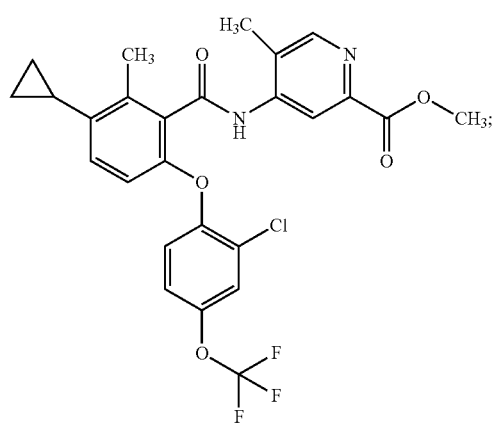
23
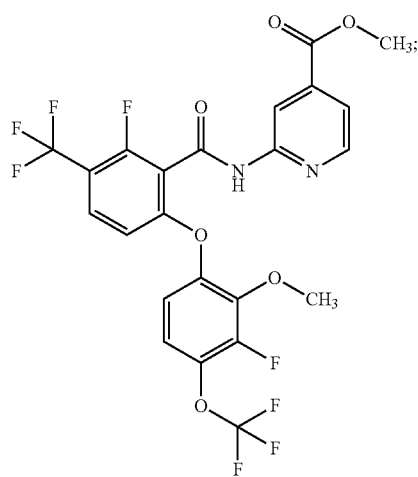
24
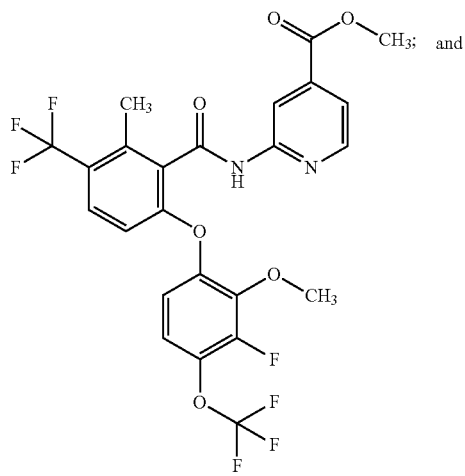
and
25
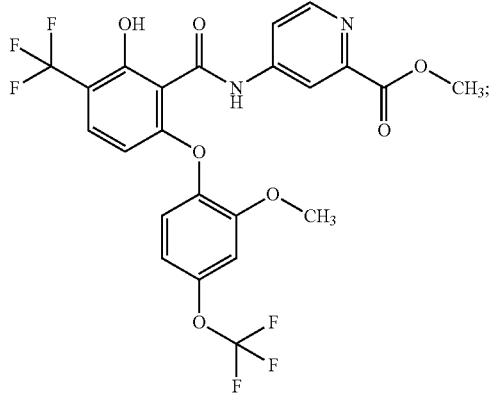
or a pharmaceutically acceptable salt thereof.
21. The compound of claim 1, wherein the compound is selected from:
26
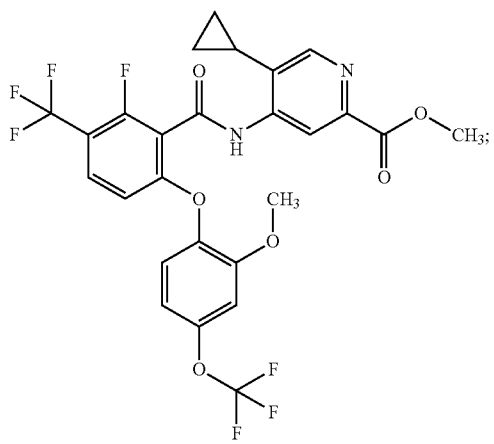

27
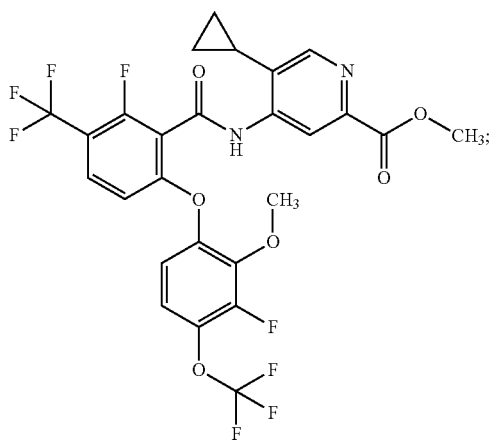
28
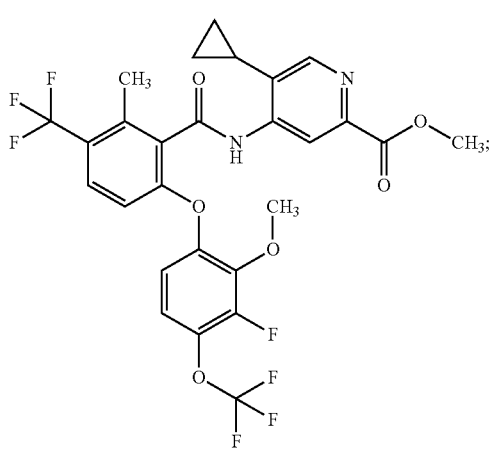
29
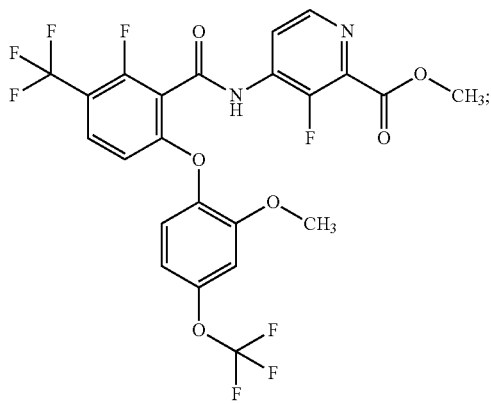
30
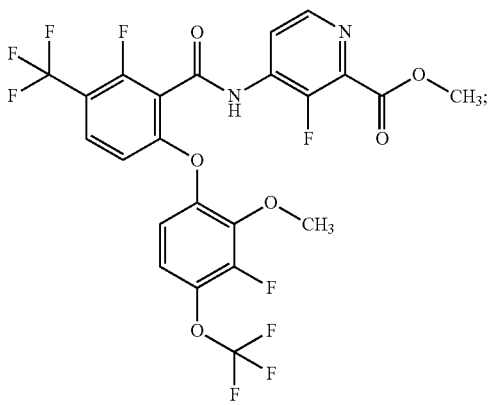
31
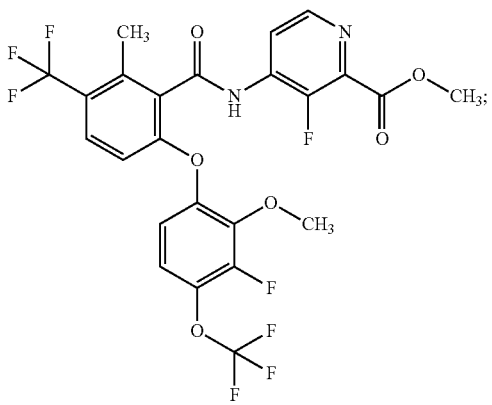
32
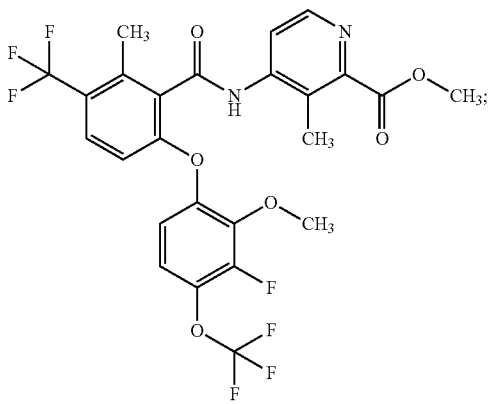

33

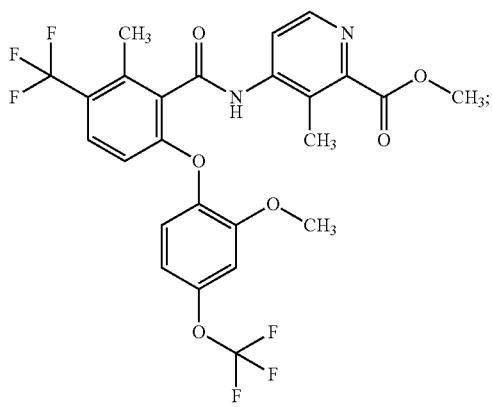

34

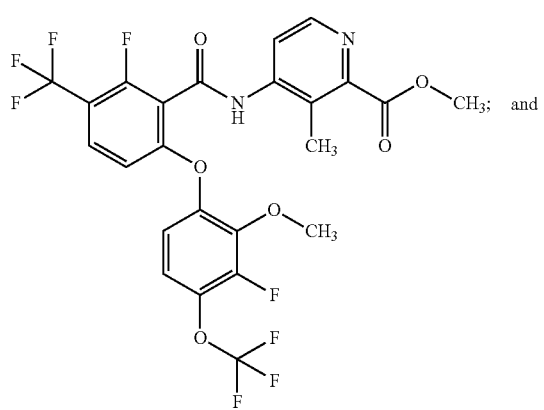
and

35

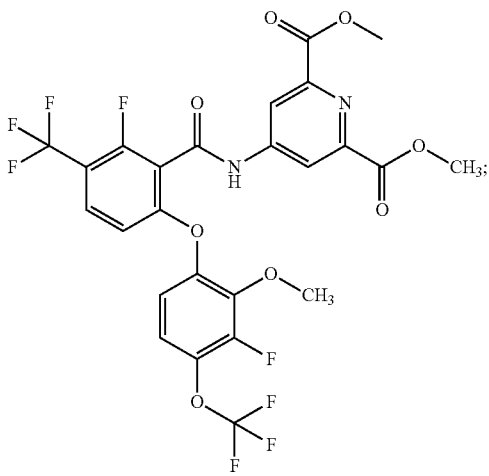

or a pharmaceutically acceptable salt thereof.

22. A pharmaceutical composition comprising the compound of claim 1, or a pharmaceutically acceptable salt thereof, and one or more pharmaceutically acceptable carriers or vehicles.

23. A method of treating or lessening the severity in a subject of chronic pain, gut pain, neuropathic pain, musculoskeletal pain, acute pain, inflammatory pain, cancer pain, idiopathic pain, postsurgical pain, visceral pain, incontinence, comprising administering to the subject an effective amount of the compound of claim 1, or a pharmaceutically acceptable salt thereof.

* * * * *